US010933615B2

(12) United States Patent
Tsuboi et al.

(10) Patent No.: US 10,933,615 B2
(45) Date of Patent: Mar. 2, 2021

(54) MULTILAYER TUBES

(71) Applicant: UBE INDUSTRIES, LTD., Ube (JP)

(72) Inventors: Kazutoshi Tsuboi, Ube (JP); Koji Nakamura, Ube (JP); Takaaki Kusumoto, Ube (JP); Daisuke Douyama, Ube (JP)

(73) Assignee: UBE INDUSTRIES, LTD., Ube (JP)

( * ) Notice: Subject to any disclaimer, the term of this patent is extended or adjusted under 35 U.S.C. 154(b) by 0 days.

(21) Appl. No.: 16/651,494

(22) PCT Filed: Sep. 12, 2018

(86) PCT No.: PCT/JP2018/033772
§ 371 (c)(1),
(2) Date: Mar. 27, 2020

(87) PCT Pub. No.: WO2019/065232
PCT Pub. Date: Apr. 4, 2019

(65) Prior Publication Data
US 2020/0262188 A1 Aug. 20, 2020

(30) Foreign Application Priority Data
Sep. 29, 2017 (JP) ............................. JP2017-189986

(51) Int. Cl.

| | |
|---|---|
| ***B32B 27/34*** | (2006.01) |
| ***B29C 48/00*** | (2019.01) |
| ***B29C 48/18*** | (2019.01) |
| ***B32B 1/08*** | (2006.01) |
| ***B32B 27/08*** | (2006.01) |
| ***B32B 27/30*** | (2006.01) |
| ***B32B 27/32*** | (2006.01) |
| ***F02M 37/00*** | (2006.01) |
| *B29K 77/00* | (2006.01) |

(52) U.S. Cl.
CPC ............ *B32B 27/34* (2013.01); *B29C 48/022* (2019.02); *B29C 48/18* (2019.02); *B32B 1/08* (2013.01); *B32B 27/08* (2013.01); *B32B 27/304* (2013.01); *B32B 27/322* (2013.01); *F02M 37/0011* (2013.01); *B29K 2077/00* (2013.01); *B32B 2597/00* (2013.01)

(58) Field of Classification Search
CPC ........... B32B 27/34; B32B 1/08; B32B 27/08; B32B 27/304; B32B 27/322; B32B 2597/00; B29C 48/022; B29C 48/18; F02M 37/0011; B29K 2077/00
See application file for complete search history.

(56) References Cited

U.S. PATENT DOCUMENTS

| | | | | |
|---|---|---|---|---|
| 5,554,425 | A | 9/1996 | Krause et al. | |
| 2002/0012806 | A1 | 1/2002 | Flepp et al. | |
| 2006/0280888 | A1 | 12/2006 | Bersted et al. | |
| 2008/0014397 | A1 | 1/2008 | Manai et al. | |
| 2009/0252979 | A1 | 10/2009 | Ferreiro et al. | |
| 2009/0269532 | A1 | 10/2009 | Ferreiro et al. | |
| 2009/0269533 | A1 | 10/2009 | Sato | |
| 2015/0353792 | A1 | 12/2015 | Montanari et al. | |
| 2016/0193813 | A1 | 7/2016 | Sato et al. | |
| 2016/0214343 | A1 * | 7/2016 | Nakamura ................ | F16L 9/12 |
| 2016/0271919 | A1 | 9/2016 | Berger et al. | |
| 2016/0271920 | A1 | 9/2016 | Franosch et al. | |
| 2018/0257354 | A1 | 9/2018 | Nakamura et al. | |

FOREIGN PATENT DOCUMENTS

| | | | |
|---|---|---|---|
| JP | 4-272592 | A | 9/1992 |
| JP | 2003-535717 | A | 12/2003 |
| JP | 2006-44201 | A | 2/2006 |
| JP | 2007-502726 | A | 2/2007 |
| JP | 2008-18702 | A | 1/2008 |
| JP | 2009-234259 | A | 10/2009 |
| JP | 2009-235394 | A | 10/2009 |
| JP | 2009-279927 | A | 12/2009 |
| JP | 2014-240147 | A | 12/2014 |
| JP | 2016-172445 | A | 9/2016 |
| JP | 2016-172449 | A | 9/2016 |
| WO | WO 2015/022818 | A1 | 2/2015 |
| WO | WO 2015/033982 | A1 | 3/2015 |
| WO | WO 2017/094564 | A1 | 6/2017 |
| WO | WO 2017/170985 | A1 | 10/2017 |

OTHER PUBLICATIONS

International Search Report (PCT/ISA/210) issued in PCT/JP2018/033772, dated Nov. 27, 2018.

* cited by examiner

*Primary Examiner* — Michael C Miggins
(74) *Attorney, Agent, or Firm* — Birch, Stewart, Kolasch & Birch, LLP

(57) ABSTRACT

It is provided a multilayer tube having a layer containing a specific aliphatic polyamide composition and a layer containing a semi-aromatic polyamide composition which contains a semi-aromatic polyamide having a specific structure or a mixture thereof, and the both layers being disposed adjacent to each other, wherein the aliphatic polyamide composition contains an aliphatic polyamide having a melting point of a specific value or less, and a ratio of the number of the methylene groups to the number of the amide groups is a specific value or more, an aliphatic polyamide having an absolute value of a difference in solubility parameter SP values to that of the aliphatic polyamide being a specific range, and an elastomer polymer containing a constitutional unit derived from an unsaturated compound having a carboxyl group and/or an acid anhydride group.

13 Claims, No Drawings

MULTILAYER TUBES

TECHNICAL FIELD

The present invention relates to a multilayer tube.

BACKGROUND ART

In a tube for automobile tubing, there is a problem of rust caused by deicing agents on roads, and in response to demand for preventing global warming and saving energy, its main material is now progressing replacement from a metal to a resin having excellent rust resistance and being lightweight. In general, the resin to be used as a tube for piping may be mentioned a polyamide resin, a saturated polyester-based resin, a polyolefin resin, a thermoplastic polyurethane-based resin, etc., and in the case of a single-layer tube using these, the applicable range is limited since heat resistance, chemical resistance, etc., are insufficient.

Also, into a tube for automobile tubing, from the viewpoints of consumption saving and high performance of gasoline, oxygen-containing gasoline to which alcohols having low boiling points such as methanol, ethanol, etc., or ethers such as ethyl-t-butyl ether (ETBE), etc., are blended, etc., are transferred. Further, from the viewpoint of preventing environmental pollution, strict exhaust gas regulations including prevention of leakage of volatile hydrocarbons, etc., into the atmosphere through piping tube partition walls are being implemented. Against such strict regulations, a polyamide-based resin which has been conventionally used, in particular, a single-layer tube using polyamide 11 or polyamide 12 alone excellent in strength, toughness, chemical resistance, flexibility, etc., is insufficient in barrier properties against the above-mentioned chemical solution, and, in particular, improvement in barrier properties to the alcohol-containing gasoline has been required.

As a method for solving the problem, a multilayer tube to which a resin having good barrier property to a chemical solution, for example, an ethylene/vinyl acetate copolymer saponified product (EVOH), polymetaxylylene adipamide (polyamide MXD6), polybutylene terephthalate (PBT), polyethylene naphthalate (PEN), polybutylene naphthalate (PBN), polyphenylene sulfide (PPS), polyvinylidene fluoride (PVDF), an ethylene/tetrafluoroethylene copolymer (ETFE), an ethylene/chlorotrifluoroethylene copolymer (ECTFE), a tetrafluoroethylene/hexafluoropropylene copolymer (TFE/HFP, FEP), a tetrafluoroethylene/hexafluoropropylene/vinylidene fluoride copolymer (TFE/HFP/VDF, THV), a tetrafluoroethylene/hexafluoropropylene/vinylidene fluoride/perfluoro(alkyl vinyl ether) copolymer (TFE/HFP/VDF/PAVE), a tetrafluoroethylene/perfluoro(alkyl vinyl ether) copolymer (TFE/PAVE, PFA), a tetrafluoroethylene/hexafluoropropylene/perfluoro(alkyl vinyl ether) copolymer (TFE/HFP/PAVE) or a chlorotrifluoroethylene/perfluoro(alkyl vinyl ether)/tetrafluoroethylene copolymer (CTFE/PAVE/TFE, CPT) is provided has been proposed (see Patent Document 1).

Among these, it has been proposed a hollow molded material comprising a layer which comprises an aliphatic polyamide and a layer which comprises a polyterephthalamide (PPA) such as a poly(hexamethylene terephthalamide/hexamethylene adipamide) copolymer (polyamide 6T/66), a poly(hexamethylene terephthalamide/hexamethylene isophthalamide/hexamethylene adipamide) copolymer (polyamide 6T/6I/66), etc., and an impact resistance improving material (see Patent Document 2).

Also, it has been proposed a tube for fuel transfer in which polymetaxylylene adipamide (polyamide MXD6) is disposed at an intermediate layer, and an adhesive layer such as modified olefin, etc., is disposed at an outer layer and an intermediate layer or a multilayer tube in which a polyamide resin having compatibility with polyamide MXD6 and the polyamide MXD6 and softer than polyamide MXD6 is disposed to improve low temperature impact resistance as an the intermediate layer, and a modified olefin or a polyamide 6/12 copolymer is disposed as an adhesive layer (see Patent Documents 3 and 4).

On the other hand, in order to simplify the entire producing process of the multilayer tube and reduce costs and management, development of an adhesive layerless in which a long-chain polyamide such as polyamide 12, etc., as an outer layer material and polyamide MXD6 are directly adhered is also progressing. For example, it has been proposed a multilayered product having a layer comprising a polyamide resin composition which contains polyamide MXD6, polyamide 11 and/or polyamide 12, and a carbodiimide compound having two or more carbodiimide groups in the molecule as a compatibilizing agent to the above, and a layer comprising polyamide 11 and/or polyamide 12, and a fuel tube using the multilayered product (see Patent Document 5). The present inventors have proposed a multilayered structural material comprising at least two or more layers, which contains a layer comprising an aliphatic polyamide, and a layer comprising a semi-aromatic polyamide which comprises a diamine unit containing 60 mol % or more of a xylylene diamine and/or a naphthalene dimethylamine unit based on the whole diamine units and a dicarboxylic acid unit containing 60 mol % or more of an aliphatic dicarboxylic acid unit having 8 or more and 13 or less carbon atoms based on the whole dicarboxylic acid units (see Patent Document 6). Also, a multilayer structural material which comprises a layer containing a long-chain polyamide resin, and a layer containing a mixture which comprises a semi-aromatic polyamide comprising a metaxylylene diamine unit and an aliphatic acid dicarboxylic acid unit having 4 or more and 8 or less carbon atoms, and a semi-aromatic polyamide comprising a xylylene diamine unit and a dicarboxylic acid unit which comprises an aliphatic dicarboxylic acid having 9 or more and 12 or less carbon atoms with a specific amount, and a multilayer structural material comprising a layer containing long-chain polyamide resin, and a layer containing a semi-aromatic polyamide composition which comprises a semi-aromatic polyamide comprising a xylylene diamine unit and an aliphatic acid dicarboxylic acid unit having 4 or more and 12 or less carbon atoms, a modified polyolefin, and a long-chain polyamide have been proposed (see Patent Documents 7 and 8).

Further, a multilayered structural material comprising a layer which comprises a specific polyamide copolymer comprising hexamethylenediamine, terephthalic acid and an aliphatic dicarboxylic acid having 8 or more and less than 19 carbon atoms and a layer which comprises a semi-aromatic polyamide comprising m- and/or p-xylylene diamine and an aliphatic dicarboxylic acid having 4 or more and less than 12 carbon atoms, and a multilayered structural material comprising a layer which comprises a specific polyamide copolymer comprising hexamethylenediamine, terephthalic acid and an aliphatic dicarboxylic acid having 8 or more and less than 19 carbon atoms and a layer which comprises a semi-aromatic polyamide comprising an aromatic dicarboxylic acid such as terephthalic acid, etc., and an aliphatic diamine have been proposed (see Patent Documents 9 and 10).

PRIOR ART DOCUMENTS

Patent Documents

Patent Document 1: U.S. Pat. No. 5,554,425
Patent Document 2: JP 2007-502726A
Patent Document 3: JP Hei. 4-272592A
Patent Document 4: JP 2008-18702A
Patent Document 5: JP 2009-279927A
Patent Document 6: JP 2006-044201A
Patent Document 7: WO 2015-22818A
Patent Document 8: WO 2017-94564A
Patent Document 9: JP 2016-172445A
Patent Document 10: JP 2016-172449A

SUMMARY OF THE INVENTION

Problems to be Solved by the Invention

In the multilayered structural material of Patent Document 5, although interlayer adhesiveness polyamide 11 or polyamide 12 is improved to a certain extent, the interlayer adhesiveness is affected by morphology of the resin composition comprising polyamide MXD6 and polyamide 11 and/or polyamide 12, which has drawback that fluctuation or lowering in the interlayer adhesiveness is remarkable depending on the extrusion conditions or the conditions of use environment, etc. In the multilayered structural material or the multilayer tube disclosed in the other Patent Documents, whereas interlayer adhesiveness at the initial stage is sufficient to a certain extent, durability of interlayer adhesiveness after contacting or dipping in a fuel for a long time or after heat treatment, etc., remains room to be improved.

In addition, in the multilayered structural material of Patent Document 6, whereas barrier property to hydrocarbons is satisfied, barrier property to ethanol-containing gasoline is desired to be further improved.

Means to Solve the Problems

The present inventors have intensively studied to solve the above-mentioned problems, and as a result, they have found that in a multilayer tube having a layer containing a specific aliphatic polyamide composition and a layer containing a semi-aromatic polyamide composition which contains a semi-aromatic polyamide having a specific structure or a mixture thereof, and the both layers are adjacent to each other, by containing an aliphatic polyamide having a melting point of a specific value or less and a ratio of the number of the methylene groups to the number of the amide groups of a specific value or more, an aliphatic polyamide having an absolute value of a difference in solubility parameter SP values to that of the aliphatic polyamide being a specific range, and an elastomer polymer containing a constitutional unit derived from an unsaturated compound having a carboxyl group and/or an acid anhydride group in the aliphatic polyamide composition, a multilayer tube having excellent in chemical liquid-barrier property, chemical resistance, interlayer adhesiveness and durability thereof while maintaining various characteristics such as low temperature impact resistance, and elution resistance to the monomer and the oligomer can be obtained.

That is, the present invention is directed to, a multilayer tube having two or more layers containing Layer (a) and Layer (b), at least one pair of Layer (a) and Layer (b) are disposed adjacent to each other, the Layer (a) contains an aliphatic polyamide composition (A), the Layer (b) contains a semi-aromatic polyamide composition (B), the above-mentioned aliphatic polyamide composition (A) contains a polyamide (A1), a polyamide (A2) and an elastomer polymer (A3), the polyamide (A1) is an aliphatic polyamide having a melting point measured in accordance with ISO 11357-3 of 210° C. or lower and having a ratio of the methylene groups to the amide groups of 8.0 or more, and contained in the above-mentioned aliphatic polyamide composition (A) in an amount of 40% by mass or more and 85% by mass or less, the polyamide (A2) is a polyamide other than the polyamide (A1) and contained in the above-mentioned aliphatic polyamide composition (A) in an amount of 10% by mass or more and 30% by mass or less, the above-mentioned elastomer polymer (A3) contains a constitutional unit derived from an unsaturated compound having a carboxyl group and/or an acid anhydride group, and contained in the above-mentioned aliphatic polyamide composition (A) in an amount of 5% by mass or more and 30% by mass or less, an absolute value of a difference in solubility parameter SP values of the polyamide (A1) and the polyamide (A2) [|(SP value of polyamide (A1))−(SP value of polyamide (A2))|] is 1.8 $(MPa)^{1/2}$ or more and 5.5 $(MPa)^{1/2}$ or less, the semi-aromatic polyamide composition (B) contains a semi-aromatic polyamide (B1) and/or a semi-aromatic polyamide (B2), the semi-aromatic polyamide (B1) and/or the semi-aromatic polyamide (B2) is/are contained in an amount(s) of 60% by mass or more, the semi-aromatic polyamide (B1) contains 60% by mass or more and 100% by mass or less of a semi-aromatic polyamide (B11) and 0% by mass or more and 40% by mass or less of a semi-aromatic polyamide (B12), the semi-aromatic polyamide (B11) contains 50 mol % or more of an aliphatic diamine unit having 4 or more and 8 or less carbon atoms based on whole diamine units of the semi-aromatic polyamide (B11), and contains 50 mol % or more of a dicarboxylic acid unit which contains at least one kind selected from the group consisting of a terephthalic acid unit, an isophthalic acid unit and a naphthalene dicarboxylic acid unit based on whole dicarboxylic acid units of the semi-aromatic polyamide (B11), the semi-aromatic polyamide (B12) contains 50 mol % or more of an aliphatic diamine unit having 9 or more and 12 or less carbon atoms based on whole diamine units of the semi-aromatic polyamide (B12), and contains 50 mol % or more of a dicarboxylic acid unit which contains at least one kind selected from the group consisting of a terephthalic acid unit, an isophthalic acid unit and a naphthalene dicarboxylic acid unit based on whole dicarboxylic acid units of the semi-aromatic polyamide (B12), the semi-aromatic polyamide (B2) contains 60% by mass or more and 100% by mass or less of a semi-aromatic polyamide (B21) and 0% by mass or more and 40% by mass or less of a semi-aromatic polyamide (B22), the semi-aromatic polyamide (B21) contains 50 mol % or more of a xylylene diamine unit and/or a bis(aminomethyl) naphthalene unit based on whole diamine units of the semi-aromatic polyamide (B21), and contains 50 mol % or more of an aliphatic dicarboxylic acid unit having 4 or more and 8 or less carbon atoms based on whole dicarboxylic acid units of the semi-aromatic polyamide (B21), and the semi-aromatic polyamide (B22) contains 50 mol % or more of a xylylene diamine unit and/or a bis(aminomethyl) naphthalene unit based on whole diamine units of the semi-aromatic polyamide (B22), and contains 50 mol % or more of an aliphatic dicarboxylic acid unit having 9 or more and 12 or less carbon atoms based on whole dicarboxylic acid units of the semi-aromatic polyamide (B22).

Preferred embodiments of the multilayer tube are shown below. The preferred embodiments can be used in combination.

[1] The multilayer tube, wherein the polyamide (A1) is at least one kind of a homopolymer selected from the group consisting of polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12), and/or at least one kind of a copolymer using several kinds of raw material monomers forming the homopolymer.

[2] The multilayer tube, wherein the polyamide (A2) is at least one kind of a homopolymer selected from the group consisting of polycaproamide (polyamide 6), polyhexamethylene adipamide (polyamide 66), polyhexamethylene azelamide (polyamide 69), polyhexamethylene sebacamide (polyamide 610) and polyhexamethylene dodecamide (polyamide 612), and/or at least one kind of a copolymer using several kinds of raw material monomers forming the homopolymer, or at least one kind of a copolymer comprising a raw material monomer(s) forming at least one kind selected from the group consisting of polycaproamide (polyamide 6), polyhexamethylene adipamide (polyamide 66), polyhexamethylene azelamide (polyamide 69), polyhexamethylene sebacamide (polyamide 610) and polyhexamethylene dodecamide (polyamide 612) as a main component, and using several kinds of raw material monomers forming at least one kind selected from the group consisting of polynonamethylene dodecamide (polyamide 912), polydecamethylene sebacamide (polyamide 1010), polydecamethylene dodecamide (polyamide 1012), polydodecamethylene dodecamide (polyamide 1212), polydodecanamide (polyamide 11) and polydodecanamide (polyamide 12).

[3] The multilayer tube, wherein when the terminal amino group concentration which is summed values of the respective terminal amino group concentrations (μeq/g) of the polyamide (A1) and the polyamide (A2) per 1 g of the aliphatic polyamide composition (A) multiplying a mixing mass ratio is made [A] (μeq/g), and when the terminal carboxyl group concentration which is summed values of the respective terminal carboxyl group concentrations (μeq/g) of the polyamide (A1) and the polyamide (A2) per 1 g of the aliphatic polyamide composition (A) multiplying a mixing mass ratio is made [B] (μeq/g), then [A]>[B]+10.

[4] The multilayer tube, wherein the semi-aromatic polyamide composition (B) contains an elastomer polymer (B3), and the elastomer polymer (B3) contains a constitutional unit derived from an unsaturated compound having a carboxyl group and/or an acid anhydride group.

[5] The multilayer tube, wherein, in at least one pair of the adjacent Layer (a) and Layer (b), the Layer (b) is disposed inside the Layer (a) and adjacent thereto.

[6] The multilayer tube, which further comprises Layer (c), at least one pair of the Layer (b) and the Layer (c) are disposed adjacent to each other, the Layer (c) contains a polyamide composition (C), and the polyamide composition (C) contains a polyamide (C1) and an elastomer polymer (C2), the polyamide (C1) is a polyamide other than the "aliphatic polyamide having a melting point measured in accordance with ISO 11357-3 of 210° C. or lower, and the ratio of the number of the methylene groups to the number of the amide groups of 8.0 or more", and is contained in an amount of 70% by mass or more and 95% by mass or less based on 100% by mass of the polyamide (C1) and the elastomer polymer (C2) in total, and the elastomer polymer (C2) contains a constitutional unit derived from an unsaturated compound having a carboxyl group and/or an acid anhydride group, and is contained in an amount of 5% by mass or more and 30% by mass or less based on 100% by mass of the polyamide (C1) and the elastomer polymer (C2) in total.

[7] The multilayer tube wherein the Layer (c) is disposed inside the Layer (b).

[8] The multilayer tube, which further comprises Layer (d), and the Layer (d) contains a fluorine-containing polymer (D) into which a functional group having reactivity to an amino group is introduced in its molecular chain.

[9] The multilayer tube wherein the Layer (d) is disposed inside the Layer (b).

[10] The multilayer tube, wherein the innermost layer is a conductive layer containing a thermoplastic resin composition in which a conductive filler is contained.

[11] The multilayer tube, wherein it is produced by co-extrusion molding.

[12] The multilayer tube, wherein it is used as a fuel tube.

Effects of the Invention

According to the present invention, it can be provided a multilayer tube excellent in chemical liquid-barrier property, chemical resistance, interlayer adhesiveness and durability thereof while maintaining various characteristics such as low temperature impact resistance, and elution resistance to monomers and oligomers.

EMBODIMENTS TO CARRY OUT THE INVENTION

The multilayer tube contains Layer (a) and Layer (b).

1. Layer (a)

Layer (a) of the multilayer tube contains an aliphatic polyamide composition (A).

[Aliphatic Polyamide Composition (A)]

The aliphatic polyamide composition (A) contains a polyamide (A1), a polyamide (A2) and an elastomer polymer (A3), the polyamide (A1) is an aliphatic polyamide having a melting point measured in accordance with ISO 11357-3 of 210° C. or lower, a ratio of a number of methylene groups to a number of amide groups of 8.0 or more, and is contained in the aliphatic polyamide composition (A) in an amount of 40% by mass or more and 85% by mass or less, the polyamide (A2) is a polyamide other than the polyamide (A1), and is contained in the aliphatic polyamide composition (A) in an amount of 10% by mass or more and 30% by mass or less, and the elastomer polymer (A3) contains a constitutional unit derived from an unsaturated compound having a carboxyl group and/or an acid anhydride group, and is contained in the aliphatic polyamide composition (A) in an amount of 5% by mass or more and 30% by mass or less, and an absolute value of difference in solubility parameter SP values of the polyamide (A1) and the polyamide (A2) [|(SP value of polyamide (A1))−(SP value of polyamide (A2))|] of 1.8 $(MPa)^{1/2}$ or more and 5.5 $(MPa)^{1/2}$ or less (hereinafter sometimes referred to as an aliphatic polyamide composition (A).).

Also, the aliphatic polyamide composition (A) preferably does not contain a plasticizer from the viewpoints of durability of interlayer adhesiveness after contacting and dipping in a fuel for a long time and/or after heat treatment for a short time.

[Polyamide (A1)]

The polyamide (A1) has a melting point measured in accordance with ISO 11357-3 (in the present specification, it sometimes simply refers to the "melting point".) of 210° C. or lower, contains aliphatic groups in the constitutional repeating units, has an amide bond(s) (—CONH—) in the main chain, and a ratio of a number of methylene groups ($[CH_2]$) to a number of amide groups ([NHCO]) $[CH_2]$/[NHCO] (hereinafter the ratio of the number of the methylene groups to the number of the amide groups is sometimes referred to as $[CH_2]$/[NHCO].) of 8.0 or more (hereinafter sometimes referred to as a polyamide (A1).).

The melting point measured in accordance with ISO 11357-3 of the polyamide (A1) is preferably 205° C. or lower, more preferably 200° C. or lower, and further preferably 195° C. or lower. Also, the $[CH_2]$/[NHCO] of the polyamide (A1) is preferably 9.0 or more, more preferably 9.5 or more, and further preferably 10.0 or more.

Incidentally, in accordance with ISO 11357-3, using a differential scanning calorimeter, the sample is heated to a temperature equal to or higher than the expected melting point and then, the sample is cooled at a rate of 10° C. per a minute, and after cooling to 30° C., it is allowing to stand as such for about 1 minutes and raising the temperature at a rate of 20° C. per a minute whereby the temperature at the peak value of the measured melting curve is defined to be the melting point.

If the ratio of the number of the methylene groups ($[CH_2]$) to the number of the amide groups ([NHCO]) of the polyamide (A1) is of a value less than the above-mentioned the value, mechanical characteristics and chemical resistance of the obtainable multilayer tube are poor.

In addition, if the melting point measured in accordance with ISO 11357-3 of the polyamide (A1) exceeds the above-mentioned value, the amide exchange reaction with the polyamide (A2) mentioned later does not sufficiently proceed under a usual processing temperature, interlayer adhesiveness and durability thereof of the obtainable multilayer tube are poor.

The polyamide (A1) has the melting point measured in accordance with ISO 11357-3 of 210° C. or lower and a ratio $[CH_2]$/[NHCO] of the number of the methylene groups ($[CH_2]$) to the number of the amide groups ([NHCO]) (hereinafter the number of the methylene groups to the number of the amide groups is sometimes referred to as a ratio of $[CH_2]$/[NHCO].) of 8.0 or more.

Incidentally, the polyamide (A1) is preferably an aliphatic polyamide having a melting point measured in accordance with ISO 11357-3 of 210° C. or lower, and a ratio of the number of the methylene groups to the number of the amide groups $[CH_2]$/[NHCO] of 8.0 or more; a polyamide copolymer using a raw material monomer (constitutional repeating unit) alone which forms an aliphatic polyamide having a melting point measured in accordance with ISO 11357-3 of 210° C. or lower, and a ratio of the number of the methylene groups to the number of the amide groups $[CH_2]$/[NHCO] of 8.0 or more; a polyamide copolymer comprising a raw material monomer (constitutional repeating unit) which forms an aliphatic polyamide having a melting point measured in accordance with ISO 11357-3 of 210° C. or lower and a ratio of the number of the methylene groups to the number of the amide groups $[CH_2]$/[NHCO] of 8.0 or more as at least one component, and using at least one component which forms an aliphatic polyamide having a ratio of the number of the methylene groups to the number of the amide groups $[CH_2]$/[NHCO] of less than 8.0; and a copolymer using at least one component of a raw material monomer (constitutional repeating unit) which forms an aliphatic polyamide having a melting point measured in accordance with ISO 11357-3 of exceeding 210° C. and a ratio of the number of the methylene groups to the number of the amide groups $[CH_2]$/[NHCO] of 8.0 or more.

Examples of the preferable polyamide (A1) are explained by dividing into an aliphatic polyamide (A1X) (hereinafter sometimes referred to as a polyamide (A1X).) having a melting point measured in accordance with ISO 11357-3 of 210° C. or lower and a ratio of the number of the methylene groups to the number of the amide groups $[CH_2]$/[NHCO] of 8.0 or more, a polyamide copolymer (A1XX) (hereinafter sometimes referred to as a polyamide (A1XX).) using a raw material monomer (constitutional repeating unit) alone which forms an aliphatic polyamide having a melting point measured in accordance with ISO 11357-3 of 210° C. or lower and a ratio of the number of the methylene groups to the number of the amide groups $[CH_2]$/[NHCO] of 8.0 or more, a polyamide copolymer (A1Y) (hereinafter sometimes referred to as a polyamide (A1Y).) comprising a raw material monomer (constitutional repeating unit) which forms an aliphatic polyamide having a melting point measured in accordance with ISO 11357-3 of 210° C. or lower and a ratio of the number of the methylene groups to the number of the amide groups $[CH_2]$/[NHCO] of 8.0 or more as at least one component, and using at least one component which forms an aliphatic polyamide having a ratio of the number of the methylene groups to the number of the amide groups $[CH_2]$/[NHCO] of less than 8.0, and a copolymer (A1Z) (hereinafter sometimes referred to as a polyamide (A1Z).) using a raw material monomer (constitutional repeating unit) which forms an aliphatic polyamide having a melting point measured in accordance with ISO 11357-3 of exceeding 210° C. and a ratio of the number of the methylene groups to the number of the amide groups $[CH_2]$/[NHCO] of 8.0 or more.

As the polyamide (A1X) having a melting point measured in accordance with ISO 11357-3 of 210° C. or lower and a ratio of the number of the methylene groups to the number of the amide groups $[CH_2]$/[NHCO] of 8.0 or more, there may be mentioned polyundecanamide (polyamide 11): $[CH_2]$/[NHCO]=10.0, polydodecanamide (polyamide 12): $[CH_2]$/[NHCO]=11.0, polyhexamethylene hexadecamide (polyamide 616): $[CH_2]$/[NHCO]=10.0, polyhexamethylene octadecamide (polyamide 618): $[CH_2]$/[NHCO]=11.0, polynonamethylene azelamide (polyamide 99): $[CH_2]$/[NHCO]=8.0, polynonamethylene decamide (polyamide 910): $[CH_2]$/[NHCO]=8.5, polynonamethylene dodecamide (polyamide 912): $[CH_2]$/[NHCO]=9.5, polydecamethylene suberamide (polyamide 108): $[CH_2]$/[NHCO]=8.0, polydecamethylene azelamide (polyamide 109): $[CH_2]$/[NHCO]=8.5, polydecamethylene sebacamide (polyamide 1010): $[CH_2]$/[NHCO]=9.0, polydecamethylene dodecamide (polyamide 1012): $[CH_2]$/[NHCO]=10.0, polydodecamethylene azelamide (polyamide 129): $[CH_2]$/[NHCO]=9.5, polydodecamethylene sebacamide (polyamide 1210): $[CH_2]$/[NHCO]=10.0, polydodecamethylene dodecamide (polyamide 1212): $[CH_2]/[NHCO]$=11.0, etc. These may be used one kind or two or more kinds.

Also, as the polyamide copolymer (A1XX) using a raw material monomer (constitutional repeating unit) alone which forms an aliphatic polyamide having a melting point measured in accordance with ISO 11357-3 of 210° C. or lower and a ratio of the number of the methylene groups to the number of the amide groups $[CH_2]/[NHCO]$ of 8.0 or more, there may be mentioned at least one kind of a copolymer which uses several kinds of raw material monomers which form at least one kind of a homopolymer of the polyamide (A1X). These may be used one kind or two or more kinds.

When the polyamide (A1) is a copolymer, the ratio of the number of the methylene groups to the number of the amide groups $[CH_2]/[NHCO]$ can be obtained by summing for all constitutional repeating units the value obtained by multiplying the ratio of the number of the methylene groups to the number of the amide groups $[CH_2]/[NHCO]$ of homopolymer of a monomer constituting the constitutional repeating units of the copolymer to the molar ratio of the constitutional repeating units.

Also, when the polyamide (A1) is a copolymer, the melting point can be obtained as an actually measured value of the melting point measured in accordance with ISO 11357-3 of the copolymer.

As the polyamide copolymer (A1XX) using a raw material monomer (constitutional repeating unit) alone which forms an aliphatic polyamide having a melting point measured in accordance with ISO 11357-3 of 210° C. or lower and a ratio of the number of the methylene groups to the number of the amide groups $[CH_2]/[NHCO]$ of 8.0 or more, for example, the ratio of the number of the methylene groups to the number of the amide groups $[CH_2]/[NHCO]$ of the poly(dodecanamide/dodecamethylene dodecamide) copolymer (polyamide 12/1212) is, since the ratio of the number of the methylene groups to the number of the amide groups $[CH_2]/[NHCO]$ of the polydodecanamide (polyamide 12) and the polydodecamethylene dodecamide (polyamide 1212) are 11.0, the ratio of the number of the methylene groups to the number of the amide groups $[CH_2]/[NHCO]$ thereof becomes 11.0 irrespective of a molar ratio of the constitutional repeating units.

Also, the melting point of the polydodecanamide (polyamide 12) is 178° C. and the melting point of the polydodecamethylene dodecamide (polyamide 1212) is 185° C., so that the melting point measured in accordance with ISO 11357-3 of the poly(dodecanamide/dodecamethylene dodecamide) copolymer (polyamide 12/1212) becomes 210° C. or lower irrespective of a molar ratio of the constitutional repeating units.

Further, the melting point and the ratio of the number of the methylene groups to the number of the amide groups $[CH_2]/[NHCO]$ of the poly(dodecanamide/undecanamide) copolymer (polyamide 12/11) changes by a molar ratio of the constitutional repeating units. The ratio of the number of the methylene group to the number of the amide group $[CH_2]/[NHCO]$ of the polydodecanamide (polyamide 12) is 11.0, and the ratio of the number of the methylene groups to the number of the amide groups $[CH_2]/[NHCO]$ of the polyundecanamide (polyamide 11) is 10.0, so that it can be calculated if the molar ratio of the constitutional repeating units is known, and when the dodecanamide unit/undecanamide unit of the poly(dodecanamide/undecanamide) copolymer (polyamide 12/11) is 80:20 (molar ratio), the ratio of the number of the methylene groups to the number of the amide groups $[CH_2]/[NHCO]$ is 11.0×0.80+10.0×0.20=10.8. If the molar ratio of the undecanamide unit increases, the ratio of the number of the methylene groups to the number of the amide groups $[CH_2]/[NHCO]$ decreases, and at least the ratio of the number of the methylene groups to the number of the amide groups $[CH_2]/[NHCO]$ does not lower 10.0.

Also, the melting point of the polydodecanamide (polyamide 12) is 178° C. and the melting point of the polyundecanamide (polyamide 11) is 188° C., so that the melting point is 210° C. or lower irrespective of the molar ratio of the constitutional repeating units of the poly(dodecanamide/undecanamide) copolymer (polyamide 12/11).

Thus, like the poly(dodecanamide/dodecamethylene dodecamide) copolymer (polyamide 12/1212) and the poly(dodecanamide/undecanamide) copolymer (polyamide 12/11), the polyamide copolymer (A1XX) using a raw material monomer (constitutional repeating unit) alone which forms an aliphatic polyamide having the melting point measured in accordance with ISO 11357-3 of 210° C. or lower and the ratio of the number of the methylene groups to the number of the amide groups $[CH_2]/[NHCO]$ of 8.0 or more becomes the ratio of the number of the methylene groups to the number of the amide groups $[CH_2]/[NHCO]$ of 8.0 or more, and the melting point measured in accordance with ISO 11357-3 of 210° C. or lower irrespective of the molar ratio of the constitutional repeating units, and is included in the polyamide (A1) of the present application.

On the other hand, it is possible to produce the polyamide (A1) by copolymerizing a raw material monomer (constitutional repeating unit) which forms an aliphatic polyamide having the melting point measured in accordance with ISO 11357-3 of 210° C. or lower and the ratio of the number of the methylene groups to the number of the amide groups $[CH_2]/[NHCO]$ of 8.0 or more as at least one component, and as mentioned later, using at least one component of a raw material monomer (constitutional repeating unit) which forms an aliphatic polyamide having the ratio of the number of the methylene groups to the number of the amide groups $[CH_2]/[NHCO]$ of less than 8.0, and the obtainable polyamide copolymer (A1Y) is included in the polyamide (A1) of the present application as long as it has the melting point measured in accordance with ISO 11357-3 of 210° C. or lower and the ratio of the number of the methylene groups to the number of the amide groups $[CH_2]/[NHCO]$ of 8.0 or more.

The aliphatic polyamide having the ratio of the number of the methylene groups to the number of the amide groups $[CH_2]/[NHCO]$ of less than 8.0 may be mentioned polycaproamide (polyamide 6): $[CH_2]/[NHCO]$=5.0, polyethylene adipamide (polyamide 26): $[CH_2]/[NHCO]$=3.0, polytetramethylene succinamide (polyamide 44): $[CH_2]/[NHCO]$=3.0, polytetramethylene glutamide (polyamide 45): $[CH_2]/[NHCO]$=3.5, polytetramethylene adipamide (polyamide 46): $[CH_2]/[NHCO]$=4.0, polytetramethylene suberamide (polyamide 48): $[CH_2]/[NHCO]$=5.0, polytetramethylene azelamide (polyamide 49): $[CH_2]/[NHCO]$=5.5, polytetramethylene sebacamide (polyamide 410): $[CH_2]/[NHCO]$=6.0, polytetramethylene dodecamide (polyamide 412): $[CH_2]/[NHCO]$=7.0, polypentamethylene succinamide (polyamide 54): $[CH_2]/[NHCO]$=3.5, polypentamethylene glutamide (polyamide 55): $[CH_2]/[NHCO]$=4.0, polypentamethylene adipamide (polyamide 56): $[CH_2]/[NHCO]$=4.5, polypentamethylene suberamide (polyamide 58): $[CH_2]/[NHCO]$=5.5, polypentamethylene azelamide (polyamide 59): $[CH_2]/[NHCO]$=6.0, polypentamethylene sebacamide (polyamide 510): $[CH_2]/[NHCO]$=6.5, polypentamethylene dodecamide (polyamide 512): $[CH_2]/$

[NHCO]=7.5, polyhexamethylene succinamide (polyamide 64): $[CH_2]/[NHCO]=4.0$, polyhexamethylene glutamide (polyamide 65): $[CH_2]/[NHCO]=4.5$, polyhexamethylene adipamide (polyamide 66): $[CH_2]/[NHCO]=5.5$, polyhexamethylene suberamide (polyamide 68): $[CH_2]/[NHCO]=6.0$, polyhexamethylene azelamide (polyamide 69): $[CH_2]/[NHCO]=6.5$, polyhexamethylene sebacamide (polyamide 610): $[CH_2]/[NHCO]=7.0$, polynonamethylene adipamide (polyamide 96): $[CH_2]/[NHCO]=6.5$, polynonamethylene suberamide (polyamide 98): $[CH_2]/[NHCO]=7.5$, polydecamethylene glutamide (polyamide 105): $[CH_2]/[NHCO]=6.5$, polydecamethylene adipamide (polyamide 106): $[CH_2]/[NHCO]=7.0$ and polydodecamethylene glutamide (polyamide 125): $[CH_2]/[NHCO]=7.5$, etc. Also, as the aliphatic polyamide having the ratio of the number of the methylene groups to the number of the amide groups $[CH_2]/[NHCO]$ of less than 8.0, there may be mentioned at least one kind of a copolymer using several kinds of the raw material monomers which form at least one kind of the homopolymer. These may be used one kind or two or more kinds.

As the polyamide copolymer (A1Y) using a raw material monomer (constitutional repeating unit) which forms an aliphatic polyamide having the melting point measured in accordance with ISO 11357-3 of 210° C. or lower and the ratio of the number of the methylene groups to the number of the amide groups $[CH_2]/[NHCO]$ of 8.0 or more as at least one component, and using at least one component of a raw material monomer (constitutional repeating unit) which forms an aliphatic polyamide having the ratio of the number of the methylene groups to the number of the amide groups $[CH_2]/[NHCO]$ of less than 8.0, for example, the melting point and the ratio of the number of the methylene groups to the number of the amide groups $[CH_2]/[NHCO]$ of the poly(dodecanamide/caproamide) copolymer (polyamide 12/6) changes by the molar ratio of the constitutional repeating units. The ratio of the number of the methylene groups to the number of the amide groups $[CH_2]/[NHCO]$ of the polydodecanamide (polyamide 12) is 11.0, and the ratio of the number of the methylene groups to the number of the amide groups $[CH_2]/[NHCO]$ of the polycaproamide (polyamide 6) is 5.0, so that it can be calculated if the molar ratio of the constitutional repeating units is known, the polyamide copolymer in which the dodecanamide unit/caproamide unit of the poly(dodecanamide/caproamide) copolymer (polyamide 12/6) is 50.0:50.0 to 99.5:0.5 (molar ratio) becomes the ratio of the number of the methylene groups to the number of the amide groups $[CH_2]/[NHCO]$ of 8.0 or more. Provided that, in order to differentiate the poly(dodecanamide/caproamide) copolymer (polyamide 12/6) and the polydodecanamide (polyamide 12), when the ratio of the dodecanamide unit of the poly(dodecanamide/caproamide) copolymer (polyamide 12/6) is higher than the dodecanamide unit/caproamide unit of 99.5:0.5 (molar ratio), it is treated to as the polydodecanamide (polyamide 12). In the following, the homopolymer and the copolymer are similarly handled.

Also, the melting point of the polydodecanamide (polyamide 12) is 178° C. and the melting point of the polycaproamide (polyamide 6) is 220° C., so that the melting point measured in accordance with ISO 11357-3 of the polyamide copolymer in which the dodecanamide unit/caproamide unit of the poly(dodecanamide/caproamide) copolymer (polyamide 12/6) is 4.0:96.0 to 99.5:0.5 (molar ratio) is 210° C. or lower.

That is, the polyamide copolymer in which the dodecanamide unit/caproamide unit of the poly(dodecanamide/caproamide) copolymer (polyamide 12/6) is 50.0:50.0 to 99.5:0.5 (molar ratio) becomes the ratio of the number of the methylene groups to the number of the amide groups $[CH_2]/[NHCO]$ of 8.0 or more and the melting point measured in accordance with ISO 11357-3 of 210° C. or lower, and is included in the polyamide (A1) of the present application.

Thus, the ratio of the number of the methylene groups to the number of the amide groups $[CH_2]/[NHCO]$ in the polyamide copolymer (A1Y) using a raw material monomer (constitutional repeating unit) which forms an aliphatic polyamide having the melting point measured in accordance with ISO 11357-3 of 210° C. or lower and the ratio of the number of the methylene groups to the number of the amide groups $[CH_2]/[NHCO]$ of 8.0 or more as at least one component, and using at least one component of a raw material monomer (constitutional repeating unit) which forms an aliphatic polyamide having the ratio of the number of the methylene groups to the number of the amide groups $[CH_2]/[NHCO]$ of less than 8.0 can be calculated by the molar ratio of the constitutional repeating units and the ratio of the number of the methylene groups to the number of the amide groups $[CH_2]/[NHCO]$ of the respective constitutional repeating units, and is included in the polyamide (A1) of the present application as long as it has the ratio of the number of the methylene groups to the number of the amide groups $[CH_2]/[NHCO]$ of 8.0 or more and the melting point measured in accordance with ISO 11357-3 of 210° C. or lower.

Also, the polyamide (A1) can be obtained by copolymerizing at least one component of a raw material monomer (constitutional repeating unit) which forms an aliphatic polyamide having the melting point measured in accordance with ISO 11357-3 of exceeding 210° C. and the ratio of the number of the methylene groups to the number of the amide groups $[CH_2]/[NHCO]$ of 8.0 or more, and the obtainable polyamide copolymer (A1Z) is included in the polyamide (A1) of the present application as long as it has the melting point measured in accordance with ISO 11357-3 of 210° C. or lower and the ratio of the number of the methylene groups to the number of the amide groups $[CH_2]/[NHCO]$ of 8.0 or more.

As the polyamide having the melting point measured in accordance with ISO 11357-3 of exceeding 210° C. and the ratio of the number of the methylene groups to the number of the amide groups $[CH_2]/[NHCO]$ of 8.0 or more, there may be mentioned polyhexamethylene dodecamide (polyamide 612): $[CH_2]/[NHCO]=8.0$ and the melting point: 218° C., and polyhexamethylene tetradecamide (polyamide 614): $[CH_2]/[NHCO]=9.0$ and the melting point: 212° C., etc. These may be used one kind or two or more kinds.

As the copolymer (A1Z) using at least one component of a raw material monomer (constitutional repeating unit) which forms an aliphatic polyamide having the melting point measured in accordance with ISO 11357-3 of exceeding 210° C. and the ratio of the number of the methylene groups to the number of the amide groups $[CH_2]/[NHCO]$ of 8.0 or more, for example, the melting point and the ratio of the number of the methylene groups to the number of the amide groups $[CH_2]/[NHCO]$ of the poly(hexamethylene hexadecamide/hexamethylene tetradecamide) copolymer (polyamide 616/614) changes depending on the molar ratio of the constitutional repeating units. The ratio of the number of the methylene groups to the number of the amide groups $[CH_2]/[NHCO]$ of the polyhexamethylene hexadecamide (polyamide 616) is 10.0 and the ratio of the number of the methylene groups to the number of the amide groups $[CH_2]/[NHCO]$ of the polyhexamethylene tetradecamide (polyamide 614) is 9.0, so that it can be calculated if the molar ratio of the constitutional repeating units is known, and when the hexamethylene hexadecamide unit/hexamethylene tetradecamide unit of the poly(hexamethylene hexadecamide/hexamethylene tetradecamide) copolymer (polyamide 616/614) is 30:70 (molar ratio), the ratio of the number of the methylene groups to the number of the amide groups $[CH_2]/[NHCO]$ is 10.0×0.30+9.0×0.70=9.3. If the molar ratio of the hexamethylene tetradecamide unit increases, the ratio of the number of the methylene groups to the number of the amide groups $[CH_2]/[NHCO]$ decreases, and at least the ratio of the number of the methylene groups to the number of the amide groups $[CH_2]/[NHCO]$ does not lower than 9.0.

Also, the melting point of the polyhexamethylene hexadecamide (polyamide 616) is 207° C. and the melting point of the polyhexamethylene tetradecamide (polyamide 614) is 212° C., so that the melting point measured in accordance with ISO 11357-3 of the polyamide copolymer of the poly(hexamethylene hexadecamide/hexamethylene tetradecamide) copolymer (polyamide 616/614) in which the hexamethylene hexadecamide unit/hexamethylene tetradecamide unit is 14.0:86.0 to 99.5:0.5 (molar ratio) is 210° C. or lower.

That is, the polyamide copolymer in which the hexamethylene hexadecamide unit/hexamethylene tetradecamide unit of the poly(hexamethylene hexadecamide/hexamethylene tetradecamide) copolymer (polyamide 616/614) is 14.0:86.0 to 99.5:0.5 (molar ratio), the ratio of the number of the methylene groups to the number of the amide groups $[CH_2]/[NHCO]$ thereof becomes 8.0 or more and the melting point measured in accordance with ISO 11357-3 is 210° C. or lower, and is included in the polyamide (A1) of the present application.

Further, as the copolymer (A1Z) using at least one component of a raw material monomer (constitutional repeating unit) which forms an aliphatic polyamide having the melting point measured in accordance with ISO 11357-3 of exceeding 210° C. and the ratio of the number of the methylene groups to the number of the amide groups $[CH_2]/[NHCO]$ of 8.0 or more, for example, the melting point and the ratio of the number of the methylene groups to the number of the amide groups $[CH_2]/[NHCO]$ of the poly(hexamethylene dodecamide/hexamethylene tetradecamide) copolymer (polyamide 612/614) changes depending on the molar ratio of the constitutional repeating units. The ratio of the number of the methylene groups to the number of the amide groups $[CH_2]/[NHCO]$ of the polyhexamethylene dodecamide (polyamide 612) is 8.0, the ratio of the number of the methylene groups to the number of the amide groups $[CH_2]/[NHCO]$ of the polyhexamethylene tetradecamide (polyamide 614) is 9.0, so that it can be calculated if the molar ratio of the constitutional repeating units is known, and when the polyamide copolymer in which the hexamethylene dodecamide unit/hexamethylene tetradecamide unit of the poly(hexamethylene dodecamide/hexamethylene tetradecamide) copolymer (polyamide 612/614) is 70.0:30.0 (molar ratio), the ratio of the number of the methylene groups to the number of the amide groups $[CH_2]/[NHCO]$ is 8.0×0.70+9.0×0.30=8.3. If the molar ratio of the hexamethylene dodecamide unit increases, the ratio of the number of the methylene groups to the number of the amide groups $[CH_2]/[NHCO]$ decreases, and at least the ratio of the number of the methylene groups to the number of the amide groups $[CH_2]/[NHCO]$ does not lower 8.0.

Further, the melting point of the polyhexamethylene dodecamide (polyamide 612) is 218° C., the melting point of the polyhexamethylene tetradecamide (polyamide 614) is 212° C., and the melting point measured in accordance with ISO 11357-3 of the polyamide copolymer in which the hexamethylene dodecamide unit/hexamethylene tetradecamide unit of the poly(hexamethylene dodecamide/hexamethylene tetradecamide) copolymer (polyamide 612/614) is 70.0:30.0 (molar ratio) is 206° C. And the melting point measured in accordance with ISO 11357-3 of the polyamide copolymer in which the hexamethylene dodecamide unit/hexamethylene tetradecamide unit of the poly(hexamethylene dodecamide/hexamethylene tetradecamide) copolymer (polyamide 612/614) is 80.0:20.0 (molar ratio) is 209° C.

Thus, the polyamide copolymer (A1Z) using at least one component of a raw material monomer (constitutional repeating unit) which forms an aliphatic polyamide having the melting point measured in accordance with ISO 11357-3 of exceeding 210° C. and the ratio of the number of the methylene groups to the number of the amide groups $[CH_2]/[NHCO]$ of 8.0 or more is included in the polyamide (A1) of the present application irrespective of the molar ratio of the constitutional repeating units, as long as it has the ratio of the number of the methylene groups to the number of the amide groups $[CH_2]/[NHCO]$ of 8.0 or more and the melting point measured in accordance with ISO 11357-3 of 210° C. or lower.

Among these, from the viewpoints of sufficiently ensuring various characteristics such as mechanical characteristics, heat resistance, chemical resistance, etc., of the obtainable multilayer tube, and economic efficiency and availability, the polyamide (A1) is more preferably at least one kind of a homopolymer selected from the group consisting of polyundecanamide (polyamide 11), polydodecanamide (polyamide 12), polynonamethylene azelamide (polyamide 99), polynonamethylene decamide (polyamide 910), polynonamethylene dodecamide (polyamide 912), polydecamethylene sebacamide (polyamide 1010), polydecamethylene dodecamide (polyamide 1012) and polydodecamethylene dodecamide (polyamide 1212), and/or at least one kind of a copolymer using several kinds of the raw materials forming these, and further preferably at least one kind of a homopolymer selected from the group consisting of polyundecanamide (polyamide 11), polydodecanamide (polyamide 12), polynonamethylene dodecamide (polyamide 912), polydecamethylene sebacamide (polyamide 1010), polydecamethylene dodecamide (polyamide 1012), and polydodecamethylene dodecamide (polyamide 1212), and/or at least one kind of a copolymer using several kinds of the raw materials forming these.

Also, from the viewpoint of elution resistance of the monomer and the oligomer, it is particularly preferably a homopolymer such as polydecamethylene decamide (polyamide 1010) and/or polydecamethylene dodecamide (polyamide 1012), and/or a copolymer using raw material monomers forming these.

[Polyamide (A2)]

The polyamide (A2) is a polyamide other than the polyamide (A1), has an amide bond (—CONH—) in the main chain, and can be obtained by polymerizing or copolymerizing a lactam, an aminocarboxylic acid or a diamine and a dicarboxylic acid which are raw material monomers (constitutional repeating unit) forming the polyamide (hereinafter sometimes referred to as a polyamide (A2).).

The absolute value [|(SP value of polyamide (A1))−(SP value of polyamide (A2))|] of a difference in solubility parameter SP values of the polyamide (A1) and the polyamide (A2) is 1.8 $(MPa)^{1/2}$ or more and 5.5 $(MPa)^{1/2}$ or less, preferably 2.0 $(MPa)^{1/2}$ or more and 5.3 $(MPa)^{1/2}$ or less, and more preferably 2.2 $(MPa)^{1/2}$ or more and 5.0 $(MPa)^{1/2}$ or less. If the absolute value of a difference in solubility parameter SP values of the polyamide (A1) and the polyamide (A2) is less than the above-mentioned value, interlayer adhesiveness and durability thereof of the obtainable multilayer tube are poor, on the other hand, if it exceeds the above-mentioned value, mechanical characteristics and chemical resistance of the obtainable multilayer tube are poor.

Incidentally, the solubility parameter SP value is a value obtained by the formula of Fedors shown below, which is a value expressed as square root of molecular cohesion energy density, and is a value with the unit of $(MPa)^{1/2}$ and measured at 25° C. (hereinafter the solubility parameter is sometimes referred to as a SP value.).

$$\delta=[\Delta Ev/\Delta V]^{1/2}=[\Sigma\Delta e_i/\Sigma\Delta v_i]^{1/2}$$

δ: Solubility parameter SP value
ΔEv: cohesion energy
ΔV: mol molecular volume
$\Delta e_i$: mol cohesion energy of atom or atomic group of i component
$\Delta v_i$: mol molecular volume of atom or atomic group of i component Here, ΔEv and ΔV are each represented by $\Delta Ev=\Sigma\Delta e_i$ and $\Delta V=\Sigma\Delta v_i$, and $e_i$ and $v_i$ are values obtained from POLYMER ENGINEERING AND SCIENCE (published in 1974, vol. 14, No. 2, pp. 147 to 154). In the following, the SP value described in the present specification is a value using the unit of $(MPa)^{1/2}$.

The solubility parameter SP values of the respective polyamides (A1) mentioned as preferred examples are polyundecanamide (polyamide 11, SP value: 22.9 $(MPa)^{1/2}$), polydodecanamide (polyamide 12, SP value: 22.5 $(MPa)^{1/2}$), polynonamethylene azelamide (polyamide 99, SP value: 24.1 $(MPa)^{1/2}$), polynonamethylene decamide (polyamide 910, SP value: 23.8 $(MPa)^{1/2}$), polynonamethylene dodecamide (polyamide 912, SP value: 23.2 $(MPa)^{1/2}$), polydecamethylene sebacamide (polyamide 1010, SP value: 23.5 $(MPa)^{1/2}$), polydecamethylene dodecamide (polyamide 1012, SP value: 22.9 $(MPa)^{1/2}$) and polydodecamethylene dodecamide (polyamide 1212, SP value: 22.5 $(MPa)^{1/2}$).

The polyamide (A2) is a polyamide other than the polyamide (A1), may be any material as long as the absolute value of the difference in solubility parameter SP value from the polyamide (A1) is 1.8 $(MPa)^{1/2}$ or more and 5.5 $(MPa)^{1/2}$ or less, and appropriately selected so as to satisfy the value.

Incidentally, the polyamide (A2) is preferably an aliphatic polyamide having the melting point measured in accordance with ISO 11357-3 of exceeding 210° C. and the ratio of the number of the methylene groups to the number of the amide groups $[CH_2]/[NHCO]$ of 8.0 or more; an aliphatic polyamide having the melting point measured in accordance with ISO 11357-3 of exceeding 210° C. and the ratio of the number of the methylene groups to the number of the amide groups $[CH_2]/[NHCO]$ of less than 8.0; and an aliphatic polyamide having the melting point measured in accordance with ISO 11357-3 of 210° C. or lower and the ratio of the number of the methylene groups to the number of the amide groups $[CH_2]/[NHCO]$ of less than 8.0. Examples of the preferable polyamides (A2) are explained by dividing into an aliphatic polyamide (A2X) (hereinafter sometimes referred to as a polyamide (A2X).) having the ratio of the number of the methylene groups to the number of the amide groups $[CH_2]/[NHCO]$ of 8.0 or more irrespective of the melting point measured in accordance with ISO 11357-3, and an aliphatic polyamide (A2Y) (hereinafter sometimes referred to as a polyamide (A2Y).) having the melting point measured in accordance with ISO 11357-3 of exceeding 210° C. and the ratio of the number of the methylene groups to the number of the amide groups $[CH_2]/[NHCO]$ of 8.0 or more.

As the aliphatic polyamide (A2X) having the ratio of the number of the methylene groups to the number of the amide groups $[CH_2]/[NHCO]$ of less than 8.0 irrespective of the melting point measured in accordance with ISO 11357-3, there may be mentioned polycaproamide (polyamide 6, SP: 26.9 $(MPa)^{1/2}$), polytetramethylene glutamide (polyamide 45, SP: 29.2 $(MPa)^{1/2}$), polytetramethylene adipamide (polyamide 46, SP: 28.3 $(MPa)^{1/2}$), polytetramethylene suberamide (polyamide 48, SP: 26.9 $(MPa)^{1/2}$), polytetramethylene azelamide (polyamide 49, SP: 26.3 $(MPa)^{1/2}$), polytetramethylene sebacamide (polyamide 410, SP: 25.7 $(MPa)^{1/2}$), polytetramethylene dodecamide (polyamide 412, SP: 24.9 $(MPa)^{1/2}$), polypentamethylene succinamide (polyamide 54, SP: 29.2 $(MPa)^{1/2}$), polypentamethylene glutamide (polyamide 55, SP: 28.3 $(MPa)^{1/2}$), polypentamethylene adipamide (polyamide 56, SP: 27.5 $(MPa)^{1/2}$), polypentamethylene suberamide (polyamide 58, SP: 26.3 $(MPa)^{1/2}$), polypentamethylene azelamide (polyamide 59, SP: 25.7 $(MPa)^{1/2}$), polypentamethylene sebacamide (polyamide 510, SP: 25.3 $(MPa)^{1/2}$), polyhexamethylene succinamide (polyamide 64, SP: 28.3 $(MPa)^{1/2}$), polyhexamethylene glutamide (polyamide 65, SP: 27.5 $(MPa)^{1/2}$), polyhexamethylene adipamide (polyamide 66, SP: 26.9 $(MPa)^{1/2}$), polyhexamethylene suberamide (polyamide 68, SP: 25.7 $(MPa)^{1/2}$), polyhexamethylene azelamide (polyamide 69, SP: 25.3 $(MPa)^{1/2}$), polyhexamethylene sebacamide (polyamide 610, SP: 24.9 $(MPa)^{1/2}$), polynonamethylene adipamide (polyamide 96, SP: 25.3 $(MPa)^{1/2}$), polydecamethylene glutamide (polyamide 105, SP: 25.3 $(MPa)^{1/2}$), polydecamethylene adipamide (polyamide 106, SP: 24.9 $(MPa)^{1/2}$), polypentamethylene dodecamide (polyamide 512, SP value: 24.5 $(MPa)^{1/2}$), polydodecamethylene glutamide (polyamide 125, SP value: 24.5 $(MPa)^{1/2}$), etc. The polyamide (A2X) may be also mentioned at least one kind of a copolymer using several kinds of raw material monomers which forms at least one kind of a homopolymer. Also, as long as the ratio of the number of the methylene groups to the number of the amide groups $[CH_2]/[NHCO]$ is less than 8.0, there may be also mentioned at least one kind of a copolymer using several kinds of raw material monomers which form at least one kind of a homopolymer of the polyamide (A1), and/or several kinds of raw material monomers which form at least one kind of a homopolymer of a polyamide (A2Y) mentioned later. These may be used singly, or two or more may be used in combination.

When the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value(s) among the polyamides (A1) is/are selected, the absolute value of the difference in the solubility parameter SP values to the polypentamethylene dodecamide (polyamide 512, SP value: 24.5 $(MPa)^{1/2}$) and the polydodecamethylene glutamide (polyamide 125, SP value: 24.5 $(MPa)^{1/2}$) having the lowest solubility parameter SP value(s) among the polyamides (A2X) becomes 2.0 $(MPa)^{1/2}$, which is within the regulated range of the present application. Accordingly, the combination of the polydodecanamide (polyamide 12, SP value: 22.5 $(MPa)^{1/2}$) and/or the polydodecamethylene dodecamide (polyamide 1212, SP value: 22.5 $(MPa)^{1/2}$) as the polyamide (A1), and the polypentamethylene dodecamide (polyamide 512, SP value: 24.5 $(MPa)^{1/2}$) and/or the polydodecamethylene glutamide (polyamide 125, SP value: 24.5 $(MPa)^{1/2}$) as the polyamide (A2X) is within the regulated range of the present application.

On the other hand, when the polynonamethylene azelamide (polyamide 99, SP value: 24.1 $(MPa)^{1/2}$) having the highest solubility parameter SP value among the polyamides (A1) is selected, the absolute value of the difference in the solubility parameter SP values to the polypentamethylene dodecamide (polyamide 512, SP value: 24.5 $(MPa)^{1/2}$) and the polydodecamethylene glutamide (polyamide 125, SP value: 24.5 $(MPa)^{1/2}$) having the lowest solubility parameter SP value(s) among the polyamides (A2X) becomes 0.4 $(MPa)^{1/2}$, which is out of the regulated range of the present application. Accordingly, the combination of the polynonamethylene azelamide (polyamide 99, SP value: 24.1 $(MPa)^{1/2}$) as the polyamide (A1), and the polypentamethylene dodecamide (polyamide 512, SP value: 24.5 $(MPa)^{1/2}$) and/or the polydodecamethylene glutamide (polyamide 125, SP value: 24.5 $(MPa)^{1/2}$) as the polyamide (A2X) is out of the regulated range of the present application, so that when the polynonamethylene azelamide (polyamide 99, SP value: 24.1 $(MPa)^{1/2}$) is selected as the polyamide (A1), the absolute value of the difference in the solubility parameter SP values is to be 1.8 $(MPa)^{1/2}$ or more, it is necessary to select the polyamide (A2X) having the solubility parameter SP value of 25.9 $(MPa)^{1/2}$ or more.

Further, the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value(s) among the polyamides (A1) is/are selected, the absolute value of the difference in the solubility parameter SP values to the polytetramethylene adipamide (polyamide 46, SP value: 28.3 $(MPa)^{1/2}$) and the polyhexamethylene succinamide (polyamide 64, SP value: 28.3 $(MPa)^{1/2}$) having the highest solubility parameter SP value(s) among the polyamides (A2X) becomes 5.8 $(MPa)^{1/2}$, which is out of the regulated range of the present application. Accordingly, the combination of the polydodecanamide (polyamide 12, SP value: 22.5 $(MPa)^{1/2}$) and/or the polydodecamethylene dodecamide (polyamide 1212, SP value: 22.5 $(MPa)^{1/2}$) as the polyamide (A1), and the polytetramethylene adipamide (polyamide 46, SP value: 28.3 $(MPa)^{1/2}$) and/or the polyhexamethylene succinamide (polyamide 64, SP value: 28.3 $(MPa)^{1/2}$) as the polyamide (A2X) is out of the regulated range of the present application, so that when the polydodecanamide (polyamide 12, SP value: 22.5 $(MPa)^{1/2}$) and/or the polydodecamethylene dodecamide (polyamide 1212, SP value: 22.5 $(MPa)^{1/2}$) is/are selected as the polyamide (A1), the absolute value of the difference in the solubility parameter SP values is to be 4.5 $(MPa)^{1/2}$ or less, it is necessary to select the polyamide (A2X) having the solubility parameter SP value of 27.0 $(MPa)^{1/2}$ or less.

On the other hand, when the polynonamethylene azelamide (polyamide 99, SP value: 24.1 $(MPa)^{1/2}$) having the highest solubility parameter SP value among the polyamides (A1) is selected, the absolute value of the difference in the solubility parameter SP values to the polytetramethylene adipamide (polyamide 46, SP value: 28.3 $(MPa)^{1/2}$) and the polyhexamethylene succinamide (polyamide 64, SP value: 28.3 $(MPa)^{1/2}$) having the highest solubility parameter SP value among the polyamides (A2X) becomes 4.2 $(MPa)^{1/2}$, which is within the regulated range of the present application. Accordingly, the combination of the polynonamethylene azelamide (polyamide 99, SP value: 24.1 $(MPa)^{1/2}$) as the polyamide (A1), and the polytetramethylene adipamide (polyamide 46, SP value: 28.3 $(MPa)^{1/2}$) and/or the polyhexamethylene succinamide (polyamide 64, SP value: 28.3 $(MPa)^{1/2}$) as the polyamide (A2X) is within the regulated range of the present application.

As the polyamide (A2Y) having the melting point measured in accordance with ISO 11357-3 exceeding 210° C. and the ratio of the number of the methylene groups to the number of the amide groups $[CH_2]/[NHCO]$ of 8.0 or more, there may be mentioned polyhexamethylene dodecamide (polyamide 612, SP value: 24.1 $(MPa)^{1/2}$), polyhexamethylene tetradecamide (polyamide 614, SP value: 23.5 $(MPa)^{1/2}$), polyoctamethylene dodecamide (polyamide 812, SP value: 23.5 $(MPa)^{1/2}$), polydodecamethylene adipamide (polyamide 126, SP value: 24.1 $(MPa)^{1/2}$), polydodecamethylene suberamide (polyamide 128, SP value: 23.5 $(MPa)^{1/2}$), polytetradecamethylene adipamide (polyamide 146, SP value: 23.5 $(MPa)^{1/2}$), etc. The polyamide (A2Y) may be mentioned at least one kind of a copolymer produced by using several kinds of a raw material monomer(s) which forms at least one kind of a homopolymer of the polyamide (A2Y), and/or a raw material monomer(s) which forms at least one kind of a homopolymer of the polyamide (A2X) as long as the melting point measured in accordance with ISO 11357-3 exceeds 210° C. These may be used one kind or two or more kinds.

When the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value among the polyamides (A1) is/are selected, the absolute value of the difference in the solubility parameter SP values to the polyhexamethylene tetradecamide (polyamide 614, SP value: 23.5 $(MPa)^{1/2}$), the polyoctamethylene dodecamide (polyamide 812, SP value: 23.5 $(MPa)^{1/2}$), the polydodecamethylene suberamide (polyamide 128, SP value: 23.5 $(MPa)^{1/2}$), and the polytetradecamethylene adipamide (polyamide 146, SP value: 23.5 $(MPa)^{1/2}$) having the lowest solubility parameter SP value among the polyamides (A2Y) becomes 1.0 $(MPa)^{1/2}$, which is out of the regulated range of the present application.

On the other hand, when the polynonamethylene azelamide (polyamide 99, SP value: 24.1 $(MPa)^{1/2}$) having the highest solubility parameter SP value among the polyamides (A1) is selected, the absolute value of the difference in the solubility parameter SP values to the polyhexamethylene tetradecamide (polyamide 614, SP value: 23.5 $(MPa)^{1/2}$), the polyoctamethylene dodecamide (polyamide 812, SP value: 23.5 $(MPa)^{1/2}$), the polydodecamethylene suberamide (polyamide 128, SP value: 23.5 $(MPa)^{1/2}$), and the polytetradecamethylene adipamide (polyamide 146, SP value: 23.5 $(MPa)^{1/2}$) having the lowest solubility parameter SP value among the polyamides (A2Y) becomes 0.8 $(MPa)^{1/2}$, which is out of the regulated range of the present application.

Also, when the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value among the polyamides (A1) is/are selected, the absolute value of the difference in the solubility parameter SP values to the polyhexamethylene dodecamide (polyamide 612, SP value: 24.1 $(MPa)^{1/2}$) and the polydodecamethylene adipamide (polyamide 126, SP value: 24.1 $(MPa)^{1/2}$) having the highest solubility parameter SP value among the polyamides (A2Y) becomes 1.6 $(MPa)^{1/2}$, which is out of the regulated range of the present application.

On the other hand, when the polynonamethylene azelamide (polyamide 99, SP value: 24.1 $(MPa)^{1/2}$) having the highest solubility parameter SP value among the polyamides (A1) is selected, the absolute value of the difference in the solubility parameter SP values to the polyhexamethylene dodecamide (polyamide 612, SP value: 24.1 $(MPa)^{1/2}$) and the polydodecamethylene adipamide (polyamide 126, SP value: 24.1 $(MPa)^{1/2}$) having the highest solubility parameter SP value among the polyamides (A2Y) becomes 0 $(MPa)^{1/2}$, which is out of the regulated range of the present application.

From the viewpoints of availability, economic efficiency, compatibility with the polyamide (A1), and sufficiently ensuring various properties such as mechanical characteristics, chemical resistance, flexibility, etc., of the obtainable multilayer tube, and sufficiently obtaining interlayer adhesiveness to the semi-aromatic polyamide composition (B) mentioned later and durability thereof, the polyamide (A2) is preferably appropriately selected from at least one kind selected from the group consisting of an aliphatic polyamide (A2X) having the ratio of the number of the methylene groups to the number of the amide groups $[CH_2]/[NHCO]$ of less than 8.0 and an aliphatic polyamide (A2Y) having the melting point measured in accordance with ISO 11357-3 of exceeding 210° C. or the ratio of the number of the methylene groups to the number of the amide groups $[CH_2]/[NHCO]$ of 8.0 or more so as to satisfy the absolute value of the difference in the solubility parameter SP values with the polyamide (A1) of 1.8 $(MPa)^{1/2}$ or more and 5.5 $(MPa)^{1/2}$ or less. Specifically, it is preferably at least one kind of a homopolymer selected from the group consisting of polycaproamide (polyamide 6), polyhexamethylene adipamide (polyamide 66), polyhexamethylene azelamide (polyamide 69), polyhexamethylene sebacamide (polyamide 610) and polyhexamethylene dodecamide (polyamide 612), and/or at least one kind of a copolymer using several kinds of raw material monomers forming these, or at least one kind of a copolymer produced by using a raw material monomer which forms at least one kind selected from the group consisting of polycaproamide (polyamide 6), polyhexamethylene adipamide (polyamide 66), polyhexamethylene azelamide (polyamide 69), polyhexamethylene sebacamide (polyamide 610) and polyhexamethylene dodecamide (polyamide 612) as a main component, and using several kinds of raw material monomers which form at least one kind selected from the group consisting of polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12).

Among these, it is more preferably polycaproamide (polyamide 6), polyhexamethylene adipamide (polyamide 66), polyhexamethylene azelamide (polyamide 69), polyhexamethylene sebacamide (polyamide 610), polyhexamethylene dodecamide (polyamide 612), a poly(caproamide/hexamethylene adipamide) copolymer (polyamide 6/66), a poly (caproamide/hexamethylene azelamide) copolymer (polyamide 6/69), a poly(caproamide/hexamethylene sebacamide) copolymer (polyamide 6/610), a poly(caproamide/hexamethylene dodecamide) copolymer (polyamide 6/612), a poly(caproamide/dodecanamide) copolymer (polyamide 6/12), a poly(caproamide/hexamethylene adipamide/hexamethylene sebacamide) copolymer (polyamide 6/66/610), a poly(caproamide/hexamethylene adipamide/hexamethylene dodecamide) copolymer (polyamide 6/66/612), a poly(caproamide/hexamethylene adipamide/dodecanamide) copolymer (polyamide 6/66/12), a poly (caproamide/hexamethylene sebacamide/dodecanamide) copolymer (polyamide 6/610/12), a poly(caproamide/hexamethylene dodecamide/dodecanamide) copolymer (polyamide 6/612/12), and a mixture of these materials, and it is particularly preferably an aliphatic polyamide having the ratio of the number of the methylene groups to the number of the amide groups $[CH_2]/[NHCO]$ of less than 8.0, and is polycaproamide (polyamide 6), polyhexamethylene sebacamide (polyamide 610), a poly(caproamide/hexamethylene adipamide) copolymer (polyamide 6/66), a poly(caproamide/hexamethylene sebacamide) copolymer (polyamide 6/610), a poly(caproamide/hexamethylene dodecamide) copolymer (polyamide 6/612), a poly(caproamide/dodecanamide) copolymer (polyamide 6/12), a poly(caproamide/hexamethylene adipamide/hexamethylene sebacamide) copolymer (polyamide 6/66/610), a poly(caproamide/hexamethylene adipamide/hexamethylene dodecamide) copolymer (polyamide 6/66/612), a poly(caproamide/hexamethylene adipamide/dodecanamide) copolymer (polyamide 6/66/12), and a mixture of these materials.

For example, the solubility parameter SP value of the poly(caproamide/hexamethylene adipamide) copolymer (polyamide 6/66) is, since the solubility parameter SP values of the polycaproamide (polyamide 6) and the polyhexamethylene adipamide (polyamide 66) are 26.9 $(MPa)^{1/2}$, so that the solubility parameter SP value is 26.9 $(MPa)^{1/2}$ irrespective of the molar ratio of the constitutional repeating units. When the polynonamethylene azelamide (polyamide 99, SP value: 24.1 $(MPa)^{1/2}$) having the highest solubility parameter SP value among the polyamides (A1) is selected, irrespective of the molar ratio of the constitutional repeating units of the poly(caproamide/hexamethylene adipamide) copolymer (polyamide 6/66), its SP value is 26.9 $(MPa)^{1/2}$, the absolute value of the difference in the solubility parameter SP values is 2.8 $(MPa)^{1/2}$, which is within the regulated range of the present application. Accordingly, the combination of the polynonamethylene azelamide (polyamide 99, SP value: 24.1 $(MPa)^{1/2}$) as the polyamide (A1) and the poly (caproamide/hexamethylene adipamide) copolymer (polyamide 6/66, SP value: 26.9 $(MPa)^{1/2}$) as the polyamide (A2) is within the regulated range of the present application.

On the other hand, when the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value among the polyamide (A1) is/are selected, since the SP value of the poly(caproamide/hexamethylene adipamide) copolymer (polyamide 6/66) is 26.9 $(MPa)^{1/2}$ irrespective of the molar ratio of the constitutional repeating units, the absolute value of the difference in the solubility parameter SP value is 4.4 $(MPa)^{1/2}$, which is within the regulated range of the present application. Accordingly, the combination of the polydodecanamide (polyamide 12, SP value: 22.5 $(MPa)^{1/2}$) and/or the polydodecamethylene dodecamide (polyamide 1212, SP value: 22.5 $(MPa)^{1/2}$) as the polyamide (A1), and the poly(caproamide/hexamethylene adipamide) copolymer (polyamide 6/66, SP value: 26.9 $(MPa)^{1/2}$) as the polyamide (A2) is within the regulated range of the present application.

Incidentally, the ratio of the number of the methylene groups to the number of the amide groups $[CH_2]/[NHCO]$ of the poly(caproamide/hexamethylene adipamide) copolymer (polyamide 6/66) is, since the ratios of the number of the methylene groups to the number of the amide groups $[CH_2]/[NHCO]$ of the polycaproamide (polyamide 6) and the polyhexamethylene adipamide (polyamide 66) are 5.0, the ratio of the number of the methylene groups to the number of the amide groups $[CH_2]/[NHCO]$ is 5.0 irrespective of the molar ratio of the constitutional repeating units. That is, the polyamide copolymer produced by using a raw material monomer (constitutional repeating unit) alone which forms an aliphatic polyamide having the ratio of the number of the methylene groups to the number of the amide groups $[CH_2]/[NHCO]$ of less than 8.0 like a poly(caproamide/hexamethylene adipamide) copolymer (polyamide 6/66) has the ratio of the number of the methylene groups to the number of the amide groups $[CH_2]/[NHCO]$ of less than 8.0 irrespective of the molar ratio of the constitutional repeating units.

For example, the solubility parameter SP value of the poly(caproamide/hexamethylene sebacamide) copolymer (polyamide 6/610) changes depending on the molar ratio of the constitutional repeating units. The solubility parameter SP value of the polycaproamide (polyamide 6) is 26.9 $(MPa)^{1/2}$, and the solubility parameter SP value of the polyhexamethylene sebacamide (polyamide 610) is 24.9 $(MPa)^{1/2}$, so that it can be calculated if the molar ratio of the constitutional repeating units is known, whereby the solubility parameter SP value of the polyamide copolymer wherein the caproamide unit/hexamethylene sebacamide unit of the poly(caproamide/hexamethylene sebacamide) copolymer (polyamide 6/610) is 0.5:99.5 to 99.5:0.5 (molar ratio) becomes 24.9 $(MPa)^{1/2}$ or more and 26.9 $(MPa)^{1/2}$ or less.

When the polynonamethylene azelamide (polyamide 99, SP value: 24.1 $(MPa)^{1/2}$) having the highest solubility parameter SP value among the polyamides (A1) is selected to the poly(caproamide/hexamethylene sebacamide) copolymer (polyamide 6/610), the absolute value of the difference in the solubility parameter SP values becomes 0.8 $(MPa)^{1/2}$ or more and 2.8 $(MPa)^{1/2}$ or less. In order to satisfy the absolute value of the difference in the solubility parameter SP values of 1.8 $(MPa)^{1/2}$ or more and 5.5 $(MPa)^{1/2}$ or less, the polyamide copolymer in which the caproamide unit/hexamethylene sebacamide unit of the poly(caproamide/hexamethylene sebacamide) copolymer (polyamide 6/610) is 50.0:50.0 to 99.5:0.5 (molar ratio) is selected. Accordingly, the combination of the polynonamethylene azelamide (polyamide 99, SP value: 24.1 $(MPa)^{1/2}$) as the polyamide (A1) and the polyamide copolymer in which the caproamide unit/hexamethylene sebacamide unit of the poly (caproamide/hexamethylene sebacamide) copolymer (polyamide 6/610) is 50.0:50.0 to 99.5:0.5 (molar ratio) as the polyamide (A2) is within the regulated range of the present application.

On the other hand, when the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value among the polyamides (A1) is/are selected to the poly (caproamide/hexamethylene sebacamide) copolymer (polyamide 6/610), the absolute value of the difference in the solubility parameter SP values becomes 2.4 $(MPa)^{1/2}$ or more and 4.4 $(MPa)^{1/2}$ or less, the absolute value of the difference in the solubility parameter SP values satisfies 1.8 $(MPa)^{1/2}$ or more and 5.5 $(MPa)^{1/2}$ or less within all the range of the poly(caproamide/hexamethylene sebacamide) copolymer (polyamide 6/610) in which the caproamide unit/hexamethylene sebacamide unit is 0.5:99.5 to 99.5:0.5 (molar ratio). Accordingly, the combination of the polydodecanamide (polyamide 12, SP value: 22.5 $(MPa)^{1/2}$) and/or the polydodecamethylene dodecamide (polyamide 1212, SP value: 22.5 $(MPa)^{1/2}$) as the polyamide (A1), and the polyamide copolymer in which the caproamide unit/hexamethylene sebacamide unit of the poly(caproamide/hexamethylene sebacamide) copolymer (polyamide 6/610) is 0.5:99.5 to 99.5:0.5 (molar ratio) as the polyamide (A2) is within the regulated range of the present application.

Incidentally, the ratio of the number of the methylene groups to the number of the amide groups $[CH_2]/[NHCO]$ of the poly(caproamide/hexamethylene sebacamide) copolymer (polyamide 6/610) changes depending on the molar ratio of the constitutional repeating units. The ratio of the number of the methylene groups to the number of the amide groups $[CH_2]/[NHCO]$ of the polycaproamide (polyamide 6) is 5.0, and the ratio of the number of the methylene groups to the number of the amide groups $[CH_2]/[NHCO]$ of the polyhexamethylene sebacamide (polyamide 610) is 7.0, so that it can be calculated if the molar ratio of the constitutional repeating units is known, and when the caproamide unit/hexamethylene sebacamide unit of the poly(caproamide/hexamethylene sebacamide) copolymer (polyamide 6/610) is 80:20 (molar ratio), the ratio of the number of the methylene groups to the number of the amide groups $[CH_2]/[NHCO]$ becomes $5.0\times0.80+7.0\times0.20=5.4$. If the molar ratio of the hexamethylene sebacamide unit increases, the ratio of the number of the methylene groups to the number of the amide groups $[CH_2]/[NHCO]$ also increases, and at least the ratio of the number of the methylene groups to the number of the amide groups $[CH_2]/[NHCO]$ does not become 8.0 or more. That is, in the polyamide copolymer produced by using a raw material monomer (constitutional repeating unit) alone which forms an aliphatic polyamide having the ratio of the number of the methylene groups to the number of the amide groups $[CH_2]/[NHCO]$ of less than 8.0 like a poly (caproamide/hexamethylene sebacamide) copolymer (polyamide 6/610), the ratio of the number of the methylene groups to the number of the amide groups $[CH_2]/[NHCO]$ becomes less than 8.0 irrespective of the molar ratio of the constitutional repeating units.

The solubility parameter SP value of the poly(caproamide/dodecanamide) copolymer (polyamide 6/12) changes depending on the molar ratio of the constitutional repeating units. The solubility parameter SP value of the polycaproamide (polyamide 6) is 26.9 $(MPa)^{1/2}$, and the solubility parameter SP value of the polydodecanamide (polyamide 12) is 22.5 $(MPa)^{1/2}$, so that it can be calculated if the molar ratio of the constitutional repeating units is known, and the solubility parameter SP value of the polyamide copolymer in which the caproamide unit/dodecanamide unit of the poly (caproamide/dodecanamide) copolymer (polyamide 6/12) is 0.5:99.5 to 99.5:0.5 (molar ratio) becomes 22.5 $(MPa)^{1/2}$ or more and 26.9 $(MPa)^{1/2}$ or less.

When the polynonamethylene azelamide (polyamide 99, SP value: 24.1 $(MPa)^{1/2}$) having the highest solubility parameter SP value among the polyamides (A1) is selected to the poly(caproamide/dodecanamide) copolymer (polyamide 6/12), the absolute value of the difference in the solubility parameter SP values becomes 0 $(MPa)^{1/2}$ or more and 2.8 $(MPa)^{1/2}$ or less. In order to satisfy the absolute value of the difference in the solubility parameter SP values of 1.8 $(MPa)^{1/2}$ or more and 5.5 $(MPa)^{1/2}$ or less, the polyamide copolymer in which the caproamide unit/dodecanamide unit of the poly(caproamide/dodecanamide) copolymer (polyamide 6/12) is 77.28:22.72 to 99.5:0.5 (molar ratio) is selected. Accordingly, the combination of the polynonamethylene azelamide (polyamide 99, SP value: 24.1 $(MPa)^{1/2}$) as the polyamide (A1) and the polyamide copolymer in which the caproamide unit/dodecanamide unit of the poly(caproamide/dodecanamide) copolymer (polyamide 6/12) is 77.28:22.72 to 99.5:0.5 (molar ratio) as the polyamide (A2) is within the regulated range of the present application.

On the other hand, when the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value among the polyamides (A1) is selected to the poly(caproamide/dodecanamide) copolymer (polyamide 6/12), the absolute value of the difference in the solubility parameter SP values becomes 0 $(MPa)^{1/2}$ or more and 4.4 $(MPa)^{1/2}$ or less. In order to satisfy the absolute value of the difference in the solubility parameter SP values of 1.8 $(MPa)^{1/2}$ or more and 5.5 $(MPa)^{1/2}$ or less, the polyamide copolymer in which the caproamide unit/dodecanamide unit of the poly(caproamide/dodecanamide) copolymer (polyamide 6/12) is 40.9:50.1 to 99.5:0.5 (molar ratio) is selected. Accordingly, the combination of the polydodecanamide (polyamide 12, SP value: 22.5 $(MPa)^{1/2}$) and/or the polydodecamethylene dodecamide (polyamide 1212, SP value: 22.5 $(MPa)^{1/2}$) as the polyamide (A1), and the polyamide copolymer in which the caproamide unit/dodecanamide unit of the poly(caproamide/dodecanamide) copolymer (polyamide 6/12) is 40.9:50.1 to 99.5:0.5 (molar ratio) as the polyamide (A2) is within the regulated range of the present application.

Incidentally, the ratio of the number of the methylene groups to the number of the amide groups $[CH_2]/[NHCO]$ of the poly(caproamide/dodecanamide) copolymer (polyamide 6/12) changes depending on the molar ratio of the constitutional repeating units. The ratio of the number of the methylene groups to the number of the amide groups $[CH_2]/[NHCO]$ of the polycaproamide (polyamide 6) is 5.0, and the ratio of the number of the methylene groups to the number of the amide groups $[CH_2]/[NHCO]$ of the polydodecanamide (polyamide 12) is 11.0, so that it can be calculated if the molar ratio of the constitutional repeating units is known, and the polyamide copolymer in which the caproamide unit/dodecanamide unit of the poly(caproamide/dodecanamide) copolymer (polyamide 6/12) is 50.1:49.9 to 99.5:0.5 (molar ratio) has the ratio of the number of the methylene groups to the number of the amide groups $[CH_2]/[NHCO]$ of less than 8.0, so that when the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value among the polyamides (A1) is selected, the polyamide copolymer in which the caproamide unit/dodecanamide unit of the poly(caproamide/dodecanamide) copolymer (polyamide 6/12) is 50.1:49.9 to 99.5:0.5 (molar ratio) is preferable as the polyamide (A2).

Incidentally, when the polyamide (A2) is a mixture of two or more kinds, the SP value can be calculated by multiplying the SP value of each polyamide (A2) by the mixing mass ratio and adding the both. The same applies to the polyamide (A1).

As the polyamide (A2), when it is a mixture comprising 75 parts by mass of the polycaproamide (polyamide 6, SP value: 26.9 $(MPa)^{1/2}$) among the (A2X) and 25 parts by mass of the polyhexamethylene dodecamide (polyamide 612, SP value: 24.1 $(MPa)^{1/2}$) among the (A2Y), the SP value of the mixture became $26.9\times0.75+24.1\times0.25=26.2$ $(MPa)^{1/2}$.

When the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value among the polyamides (A1) is selected, the absolute value of the difference in the solubility parameter SP values with the above mixture becomes 3.7 $(MPa)^{1/2}$, which is within the regulated range of the present application.

On the other hand, when the polynonamethylene azelamide (polyamide 99, SP value: 24.1 $(MPa)^{1/2}$) having the highest solubility parameter SP value among the polyamides (A1) is selected, the absolute value of the difference in the solubility parameter SP values with the above mixture becomes 1.9 $(MPa)^{1/2}$, which is within the regulated range of the present application.

As the polyamide (A2), when it is a mixture comprising 25 parts by mass of the polycaproamide (polyamide 6, SP value: 26.9 $(MPa)^{1/2}$) among the (A2X), and 75 parts by mass of the polyhexamethylene dodecamide (polyamide 612, SP value: 24.1 $(MPa)^{1/2}$) among the (A2Y), the SP value of the mixture becomes $26.9\times0.25+24.1\times0.75=24.8$ $(MPa)^{1/2}$.

When the polydodecanamide (polyamide 12, SP value: 22.5 $(MPa)^{1/2}$) and/or the polydodecamethylene dodecamide (polyamide 1212, SP value: 22.5 $(MPa)^{1/2}$) having the lowest solubility parameter SP value among the polyamides (A1) is/are selected, the absolute value of the difference in the solubility parameter SP values with the above mixture becomes 3.7 $(MPa)^{1/2}$, which is within the regulated range of the present application.

On the other hand, when the polynonamethylene azelamide (polyamide 99, SP value: 24.1 $(MPa)^{1/2}$) having the highest solubility parameter SP value among the polyamides (A1) is selected, the absolute value of the difference in the solubility parameter SP values with the above mixture becomes 0.9 $(MPa)^{1/2}$, which is out of the regulated range of the present application.

Accordingly, in consideration with the respective SP values of the polyamide (A1) and the polyamide (A2), by appropriately determining the respective mixing mass ratio, the absolute value of the difference in the solubility parameter SP values of the polyamide (A1) and the polyamide (A2) can be selected so as to satisfy 1.8 $(MPa)^{1/2}$ or more and 5.5 $(MPa)^{1/2}$ or less.

The polyamide (A1) and the polyamide (A2) may be produced using a known polyamide production apparatus such as a batch reaction vessel, a one-tank or multi-tank continuous reaction apparatus, a tubular continuous reaction apparatus, or a kneading reaction extruder such as a single-screw kneading extruder or a twin-screw kneading extruder. The polymerization may be performed by a known method such as melt polymerization, solution polymerization or solid phase polymerization at atmospheric pressure or while repeating pressure decreasing and increasing operations. These polymerization methods may be used singly or may be combined appropriately.

A relative viscosity of the polyamide (A1) and the polyamide (A2) measured in accordance with HS K-6920 under the conditions of 96% sulfuric acid, a polymer concentration of 1%, and at 25° C. is preferably 1.5 or more and 5.0 or less, and more preferably 1.8 or more and 4.5 or less from the viewpoints of ensuring mechanical property of the obtainable multilayer tube, and ensuring desirable moldability of the multilayer tube by making the viscosity at the time of melting to an appropriate range.

When the terminal amino group concentration per 1 g of the aliphatic polyamide composition (A) is made [A] (μeq/g), and the terminal carboxyl group concentration of the same is made [B] (μeq/g), it is preferably $[A]>[B]+10$, more preferably $[A]>[B]+15$, and further preferably $[A]>[B]+20$ from the viewpoints of sufficiently obtaining interlayer adhesiveness and durability thereof with the semi-aromatic polyamide composition (B) mentioned later. Further, from the viewpoints of melt stability of the polyamide and suppression of formation of a gel-like substance, it is preferably $[A]>30$, and more preferably $30<[A]<140$.

Here, the terminal amino group concentration per 1 g of the aliphatic polyamide composition (A) is made [A] (μeq/g), and the terminal carboxyl group concentration of the same is made [B] (μeq/g), and these were made values by multiplying the respective terminal amino group concentrations (μeq/g) and terminal carboxyl group concentrations (μeq/g) of the polyamide (A1) and the polyamide (A2) by the respective mixing mass ratios and adding the both.

Incidentally, the terminal amino group concentration (μeq/g) can be measured by dissolving the polyamide in a phenol/methanol mixed solution and titrating with 0.05N hydrochloric acid. The terminal carboxyl group concentration (μeq/g) can be measured by dissolving the polyamide in benzyl alcohol and titrating with a 0.05N sodium hydroxide solution.

The polyamide (A1) and the polyamide (A2) can be produced by polymerizing or copolymerizing the polyamide raw material(s) in the presence of an amine by a conventionally known method such as melt polymerization, solution polymerization, solid phase polymerization, etc. Or else, after the polymerization, it is produced by melt-kneading in the presence of an amine. Thus, the amine can be added at any stage during the polymerization, or at any stage after the polymerization, or at the time of melt-kneading, but in consideration of interlayer adhesiveness of the obtainable multilayer tube, it is preferably added at the stage of the polymerization.

The amine may be mentioned a monoamine, a diamine, a triamine, a tetraamine and a polyamine. In addition, other than the amines, a carboxylic acid such as a monocarboxylic acid, a dicarboxylic acid, a tricarboxylic acid, etc., may be added, if necessary, as long as the product does not deviate from the range of the terminal group concentration conditions as mentioned above. These amines and carboxylic acids may be added simultaneously or may be added separately. The amines and the carboxylic acids exemplified later may be used one kind or two or more kinds.

Specific examples of the monoamines which may be added include aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine and docosylamine; alicyclic monoamines such as cyclohexylamine and methylcyclohexylamine; aromatic monoamines such as benzylamine and β-phenylmethylamine; symmetric secondary amines such as N,N-dimethylamine, N,N-diethylamine, N,N-dipropylamine, N,N-dibutylamine, N,N-dihexylamine and N,N-dioctylamine; and mixed secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecyl amine and N-propyl-N-benzylamine. These may be used singly, or two or more may be used in combination.

Specific examples of the diamines which may be added include aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexan ediamine and 5-methyl-1,9-nonanediamine; alicyclic diamines such as 1,3-bis(aminomethyl)cyclohexane, 1,4-bis(aminomethyl)cyclohexane, bis(4-aminocyclohexyl)methane, 2,2-bis(4-amino cyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane and 4,9-bis(aminomethyl)tricyclodecane; and aromatic diamines such as m-xylylenediamine and p-xylylenediamine. These may be used singly, or two or more may be used in combination.

Specific examples of the triamines and tetramines which may be added include 1,2,3-triaminopropane, 1,2,3-triamino-2-methylpropane, 1,2,4-triaminobutane, 1,2,3,4-tetraminobutane, 1,3,5-triaminocyclohexane, 1,2,4-triaminocyclohexane, 1,2,3-triaminocyclohexane, 1,2,4,5-tetraminocyclohexane, 1,3,5-triaminobenzene, 1,2,4-triaminobenzene, 1,2,3-triaminobenzene, 1,2,4,5-tetraminobenzene, 1,2,4-triaminonaphthalene, 2,5,7-triaminonaphthalene, 2,4,6-triaminopyridine, 1,2,7,8-tetraminonaphthalene and 1,4,5,8-tetraminonaphthalene. These may be used singly, or two or more may be used in combination.

The polyamines which may be added may be a compound having a plurality of a primary amino group(s) ($—NH_2$) and/or a secondary amino group(s) (—NH—) and, for example, may be mentioned a polyalkyleneimine, a polyalkylenepolyamine, a polyvinylamine, a polyallylamine, etc. These may be used singly, or two or more may be used in combination. An amino group having an active hydrogen is a reaction site of the polyamine.

The polyalkyleneimines are produced by, for example, ionic polymerization of an alkyleneimine such as ethyleneimine and/or propyleneimine, or by polymerization of an alkyloxazoline followed by partial or complete hydrolysis of the polymer. Examples of the polyalkylenepolyamines include diethylenetriamine, triethylenetetramine, pentaethylenehexamine, and reaction products of ethylenediamine with polyfunctional compounds. The polyvinylamines are obtained by, for example, polymerizing N-vinylformamide into poly(N-vinylformamide) followed by partial or complete hydrolysis of the polymer with an acid such as hydrochloric acid. The polyallylamines are generally obtained by polymerizing a hydrochloride salt of an allylamine monomer followed by the removal of hydrochloric acid. These may be used singly, or two or more may be used in combination. In particular, polyalkyleneimines are preferable.

The polyalkyleneimine may be mentioned a homopolymer and/or a copolymer obtained by polymerizing one kind or two or more kinds of alkyleneimine(s) having 2 or more and 8 or less carbon atoms such as ethyleneimine, propyleneimine, 1,2-butyleneimine, 2,3-butyleneimine, 1,1-dimethylethyleneimine, etc., according to the conventional method. These may be used singly, or two or more may be used in combination. Among these, the polyethyleneimine is more preferable. The polyalkyleneimine may be a branched type polyalkyleneimine including a primary amine, a secondary amine and a tertiary amine obtained by using an alkyleneimine as a raw material and subjecting it to ring-opening polymerization, or a linear type polyalkyleneimine including only a primary amine and a secondary amine obtained by using an alkyloxazoline as a raw material obtained by polymerizing the same, or a material having a structure cross-linked three-dimensionally. Further, it may be a material obtained by copolymerizing monomers such as ethylenediamine, propylenediamine, diethylenetriamine, triethylenetetramine, tetraethylenepentamine, dipropylenetriamine, tripropylenetetramine, dihexamethylene triamine, aminopropylethylenediamine, bisaminopropylethylenediamine, etc. The polyalkyleneimine generally has a primary amino group and/or a secondary amino group (imino group) having an active hydrogen atom in addition to a tertiary amino group derived from reactivity of the active hydrogen atom on the contained nitrogen atom.

A number of the nitrogen atoms in the polyalkyleneimine is not particularly limited, and is preferably 4 or more to 3,000, more preferably 8 or more and 1,500 or less, and further preferably 11 or more and 500 or less. Also, a number average molecular weight of the polyalkyleneimine is preferably 100 or more and 20,000 or less, more preferably 200 or more and 10,000 or less, and further preferably 500 or more and 8,000 or less.

Examples of the carboxylic acids which may be added include aliphatic monocarboxylic acids such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linoleic acid, arachidic acid, behenic acid and erucic acid; alicyclic monocarboxylic acids such as cyclohexanecarboxylic acid and methylcyclohexanecarboxylic acid; aromatic monocarboxylic acids such as benzoic acid, toluic acid, ethylbenzoic acid and phenylacetic acid; aliphatic dicarboxylic acids such as malonic acid, succinic acid, glutaric acid, adipic acid, pimelic acid, suberic acid, azelaic acid, sebacic acid, undecanedioic acid, dodecanedioic acid, hexadecanedioic acid, hexadecenedioic acid, octadecanedioic acid, octadecenedioic acid, eicosanedioic acid, eicosenedioic acid, docosanedioic acid, diglycolic acid, 2,2,4-trimethyladipic acid and 2,4,4-trimethyladipic acid; alicyclic dicarboxylic acids such as 1,3-cyclohexanedicarboxylic acid, 1,4-cyclohexanedicarboxylic acid and norbornanedicarboxylic acid; aromatic dicarboxylic acids such as terephthalic acid, isophthalic acid, phthalic acid, m-xylylenedicarboxylic acid, p-xylylenedicarboxylic acid, 1,4-naphthalenedicarboxylic acid, 2,6-naphthalenedicarboxylic acid and 2,7-naphthalenedicarboxylic acid; and tricarboxylic acids such as 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid and trimesic acid. These may be used singly, or two or more may be used in combination.

A used amount of the amines to be added can be appropriately determined by the conventionally known method in consideration with the terminal amino group concentration, the terminal carboxyl group concentration and a relative viscosity of the polyamide (A1) and the polyamide (A2) to be produced. In general, an amount of the amines to be added is preferably 0.5 meq/mol or more and 20 meq/mol or less, and more preferably 1 meq/mol or more and 10 meq/mol or less (the equivalent (eq) of the amino group is an amount of an amino group which reacts with a carboxyl group with 1:1 (molar ratio) to form an amide group is defined to be 1 equivalent.) per 1 mol of the polyamide raw material (1 mol of a monomer or a monomer unit constituting the repeating unit), from the viewpoints of obtaining sufficient reactivity and making production of a polyamide having a desired viscosity easy.

In the polyamide (A1) and the polyamide (A2), among the amines exemplified above, it is preferable to add a diamine and/or a polyamine at the time of polymerization to satisfy the condition of the terminal group concentration, and from the viewpoint of suppressing generating a gel, it is more preferable to add at least one selected from the group consisting of an aliphatic diamine, an alicyclic diamine and a polyalkyleneimine at the time of polymerization.

[Elastomer Polymer (A3)]

The aliphatic polyamide composition (A) contains an elastomer polymer (A3) which contains a constitutional unit derived from an unsaturated compound having a carboxyl group and/or an acid anhydride group (hereinafter sometimes referred to as an elastomer polymer (A3).).

As the elastomer polymer (A3), there may be mentioned an (ethylene and/or propylene)/α-olefin based copolymer, an (ethylene and/or propylene)/(α,β-unsaturated carboxylic acid ester)-based copolymer, and an aromatic vinyl compound/conjugated diene compound-based block copolymer, each containing a constitutional unit derived from an unsaturated compound having a carboxyl group and/or an acid anhydride group, and these may be used one kind or two or more kinds.

The (ethylene and/or propylene)/α-olefin copolymers are polymers obtained by copolymerizing ethylene and/or propylene with an α-olefin having 3 or more carbon atoms. Examples of the α-olefins having 3 or more carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These may be used singly, or two or more may be used in combination. Further, the copolymerization may involve polyenes of nonconjugated dienes such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,5-norbornadiene. These may be used singly, or two or more may be used in combination.

The (ethylene and/or propylene)/(α,β-unsaturated carboxylate ester) copolymers are polymers obtained by copolymerizing ethylene and/or propylene with an α,β-unsaturated carboxylate ester monomer. Examples of the α,β-unsaturated carboxylate ester monomers include methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, 2-ethylhexyl acrylate, 2-ethylhexyl methacrylate, hydroxyethyl acrylate, hydroxyethyl methacrylate, monomethyl maleate, monomethyl itaconate, dimethyl maleate and dimethyl itaconate. These may be used singly, or two or more may be used in combination.

The aromatic vinyl compound/conjugated diene compound block copolymers are block copolymers composed of an aromatic vinyl compound polymer block and a conjugated diene compound polymer block. Those block copolymers having at least one aromatic vinyl compound polymer block and at least one conjugated diene compound polymer block are used. In the block copolymers, an unsaturated bond in the conjugated diene compound polymer block may be hydrogenated.

The aromatic vinyl compound polymer block is a polymer block principally composed of units derived from an aromatic vinyl compound. Examples of the aromatic vinyl compounds include styrene, o-methylstyrene, m-methylstyrene, p-methylstyrene, 1,5-dimethylstyrene, 2,4-dimethylstyrene, vinylnaphthalene, vinylanthracene, 4-propylstyrene, 4-cyclohexylstyrene, 4-dodecylstyrene, 2-ethyl-4-benzyl styrene and 4-(phenylbutyl)styrene. These may be used singly, or two or more may be used in combination. In some cases, the aromatic vinyl compound polymer block may have a small amount of units derived from other unsaturated monomer.

The conjugated diene compound polymer block is a polymer block that is formed from one, or two or more conjugated diene compounds such as 1,3-butadiene, chloroprene, isoprene, 2,3-dimethyl-1,3-butadiene, 1,3-pentadiene, 4-methyl-1,3-pentadiene and 1,3-hexadiene. In the case of a hydrogenated form of the aromatic vinyl compound/conjugated diene compound block copolymer, the unsaturated bonds in the conjugated diene compound polymer block have been partially or totally hydrogenated and are in the form of saturated bonds.

The molecular structures of the aromatic vinyl compound/conjugated diene compound block copolymers and hydrogenated products thereof may be any of linear, branched and radial structures and combinations of such structures. Of these structures, the aromatic vinyl compound/conjugated diene compound block copolymer and/or the hydrogenated product thereof is preferably one, or two or more of diblock copolymers in which one aromatic vinyl compound polymer block and one conjugated diene compound polymer block are bonded linearly to each other, triblock copolymers in which three polymer blocks are bonded linearly in the order of aromatic vinyl compound polymer block-conjugated diene compound polymer block-aromatic vinyl compound polymer block, and hydrogenated products of these polymers, with examples including unhydrogenated or hydrogenated styrene/butadiene block copolymer, unhydrogenated or hydrogenated styrene/isoprene block copolymer, unhydrogenated or hydrogenated styrene/butadiene/styrene block copolymer, unhydrogenated or hydrogenated styrene/isoprene/styrene block copolymer, unhydrogenated or hydrogenated styrene/(ethylene/butadiene)/styrene block copolymer, and unhydrogenated or hydrogenated styrene/(isoprene/butadiene)/styrene block copolymer. These may be used singly, or two or more may be used in combination.

The unsaturated compound having a carboxyl group which forms a constitutional unit of the elastomer polymer (A3) may be mentioned an α,β-unsaturated carboxylic acid such as acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endo-bicyclo-[2.2.1]-5-heptene-2,3-dicarboxylic acid, and a metal salt of these carboxylic acids, etc. These may be used singly, or two or more may be used in combination. As the unsaturated compound having an acid anhydride group which forms a constitutional unit of the elastomer polymer (A3), there may be mentioned a dicarboxylic anhydride having an α,β-unsaturated bond such as maleic anhydride, itaconic anhydride, citraconic anhydride, endo-bicyclo-[2.2.1]-5-heptene-2,3-dicarboxylic anhydride, etc. These may be used singly, or two or more may be used in combination. Among these, a dicarboxylic anhydride having an α,β-unsaturated bond is preferable, and maleic anhydride and itaconic anhydride are more preferable.

The carboxyl group and/or the acid anhydride group concentration in the elastomer polymer (A3) is preferably 25 μeq/g or more and 200 μeq/g or less, and more preferably 50 μeq/g or more and 150 μeq/g or less from the viewpoints of sufficiently obtaining an improved effect of low temperature impact resistance, interlayer adhesiveness with the semi-aromatic polyamide composition (B) mentioned later and durability thereof, and fluidity of the obtainable aliphatic polyamide composition (A).

Incidentally, the carboxyl group and/or the acid anhydride group concentration in the elastomer polymer (A3) can be measured by using a sample solution prepared by dissolving the elastomer polymer in a toluene solution and further adjusted by adding ethanol, and titrating with 0.1N KOH ethanol solution using phenolphthalein as an indicator.

A content of the polyamide (A1) in the aliphatic polyamide composition (A) is 40% by mass or more and 85% by mass or less based on 100% by mass of the aliphatic polyamide composition (A), preferably 47% by mass or more and 80% by mass or less, and more preferably 55% by mass or more and 75% by mass or less. Also, a lower limit of the content of the polyamide (A1) in the aliphatic polyamide composition (A) may be 50% by mass or more, or may be 52% by mass or more. If the content of the polyamide (A1) is less than the above-mentioned value, mechanical characteristics and low temperature impact resistance of the obtainable multilayer tube may sometimes be poor, on the other hand, if it exceeds the above-mentioned value, interlayer adhesiveness and durability thereof of the obtainable multilayer tube may sometimes be poor.

A content of the polyamide (A2) in the aliphatic polyamide composition (A) is 10% by mass or more and 30% by mass or less based on 100% by mass of the aliphatic polyamide composition (A), preferably 12% by mass or more and 28% by mass or less, and more preferably 15% by mass or more and 25% by mass or less. If the content of the polyamide (A2) is less than the above-mentioned value, interlayer adhesiveness and durability thereof of the obtainable multilayer tube may sometimes be poor, on the other hand, if it exceeds the above-mentioned value, mechanical characteristics and chemical resistance of the obtainable multilayer tube may sometimes be poor.

A content of the elastomer polymer (A3) in the aliphatic polyamide composition (A) is 5% by mass or more and 30% by mass or less based on 100% by mass of the aliphatic polyamide composition (A), preferably 8% by mass or more and 25% by mass or less, and more preferably 10% by mass or more and 20% by mass or less. If the content of the elastomer polymer (A3) is less than the above-mentioned value, low temperature impact resistance, interlayer adhesiveness, and durability thereof of the obtainable multilayer tube may sometimes be poor, on the other hand, if it exceeds the above-mentioned value, mechanical characteristics of the obtainable multilayer tube and fluidity of the obtainable aliphatic polyamide composition (A) may sometimes be poor.

A method of mixing the polyamide (A1) and the polyamide (A2) with the elastomer polymer (A3) is not particularly limited, and employed various kinds of methods which have conventionally known, by adding various kinds of additives, if necessary. For example, it can be produced by a method in which pellets of the polyamide (A1), the polyamide (A2), and the elastomer polymer (A3) are uniformly dry blending with each other so as to have the above-mentioned mixing ratio using a tumbler and/or a mixer, and a method in which the both are previously dry blending with the concentrations to be used at the time of molding with other components added depending on necessity, and then, melt-kneaded, etc. Melt-kneading can be carried out using a kneading machine such as a single screw extruder, a twin screw extruder, a kneader, a Banbury mixer, etc.

The aliphatic polyamide composition (A) may be a mixture with another thermoplastic resin. A total content of the polyamide (A1), the polyamide (A2) and the elastomer polymer (A3) is preferably 80% by mass or more, and more preferably 85% by mass or more based on 100% by mass of the aliphatic polyamide composition (A).

The other thermoplastic resins to be mixed may be mentioned polyolefin-based resins such as high density polyethylene (HDPE), medium density polyethylene (MDPE), low density polyethylene (LDPE), linear low density polyethylene (LLDPE), ultra-high molecular weight polyethylene (UHMWPE), polypropylene (PP), polybutene (PB), polymethylpentene (TPX), an ethylene/vinyl acetate copolymer saponified product (EVOH), etc.; polystyrene-based resins such as polystyrene (PS), syndiotactic polystyrene (SPS), a methyl methacrylate/styrene copolymer (MS), a methyl methacrylate/styrene/butadiene copolymer (MBS), etc.; polyolefin-based resins and polystyrene-based resins containing a functional group(s) such as a carboxyl group and a salt thereof, an acid anhydride group, an epoxy group, etc.; polyester-based resins such as polybutylene terephthalate (PBT), polyethylene terephthalate (PET), polyethylene isophthalate (PEI), a poly(ethylene terephthalate/ethylene isophthalate) copolymer (PET/PEI), polytrimethylene terephthalate (PTT), polycyclohexanedimethylene terephthalate (PCT), polyethylene naphthalate (PEN), polybutylene naphthalate (PBN), polyacrylate (PAR), liquid crystal polyester (LCP), polylactic acid (PLA), polyglycolic acid (PGA), etc.; polyether-based resins such as polyacetal (POM), polyphenylene ether (PPO), etc.; polysulfone-based resins such as polysulfone (PSU), polyethersulfone (PESU), polyphenylsulfone (PPSU), etc.; polythioether-based resins such as polyphenylene sulfide (PPS), polythioether sulfone (PTES), etc.; polyketone-based resins such as polyketone (PK), polyetherketone (PEK), polyetheretherketone (PEEK), polyetherketoneketone (PEKK), polyetheretheretherketone (PEEEK), polyetheretherketoneketone (PEEKK), polyetherketoneketoneketone (PEKKK), polyetherketoneetherketoneketone (PEKEKK), etc.; polynitrile-based resins such as polyacrylonitrile (PAN), polymethacrylonitrile, an acrylonitrile/styrene copolymer (AS), a methacrylonitrile/styrene copolymer, an acrylonitrile/butadiene/styrene copolymer (ABS), an acrylonitrile/butadiene copolymer (NBR), etc.; polymethacrylate-based resins such as polymethyl methacrylate (PMMA), polyethyl methacrylate (PEMA), etc.; polyvinyl-based resins such as polyvinyl alcohol (PVA), polyvinylidene chloride (PVDC), polyvinyl chloride (PVC), a vinyl chloride/vinylidene chloride copolymer, vinylidene chloride/methyl acrylate copolymer, etc.; cellulose-based resins such as cellulose acetate, cellulose butyrate, etc.; polycarbonate-based resins such as polycarbonate (PC), etc.; polyimide-based resins such as thermoplastic polyimide (TPI), polyether imide, polyester imide, polyamideimide (PAD, polyester amideimide, etc.; thermoplastic polyurethane-based resins; polyamide elastomers, polyurethane elastomers, polyester elastomers, etc., and in some cases, there may be mentioned fluorine-based resins such as polyvinylidene fluoride (PVDF), polyvinyl fluoride (PVF), polytetrafluoroethylene (PTFE), polychlorofluoroethylene (PCTFE), a tetrafluoroethylene/ethylene copolymer (ETFE), an ethylene/chlorotrifluoroethylene copolymer (ECTFE), a tetrafluoroethylene/hexafluoropropylene copolymer (FEP), a tetrafluoroethylene/hexafluoropropylene/vinylidene fluoride copolymer (THV), a tetrafluoroethylene/hexafluoropropylene/vinylidene fluoride/perfluoro(alkyl vinyl ether) copolymer, a tetrafluoroethylene/perfluoro(alkyl vinyl ether) copolymer (PFA), a tetrafluoroethylene/hexafluoropropylene/perfluoro(alkyl vinyl ether) copolymer, a chlorotrifluoroethylene/perfluoro(alkyl vinyl ether)/tetrafluoroethylene copolymer (CPT), etc. These may be used singly, or two or more may be used in combination.

Further, the aliphatic polyamide composition (A) may contain, if necessary, an antioxidant, a heat stabilizer, an ultraviolet absorber, a light stabilizer, a lubricant, an inorganic filler, an antistatic agent, a flame retardant, a crystallization accelerator, a coloring agent, etc.

2. Layer (b)

Layer (b) of the multilayer tube contains a semi-aromatic polyamide composition (B).

[Semi-Aromatic Polyamide Composition (B)]

The semi-aromatic polyamide composition (B) contains a semi-aromatic polyamide (B1) and/or a semi-aromatic polyamide (B2), the semi-aromatic polyamide (B1) and/or the semi-aromatic polyamide (B2) is contained in the semi-aromatic polyamide composition (B) in an amount(s) of 60% by mass or more, the semi-aromatic polyamide (B1) contains 60% by mass or more and 100% by mass or less of a semi-aromatic polyamide (B11) and 0% by mass or more and 40% by mass or less of a semi-aromatic polyamide (B12), the semi-aromatic polyamide (B11) contains 50 mol % or more of an aliphatic diamine unit having 4 or more and 8 or less carbon atoms based on the whole diamine units of the semi-aromatic polyamide (B11) and contains 50 mol % or more of a dicarboxylic acid unit containing at least one kind selected from the group consisting of a terephthalic acid unit, an isophthalic acid unit and a naphthalene dicarboxylic acid unit based on the whole dicarboxylic acid units of the semi-aromatic polyamide (B11), the semi-aromatic polyamide (B12) contains 50 mol % or more of an aliphatic diamine unit having 9 or more and 12 or less carbon atoms based on the whole diamine units of the semi-aromatic polyamide (B12) and contains 50 mol % or more of a dicarboxylic acid unit containing at least one kind selected from the group consisting of a terephthalic acid unit, an isophthalic acid unit and a naphthalene dicarboxylic acid unit based on the whole dicarboxylic acid units of the semi-aromatic polyamide (B12), the semi-aromatic polyamide (B2) contains 60% by mass or more and 100% by mass or less of a semi-aromatic polyamide (B21) and 0% by mass or more and 40% by mass or less of a semi-aromatic polyamide (B22), the semi-aromatic polyamide (B21) contains 50 mol % or more of a xylylene diamine unit and/or a bis(aminomethyl)naphthalene unit based on the whole diamine units of the semi-aromatic polyamide (B21) and contains 50 mol % or more of an aliphatic dicarboxylic acid unit having 4 or more and 8 or less carbon atoms based on the whole dicarboxylic acid units of the semi-aromatic polyamide (B21), and the semi-aromatic polyamide (B22) contains 50 mol % or more of a xylylene diamine unit and/or a bis(aminomethyl)naphthalene unit based on the whole diamine units of the semi-aromatic polyamide (322) and contains 50 mol % or more of an aliphatic dicarboxylic acid unit having 9 or more and 12 or less carbon atoms based on the whole dicarboxylic acid unit of the semi-aromatic polyamide (B22) (hereinafter sometimes referred to as semi-aromatic polyamide composition (B).).

[Semi-Aromatic Polyamide (B1)]

The semi-aromatic polyamide composition (B) has an embodiment of containing a semi-aromatic polyamide (B1) (hereinafter sometimes referred to as semi-aromatic polyamide (B1).), and the semi-aromatic polyamide (B1) contains 60% by mass or more and 100% by mass or less of a semi-aromatic polyamide (B11) and 0% by mass or more and 40% by mass or less of a semi-aromatic polyamide (B12).

The semi-aromatic polyamide (B11) contains a diamine unit containing 50 mol % or more of an aliphatic diamine unit having 4 or more and 8 or less carbon atoms based on the whole diamine units of the semi-aromatic polyamide (B11), and a dicarboxylic acid unit containing 50 mol % or more of a dicarboxylic acid unit which contains at least one kind selected from the group consisting of a terephthalic acid unit, an isophthalic acid unit and a naphthalene dicarboxylic acid unit based on the whole dicarboxylic acid units of the semi-aromatic polyamide (B11) (hereinafter sometimes referred to as semi-aromatic polyamide (B11).).

The semi-aromatic polyamide (B12) contains a diamine unit containing 50 mol % or more of an aliphatic diamine unit having 9 or more and 12 or less carbon atoms based on the whole diamine units of the semi-aromatic polyamide (B12), and a dicarboxylic acid unit containing 50 mol % or more of a dicarboxylic acid unit which contains at least one kind selected from the group consisting of a terephthalic acid unit, an isophthalic acid unit and a naphthalene dicarboxylic acid unit based on the whole dicarboxylic acid units of the semi-aromatic polyamide (B12) (hereinafter sometimes referred to as semi-aromatic polyamide (B12).).

[Semi-Aromatic Polyamide (B11)]

A content of the aliphatic diamine unit having 4 or more and 8 or less carbon atoms in the semi-aromatic polyamide (B11) is 50 mol % or more based on the whole diamine units of the semi-aromatic polyamide (B11) from the viewpoints of sufficiently ensuring various properties such as heat resistance, chemical resistance, impact resistance, chemical liquid-barrier property, etc., of the obtainable multilayer tube, preferably 55 mol % or more, and more preferably 60 mol % or more.

As the aliphatic diamine unit having 4 or more and 8 or less carbon atoms, there may be mentioned a unit derived from 1,4-butanediamine, 1,5-pentanediamine, 1,6-hexanediamine, 1,7-heptanediamine, 1,8-octanediamine, etc. As long as the number of the carbon atoms satisfies the above-mentioned range, it may contain a unit derived from a branched chain aliphatic diamine such as 1-butyl-1,2-ethanediamine, 1, 1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, etc. These may be used singly, or two or more may be used in combination.

Among the aliphatic diamine unit having 4 or more and 8 or less carbon atoms, from the viewpoints of availability and economic efficiency, a unit derived from 1,4-butanediamine, 1,5-pentanediamine, 1,6-hexanediamine or 2-methyl-1,5-pentanediamine is preferable. Further, when 1,6-hexanediamine and 2-methyl-1,5-pentanediamine are used in combination, a molar ratio of the 1,6-hexanediamine unit and the 2-methyl-1,5-pentanediamine unit is preferably 30:70 to 98:2 (molar ratio) from the viewpoints of a balance between moldability and impact resistance, and more preferably 40:60 to 95:5 (molar ratio).

The diamine unit in the semi-aromatic polyimide (B11) may contain a diamine unit(s) other than the aliphatic diamine unit having 4 or more and 8 or less carbon atoms within the range which does not impair excellent various characteristics of the obtainable multilayer tube. As the other diamine units, there may be mentioned a unit derived from an aliphatic diamine such as 1,2-ethanediamine, 1,3-propanediamine, 1,9-nonanediamine, 1,10-decanediamine 1,11-undecanediamine, 1,12-dodecanediamine, 1,13-tridecanediamine, 2,2,4-trimethyl-1,6-hexanediamine, 2,4,4-trimethyl-1,6-hexanediamine, 2,4-diethyl-1,6-hexanediamine, 2,2-dimethyl-heptanediamine, 2,3-dimethyl-heptanediamine, 2,4-dimethyl-heptanediamine, 2,5-dimethyl-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,2-dimethyl-1,8-octanediamine, 2,4-dimethyl-1,8-octanediamine, 3,3-dimethyl-1,8-octanediamine, 3, 4-dimethyl-1,8-octanediamine, 4,4-dimethyl-1,8-octanediamine, 4,5-dimethyl-1,8-octanediamine, 5-methyl-1,9-nonanediamine, etc.; a unit derived from an alicyclic diamine such as 1,3-cyclohexanediamine, 1,4-cyclohexanediamine, 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl) propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl) norbornane, 3,8-bis(aminomethyl)tricyclodecane, 4,9-bis (aminomethyl)tricyclodecane, etc.; and a unit derived from an aromatic diamine such as m-phenylenediamine, p-phenylenediamine, m-xylylene diamine, p-xylylene diamine, 1,4-bis(aminomethyl)naphthalene, 1,5-bis(aminomethyl) naphthalene, 2,6-bis(aminomethyl)naphthalene, 2,7-bis (aminomethyl)naphthalene, 4,4'-diaminodiphenylmethane, 2,2-bis(4-aminophenyl)propane, 4,4'-diaminodiphenylsulfone, 4,4'-diaminodiphenyl ether, etc., these may be used singly, or two or more may be used in combination. A content of these other diamine units is less than 50 mol % based on the whole diamine units of the semi-aromatic polyamide (B11), preferably 45 mol % or less, and more preferably 40 mol % or less.

Also, a content of the dicarboxylic acid unit containing at least one kind selected from the group consisting of a terephthalic acid unit, an isophthalic acid unit and a naphthalenedicarboxylic acid unit in the semi-aromatic polyamide (B11) is 50 mol % or more based on the whole dicarboxylic acid units of the semi-aromatic polyamide (B11), preferably 55 mol % or more, and more preferably 60 mol % or more from the viewpoints of sufficiently ensuring various properties such as heat resistance, chemical resistance, chemical liquid-barrier property, etc., of the obtainable multilayer tube.

Examples of the naphthalenedicarboxylic acid units include those units derived from 2,6-naphthalenedicarboxylic acid, 2,7-naphthalenedicarboxylic acid, 1,4-naphthalenedicarboxylic acid and 1,5-naphthalenedicarboxylic acid. These may be used singly, or two or more may be used in combination. Of the naphthalenedicarboxylic acid units, units derived from 2,6-naphthalenedicarboxylic acid and 2,7-naphthalenedicarboxylic acid are preferable in light of economic efficiency and availability.

The dicarboxylic acid unit in the semi-aromatic polyamide (B11) may contain other dicarboxylic acid unit than the terephthalic acid unit, isophthalic acid unit and naphthalenedicarboxylic acid unit as long as within the range which does not impair excellent various characteristics of the obtainable multilayer tube. Examples of the additional dicarboxylic acid units include units derived from aliphatic dicarboxylic acids such as oxalic acid, malonic acid, dimethylmalonic acid, succinic acid, glutaric acid, adipic acid, 2-methyladipic acid, pimelic acid, 2,2-dimethylglutaric acid, 2,2-diethylsuccinic acid, suberic acid, azelaic acid, 2,2,4-trimethyladipic acid, 2,4,4-trimethyladipic acid, sebacic acid, undecanedioic acid, dodecanedioic acid, tridecanedioic acid, tetradecanedioic acid, pentadecanedioic acid, hexadecanedioic acid, octadecanedioic acid and eicosanedioic acid; units derived from alicyclic dicarboxylic acids such as 1,3-cyclopentanedicarboxylic acid, 1,3-cyclohexanedicarboxylic acid and 1,4-cyclohexanedicarboxylic acid; and units derived from aromatic dicarboxylic acids such as phthalic acid, 1,3-phenylenedioxydiacetic acid, 1,4-phenylenedioxydiacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenyl ether-4,4'-dicarboxylic acid, diphenylsulfone-4,4'-dicarboxylic acid, 4,4'-biphenyldicarboxylic acid and 4,4'-triphenyldicarboxylic acid. These may be used singly, or two or more may be used in combination. Of these, units derived from aromatic dicarboxylic acids are preferable. The content of these additional dicarboxylic acid units is less than 50 mol % of all the dicarboxylic acid units in the semi-aromatic polyamide (B11), and is preferably 45 mol % or less, and more preferably 40 mol % or less. Further, polyvalent carboxylic acids such as trimellitic acid, trimesic acid and pyromellitic acid may be used as long as melt forming is feasible.

As long as the superior characteristics of the multilayer tube that is obtained are not impaired, the semi-aromatic polyamide (B11) may include additional units other than the dicarboxylic acid units and the diamine units. Examples of such additional units include units derived from lactams such as caprolactam, enantholactam, undecanelactam, dodecanelactam, α-pyrrolidone and α-piperidone; aliphatic aminocarboxylic acids such as 6-aminocaproic acid, 7-aminoheptanoic acid, 9-aminononanoic acid, 11-aminoundecanoic acid and 12-aminododecanoic acid; and units derived from aminocarboxylic acids of aromatic aminocarboxylic acids such as p-aminomethylbenzoic acid. These may be used singly, or two or more may be used in combination. A content of the other units is preferably 45 mol % or less based on the whole polymerization unit of the semi-aromatic polyamide (B11), more preferably 40 mol % or less, and further preferably 35 mol % or less.

Specific examples of the semi-aromatic polyamide (B11) may be mentioned a homopolymer of polytetramethylene terephthalamide (polyamide 4T), polytetramethylene isophthalamide (polyamide 41), polytetramethylene naphthalamide (polyamide 4N), polypentamethylene terephthalamide (polyamide 5T), polypentamethylene isophthalamide (polyamide 5I), polypentamethylene naphthalamide (polyamide 5N), polyhexamethylene terephthalamide (polyamide 6T), polyhexamethylene isophthalamide (polyamide 6I), polyhexamethylene naphthalamide (polyamide 6N), poly(2-methylpentamethylene terephthalamide) (polyamide M5T), poly(2-methylpentamethylene isophthalamide) (polyamide M5I) or poly(2-methylpentamethylene naphthalamide (polyamide M5N), and/or a copolymer which uses several kinds of raw material monomers of these polyamides, and/or raw material monomers of the polyamide (A1) and the polyamide (A2). These may be used singly, or two or more may be used in combination.

Among these, from the viewpoints of availability, and sufficiently ensuring various properties such as heat resistance, chemical resistance, impact resistance, chemical liquid-barrier property, etc., of the obtainable multilayer tube, the semi-aromatic polyamide (B11) is preferably a poly (tetramethylene terephthalamide/hexamethylene terephthalamide) copolymer (polyamide 4T/6T), a poly(tetramethylene terephthalamide/tetramethylene adipamide) copolymer (polyamide 4T/46), a poly(hexamethylene terephthalamide/hexamethylene isophthalamide) copolymer (polyamide 6T/6I), a poly(hexamethylene terephthalamide/2-methylpentamethylene terephthalamide) copolymer (polyamide 6T/M5T), a poly(hexamethylene terephthalamide/caproamide) copolymer (polyamide 6T/6), a poly(hexamethylene terephthalamide/hexamethylene adipamide) copolymer (polyamide 6T/66), a poly(hexamethylene terephthalamide/hexamethylene sebacamide) copolymer (polyamide 6T/610), a poly(hexamethylene terephthalamide/hexamethylene dodecamide) copolymer (polyamide 6T/612), a poly (hexamethylene terephthalamide/hexamethylene isophthalamide/hexamethylene adipamide) copolymer (polyamide 6T/6I/66), a poly(hexamethylene terephthalamide/hexamethylene isophthalamide/hexamethylene sebacamide) copolymer (polyamide 6T/6I/610), a poly(hexamethylene terephthalamide/hexamethylene isophthalamide/hexamethylene dodecamide) copolymer (polyamide 6T/6I/612), and a mixture of these materials, and more preferably a poly(hexamethylene terephthalamide/hexamethylene isophthalamide) copolymer (polyamide 6T/6I), a poly(hexamethylene terephthalamide/2-methylpentamethylene terephthalamide) copolymer (polyamide 6T/M5T), a poly(hexamethylene terephthalamide/caproamide) copolymer (polyamide 6T/6), a poly(hexamethylene terephthalamide/hexamethylene adipamide) copolymer (polyamide 6T/66), a poly(hexamethylene terephthalamide/hexamethylene sebacamide) copolymer (polyamide 6T/610), a poly(hexamethylene terephthalamide/hexamethylene dodecamide) copolymer (polyamide 6T/612), a poly(hexamethylene terephthalamide/hexamethylene isophthalamide/hexamethylene adipamide) copolymer (polyamide 6T/6I/66), a poly(hexamethylene terephthalamide/hexamethylene isophthalamide/hexamethylene sebacamide) copolymer (polyamide 6T/6I/610), a poly(hexamethylene terephthalamide/hexamethylene isophthalamide/hexamethylene dodecamide) copolymer (polyamide 6T/6I/612), and a mixture of these materials.

[Semi-Aromatic Polyamide (B12)]

A content of the aliphatic diamine unit having 9 or more and 12 or less carbon atoms in the semi-aromatic polyamide (B12) is 50 mol % or more based on the whole diamine units of the semi-aromatic polyamide (B12) from the viewpoints of sufficiently ensuring various properties such as heat resistance, chemical resistance, impact resistance, chemical liquid-barrier property, etc., of the obtainable multilayer tube, preferably 55 mol % or more, and more preferably 60 mol % or more.

As the aliphatic diamine unit having 9 or more and 12 or less carbon atoms, there may be mentioned a unit derived from 1,9-nonanediamine, 1,10-decanediamine 1,11-undecanediamine, 1,12-dodecanediamine, etc. As long as the number of the carbon atoms satisfies the above-mentioned range, it may contain a unit derived from a branched aliphatic diamine such as 2,2,4-trimethyl-1,6-hexanediamine, 2,4,4-trimethyl-1,6-hexanediamine, 2,4-diethyl-1,6-hexanediamine, 2,2-dimethyl-heptanediamine, 2,3-dimethyl-heptanediamine, 2,4-dimethyl-heptanediamine, 2,5-dimethyl-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,2-dimethyl-1,8-octanediamine, 2,4-dimethyl-1,8-octanediamine, 3,3-dimethyl-1,8-octanediamine, 3, 4-dimethyl-1,8-octanediamine, 4,4-dimethyl-1,8-octanediamine, 4,5-dimethyl-1,8-octanediamine, 5-methyl-1,9-nonanediamine, etc. These may be used singly, or two or more may be used in combination.

Among the aliphatic diamine units having 9 or more and 12 or less carbon atoms, a unit derived from 1,9-nonanediamine, 2-methyl-1,8-octanediamine, 1,10-decanediamine or 1,12-dodecanediamine is preferable from the viewpoints of availability and economic efficiency. Further, when the 1,9-nonanediamine and the 2-methyl-1,8-octanediamine are used in combination, a molar ratio of the 1,9-nonanediamine unit and the 2-methyl-1,8-octanediamine unit is preferably 30:70 to 98:2 (molar ratio) from the viewpoints of a balance between moldability and impact resistance, and more preferably 40:60 to 95:5 (molar ratio).

The diamine unit in the semi-aromatic polyamide (B12) may contain a diamine unit(s) other than the aliphatic diamine unit having 9 or more and 12 or less carbon atoms within the range which does not impair excellent various characteristics of the obtainable multilayer tube. As the other diamine unit(s), there may be mentioned a unit derived from an aliphatic diamine such as 1,2-ethanediamine, 1,3-propanediamine, 1,4-butanediamine, 1,5-pentanediamine, 1,6-hexanediamine, 1,7-heptanediamine, 1,8-octanediamine, 1,13-tridecanediamine, etc., a unit derived from an alicyclic diamine described in the explanation of the semi-aromatic polyamide (B11), and a unit derived from an aromatic diamine. These may be used singly, or two or more may be used in combination. A content of the other diamine unit(s) is 40 mol % or less based on the whole diamine units of the semi-aromatic polyamide (B12), preferably 25 mol % or less, and more preferably 10 mol % or less.

Also, a content of the dicarboxylic acid unit which contains at least one kind selected from the group consisting of a terephthalic acid unit, an isophthalic acid unit and a naphthalene dicarboxylic acid unit in the semi-aromatic polyamide (B12) is 50 mol % or more based on the whole dicarboxylic acid units of the semi-aromatic polyamide (B12), from the viewpoints of sufficiently ensuring various properties of the obtainable multilayer tube such as heat resistance, chemical resistance, chemical liquid-barrier property, etc., preferably 55 mol % or more, and more preferably 60 mol % or more.

As the naphthalene dicarboxylic acid unit, there may be mentioned the dicarboxylic acid unit described in the explanation of the semi-aromatic polyamide (B11). These may be used singly, or two or more may be used in combination.

The dicarboxylic acid unit in the semi-aromatic polyamide (B12) may contain a dicarboxylic acid unit(s) other than the terephthalic acid unit, the isophthalic acid unit and the naphthalene dicarboxylic acid unit within the range which does not impair excellent various characteristics of the obtainable multilayer tube. As the other dicarboxylic acid unit(s), there may be mentioned the dicarboxylic acid unit described in the explanation of the semi-aromatic polyamide (B11). These may be used singly, or two or more may be used in combination. A content of these other dicarboxylic acid unit(s) is less than 50 mol % based on the whole dicarboxylic acid units of the semi-aromatic polyamide (B12), preferably 45 mol % or less, and more preferably 40 mol % or less.

In the semi-aromatic polyamide (B12), other unit(s) than the dicarboxylic acid unit and the diamine unit may be contained within the range which does not impair excellent various characteristics of the obtainable multilayer tube. As the other unit(s), the unit derived from the lactam and/or the unit derived from the aminocarboxylic acid described in the explanation of the semi-aromatic polyamide (B11) is/are mentioned. These may be used singly, or two or more may be used in combination. A content of the other unit(s) is preferably 45 mol % or less based on the whole polymerization units of the semi-aromatic polyamide (B12), more preferably 40 mol % or less, and further preferably 35 mol % or less.

Specific examples of the semi-aromatic polyamide (B12) may be mentioned a homopolymer of polynonamethylene terephthalamide (polyamide 9T), polynonamethylene isophthalamide (polyamide 9I), polynonamethylene naphthalamide (polyamide 9N), poly(2-methyloctamethylene terephthalamide) (polyamide MST), poly(2-methyloctamethylene isophthalamide) (polyamide M8D, poly(2-methyloctamethylene naphthalamide) (polyamide M8N), polytrimethylhexamethylene terephthalamide (polyamide TMHT), polytrimethylhexamethylene isophthalamide (polyamide TMHI), polytrimethylhexamethylene naphthalamide (polyamide TMHN), polydecamethylene terephthalamide (polyamide 10T), polydecamethylene isophthalamide (polyamide 10I), polydecamethylene naphthalamide (polyamide 10N), polyundecamethylene terephthalamide (polyamide 11T), polyundecamethylene isophthalamide (polyamide 11D, polyundecamethylene naphthalamide (polyamide 11N), polydodecamethylene terephthalamide (polyamide 12T), polydodecamethylene isophthalamide (polyamide 12I) or polydodecamethylene naphthalamide (polyamide 12N), and/or a copolymer using raw material monomer(s) of these polyamides, and/or several kinds of raw material monomers of the polyamide (A1) and polyamide (A2). These may be used singly, or two or more may be used in combination.

Among these, from the viewpoints of availability, and sufficiently ensuring various properties such as heat resistance, chemical resistance, impact resistance, chemical liquid-barrier property, etc., of the obtainable multilayer tube, the semi-aromatic polyamide (B12) is preferably polynonamethylene terephthalamide (polyamide 9T), a poly(nonamethylene terephthalamide/2-methyloctamethylene terephthalamide) copolymer (polyamide 9T/M8T), a poly(nonamethylene terephthalamide/2-methyloctamethylene terephthalamide/undecaneamide) copolymer (polyamide 9T/M8T/11), a poly(nonamethylene terephthalamide/2-methyloctamethylene terephthalamide/dodecaneamide) copolymer (polyamide 9T/M8T/12), a poly(nonamethylene terephthalamide/2-methyloctamethylene terephthalamide/nonamethylene isophthalamide/2-methyloctamethylene isophthalamide) copolymer (polyamide 9T/M8T/9I/M8I), polynonamethylene naphthalamide (polyamide 9N), a poly(nonamethylene naphthalamide/2-methyloctamethylene naphthalamide) copolymer (polyamide 9N/M8N), a poly(nonamethylene naphthalamide/2-methyloctamethylene naphthalamide/undecaneamide) copolymer (polyamide 9N/M8N/11), a poly(nonamethylene naphthalamide/2-methyloctamethylene naphthalamide/dodecaneamide) copolymer (polyamide 9N/M8N/12), polydecamethylene terephthalamide (polyamide 10T), a poly(decamethylene terephthalamide/undecaneamide) copolymer (polyamide 10T/11), a poly(decamethylene terephthalamide/dodecaneamide) copolymer (polyamide 10T/12), a poly(decamethylene terephthalamide/decamethylene sebacamide) copolymer (polyamide 10T/1010), a poly(decamethylene terephthalamide/decamethylene dodecamide) copolymer (polyamide 10T/1012), a poly(decamethylene terephthalamide/decamethylene isophthalamide/undecaneamide) copolymer (polyamide 10T/10I/11), a poly(decamethylene terephthalamide/decamethylene isophthalamide/dodecaneamide) copolymer (polyamide 10T/10I/12), a poly(decamethylene terephthalamide/decamethylene isophthalamide/decamethylene sebacamide) copolymer (polyamide 10T/10I/1010), a poly (decamethylene terephthalamide/decamethylene isophthalamide/decamethylene dodecamide) copolymer (polyamide 10T/10I/1012), polydecamethylene naphthalamide (polyamide 10N), a poly(decamethylene naphthalamide/undecaneamide) copolymer (polyamide 10N/11), a poly(decamethylene naphthalamide/dodecaneamide) copolymer (polyamide 10N/12), a poly(decamethylene naphthalamide/decamethylene sebacamide) copolymer (polyamide 10N/1010), a poly(decamethylene naphthalamide/decamethylene dodecamide) copolymer (polyamide 10N/1012), a poly (decamethylene terephthalamide/decamethylene naphthalamide/undecaneamide) copolymer (polyamide 10T/10N/11), a poly(decamethylene terephthalamide/decamethylene naphthalamide/dodecaneamide) copolymer (polyamide 10T/10N/12), a poly(decamethylene terephthalamide/decamethylene naphthalamide/decamethylene sebacamide) copolymer (polyamide 10T/10N/1010), a poly(decamethylene terephthalamide/decamethylene naphthalamide/decamethylene dodecamide) copolymer (polyamide 10T/10N/1012), polydodecamethylene terephthalamide (polyamide 12T), a poly(dodecamethylene terephthalamide/undecaneamide) copolymer (polyamide 12T/11), a poly(dodecamethylene terephthalamide/dodecaneamide) copolymer (polyamide 12T/12), a poly(dodecamethylene terephthalamide/dodecamethylene sebacamide) copolymer (polyamide 12T/1210), a poly(dodecamethylene terephthalamide/dodecamethylene dodecamide) copolymer (polyamide 12T/1212), a poly(dodecamethylene terephthalamide/dodecamethylene isophthalamide/undecaneamide) copolymer (polyamide 12T/12I/11), a poly(dodecamethylene terephthalamide/dodecamethylene isophthalamide/dodecaneamide) copolymer (polyamide 12T/12I/12), a poly (dodecamethylene terephthalamide/dodecamethylene isophthalamide/dodecamethylene sebacamide) copolymer (polyamide 12T/12I/1210), a poly(dodecamethylene terephthalamide/dodecamethylene isophthalamide/dodecamethylene dodecamide) copolymer (polyamide 12T/12I/1212), polydodecamethylene naphthalamide (polyamide 12N), a poly(dodecamethylene naphthalamide/undecaneamide) copolymer (polyamide 12N/11), a poly(dodecamethylene naphthalamide/dodedecaneamide) copolymer (polyamide 12N/12), a poly(dodecamethylene naphthalamide/dodecamethylene sebacamide) copolymer (polyamide 12N/1210), a poly(dodecamethylene naphthalamide/dodecamethylene dodecamide) copolymer (polyamide 12N/1212), a poly(dodecamethylene terephthalamide/dodecamethylene naphthalamide/undecaneamide) copolymer (polyamide 12T/12N/11), a poly(dodecamethylene terephthalamide/dodecamethylene naphthalamide/dodecaneamide) copolymer (polyamide 12T/12N/12), a poly(dodecamethylene terephthalamide/dodecamethylene naphthalamide/dodecamethylene sebacamide) copolymer (polyamide 12T/12N/1210), a poly(dodecamethylene terephthalamide/dodecamethylene naphthalamide/dodecamethylene dodecamide) copolymer (polyamide 12T/12N/1212), and a mixture of these materials, and more preferably polynonamethylene terephthalamide (polyamide 9T), a poly(nonamethylene terephthalamide/2-methyloctamethylene terephthalamide) copolymer (polyamide 9T/M8T), polynonamethylene naphthalamide (polyamide 9N), a poly (nonamethylene naphthalamide/2-methyloctamethylene naphthalamide) copolymer (polyamide 9N/M8N), polydecamethylene terephthalamide (polyamide 10T), a poly(decamethylene terephthalamide/undecaneamide) copolymer (polyamide 10T/11), a poly(decamethylene terephthalamide/dodecaneamide) copolymer (polyamide 10T/12), a poly(decamethylene terephthalamide/decamethylene sebacamide) copolymer (polyamide 10T/1010), a poly(decamethylene terephthalamide/decamethylene dodecamide) copolymer (polyamide 10T/1012), a poly(decamethylene terephthalamide/decamethylene isophthalamide/undecaneamide) copolymer (polyamide 10T/10I/11), a poly(decamethylene terephthalamide/decamethylene isophthalamide/dodecaneamide) copolymer (polyamide 10T/10I/12), a poly (decamethylene terephthalamide/decamethylene isophthalamide/decamethylene sebacamide) copolymer (polyamide 10T/10I/1010), a poly(decamethylene terephthalamide/decamethylene isophthalamide/decamethylene dodecamide) copolymer (polyamide 10T/10I/1012), polydecamethylene naphthalamide (polyamide 10N), a poly (decamethylene naphthalamide/undecaneamide) copolymer (polyamide 10N/11), a poly(decamethylene naphthalamide/dodecaneamide) copolymer (polyamide 10N/12), a poly (decamethylene naphthalamide/decamethylene sebacamide) copolymer (polyamide 10N/1010), a poly(decamethylene naphthalamide/decamethylene dodecamide) copolymer (polyamide 10N/1012), a poly(decamethylene terephthalamide/decamethylene naphthalamide/undecaneamide) copolymer (polyamide 10T/10N/11), a poly(decamethylene terephthalamide/decamethylene naphthalamide/dodecaneamide) copolymer (polyamide 10T/10N/12), a poly(decamethylene terephthalamide/decamethylene naphthalamide/decamethylene sebacamide) copolymer (polyamide 10T/10N/1010), a poly(decamethylene terephthalamide/decamethylene naphthalamide/decamethylene dodecamide) copolymer (polyamide 10T/10N/1012), polydodecamethylene terephthalamide (polyamide 12T), a poly(dodecamethylene terephthalamide/undecaneamide) copolymer (polyamide 12T/11), a poly(dodecamethylene terephthalamide/dodecaneamide) copolymer (polyamide 12T/12), a poly (dodecamethylene terephthalamide/dodecamethylene dodecamide) copolymer (polyamide 12T/1212), polydodecamethylene naphthalamide (polyamide 12N), a poly(dodecamethylene naphthalamide/undecaneamide) copolymer (polyamide 12N/11), a poly(dodecamethylene naphthalamide/dodecaneamide) copolymer (polyamide 12N/12), a poly(dodecamethylene naphthalamide/dodecamethylene dodecamide) copolymer (polyamide 12N/1212), and a mixture of these materials.

Further, as the producing apparatus of the semi-aromatic polyamide (B1), there may be mentioned conventionally known polyamide producing apparatuses such as a batch type reaction vessel, a single- or multi-tank type continuous reaction apparatus, a tubular continuous reaction apparatus, a kneading reaction extruder including a single-screw kneading extruder, and a twin-screw kneading extruder, etc. As the producing method, there are conventionally known methods such as melt polymerization, solution polymerization, solid-state polymerization, etc., and by using these methods, the materials can be polymerized by repeating normal pressure, reduced pressure and pressuring operations. These producing method can be used alone or in an appropriate combination.

At the time of producing the semi-aromatic polyamide (B1), as a catalyst, phosphoric acid, phosphorous acid, hypophosphorous acid, a salt or an ester thereof can be added. As the salt or the ester of the phosphoric acid, phosphorous acid or hypophosphorous acid, there may be mentioned, for example, a metal salt of phosphoric acid, phosphorous acid or hypophosphorous acid with potassium, sodium, magnesium, vanadium, calcium, zinc, cobalt, manganese, tin, tungsten, germanium, titanium, antimony, etc., an ammonium salt of phosphoric acid, phosphorous acid or hypophosphorous acid, an ethyl ester, isopropyl ester, butyl ester, hexyl ester, isodecyl ester, decyl ester, stearyl ester or phenyl ester of phosphoric acid, phosphorous acid or hypophosphorous acid, etc. These may be used singly, or two or more may be used in combination.

A content of the semi-aromatic polyamide (B11) in the semi-aromatic polyamide (B1) is 60% by mass or more and 100% by mass or less based on 100% by mass of the semi-aromatic polyamide (B1), preferably 65% by mass or more and 100% by mass or less, and more preferably 70% by mass or more and 100% by mass or less. If the content of the semi-aromatic polyamide (B11) is less than the above-mentioned value, chemical liquid-barrier property of the obtainable multilayer tube is poor.

A content of the semi-aromatic polyamide (B12) in the semi-aromatic polyamide (B1) is 0% by mass or more and 40% by mass or less based on 100% by mass of the semi-aromatic polyamide (B1), preferably 0% by mass or more and 35% by mass or less, and more preferably 0% by mass or more and 30% by mass or less. If the content of the semi-aromatic polyamide (B12) exceeds the above-mentioned value, chemical liquid-barrier property of the obtainable multilayer tube is poor.

A method of mixing the semi-aromatic polyamide (B11) and the semi-aromatic polyamide (B12) may be mentioned the conventionally known methods described in the explanation of the above-mentioned aliphatic polyamide composition (A).

[Semi-Aromatic Polyamide (B2)]

The semi-aromatic polyamide composition (B) involves an embodiment containing the semi-aromatic polyamide (B2) (hereinafter sometimes referred to as semi-aromatic polyamide (B2).), and the semi-aromatic polyamide (B2) contains 60% by mass or more and 100% by mass or less of a semi-aromatic polyamide (B21) and 0% by mass or more and 40% by mass or less of a semi-aromatic polyamide (B22).

The semi-aromatic polyamide (B21) contains a diamine unit in which 50 mol % or more of a xylylene diamine unit and/or a bis(aminomethyl)naphthalene unit is/are contained based on the whole diamine units of the semi-aromatic polyamide (B21), and a dicarboxylic acid unit in which 50 mol % or more of an aliphatic dicarboxylic acid unit having 4 or more and 8 or less carbon atoms is contained based on the whole dicarboxylic acid units of the semi-aromatic polyamide (B21) (hereinafter sometimes referred to as semi-aromatic polyamide (B21).).

The semi-aromatic polyamide (B22) contains a diamine unit in which 50 mol % or more of a xylylene diamine unit and/or a bis(aminomethyl)naphthalene unit is/are contained based on the whole diamine units of the semi-aromatic polyamide (B22), and a dicarboxylic acid unit in which 50 mol % or more of an aliphatic dicarboxylic acid unit having 9 or more and 12 or less carbon atoms is contained based on the whole dicarboxylic acid units of the semi-aromatic polyamide (B22) (hereinafter sometimes referred to as semi-aromatic polyamide (B22).).

[Semi-Aromatic Polyamide (B21)]

A content of the xylylene diamine unit and/or a bis (aminomethyl)naphthalene unit in the semi-aromatic polyamide (B21) is 50 mol % or more based on the whole diamine units of the semi-aromatic polyamide (B21) from the viewpoints of sufficiently ensuring various properties such as heat resistance, chemical resistance, impact resistance, chemical liquid-barrier property, etc., of the obtainable multilayer tube, preferably 55 mol % or more, and more preferably 60 mol % or more.

As the xylylene diamine unit, a unit derived from o-xylylene diamine, m-xylylenediamine or p-xylylenediamine may be mentioned. These may be used singly, or two or more may be used in combination. Among the xylylene diamine units, from the viewpoints of economic efficiency and availability, a unit derived from m-xylylenediamine or p-xylylenediamine is preferable.

When m-xylylenediamine and p-xylylenediamine are used in combination, a molar ratio of the m-xylylenediamine unit and the p-xylylenediamine unit is preferably 10:90 to 99:1 (molar ratio) from the viewpoints of a balance between moldability and impact resistance, more preferably 50:50 to 99:1 (molar ratio), and further preferably 65:35 to 99:1 (molar ratio).

As the bis(aminomethyl)naphthalene unit, a unit derived from 1,4-bis(aminomethyl)naphthalene, 1,5-bis(aminomethyl)naphthalene, 2,6-bis(aminomethyl)naphthalene or 2,7-bis(aminomethyl)naphthalene, etc., may be mentioned. These may be used singly, or two or more may be used in combination. Among the bis(aminomethyl)naphthalene units, a unit derived from 1,5-bis(aminomethyl)naphthalene or 2,6-bis(aminomethyl)naphthalene is preferable from the viewpoints of economic efficiency and availability.

As long as the superior characteristics of the multilayer tube that is obtained are not impaired, the diamine units in the semi-aromatic polyamide (B21) may include additional diamine units other than the xylylenediamine units and/or the bis(aminomethyl)naphthalene units. Examples of the additional diamine units include units derived from aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine and 5-methyl-1,9-nonanediamine; units derived from alicyclic diamines such as 1,3-cyclohexanediamine, 1,4-cyclohexanediamine, 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane and 4,9-bis(aminomethyl)tricyclodecane; and units derived from aromatic diamines such as m-phenylenediamine, p-phenylenediamine, 4,4'-diaminodiphenylmethane, 2,2-bis(4-aminophenyl)propane, 4,4'-diaminodiphenylsulfone and 4,4'-diaminodiphenyl ether. These may be used singly, or two or more may be used in combination. Of these, those units derived from aromatic diamines are preferable. The content of these additional diamine units is less than 50 mol % of all the diamine units in the semi-aromatic polyamide (B21), and is preferably 45 mol % or less, and more preferably 40 mol % or less.

The aliphatic dicarboxylic acid unit having 4 or more and 8 or less carbon atoms may be mentioned a unit derived from succinic acid, glutaric acid, adipic acid, pimelic acid, suberic acid, etc. As long as the number of the carbon atoms satisfies the above-mentioned range, it may contain a unit derived from a branched aliphatic dicarboxylic acid such as methylmalonic acid, dimethylmalonic acid, ethylmalonic acid, dimethylmalonic acid, methylsuccinic acid, methylethylmalonic acid, 2,2-dimethylsuccinic acid, 2,3-dimethylsuccinic acid, 2-methylglutaric acid, 3-methylglutaric acid, 2-methyladipic acid, 2,2-dimethylglutaric acid, 2,2-diethylsuccinic acid, etc. These may be used singly, or two or more may be used in combination. Among the aliphatic dicarboxylic acid units having 4 or more and 8 or less carbon atoms, from the viewpoints of availability and economic efficiency, a unit derived from adipic acid is preferable.

Also, a content of the aliphatic dicarboxylic acid unit having 4 or more and 8 or less carbon atoms in the semi-aromatic polyamide (B21) is 50 mol % or more based on the whole dicarboxylic acid units of the semi-aromatic polyamide (B21) from the viewpoints of sufficiently ensuring various properties of the obtainable multilayer tube such as heat resistance, chemical resistance, chemical liquid-barrier property, etc., preferably 55 mol % or more, and more preferably 60 mol % or more.

The dicarboxylic acid unit in the semi-aromatic polyamide (B21) may contain a dicarboxylic acid unit(s) other than the aliphatic dicarboxylic acid unit having 4 or more and 8 or less carbon atoms within the range which does not impair the excellent various characteristics of the obtainable multilayer tube. The other dicarboxylic acid units may be mentioned a unit derived from an aliphatic dicarboxylic acid such as oxalic acid, malonic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, eicosanedioic acid, 2,2,4-trimethyladipic acid, 2,4,4-trimethyladipic acid, 2-butylsuberic acid, etc.; a unit derived from an alicyclic dicarboxylic acid 1,3-cyclopentane dicarboxylic acid, 1,3-cyclohexane dicarboxylic acid, 1,4-cyclohexane dicarboxylic acid, etc.; a unit derived from an aromatic dicarboxylic acid such as phthalic acid, terephthalic acid, isophthalic acid, 1,4-naphthalene dicarboxylic acid, 1,5-naphthalene dicarboxylic acid, 2,6-naphthalene dicarboxylic acid, 2,7-naphthalene dicarboxylic acid, 1,3-phenylenedioxydiacetic acid, 1,4-phenylenedioxydiacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenyl ether-4,4'-dicarboxylic acid, diphenylsulfone-4,4'-dicarboxylic acid, 4,4'-biphenyldicarboxylic acid, 4,4'-triphenyldicarboxylic acid, etc., these may be used singly, or two or more may be used in combination. A content of these other dicarboxylic acid units is less than 50 mol % based on the whole dicarboxylic acid units of the semi-aromatic polyamide (B21), preferably 45 mol % or less, and more preferably 40 mol % or less. Further, it is also possible to use a polyvalent carboxylic acid such as trimellitic acid, trimesic acid, pyromellitic acid, etc., within the range in which melt molding is possible.

In the semi-aromatic polyamide (B21), other unit(s) than the dicarboxylic acid unit and the diamine unit may be contained within the range which does not impair the excellent various characteristics of the obtainable multilayer tube. The other unit(s) may be mentioned the unit derived from the lactam and/or the unit derived from the aminocarboxylic acid described in the explanation of the semi-aromatic polyamide (B11). These may be used singly, or two or more may be used in combination. A content of the other unit(s) is preferably 45 mol % or less based on the while polymerization units of the semi-aromatic polyamide (B21), more preferably 40 mol % or less, and further preferably 35 mol % or less.

Specific examples of the semi-aromatic polyamide (B21) may be mentioned a homopolymer of a polymetaxylylene succinamide (polyamide MXD4), polymetaxylylene glutamide (polyamide MXD5), polymetaxylylene adipamide (polyamide MXD6), polymetaxylylene suberamide (polyamide MXD8), polyparaxylylene succinamide (polyamide PXD4), polyparaxylylene glutamide (polyamide PXD5), polyparaxylylene adipamide (polyamide PXD6), polyparaxylylene suberamide (polyamide PXD8), poly(2,6-naphthalenedimethylene succinamide) (polyamide 2,6-BAN4), poly(2,6-naphthalenedimethylene glutamide) (polyamide 2,6-BAN5), poly(2,6-naphthalenedimethylene adipamide) (polyamide 2,6-BANG) or poly(2,6-naphthalenedimethylene suberamide) (polyamide 2,6-BAN8), and/or a copolymer using several kinds of raw material monomers of these polyamides, and/or a copolymer using several kinds of raw material monomers forming polymetaxylylene terephthalamide (polyamide MXDT), polymetaxylylene isophthalamide (polyamide MXDI), polymetaxylylene naphthalamide (polyamide MXDN), polyparaxylylene terephthalamide (polyamide PXDT), polyparaxylylene isophthalamide (polyamide PXDI), polyparaxylylene naphthalamide (polyamide PXDN), poly(2,6-naphthalenedimethylene terephthalamide) (polyamide 2,6-BANT), poly(2,6-naphthalenedimethylene isophthalamide) (polyamide 2,6-BANI), poly(2,6-naphthalenedimethylene naphthalamide) (polyamide 2,6-BANN), etc. These may be used singly, or two or more may be used in combination.

Among these, from the viewpoints of availability, and sufficiently ensuring various properties such as heat resistance, chemical resistance, impact resistance, chemical liquid-barrier property, etc., of the obtainable multilayer tube, the semi-aromatic polyamide (B21) is preferably polymetaxylylene adipamide (polyamide MXD6), polyparaxylylene adipamide (polyamide PXD6), a poly(metaxylylene adipamide/metaxylylene terephthalamide) copolymer (polyamide MXD6/MXDT), a poly(metaxylylene adipamide/metaxylylene isophthalamide) copolymer (polyamide MXD6/MXDI), a poly(metaxylylene adipamide/metaxylylene terephthalamide/metaxylylene isophthalamide) copolymer (polyamide MXD6/MXDT/MXDI), a poly(paraxylylene adipamide/paraxylylene terephthalamide) copolymer (polyamide PXD6/PXDT), a poly(paraxylylene adipamide/paraxylylene isophthalamide) copolymer (polyamide PXD6/PXDI), a poly(paraxylylene adipamide/paraxylylene terephthalamideparaxylylene isophthalamide) copolymer (polyamide PXD6/PXDT/PXDI), a poly(metaxylylene adipamide/paraxylylene adipamide) copolymer (polyamide MXD6/PXD6), a poly(metaxylylene adipamide/paraxylylene adipamide/metaxylylene terephthalamide/paraxylylene terephthalamide) copolymer (polyamide MXD6/PXD6/MXDT/PXDT), a poly(metaxylylene adipamide/paraxylylene adipamide/metaxylylene isophthalamide/paraxylylene isophthalamide) copolymer (polyamide MXD6/PXD6/MXDI/PXDI), a poly(metaxylylene adipamide/paraxylylene adipamide/metaxylylene terephthalamide/paraxylylene terephthalamide/metaxylylene isophthalamide/paraxylylene isophthalamide) copolymer (polyamide MXD6/PXD6/MXDT/PXDT/MXDI/PXDI) and a mixture of these materials, more preferably polymetaxylylene adipamide (polyamide MXD6), polyparaxylylene adipamide (polyamide PXD6), a poly(metaxylylene adipamide/metaxylylene isophthalamide) copolymer (polyamide MXD6/MXDI), a poly(paraxylylene adipamide/paraxylylene isophthalamide) copolymer (polyamide PXD6/PXDI), a poly(metaxylylene adipamide/paraxylylene adipamide) copolymer (polyamide MXD6/PXD6), a poly (metaxylylene adipamide/paraxylylene adipamide/metaxylylene isophthalamide/paraxylylene isophthalamide) copolymer (polyamide MXD6/PXD6/MXDI/PXDI) and a mixture of these materials, and further preferably polymetaxylylene adipamide (polyamide MXD6), a poly(metaxylylene adipamide/paraxylylene adipamide) copolymer (polyamide MXD6/PXD6) and a mixture of these materials.

[Semi-Aromatic Polyamide (B22)]

A content of the xylylene diamine unit and/or the bis (aminomethyl)naphthalene unit in the semi-aromatic polyamide (B22) is 50 mol % or more based on the whole diamine units of the semi-aromatic polyamide (B22) from the viewpoints of sufficiently ensuring various properties such as heat resistance, chemical resistance, impact resistance, chemical liquid-barrier property, etc., of the obtainable multilayer tube, preferably 55 mol % or more, and more preferably 60 mol % or more.

As the xylylene diamine unit and/or the bis(aminomethyl) naphthalene unit, the diamine unit described in the explanation of the semi-aromatic polyamide (B21) may be mentioned. These may be used singly, or two or more may be used in combination.

The diamine unit in the semi-aromatic polyamide (B22) may contain other diamine unit(s) than the xylylene diamine unit and/or the bis(aminomethyl)naphthalene unit within the range which does not impair excellent various characteristics of the obtainable multilayer tube. As the other diamine unit(s), there may be mentioned the diamine unit described in the explanation of the semi-aromatic polyamide (B21). These may be used singly, or two or more may be used in combination. A content of these other diamine unit(s) is 40 mol % or less based on the whole diamine units of the semi-aromatic polyamide (B22), preferably 25 mol % or less, and more preferably 10 mol % or less.

As the aliphatic dicarboxylic acid unit having 9 or more and 12 or less carbon atoms, there may be mentioned a unit derived from azelaic acid, sebacic acid, undecanedioic acid, dodecanedioic acid, etc. As long as the number of the carbon atoms satisfies the mentioned range, it may contain a unit derived from a branched aliphatic dicarboxylic acid such as 2,2,4-trimethyladipic acid, 2,4,4-trimethyladipic acid, 2-butylsuberic acid, etc. These may be used singly, or two or more may be used in combination. Among the aliphatic dicarboxylic acid units having 9 or more and 12 or less carbon atoms, from the viewpoints of availability and economic efficiency, it is preferably a unit derived from azelaic acid, sebacic acid, undecanedioic acid or dodecanedioic acid, more preferably a unit derived from sebacic acid or dodecanedioic acid, and further preferably a unit derived from sebacic acid.

Also, a content of the aliphatic dicarboxylic acid unit having 9 or more and 12 or less carbon atoms in the semi-aromatic polyamide (B22) is 50 mol % or more based on the whole dicarboxylic acid units of the semi-aromatic polyamide (B22) from the viewpoints of sufficiently ensuring various properties of the obtainable multilayer tube such as heat resistance, chemical resistance, chemical liquid-barrier property, etc., preferably 55 mol % or more, and more preferably 60 mol % or more.

The dicarboxylic acid unit in the semi-aromatic polyamide (B22) may contain other dicarboxylic acid unit(s) than the aliphatic dicarboxylic acid unit having 9 or more and 12 or less carbon atoms within the range which does not impair excellent various characteristics of the obtainable multilayer tube. As the other dicarboxylic acid unit(s), there may be mentioned a unit derived from an aliphatic dicarboxylic acid such as oxalic acid, malonic acid, tridecanedioic acid, tetradecanedioic acid, pentadecanedioic acid, hexadecanedioic acid, octadecanedioic acid, eicosanedioic acid, etc., a unit derived from an alicyclic dicarboxylic acid described in the explanation of the semi-aromatic polyamide (B21), and a unit derived from an aromatic dicarboxylic acid. These may be used singly, or two or more may be used in combination. A content of the other dicarboxylic acid units is less than 50 mol % based on the whole dicarboxylic acid units of the semi-aromatic polyamide (B22), preferably 45 mol % or less, and more preferably 40 mol % or less.

In semi-aromatic polyamide (B22), other unit(s) than the dicarboxylic acid unit and diamine unit may be contained within the range which does not impair the excellent various characteristics of the obtainable multilayer tube. As the other unit(s), there may be mentioned a unit derived from the lactam and/or a unit derived from an aminocarboxylic acid described in the explanation of the semi-aromatic polyamide (B11). These may be used singly, or two or more may be used in combination. A content of the other unit(s) is preferably 45 mol % or less based on the whole polymerization unit of the semi-aromatic polyamide (B22), more preferably 40 mol % or less, and further preferably 35 mol % or less.

Specific examples of the semi-aromatic polyamide (B22) may be mentioned a homopolymer of polymetaxylylene azelamide (polyamide MXD9), polymetaxylylene sebacamide (polyamide MXD10), polymetaxylylene dodecamide (polyamide MXD12), polyparaxylylene azelamide (polyamide PXD9), polyparaxylylene sebacamide (polyamide PXD10), polyparaxylylene dodecamide (polyamide PXD12), poly(2,6-naphthalenedimethylene azelamide) (polyamide 2,6-BAN9), poly(2,6-naphthalenedimethylene sebacamide) (polyamide 2,6-BAN10) or poly(2,6-naphthalenedimethylene dodecamide) (polyamide 2,6-BAN12), and/or a copolymer using several kinds of raw material monomers of these polyamides, and/or a copolymer using several kinds of raw material monomers forming polymetaxylylene terephthalamide (polyamide MXDT), polymetaxylylene isophthalamide (polyamide MXDI), polymetaxylylene naphthalamide (polyamide MXDN), polyparaxylylene terephthalamide (polyamide PXDT), polyparaxylylene isophthalamide (polyamide PXDI), polyparaxylylene naphthalamide (polyamide PXDN), poly (2,6-naphthalenedimethylene terephthalamide) (polyamide 2,6-BANT), poly(2,6-naphthalenedimethylene isophthalamide) (polyamide 2,6-BANI), poly(2,6-naphthalenedimethylene naphthalamide) (polyamide 2,6-BANN), etc. These may be used singly, or two or more may be used in combination.

Among these, from the viewpoints of availability, and sufficiently ensuring various properties such as heat resistance, chemical resistance, impact resistance, chemical liquid-barrier property, etc., of the obtainable multilayer tube, the semi-aromatic polyamide (B22) is preferably polymetaxylylene sebacamide (polyamide MXD10), polyparaxylylene sebacamide (polyamide PXD10), a poly(metaxylylene sebacamide/metaxylylene terephthalamide) copolymer (polyamide MXD10/MXDT), a poly(metaxylylene sebacamide/metaxylylene isophthalamide) copolymer (polyamide MXD10/MXDI), a poly(metaxylylene sebacamide/metaxylylene terephthalamide/metaxylylene isophthalamide) copolymer (polyamide MXD10/MXDT/MXDI), a poly(paraxylylene sebacamide/paraxylylene terephthalamide) copolymer (polyamide PXD10/PXDT), a poly (paraxylylene sebacamide/paraxylylene isophthalamide) copolymer (polyamide PXD10/PXDI), a poly(paraxylylene sebacamide/paraxylylene terephthalamide/paraxylylene isophthalamide) copolymer (polyamide PXD10/PXDT/PXDI), a poly(metaxylylene sebacamide/paraxylylene sebacamide) copolymer (polyamide MXD10/PXD10), a poly(metaxylylene sebacamide/paraxylylene sebacamide/metaxylylene terephthalamide/paraxylylene terephthalamide) copolymer (polyamide MXD10/PXD10/MXDT/PXDT), a poly(metaxylylene sebacamide/paraxylylene sebacamide/metaxylylene isophthalamide/paraxylylene isophthalamide) copolymer (polyamide MXD10/PXD10/MXDI/PXDI), a poly(metaxylylene sebacamide/paraxylylene sebacamide/metaxylylene terephthalamide/paraxylylene terephthalamide/metaxylylene isophthalamide/paraxylylene isophthalamide) copolymer (polyamide MXD10/PXD10/MXDT/PXDT/MXDI/PXDI), and a mixture of these materials, and more preferably polymetaxylylene sebacamide (polyamide MXD10), polyparaxylylene sebacamide (polyamide PXD10), a poly(metaxylylene sebacamide/metaxylylene isophthalamide) copolymer (polyamide MXD10/MXDI), a poly(paraxylylene sebacamide/paraxylylene isophthalamide) copolymer (polyamide PXD10/PXDI), a poly(metaxylylene sebacamide/paraxylylene sebacamide) copolymer (polyamide MXD10/PXD10), a poly(metaxylylene sebacamide/paraxylylene sebacamide/metaxylylene isophthalamide/paraxylylene isophthalamide) copolymer (polyamide MXD10/PXD10/MXDI/PXDI), and a mixture of these materials.

As the production apparatus of the semi-aromatic polyamide (B2), there may be mentioned conventionally known polyamide producing apparatuses such as a batch type reaction vessel, a single- or multi-tank type continuous reaction apparatus, a tubular continuous reaction apparatus, a kneading reaction extruder including a single-screw kneading extruder, and a twin-screw kneading extruder, etc. As the method for producing the semi-aromatic polyamide (B2), there are conventionally known methods such as melt polymerization, solution polymerization, solid-state polymerization, etc., and by using these methods, the semi-aromatic polyamide (B2) can be produced by repeating normal pressure, reduced pressure and pressuring operations. These producing method can be used alone or in an appropriate combination, and among these, the melt polymerization method is preferable. For example, it is produced by the method in which a nylon salt comprising xylylene diamine and/or bis(aminoethyl)naphthalene and an aliphatic dicarboxylic acid having 4 or more and 12 or less carbon atoms is pressurized and heated in the presence of water, and polymerizing in a molten state while removing added water and condensed water. Also, it is produced by the method in which xylylene diamine and/or bis(aminomethyl)naphthalene is/are directly added to an aliphatic dicarboxylic acid having 4 or more and 12 or less carbon atoms in a molten state, and subjecting to polycondensation under normal pressure. In this case, in order to keep the reaction system in a uniform liquid state, xylylene diamine and/or bis(aminomethyl)naphthalene is/are continuously added to the aliphatic dicarboxylic acid having 4 or more and 12 or less carbon atoms, during which, polymerization proceeds while raising the temperature so that the temperature of the reaction system is higher than the melting points of the forming oligoamide and polyamide. The semi-aromatic polyamide (B2) may be subjected to solid-state polymerization after being produced by a melt polymerization method.

To the semi-aromatic polyamide (B2), a phosphorus atom-containing compound may be added as a catalyst or to heighten processing stability at the time of melt molding and to prevent from coloration. As the phosphorus atom-containing compound, there may be mentioned hypophosphorous acid, phosphorous acid, phosphoric acid, pyrophosphoric acid, metaphosphoric acid, phosphonous acid, and a derivative thereof, that is, an alkaline earth metal salt of hypophosphorous acid, an alkali metal salt of phosphorous acid, an alkaline earth metal salt of phosphorous acid, an alkali metal salt of phosphoric acid, an alkaline earth metal salt of phosphoric acid, an alkali metal salt of pyrophosphoric acid, an alkaline earth metal salt of pyrophosphoric acid, an alkali metal salt of metaphosphoric acid, an alkaline earth metal salt of metaphosphoric acid, an alkali metal salt of phosphonous acid, an alkaline earth metal salt of phosphonous acid, an alkali metal salt of phosphonic acid, an alkaline earth metal salt of phosphonic acid, etc. These may be used singly, or two or more may be used in combination.

Specific examples of the phosphorus atom-containing compound may be mentioned phosphonic acid (hypophosphorous acid), ethyl hypophosphite, dimethylphosphonic acid, phenylmethylphosphonic acid, sodium hypophosphite, potassium hypophosphite, lithium hypophosphite, calcium hypophosphite, magnesium hypophosphite, phosphorous acid, triethyl phosphite, triphenyl phosphite, sodium phosphite, sodium hydrogen phosphite, potassium phosphite, potassium hydrogen phosphite, lithium phosphite, lithium hydrogen phosphite, magnesium phosphite, magnesium hydrogen phosphite, calcium phosphite, calcium hydrogen phosphite, pyrophosphorous acid, phosphoric acid, sodium phosphate, disodium hydrogen phosphate, sodium dihydrogen phosphate, potassium phosphate, dipotassium hydrogen phosphate, potassium dihydrogen phosphate, magnesium phosphate, dimagnesium hydrogen phosphate, magnesium dihydrogen phosphate, calcium phosphate, dicalcium hydrogen phosphate, calcium dihydrogen phosphate, lithium phosphate, dilithium hydrogen phosphate, lithium dihydrogen phosphate, sodium pyrophosphate, potassium pyrophosphate, magnesium pyrophosphate, calcium pyrophosphate, lithium pyrophosphate, sodium metaphosphate, potassium metaphosphate, magnesium metaphosphate, calcium metaphosphate, lithium metaphosphate, phosphonous acid, sodium phosphonite, lithium phosphonite, potassium phosphonite, magnesium phosphonite, calcium phosphonite, ethyl phenylphosphonite, sodium phenylphosphonite, potassium phenylphosphonite, lithium phenylphosphonite, phosphonic acid, sodium phosphonate, potassium phosphonate, lithium phosphonate, potassium phosphonate, magnesium phosphonate, calcium phosphonate, phenylphosphonic acid, ethyl phosphonic acid, sodium phenylphosphonate, potassium phenylphosphonate, lithium phenylphosphonate, diethyl phenylphosphonate, sodium ethylphosphonate, potassium ethylphosphonate, etc. These may be used singly, or two or more may be used in combination. Among these, it is preferably sodium hypophosphite, potassium hypophosphite, lithium hypophosphite, calcium hypophosphite, magnesium hypophosphite, calcium phosphite, calcium hydrogen phosphite, calcium dihydrogen phosphite, sodium phosphite, sodium phosphite, sodium hydrogen phosphite, potassium phosphite, potassium hydrogen phosphite, lithium phosphite, lithium hydrogen phosphite, magnesium phosphite, magnesium hydrogen phosphite, calcium phosphite or calcium hydrogen phosphite, and more preferably sodium hypophosphite, potassium hypophosphite, lithium hypophosphite, calcium hypophosphite or magnesium hypophosphite. Incidentally, these phosphorus atom-containing compounds may be hydrates.

To ensure sufficient catalytic effect and sufficient prevention of coloration during polymerization and also to suppress the occurrence of gelation, the content of the phosphorus atom-containing compound is preferably 0.03 parts by mass or more and 0.3 parts by mass or less in terms of phosphorus atom concentration per 100 parts by mass of the semi-aromatic polyamide (B2), and is more preferably 0.05 parts by mass or more and 0.2 part by mass or less, and still more preferably 0.07 parts by mass or more and 0.15 parts by mass or less.

The phosphorus atom-containing compound may be added to a raw material for the semi-aromatic polyamide (B2), that is, an aqueous nylon salt solution, a diamine or a dicarboxylic acid, may be added to a dicarboxylic acid in the molten state, or may be added during the melt polymerization. The method of the addition is not limited to those described above, and the addition may be accomplished by any method as long as the compound can be dispersed uniformly in the semi-aromatic polyamide (B2).

To the semi-aromatic polyamide (B2), an alkali metal compound and/or an alkaline earth metal compound can be added in combination with the phosphorus atom-containing compound. Incidentally, the alkali metal salt and/or the alkaline earth metal salt refer to the compound other than the above-mentioned phosphorus atom-containing compound. In order to prevent coloring of the polyamide during the polycondensation, it is necessary to make a sufficient amount of the phosphorus atom-containing compound be present, but in some cases, there is a fear of causing gellation of the polyamide, so that it is preferable to coexist the alkali metal compound and/or the alkaline earth metal compound in order for adjusting an amidation reaction rate. The alkali metal compound and the alkaline earth metal compound may be mentioned an alkali metal hydroxide, an alkaline earth metal hydroxide, an alkali metal acetate, an alkaline earth metal acetate, an alkali metal carbonate, an alkaline earth metal carbonate, an alkali metal alkoxide, an alkaline earth metal alkoxide, etc. These may be used singly, or two or more may be used in combination. Among these, the alkali metal hydroxide and/or an alkali metal acetate is/are more preferable.

Examples of the alkali metal compounds and alkaline earth metal include alkali metal/alkaline earth metal hydroxides such as lithium hydroxide, sodium hydroxide, potassium hydroxide, rubidium hydroxide, cesium hydroxide, magnesium hydroxide, calcium hydroxide, strontium hydroxide and barium hydroxide; alkali metal/alkaline earth metal acetate salts such as lithium acetate, sodium acetate, potassium acetate, rubidium acetate, cesium acetate, magnesium acetate, calcium acetate, strontium acetate and barium acetate; alkali metal/alkaline earth metal carbonate salts such as lithium carbonate, sodium carbonate, potassium carbonate, rubidium carbonate, cesium carbonate, magnesium carbonate, calcium carbonate, strontium carbonate and barium carbonate; and alkali metal/alkaline earth metal alkoxides such as sodium methoxide, sodium ethoxide, sodium propoxide, sodium butoxide, potassium methoxide, lithium methoxide, magnesium methoxide and calcium methoxide. These may be used singly, or two or more may be used in combination. Of these, from the point of view of economic efficiency, sodium hydroxide, potassium hydroxide, magnesium hydroxide, calcium hydroxide, sodium acetate and potassium acetate are preferable.

When the alkali metal compound or the alkaline earth metal compound is added to the polycondensation system for the synthesis of the semi-aromatic polyamide (B2), the quotient of the number of moles of the compound divided by the number of moles of the phosphorus atoms of the phosphorus atom-containing compound is preferably 0.3 or more and 2.0 or less from the point of view of the balance between acceleration and restraining of the amide-forming reaction, and is more preferably 0.4 or more and 1.9 or less, and still more preferably 0.5 or more and 1.8 or less.

The alkali metal compound or the alkaline earth metal compound may be added to a raw material for the semi-aromatic polyamide (B2), that is, an aqueous nylon salt solution, a diamine or a dicarboxylic acid, may be added to a dicarboxylic acid in the molten state, or may be added during the melt polymerization. The method of the addition is not limited to those described above, and the addition may be accomplished by any method as long as the compound can be dispersed uniformly in the semi-aromatic polyamide (B2).

A content of the semi-aromatic polyamide (B21) in the semi-aromatic polyamide (B2) is 60% by mass or more and 100% by mass or less based on 100% by mass of semi-aromatic polyamide (B2), preferably 65% by mass or more and 100% by mass or less, and more preferably 70% by mass or more and 100% by mass or less. If the content of the semi-aromatic polyamide (B21) is less than the above-mentioned value, chemical liquid-barrier property of the obtainable multilayer tube is poor.

A content of the semi-aromatic polyamide (B22) in the semi-aromatic polyamide (B2) is 0% by mass or more and 40% by mass or less based on 100% by mass of the semi-aromatic polyamide (B2), preferably 0% by mass or more and 35% by mass or less, and more preferably 0% by mass or more and 30% by mass or less. If the content of the semi-aromatic polyamide (B22) exceeds the above-mentioned value, chemical liquid-barrier property of the obtainable multilayer tube is poor.

A method of mixing the semi-aromatic polyamide (B21) and the semi-aromatic polyamide (B22) may be mentioned the conventionally known method described in the explanation of the above-mentioned aliphatic polyamide composition (A).

The relative viscosities of the semi-aromatic polyamide (B1) and the semi-aromatic polyamide (B2) measured in accordance with HS K-6920 under the conditions of 96% sulfuric acid, polymer concentration 1% and at 25° C. are preferably 1.5 or more and 4.0 or less from the viewpoints of ensuring mechanical property of the obtainable multilayer tube, and ensuring desired moldability of the multilayer tube by making the viscosity at the time of melting within an appropriate range, more preferably 1.6 or more and 3.5 or less, and further preferably 1.8 or more and 3.0 or less.

Incidentally, there are no particular limitations on the types of terminal groups, concentrations of terminal groups and molecular weight distributions of the semi-aromatic polyamide (B1) and the semi-aromatic polyamide (B2). For the purpose of adjusting the molecular weight and stabilizing melt during molding processing, one kind or two or more kinds among monoamine, diamine, polyamine, monocarboxylic acid and dicarboxylic acid can be added thereto in combination appropriately. For example, there may be mentioned an aliphatic monoamine such as methylamine, ethylamine, propylamine, butylamine, hexylamine, octylamine, decylamine, stearylamine, dimethylamine, diethylamine, dipropylamine, dibutylamine, etc.; an alicyclic monoamine such as cyclohexylamine, dicyclohexylamine, etc.; an aromatic monoamine such as aniline, toluidine, diphenylamine, naphthylamine, etc.; an aliphatic diamine such as 1,2-ethanediamine, 1,3-propanediamine, 1,13-tridecanediamine, etc.; an alicyclic diamine such as cyclohexanediamine, bis(aminomethyl)cyclohexane, 5-amino-1,3,3-trimethylcyclohexanemethylamine, etc.;

an aromatic diamine such as m-phenylene diamine, p-phenylene diamine, etc.; a polyamine such as polyalkyleneimine, polyalkylenepolyamine, polyvinylamine, polyallylamine, etc.; an aliphatic monocarboxylic acid such as acetic acid, propionic acid, butyric acid, valeric acid, caproic acid, caprylic acid, lauric acid, tridecylic acid, myristic acid, palmitic acid, stearic acid, pivalic acid, isobutyric acid, etc.; an alicyclic monocarboxylic acid such as cyclohexanecarboxylic acid, etc.; an aromatic monocarboxylic acid such as benzoic acid, toluic acid, α-naphthalene carboxylic acid, β-naphthalene carboxylic acid, methylnaphthalene carboxylic acid, phenylacetic acid, etc.; an aliphatic dicarboxylic acid such as oxalic acid, malonic acid, tridecanedioic acid, tetradecanedioic acid, etc., an alicyclic dicarboxylic acid such as 1,3-cyclopentanedicarboxylic acid, 1,3-cyclohexanedicarboxylic acid, 1,4-cyclohexanedicarboxylic acid, etc.; and an aromatic dicarboxylic acid such as phthalic acid, etc. These may be used singly, or two or more may be used in combination. An amount of these molecular weight modifiers may vary depending on the reactivity of the molecular weight modifier and the polymerization conditions, and is appropriately determined so that the relative viscosity of the polyamide finally obtained falls within the above-mentioned range.

In consideration of melt stability, it is preferable that ends of molecular chains of the semi-aromatic polyamide (B1) and the semi-aromatic polyamide (B2) be capped with endcapping agents. It is more preferable that 10% or more terminal groups be endcapped, and it is still more preferable that 20% or more terminal groups be endcapped. The endcapping agents are not particularly limited as long as they are monofunctional compounds and have reactivity with the amino group or the carboxyl group at a terminal of the polyamide. From points of view such as reactivity and endcap stability, monocarboxylic acids and monoamines are preferable. From points of view such as easy handling, monocarboxylic acids are more preferable. Other compounds such as acid anhydrides such as phthalic anhydride, monoisocyanates, monoacid halides, monoesters and monoalcohols may be used.

The monocarboxylic acids used as the endcapping agents are not particularly limited as long as having reactivity with the amino groups. Examples thereof include the aliphatic monocarboxylic acids, alicyclic monocarboxylic acids and aromatic monocarboxylic acids described hereinabove. These may be used singly, or two or more may be used in combination. Of these, from points of view such as reactivity, endcap stability and price, acetic acid, propionic acid, butyric acid, valeric acid, caproic acid, caprylic acid, lauric acid, tridecylic acid, myristic acid, palmitic acid, stearic acid and benzoic acid are preferable. The monoamines used as the endcapping agents are not particularly limited as long as having reactivity with the carboxyl groups. Examples thereof include the aliphatic monoamines, alicyclic monoamines and aromatic monoamines described hereinabove. These may be used singly, or two or more may be used in combination. Of these, from points of view such as reactivity, boiling point, endcap stability and price, butylamine, hexylamine, octylamine, decylamine, stearylamine, cyclohexylamine and aniline are preferable.

The amount in which the endcapping agent is used may be determined appropriately in light of factors such as the reactivity and boiling point of the endcapping agent used, the reaction apparatus and the reaction conditions. From the point of view of the controlling of polymerization degree, it is preferable that the amount be 0.1 mol % or more and 15 mol % or less relative to the total number of moles of the dicarboxylic acid and the diamine that are raw material components.

To the semi-aromatic polyamide composition (B), an impact improver is preferably added to improve low temperature impact resistance of the semi-aromatic polyamide (B1) and the semi-aromatic polyamide (B2), and an elastomer polymer (B3) containing a constitutional unit derived from an unsaturated compound having a carboxyl group and/or an acid anhydride group is more preferably added. The elastomer polymer (133) is as described in the explanation of the elastomer polymer (A3) contained in the aliphatic polyamide composition (A). As the elastomer polymer (B3), the same material as the elastomer polymer (A3) may be used or a different material may be used. These may be used singly, or two or more may be used in combination. If the elastomer polymer (B3) contains a constitutional unit derived from an unsaturated compound having a carboxyl group and/or an acid anhydride group, the impact improving effect is sufficient.

A content of the impact improver is preferably 1 part by mass or more and 30 parts by mass or less based on 100 parts by mass of the semi-aromatic polyamide (B1) and/or the semi-aromatic polyamide (B2) which is/are the main component(s) from the viewpoints of sufficiently ensuring mechanical strength and low temperature impact resistance of the obtainable multilayer tube, and more preferably 3 parts by mass or more and 25 parts by mass or less.

In the semi-aromatic polyamide composition (B), other thermoplastic resin(s) may be contained in addition to the semi-aromatic polyamide (B1) and/or the semi-aromatic polyamide (B2). The other thermoplastic resin(s) may be mentioned the same resins as the other thermoplastic resin(s) described in the explanation of the aliphatic polyamide composition (A). These may be used singly, or two or more may be used in combination. Further, it is also preferable to be a mixture with the polyamide described in the explanation of the polyamide (A1) and/or the polyamide (A2) contained in the aliphatic polyamide composition (A) from the viewpoints of interlayer adhesiveness, flexibility, and melt processing stability of the obtainable multilayer tube. A content(s) of the semi-aromatic polyamide (B1) and/or the semi-aromatic polyamide (B2) in the semi-aromatic polyamide composition (B) is 60% by mass or more, and preferably 70% by mass or more.

Further, the semi-aromatic polyamide composition (B) may contain, if necessary, a conductive filler, an antioxidant, a heat stabilizer, an ultraviolet absorber, a light stabilizer, a lubricant, an inorganic filler, an antistatic agent, a flame retardant, a crystallization accelerator, a coloring agent, a lubricant, etc.

3. Layer (c)

The multilayer tube preferably further has Layer (c).

Layer (c) of the multilayer tube contains a polyamide composition (C).

The polyamide composition (C) contains a polyamide (C1) and an elastomer polymer (C2), the polyamide (C1) is a polyamide other than the "aliphatic polyamide having a melting point measured in accordance with ISO 11357-3 of 210° C. or lower, and the ratio of the number of the methylene groups to the number of the amide groups of 8.0 or more", and is contained in an amount of 70% by mass or more and 95% by mass or less based on the total of the polyamide (C1) and the elastomer polymer (C2) as 100% by mass, and the elastomer polymer (C2) contains a constitutional unit derived from an unsaturated compound having a carboxyl group and/or an acid anhydride group, and is contained in an amount of 5% by mass or more and 30% by mass or less based on the total of the polyamide (C1) and the elastomer polymer (C2) as 100% by mass (hereinafter sometimes referred to as polyamide composition (C).). Also, polyamide composition (C) preferably does not contain a plasticizer from the viewpoint of durability of interlayer adhesiveness after contacting with and dipping in fuel for a long time and/or after heat treatment for a short time.

The polyamide (C1) is as described in the explanation of the polyamide (A2) contained in the above-mentioned aliphatic polyamide composition (A). As the polyamide (C1), the same material as the polyamide (A2) may be used or a different material may be used. These may be used singly, or two or more may be used in combination.

A content of the polyamide (C1) in the polyamide composition (C) is preferably 70% by mass or more and 95% by mass or less based on the total of the polyamide (C1) and the elastomer polymer (C2) as 100% by mass, more preferably 75% by mass or more and 93% by mass or less, and particularly preferably 80% by mass or more and 90% by mass or less. If the content of the polyamide (C1) is the above-mentioned value or more based on 100% by mass of the total of the polyamide (C1) and the elastomer polymer (C2), it is advantageous in terms of mechanical properties of the obtainable multilayer tube, on the other hand, if it is the above-mentioned value or less, it is advantageous in terms of low temperature impact resistance and chemical resistance of the obtainable multilayer tube.

The elastomer polymer (C2) is as described in the explanation of the elastomer polymer (A3) contained in the above-mentioned aliphatic polyamide composition (A). As the elastomer polymer (C2), the same material as the elastomer polymer (A3) may be used or a different material may be used. These may be used singly, or two or more may be used in combination.

A content of the elastomer polymer (C2) in the polyamide composition (C) is preferably 5% by mass or more and 30% by mass or less based on the total of the polyamide (C1) and the elastomer polymer (C2) as 100% by mass, more preferably 7% by mass or more and 25% by mass or less, and particularly preferably 10% by mass or more and 20% by mass or less. If the content of the elastomer polymer (C2) is the above-mentioned value or more based on 100% by mass of the total of the polyamide (C1) and the elastomer polymer (C2) as 100% by mass, it is advantageous in terms of low temperature impact resistance, interlayer adhesiveness and durability thereof of the obtainable multilayer tube, on the other hand, if it is the above-mentioned value or less, it is advantageous in terms of mechanical properties of the obtainable multilayer tube and in view of fluidity of the obtainable polyamide composition (C).

A method of mixing the polyamide (C1) and the elastomer polymer (C2) may be mentioned the conventionally known method described in the explanation of the above-mentioned aliphatic polyamide composition (A).

The polyamide composition (C) may contain the other thermoplastic resin(s). As the other thermoplastic resin(s), there may be mentioned the same resin(s) as the other thermoplastic resin(s) described in the explanation of the above-mentioned aliphatic polyamide composition (A). These may be used singly, or two or more may be used in combination. A total content of the polyamide (C1) and the elastomer polymer (C2) in the polyamide composition (C) is preferably 80% by mass or more, and more preferably 90% by mass or more.

Further, the polyamide composition (C) may contain, if necessary, an antioxidant, a heat stabilizer, an ultraviolet absorber, a light stabilizer, a lubricant, an inorganic filler, an antistatic agent, a flame retardant, a crystallization accelerator, a coloring agent, a lubricant, etc.

5. Layer (d)

The multilayer tube preferably further has Layer (d).

Layer (d) of the multilayer tube contains a fluorine-containing polymer (D) into which a functional group having reactivity to an amino group is introduced in its molecular chain (hereinafter sometimes referred to as the fluorine-containing polymer (D).).

[Fluorine-Containing Type Polymer (D)]

The fluorine-containing polymer (D) is a fluorine-containing polymer into which a functional group having reactivity to an amino group is introduced in its molecular chain.

The fluorine-containing polymer (D) is a polymer (a homopolymer or a copolymer) having a constitutional repeating unit derived from at least one kind of a fluorine-containing monomer. It is not particularly limited as long as it is a fluorine-containing polymer capable of processing by heat fusion.

Here, the fluorine-containing monomer may be mentioned tetrafluoroethylene (TFE), trifluoroethylene, vinylidene fluoride (VDF), vinyl fluoride (VF), chlorotrifluoroethylene (CTFE), trichlorofluoroethylene, hexafluoropropylene (HFP), $CF_2$—$CFOR^{f1}$ (here, $R^{f1}$ represents a perfluoroalkyl group having 1 or more and 10 or less carbon atoms which may contain an etheric oxygen atom.), $CF_2$—CF—$OCH_2$—$R^{f2}$ (here, $R^{f2}$ represents a perfluoroalkylene group having 1 or more and 10 or less carbon atoms which may contain an etheric oxygen atom.), $CF_2{=}CF(CF_2)_pOCF{=}CF_2$ (here, p is 1 or 2.), $CH_2{=}CX^1(CF_2)_nX^2$ (here, $X^1$ and $X^2$ each independently represent a hydrogen atom or a fluorine atom, and n is an integer of 2 or more and 10 or less.), etc. These may be used singly, or two or more may be used in combination.

Specific examples of the general formula $CF_2{=}CFOR^{f1}$ include perfluoro(alkyl vinyl ethers) (hereinafter, also referred to as PAVE) such as $CF_2{=}CFOCF_2$ (perfluoro (methyl vinyl ether): PMVE), $CF_2{=}CFOCF_2CF_3$ (perfluoro (ethyl vinyl ether): PEVE), $CF_2{=}CFOCF_2CF_2CF_3$ (perfluoro(propyl vinyl ether): PPVE), $CF_2{=}CFOCF_2CF_2CF_2CF_3$ (perfluoro(butyl vinyl ether): PBVE) and $CF_2{=}CFO(CF_2)_8F$ (perfluoro(octyl vinyl ether): POVE). These may be used singly, or two or more may be used in combination. Of these, $CF_2{=}CFOCF_2$ and $CF_2{=}CFOCF_2CF_2CF_3$ are preferable.

In the compounds represented by the general formula $CH_2{=}CX^1(CF_2)_nX^2$ (wherein $X^1$ and $X^2$ are each independently a hydrogen atom or a fluorine atom, and n is an integer of 2 to 10), n is an integer of 2 to 10 to ensure a modification effect for the fluorine-containing polymer (for example, prevention of cracks during forming of the copolymer or cracks in formed articles) and to obtain sufficient polymerization reactivity. Specific examples include $CH_2{=}CF(CF_2)_2F$, $CH_2{=}CF(CF_2)_3F$, $CH_2{=}CF(CF_2)_4F$, $CH_2{=}CF(CF_2)_5F$, $CH_2{=}CF(CF_2)_8F$, $CH_2{=}CF(CF_2)_2H$, $CH_2{=}CF(CF_2)_3H$, $CH_2{=}CF(CF_2)_4H$, $CH_2{=}CF(CF_2)_5H$, $CH_2{=}CF(CF_2)_8H$, $CH_2{=}CH(CF_2)_2F$, $CH_2{=}CH(CF_2)_3F$, $CH_2{=}CH(CF_2)_4F$, $CH_2{=}CH(CF_2)_5F$, $CH_2{=}CH(CF_2)_8F$, $CH_2{=}CH(CF_2)_2H$, $CH_2{=}CH(CF_2)_3H$, $CH_2{=}CH(CF_2)_4H$, $CH_2{=}CH(CF_2)_5H$ and $CH_2{=}CH(CF_2)_8H$. These may be used singly, or two or more may be used in combination.

Of the compounds described above, those represented by $CH_2{=}CH(CF_2)_nF$ or $CH_2{=}CF(CF_2)_nH$ are preferable from the point of view of the balance between barrier properties to chemical medias and environmental stress crack resistance of the fluorine-containing polymer (D). More preferably, n in the formula is 2 to 4.

In addition to the units from the fluorine-containing monomer, the fluorine-containing polymer (D) may further contain polymer units based on a fluorine-free monomer. Examples of the fluorine-free monomers include olefins with 2 to 4 carbon atoms such as ethylene, propylene and isobutene; vinyl esters such as vinyl chloride, vinylidene chloride, vinyl acetate, vinyl chloroacetate, vinyl lactate, vinyl butyrate, vinyl pivalate, vinyl benzoate, vinyl crotonate, methyl (meth)acrylate, ethyl (meth)acrylate, n-butyl (meth)acrylate and methyl crotonate; and vinyl ethers such as methyl vinyl ether (MVE), ethyl vinyl ether (EVE), butyl vinyl ether (BVE), isobutyl vinyl ether (IBVE), cyclohexyl vinyl ether (CHVE) and glycidyl vinyl ether. These may be used singly, or two or more may be used in combination. Of these, ethylene, propylene and vinyl acetate are preferable, and ethylene is more preferable.

From the points of view of heat resistance, chemical resistance and barrier properties to chemical medias, preferred fluorine-containing polymers (D) are polymers (D1) including at least vinylidene fluoride units (VDF units), copolymers (D2) including at least tetrafluoroethylene units (TFE units) and ethylene units (E units), copolymers (D3) including at least tetrafluoroethylene units (TFE units) and hexafluoropropylene units (HFP units) and/or PAVE units derived from PAVE represented by the aforementioned general formula $CF_2{=}CFOR^{f1}$ (wherein $R^{f1}$ is a perfluoroalkyl group with 1 to 10 carbon atoms which may contain an etheric oxygen atom), copolymers (D4) including at least chlorotrifluoroethylene units (CTFE units), and copolymers (D5) including at least chlorotrifluoroethylene units (CTFE units) and tetrafluoroethylene units (TFE units).

Examples of the polymers (D1) including at least vinylidene fluoride units (VDF units) (hereinafter, also written as the VDF copolymers (D1)) include vinylidene fluoride homopolymer (polyvinylidene fluoride (PVDF)) (D1-1), copolymers (D1-2) including VDF units and TFE units wherein the content of the VDF units is 30 mol % or more and 99 mol % or less and the content of the TFE units is 1 mol % or more and 70 mol % or less relative to all the monomers except functional group-containing monomers described later, copolymers (D1-3) including VDF units, TFE units and trichlorofluoroethylene units wherein the content of the VDF units is 10 mol % or more and 90 mol % or less, the content of the TFE units is 0 mol % or more and 90 mol % or less and the content of the trichlorofluoroethylene units is 0 mol % or more and 30 mol % or less relative to all the monomers except functional group-containing monomers described later, and copolymers (D1-4) including VDF units, TFE units and HFP units wherein the content of the VDF units is 10 mol % or more and 90 mol % or less, the content of the TFE units is 0 mol % or more and 90 mol % or less and the content of the HFP units is 0 mol % or more and 30 mol % or less relative to all the monomers except functional group-containing monomers described later.

In the copolymers (D1-4), it is preferable that the content of the VDF units be 15 mol % or more and 84 mol % or less, the content of the TFE units be 15 mol % or more and 84 mol % or less and the content of the HFP units be 0 mol % or more and 30 mol % or less relative to all the monomers except functional group-containing monomers described later.

Examples of the copolymers (D2) including at least tetrafluoroethylene units (TFE units) and ethylene units (E units) (hereinafter, also written as the TFE copolymers (D2)) include polymers wherein the content of the TFE units is 20 mol % or more relative to all the monomers except functional group-containing monomers described later, and copolymers wherein the content of the TFE units is 20 mol % or more and 80 mol % or less, the content of the E units is 20 mol % or more and 80 mol % or less and the content of units derived from a monomer copolymerizable with the above monomers is 0 mol % or more and 60 mol % or less relative to all the monomers except functional group-containing monomers described later.

Examples of the copolymerizable monomers include hexafluoropropylene (HFP), $CF_2{=}CFOR^{f1}$ (wherein $R^{f1}$ is a perfluoroalkyl group with 1 to 10 carbon atoms which may contain an etheric oxygen atom) and $CH_2{-}CX^1(CF_2)_nX^2$ (wherein $X^1$ and $X^2$ are each independently a hydrogen atom or a fluorine atom, and n is an integer of 2 to 10). These may be used singly, or two or more may be used in combination.

Examples of the TFE copolymers (D2) include:

copolymers (D2-1) including TFE units, E units and fluoroolefin units derived from a fluoroolefin represented by the aforementioned general formula $CH_2{=}CX^3(CF_2)_nX^4$ (wherein $X^3$ and $X^4$ are each independently a hydrogen atom or a fluorine atom, and n is an integer of 2 to 10) wherein the content of the TFE units is 30 mol % or more and 70 mol % or less, the content of the E units is 20 mol % or more and 55 mol % or less and the content of the fluoroolefin units derived from a fluoroolefin represented by the aforementioned general formula $CH_2{=}CX^3(CF_2)_nX^4$ (wherein $X^3$ and $X^4$ are each independently a hydrogen atom or a fluorine atom, and n is an integer of 2 to 10) is 0 mol % or more and 10 mol % or less relative to all the monomers except functional group-containing monomers described later, copolymers (D2-2) including TFE units, E units, HFP units and units derived from a monomer copolymerizable with the above monomers wherein the content of the TFE units is 30 mol % or more and 70 mol % or less, the content of the E units is 20 mol % or more and 55 mol % or less, the content of the HFP units is 1 mol % or more and 30 mol % or less, and the content of the units derived from a monomer copolymerizable with the above monomers is 0 mol % or more and 10 mol % or less relative to all the monomers except functional group-containing monomers described later, and copolymers (D2-3) including TFE units, E units and PAVE units derived from PAVE represented by the aforementioned general formula $CF_2{=}CFOR^{f1}$ (wherein $R^{f1}$ is a perfluoroalkyl group with 1 to 10 carbon atoms which may contain an etheric oxygen atom) wherein the content of the TFE units is 30 mol % or more and 70 mol % or less, the content of the E units is 20 mol % or more and 55 mol % or less, and the content of the PAVE units derived from PAVE represented by the aforementioned general formula $CF_2{=}CFOR^{f1}$ (wherein $R^{f1}$ is a perfluoroalkyl group with 1 to 10 carbon atoms which may contain an etheric oxygen atom) is 0 mol % or more and 10 mol % or less relative to all the monomers except functional group-containing monomers described later.

Examples of the copolymers (D3) including at least tetrafluoroethylene units (TFE units) and hexafluoropropylene units (HFP units) and/or PAVE units derived from PAVE represented by the aforementioned general formula $CF_2{=}CFOR^{f1}$ (wherein $R^{f1}$ is a perfluoroalkyl group with 1 to 10 carbon atoms which may contain an etheric oxygen atom) (hereinafter, also written as the TFE copolymers (D3)) include:

copolymers (D3-1) including TFE units and HFP units wherein the content of the TFE units is 70 mol % or more and 95 mol % or less, preferably 85 mol % or more and 93 mol % or less, and the content of the HFP units is 5 mol % or more and 30 mol % or less, preferably 7 mol % or more and 15 mol % or less, relative to all the monomers except functional group-containing monomers described later, copolymers (D3-2) including TFE units and one, or two or more kinds of PAVE units derived from PAVE represented by the aforementioned general formula $CF_2{=}CFOR^{f1}$ (wherein $R^{f1}$ is a perfluoroalkyl group with 1 to 10 carbon atoms which may contain an etheric oxygen atom) wherein the content of the TFE units is 70 mol % or more and 95 mol % or less and the content of one, or two or more kinds of PAVE units derived from PAVE represented by the aforementioned general formula $CF_2{=}CFOR^{f1}$ (wherein $R^{f1}$ is a perfluoroalkyl group with 1 to 10 carbon atoms which may contain an etheric oxygen atom) is 5 mol % or more and 30 mol % or less relative to all the monomers except functional group-containing monomers described later, and copolymers (D3-3) including TFE units, HFP units and one, or two or more kinds of PAVE units derived from PAVE represented by the aforementioned general formula $CF_2{=}CFOR^{f1}$ (wherein $R^{f1}$ is a perfluoroalkyl group with 1 to 10 carbon atoms which may contain an etheric oxygen atom) wherein the content of the TFE units is 70 mol % or more and 95 mol % or less, and the total content of the HFP units and one, or two or more kinds of PAVE units derived from PAVE represented by the aforementioned general formula $CF_2{=}CFOR^{f1}$ (wherein $R^{f1}$ is a perfluoroalkyl group with 1 to 10 carbon atoms which may contain an etheric oxygen atom) is 5 mol % or more and 30 mol % or less relative to all the monomers except functional group-containing monomers described later The copolymers including at least chlorotrifluoroethylene units (CTFE units) further are chlorotrifluoroethylene copolymers (D4) which have CTFE units [—CFCl—$CF_2$-] and are composed of ethylene units (E units) and/or fluorine-containing monomer units (hereinafter, also written as the CTFE copolymers (D4)).

The fluorine-containing monomers in the CTFE copolymers (D4) are not particularly limited and may be any such monomers except CTFE. Examples thereof include vinylidene fluoride (VDF), hexafluoropropylene (HFP), PAVE represented by the aforementioned general formula $CF_2{=}CFOR^{f1}$ (wherein $R^{f1}$ is a perfluoroalkyl group with 1 to 10 carbon atoms which may contain an etheric oxygen atom) and fluoroolefins represented by the aforementioned general formula $CH_2{=}CX^1(CF_2)_nX^2$ (wherein $X^1$ and $X^2$ are each independently a hydrogen atom or a fluorine atom, and n is an integer of 2 to 10). These may be used singly, or two or more may be used in combination.

The CTFE copolymers (D4) are not particularly limited, and examples thereof include CTFE/PAVE copolymer, CTFE/VDF copolymer, CTFE/HFP copolymer, CTFE/E copolymer, CTFE/PAVE/E copolymer, CTFE/VDF/E copolymer and CTFE/HFP/E copolymer. These may be used singly, or two or more may be used in combination.

The content of the CTFE units in the CTFE copolymer (D4) is preferably 15 mol % or more and 70 mol % or less, and more preferably 18 mol % or more and 65 mol % or less relative to all the monomers except functional group-containing monomers described later. The content of the E units and/or the fluorine-containing monomer units is preferably 30 mol % or more and 85 mol % or less, and more preferably 35 mol % or more and 82 mol % or less.

The copolymers (D5) including at least chlorotrifluoroethylene units (CTFE units) and tetrafluoroethylene units (TFE units) are chlorotrifluoroethylene copolymers composed of CTFE units [—CFCl—$CF_2$—], TFE units [—$CF_2$—$CF_2$-] and units from a monomer copolymerizable with CTFE and TFE (hereinafter, also written as the CTFE/TFE copolymers (D5)).

The copolymerizable monomers in the CTFE/TFE copolymers (D5) are not particularly limited and may be any such monomers except CTFE and TFE. Examples thereof include fluorine-containing monomers such as vinylidene fluoride (VDF), hexafluoropropylene (HFP), PAVE represented by the aforementioned general formula $CF_2{=}CFOR^{f1}$ (wherein $R^{f1}$ is a perfluoroalkyl group with 1 to 10 carbon atoms which may contain an etheric oxygen atom) and fluoroolefins represented by the aforementioned general formula $CH_2{=}CX^1(CF_2)_nX^2$ (wherein $X^1$ and $X^2$ are each independently a hydrogen atom or a fluorine atom, and n is an integer of 2 to 10); and fluorine-free monomers, for example, olefins with 2 to 4 carbon atoms such as ethylene, propylene and isobutene; vinyl esters such as vinyl acetate, methyl (meth)acrylate and ethyl (meth)acrylate; and vinyl ethers such as methyl vinyl ether (MVE), ethyl vinyl ether (EVE) and butyl vinyl ether (BVE). These may be used singly, or two or more may be used in combination. Of these, PAVE represented by the aforementioned general formula $CF_2{=}CFOR^{f1}$ (wherein $R^{f1}$ is a perfluoroalkyl group with 1 to 10 carbon atoms which may contain an etheric oxygen atom) are preferable. Perfluoro(methyl vinyl ether) (PMVE) and perfluoro(propyl vinyl ether) (PPVE) are more preferable. From the point of view of heat resistance, PPVE is still more preferable.

The CTFE/TFE copolymers (D5) are not particularly limited, and examples thereof include CTFE/TFE copolymer, CTFE/TFE/HFP copolymer, CTFE/TFE/VDF copolymer, CTFE/TFE/PAVE copolymer, CTFE/TFE/E copolymer, CTFE/TFE/HFP/PAVE copolymer and CTFE/TFE/VDF/PAVE copolymer. These may be used singly, or two or more may be used in combination. Of these, CTFE/TFE/PAVE copolymer and CTFE/TFE/HFP/PAVE copolymer are preferable.

To ensure good formability, environmental stress crack resistance, barrier properties to chemical medias, heat resistance and mechanical characteristics, the total content of the CTFE units and the TFE units in the CTFE/TFE copolymer (D5) is preferably 90 mol % or more and 99.9 mol % or less and the content of the units from the monomer copolymerizable with CTFE and TFE is preferably 0.1 mol % or more and 10 mol % or less, relative to all the monomers except functional group-containing monomers described later.

To ensure good formability, environmental stress crack resistance and barrier properties to chemical medias, the content of the CTFE units in the CTFE/TFE copolymer (D5) is preferably 15 mol % or more and 80 mol % or less relative to the total content of the CTFE units and the TFE units taken as 100 mol %, and is more preferably 17 mol % or more and 70 mol % or less, and still more preferably 19 mol % or more and 65 mol % or less.

When the monomer copolymerizable with CTFE and TFE is PAVE, the content of the PAVE units in the CTFE/TFE copolymer (D5) is preferably 0.5 mol % or more and 7 mol % or less, and more preferably 1 mol % or more and 5 mol % or less relative to all the monomers except functional group-containing monomers described later.

When HFP and PAVE are the monomers copolymerizable with CTFE and TFE, the total content of the HFP units and the PAVE units in the CTFE/TFE copolymer (D5) is preferably 0.5 mol % or more and 7 mol % or less, and more preferably 1 mol % or more and 5 mol % or less relative to all the monomers except functional group-containing monomers described later.

The TFE copolymers (D3), the CTFE copolymers (D4) and the CTFE/TFE copolymers (D5) have superior barrier properties to chemical medias, in particular, barrier properties to alcohol-containing gasoline. The coefficient of permeability for alcohol-containing gasoline is a value calculated in such a manner that a sheet obtained from a resin of interest is placed into a permeability coefficient measurement cup containing isooctane/toluene/ethanol mixed solvent prepared by mixing isooctane, toluene and ethanol in a volume ratio of 45:45:10, and a change in mass is measured at 60° C. The coefficient of permeability for alcohol-containing gasoline of the TFE copolymers (D3), the CTFE copolymers (D4) and the CTFE/TFE copolymers (D5) is preferably 1.5 g·mm/($m^2$·day) or less, more preferably 0.01 g·mm/($m^2$·day) or more and 1 g·mm/($m^2$·day) or less and still more preferably 0.02 g·mm/($m^2$·day) or more and 0.8 g·mm/($m^2$·day) or less.

The fluorine-containing polymer (D) may be obtained by (co)polymerizing a monomer(s) for constituting the polymer by a conventional polymerization method. Radical polymerization is mainly used. The polymerization may be initiated in any manner without limitation as long as radicals are formed. For example, the polymerization is initiated with an organic or inorganic radical polymerization initiator, heat, light, ionizing radiation, or the like.

The fluorine-containing polymer (D) may be produced by any method without limitation, and general polymerization method using a radical polymerization initiator is adopted. The polymerization method may be conventional, with examples including bulk polymerization, solution polymerization using an organic solvent such as fluorinated hydrocarbon, chlorinated hydrocarbon, fluorinated chlorinated hydrocarbon, alcohol or hydrocarbon, suspension polymerization using an aqueous medium and optionally an appropriate organic solvent, and emulsion polymerization using an aqueous medium and an emulsifier.

The polymerization may be performed batchwise or continuously using a one-tank or multi-tank stirring polymerization apparatus or a tubular polymerization apparatus etc.

The radical polymerization initiators preferably have a 10-hour half-life decomposition temperature of 0° C. or higher and 100° C. or lower, and more preferably 20° C. or higher and 90° C. or lower. Specific examples include azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile] and 4,4'-azobis(4-cyanopentenoic acid); hydroperoxides such as hydrogen peroxide, t-butyl hydroperoxide and cumene hydroperoxide; dialkyl peroxides such as di-t-butyl peroxide and dicumyl peroxide; fluorine-free diacyl peroxides such as acetyl peroxide, isobutyryl peroxide, octanoyl peroxide, benzoyl peroxide and lauroyl peroxide; ketone peroxides such as methyl ethyl ketone peroxide and cyclohexanone peroxide; peroxydicarbonates such as diisopropyl peroxydicarbonate; peroxy esters such as t-butyl peroxypivalate, t-butyl peroxyisobutyrate and t-butyl peroxyacetate; fluorine-containing diacyl peroxides such as compounds represented by $(Z(CF_2)_pCOO)_2$ (wherein Z is a hydrogen atom, a fluorine atom or a chlorine atom, and p is an integer of 1 to 10); and inorganic peroxides such as potassium persulfate, sodium persulfate and ammonium persulfate. These may be used singly, or two or more may be used in combination.

The production of the fluorine-containing polymer (D) preferably involves a common chain transfer agent for the purpose of controlling the molecular weight. Examples of the chain transfer agents include alcohols such as methanol and ethanol; chlorofluorohydrocarbons such as 1,3-dichloro-1,1,2,2,3-pentafluoropropane, 1,1-dichloro-1-fluoroethane, 1,2-dichloro-1,1,2,2-tetrafluoroethane, 1,1-dichloro-1-fluoroethane and 1,1,2-trichloro-1,2,2-trifluoroethane; hydrocarbons such as pentane, hexane and cyclohexane; and chlorohydrocarbons such as carbon tetrachloride, chloroform, methylene chloride and methyl chloride. These may be used singly, or two or more may be used in combination.

The polymerization conditions are not particularly limited. The polymerization temperature is preferably 0° C. or higher and 100° C. or lower, and more preferably 20° C. or higher and 90° C. or lower. To avoid a decrease in heat resistance due to the formation of ethylene-ethylene sequences in the polymer, a lower temperature is generally preferable. The polymerization pressure may be determined appropriately in accordance with other polymerization conditions such as the type, amount and vapor pressure of the solvent that is used, and polymerization temperature, but is preferably 0.1 MPa or more and 10 MPa or less, and more preferably 0.5 MPa or more and 3 MPa or less. The polymerization time is preferably 1 hour or more and 30 hours or less.

The molecular weight of the fluorine-containing polymer (D) is not particularly limited but is preferably such that the polymer is solid at room temperature and the polymer itself is usable as a thermoplastic resin, an elastomer or the like. The molecular weight is controllable by controlling the concentration of the monomers in the polymerization, the concentration of the polymerization initiator, the concentration of the chain transfer agent, and the temperature.

When the fluorine-containing polymer (D) is coextruded with the aliphatic polyamide composition (A), the semi-aromatic polyamide composition (B), the polyamide composition (C), etc., for ensuring sufficient melting fluidity in the kneading temperature and the molding temperature range at which remarkable deterioration of these materials are not accompanied, a melt flow rate at a temperature 50° C. higher than the melting point of the fluorine-containing polymer (D) and at a load of 5 kg is preferably 0.5 g/10 minutes or more and 200 g/10 minutes or less, and more preferably 1 g/10 minutes or more and 100 g/10 minutes or less.

Also, in the fluorine-containing polymer (D), the melting point, glass transition point, etc., of the polymer can be adjusted by selecting the type, the compositional ratio, etc., of the fluorine-containing monomer and the other monomer(s).

The melting point of the fluorine-containing polymer (D) is appropriately selected by the purpose, use, method of use, etc., and when it is co-extruded with the aliphatic polyamide composition (A), the semi-aromatic polyamide composition (B), the polyamide composition (C), etc., it is preferably close to the molding temperature of the resin. Therefore, it is preferable to optimize the melting point of the fluorine-containing polymer (D) by appropriately adjusting the ratio of the fluorine-containing monomer, the other monomer(s), and the functional group-containing monomer mentioned later.

Here, the melting point means that using a differential scanning calorimeter, sample is heated to a temperature of the expected melting point or higher, and then, the sample is cooled at a rate of 10° C. per a minute and cooled to 30° C., and after allowing to stand as such for about 1 minutes, and a temperature of the peak value of the melting curve measured by raising the temperature at a rate of 20° C. per a minute is defined to be a melting point.

In the fluorine-containing polymer (D), a functional group(s) having a reactivity to an amino group is/are introduced into the molecular structure, and the functional group(s) may be introduced into any of the molecular terminal, the side chain or the main chain of the fluorine-containing polymer (D). Also, the functional group(s) may be used alone or two or more kinds in combination in the fluorine-containing polymer (D). The kind and the content of the functional group are appropriately determined depending on the kind, shape, use, required interlayer adhesiveness, adhesive method, introducing method of the functional group, etc., of the mating material to be layered onto the fluorine-containing polymer (D).

The functional group that is reactive to an amino group may be at least one selected from the group consisting of carboxyl group, acid anhydride group, carboxylate salt, sulfo group, sulfonate salt, epoxy group, cyano group, carbonate group and haloformyl group, and is preferably at least one selected from the group consisting of carboxyl group, acid anhydride group, carboxylate salt, epoxy group, carbonate group and haloformyl group.

The reactive functional groups to an amino group may be introduced into the fluorine-containing polymer (D) by a method (i) in which the monomers for the fluorine-containing polymer (D) are copolymerized with a copolymerizable monomer having the functional group, a method (ii) in which the functional groups are introduced to molecular terminals of the fluorine-containing polymer (D) during polymerization with use of, for example, a polymerization initiator or a chain transfer agent, and a method (iii) in which a compound having the reactive functional group and a grafting functional group (a grafting compound) is grafted to the fluorine-containing polymer. These introduction methods may be used singly or in appropriate combination. In consideration of interlayer adhesion in the multilayer tube, the fluorine-containing polymer (D) is preferably one produced by the method (i) or (ii). For details of the method (iii), reference may be made to Japanese Patent Application Kokai Publication No. H7-18035, Japanese Patent Application Kokai Publication No. H7-25952, Japanese Patent Application Kokai Publication No. H7-25954, Japanese Patent Application Kokai Publication No. H7-173230, Japanese Patent Application Kokai Publication No. H7-173446, Japanese Patent Application Kokai Publication No. H7-173447 and Japanese Patent Kohyo Publication No. H10-503236. Hereinbelow, there will be described the method (1) in which the monomers for the fluorine-containing polymer are copolymerized with a copolymerizable monomer having the functional group, and the method (ii) in which the functional groups are introduced to molecular terminals of the fluorine-containing polymer with use of a polymerization initiator or the like.

In the method (i) in which the monomers for the fluorine-containing polymer (D) are copolymerized with a copolymerizable monomer having the functional group (hereinafter, sometimes written simply as the functional group-containing monomer), use is made of a monomer containing at least one functional groups selected from the group consisting of carboxyl group, acid anhydride group, carboxylate salt, hydroxyl group, sulfo group, sulfonate salt, epoxy group and cyano group. Examples of the functional group-containing monomers include functional group-containing fluorine-free monomers and functional group-containing fluorine-containing monomers.

Examples of the functional group-containing fluorine-free monomers include unsaturated carboxylic acids and derivatives such as esters thereof, such as acrylic acid, halogenated (except fluorinated) acrylic acid, methacrylic acid, halogenated (except fluorinated) methacrylic acid, maleic acid, halogenated (except fluorinated) maleic acid, fumaric acid, halogenated (except fluorinated) fumaric acid, itaconic acid, citraconic acid, crotonic acid and endobicyclo-[2.2.1]-5-heptene-2,3-dicarboxylic acid; carboxyl group-containing monomers such as maleic anhydride, itaconic anhydride, succinic anhydride, citraconic anhydride and endobicyclo-[2.2.1]-5-heptene-2,3-dicarboxylic anhydride; and epoxy group-containing monomers such as glycidyl acrylate, glycidyl methacrylate and glycidyl ether. These may be used singly, or two or more may be used in combination. The functional group-containing fluorine-free monomer is selected in consideration of the copolymerizability with the fluorine-containing monomer that is used. By selecting an appropriate functional group-containing fluorine-free monomer, the polymerization is allowed to take place satisfactorily and the functional group-containing fluorine-free monomer is easily introduced into the main chain uniformly, with the result that less monomer remains unreacted and the amount of impurities can be reduced.

As the functional group-containing fluorine-containing monomer, there may be mentioned an unsaturated compound represented by the general formula $CX^3X^4{=}CX^5{-}(R^7)_n{-}Y$ (here, Y represents a functional group selected from the group consisting of —COOM (M represents a hydrogen atom or an alkali metal.), a carboxyl group-derived group, $—SO_3M$ (M represents a hydrogen atom or an alkali metal.), a sulfonic acid-derived group, an epoxy group and —CN, $X^3$, $X^4$ and $X^5$ are the same or different from each other and represent a hydrogen atom or a fluorine atom (provided that when $X^3$, $X^4$ and $X^5$ are simultaneously hydrogen atoms, n=1, and $R^7$ contains a fluorine atom.), $R^7$ represents an alkylene group having 1 or more and 40 or less carbon atoms, a fluorine-containing oxyalkylene group having 1 or more and 40 or less carbon atoms, a fluorine-containing alkylene group having 1 or more and 40 or less carbon atoms and having an ether bond(s), or a fluorine-containing oxyalkylene group having 1 or more and 40 or less carbon atoms and having an ether bond(s), and n is 0 or 1.), etc. These may be used singly, or two or more may be used in combination.

As the carboxyl group-derived group which is Y in the above-mentioned general formula, there may be mentioned, for example, a functional group represented by the general formula $—C(=O)Q^1$ (wherein $Q^1$ represents $—OR^8$, $—NH_2$, F, Cl, Br or I, and $R^8$ represents an alkyl group having 1 or more and 20 or less carbon atoms or an aryl group having 6 or more and 22 or less carbon atoms.), etc. These may be used singly, or two or more may be used in combination.

As the sulfonic acid-derived group which is Y in the above-mentioned general formula, there may be mentioned, for example, a functional group represented by the general formula $—SO_2Q^2$ (wherein $Q^2$ represents $—OR^9$, $—NH_2$, F, Cl, Br or I, and $R^9$ represents an alkyl group having 1 or more and 20 or less carbon atoms or an aryl group having 6 or more and 22 or less carbon atoms.), etc. These may be used singly, or two or more may be used in combination.

The Y is preferably —COOH, —$SO_3H$, —$SO_3Na$, —$SO_2F$ or —CN.

Examples of the functional group-containing fluorine-containing monomers wherein the functional group has a carbonyl group include perfluoroacryloyl fluoride, 1-fluoroacryloyl fluoride, acryloyl fluoride, 1-trifluoromethacryloyl fluoride and perfluorobutenoic acid. These may be used singly, or two or more may be used in combination.

To ensure sufficient interlayer adhesion and to make sure that the interlayer adhesion will not be decreased under any use environmental conditions and sufficient heat resistance will be attained, and thereby to prevent the occurrence of problems such as bonding failure, coloration and foaming during processing at high temperatures, as well as separation, coloration, foaming and leaching due to decomposition during use at high temperatures, the content of the functional group-containing monomer in the fluorine-containing polymer (D) is preferably 0.01 mol % or more and 5 mol % or less of all the units that are polymerized, and is more preferably 0.015 mol % or more and 4 mol % or less, and still more preferably 0.02 mol % or more and 3 mol % or less. When the content of the functional group-containing monomer in the fluorine-containing polymer (D) is in the above range, the fluorine-containing polymer (D) can be produced without a decrease in polymerization rate and also attains excellent adhesion with respect to a mating material that is stacked therewith. The functional group-containing monomer may be added in any manner without limitation, and may be added at once at the start of the polymerization or may be added continuously during the polymerization. The manner of the addition is selected appropriately in accordance with the decomposition reactivity of the polymerization initiator and the polymerization temperature. Preferably, the consumption of the functional group-containing monomer by the polymerization is compensated for by continuous or intermittent addition of the corresponding amount of the monomer to the polymerization vessel so that the concentration of the functional group-containing monomer will be kept in the aforementioned range.

Incidentally, 0.01 mol % of the functional group-containing monomer in the fluorine-containing polymer (D) relative to all the units that are polymerized corresponds to 100 functional group residues in the fluorine-containing polymer (D) per $1\times10^6$ carbon atoms in the main chain of the fluorine-containing polymer (D). 5 mol % of the functional group-containing monomer relative to all the units in the fluorine-containing polymer (D) corresponds to 50,000 functional group residues in the fluorine-containing polymer (D) per $1\times10^6$ carbon atoms in the main chain of the fluorine-containing polymer (D). As long as the content described above is satisfied, the polymer may be a mixture of the fluorine-containing polymer having the functional groups, and the fluorine-containing polymer having no functional groups.

In the method (ii) in which the functional groups are introduced to molecular terminals of the fluorine-containing polymer with use of a polymerization initiator or the like, the functional groups are introduced to one or both ends of the molecular chain of the fluorine-containing polymer. The functional groups that are introduced to terminals are preferably carbonate groups and/or haloformyl groups.

The carbonate groups introduced as terminal groups in the fluorine-containing polymer (D) are generally groups having an —OC(=O)O— bond, and specifically have a structure represented by —OC(=O)O—$R^{10}$ group [$R^{10}$ is a hydrogen atom, an organic group (for example, a $C_{1-20}$ alkyl group, or a $C_{2-20}$ alkyl group having an ether bond) or a Group I, II or VII element], such as —OC(=O)$OCH_3$, —OC(=O)$OC_3H_7$, —OC(=O)$OC_8H_{17}$ and —OC(=O)$OCH_2CH_2OCH_2CH_3$. The haloformyl groups specifically have a structure represented by —COZ [Z is a halogen element], such as —COF and —COCl. These may be used singly, or two or more may be used in combination.

The carbonate groups may be introduced to the molecular terminals of the polymer by various methods using a polymerization initiator and/or a chain transfer agent. From the point of view of performances such as economic efficiency, heat resistance and chemical resistance, a method using a peroxide, in particular, a peroxycarbonate and/or a peroxyester as a polymerization initiator may be preferably adopted. By this method, the groups that are introduced to the polymer terminals are the carbonyl groups derived from the peroxide, for example, carbonate groups derived from the peroxycarbonate, ester groups derived from the peroxyester, haloformyl groups or the like converted from these functional groups. Of the polymerization initiators, peroxycarbonates are more preferably used for the reasons that the polymerization temperature can be decreased and the initiation reaction does not involve side reactions.

The haloformyl groups may be introduced to the molecular terminals of the polymer by various methods. For example, the fluorine-containing polymer described above which has the carbonate groups at the terminals may be heated to thermally decompose (decarboxylate) the carbonate groups.

Examples of the peroxycarbonates include diisopropyl peroxycarbonate, di-n-propyl peroxycarbonate, t-butyl peroxyisopropyl carbonate, t-butyl peroxymethacryloyloxyethyl carbonate, bis(4-t-butylcyclohexyl) peroxydicarbonate and di-2-ethylhexyl peroxydicarbonate. These may be used singly, or two or more may be used in combination.

The amount in which the peroxycarbonate is used is variable depending on the type (such as the composition) and molecular weight of the target polymer, polymerization conditions and the type of the initiator that is used. To control the polymerization rate appropriately and to ensure sufficient polymerization rate, the amount is preferably 0.05 parts by mass or more and 20 parts by mass or less per 100 parts by mass of the whole polymer obtained by the polymerization, and is more preferably 0.1 part by mass or more and 10 parts by mass or less. The content of the carbonate groups at the molecular terminals of the polymer may be controlled by controlling the polymerization conditions. The polymerization initiator may be added in any manner without limitation, and may be added at once at the start of the polymerization or may be added continuously during the polymerization. The manner of the addition is selected appropriately in accordance with the decomposition reactivity of the polymerization initiator and the polymerization temperature.

To ensure sufficient interlayer adhesion and to make sure that the interlayer adhesion will not be decreased under any use environmental conditions and sufficient heat resistance will be attained, and thereby to prevent the occurrence of problems such as bonding failure, coloration and foaming during processing at high temperatures, as well as separation, coloration, foaming and leaching due to decomposition during use at high temperatures, the number of the terminal functional groups per $10^6$ carbon atoms in the main chain of the fluorine-containing polymer (D) is preferably 150 or more and 3,000 or less, more preferably 200 or more and 2,000 or less, and still more preferably 300 or more and 1,000 or less. As long as the number of the functional groups described above is satisfied, the polymer may be a mixture of the fluorine-containing polymer having the functional groups, and the fluorine-containing polymer having no functional groups.

As described above, the fluorine-containing polymer (D) is a fluorine-containing polymer in which a functional group reactive to an amino group is introduced. As described earlier, the fluorine-containing polymer (D) having such functional groups still exhibits the superior characteristics inherent to fluorine-containing polymers such as heat resistance, water resistance, low frictional properties, chemical resistance, weather resistance, antifouling properties and barrier properties to chemical medias, and is advantageous in terms of productivity and cost.

By virtue of the functional groups reactive to amino groups being introduced in the molecular chains, the polymer used in a multilayer tube can attain direct and superior interlayer adhesion with respect to various materials which are bondable therewith with no or only insufficient interlayer adhesion, without special treatments such as surface treatment and/or application of adhesive resins.

To the fluorine-containing polymer (D), various fillers such as inorganic powders, glass fibers, carbon fibers, metal oxides, carbon, etc., may be added within the range which does not impair its performance in accordance with the purpose, use, etc. In addition, other than the fillers, a pigment, an ultraviolet absorber, and other optional additives may be mixed. Other than the additives, resins such as the other fluorine-containing resins, the other thermoplastic resins, etc., and synthetic rubbers, etc., may be added whereby it is possible to improve mechanical characteristics, to improve weather resistance, to impart design nature, to prevent static generation and to improve moldability.

[Multilayer Tube]

The first embodiment of the multilayer tube includes at least two layers of Layer (a) and Layer (b), and at least one pair of Layer (a) and Layer (b) is disposed adjacent to each other.

In the multilayer tube of the first embodiment, it is essential to contain Layer (b), whereby chemical liquid-barrier property, in particular, hydrocarbon barrier property of the multilayer tube become good. Further, since Layer (a) and Layer (b) are being disposed adjacent to each other, it is possible to obtain a multilayer tube excellent in interlayer adhesiveness and durability thereof.

As the preferred embodiment, in at least one pair of the above-mentioned adjacent Layer (a) and Layer (b), Layer (b) is disposed inside Layer (a). For example, in the case of a three-layer structure in which one layer of an intermediate layer Layer (b) is contained between the outermost layer Layer (a) and the innermost layer Layer (a), as the adjacent Layer (a) and Layer (b), there are a combination of the outermost layer Layer (a) and the intermediate layer Layer (b), and a combination of the innermost layer Layer (a) and the intermediate layer Layer (b), and in the two combinations, Layer (b) is disposed inside Layer (a) in at least one of them so that it satisfies the above-mentioned requirement.

As the more preferred embodiment, Layer (a) is disposed at the outermost layer of the multilayer tube. By being disposed Layer (a) at the outermost layer, it is possible to obtain a multilayer tube excellent in chemical resistance and flexibility.

As the further preferred embodiment, Layer (b) is disposed at the innermost layer of the multilayer tube. By being disposed Layer (b) at the innermost layer, it is possible to obtain a multilayer tube excellent in deteriorated fuel resistant property and to suppress elution of a low molecular weight component(s) such as the monomer and the oligomer, etc., due to contact with alcohol-containing gasoline.

Also, in the multilayer tube of the first embodiment, when a conductive layer containing the semi-aromatic polyamide composition (B) to which a conductive filler is contained is disposed at the innermost layer of the multilayer tube, it is excellent in chemical liquid-barrier property, deteriorated fuel resistant property and elution resistance to the monomer and the oligomer, and when it is used as a fuel piping tube, it is possible to prevent sparks generated by internal friction of the fuel circulating in the pipe or friction with the pipe wall of the same from igniting the fuel. In such a case, the layer containing the semi-aromatic polyamide composition (B) having no conductivity is disposed outside the conductive layer, whereby it is possible to achieve both low temperature impact resistance and conductivity, and it is also economically advantageous.

Conductivity refers, for example, when a flammable fluid such as gasoline continuously contacts with an insulating material such as a resin, there is a possibility of catching fire by accumulating static electricity, to a state to have electric characteristics of such an extent that this static electricity does not accumulate. According to the above, it is possible to prevent from explosion due to static electricity generated at the time of conveying a fluid such as a fuel, etc.

The conductive filler includes all fillers added for imparting conductive property to the resin, and may be mentioned granular, flake, and fibrous filler, etc.

The granular filler may be mentioned carbon black, graphite, etc. The flake filler may be mentioned aluminum flake, nickel flake, nickel-coated mica, etc. Also, the fibrous filler may be mentioned carbon fiber, carbon-coated ceramic fiber, carbon whisker, carbon nanotube, and metal fiber such as aluminum fiber, copper fiber, brass fiber, stainless fiber, etc. These may be used singly, or two or more may be used in combination. Among these, carbon nanotube and carbon black are preferable.

Carbon nanotubes are referred to as hollow carbon fibrils, the fibrils have an outer region comprising an essentially continuous multi-layer of regularly arranged carbon atoms, and an inner hollow region, and are essentially cylindrical fibrils in which each layer and the hollow region are disposed substantially concentrically about the cylindrical axis of the fibrils. Further, it is preferable that the regularly arranged carbon atoms in the outer region is a graphite state, and a diameter of the hollow region is 2 nm or more and 20 nm or less. An outer diameter of the carbon nanotube is preferably 3.5 nm or more and 70 nm or less from the viewpoints of imparting sufficient dispersibility into the resin and good conductivity of the obtainable resin molded product, and more preferably 4 nm or more and 60 nm or less. An aspect ratio (ratio of length/outer diameter) of the carbon nanotube is preferably 5 or more, more preferably 100 or more, and further preferably 500 or more. By satisfying the aspect ratio, a conductive network can be easily formed, and excellent conductivity can be exhibited by adding a small amount.

The carbon black includes all carbon blacks generally used for imparting conductivity, and the preferable carbon black may be mentioned acetylene black obtained by incomplete combustion of an acetylene gas, furnace black such as Ketjenblack, etc., obtained by furnace type incomplete combustion of crude oil as a raw material, oil black, naphthalene black, thermal black, lamp black, channel black, roll black, disc black, etc., but are not limited thereto. These may be used singly, or two or more may be used in combination. Among these, acetylene black and furnace black are more preferable.

Also, as the carbon black, various carbon powders having different characteristics such as its particle size, surface area, DBP oil absorption, ash content, etc., are produced. There is no limitation in the characteristics of the carbon black, and a material having good chain-state structure and large aggregation density is preferable. Formulation of the carbon black with a large amount is not preferable in the viewpoint of impact resistance, and from the viewpoints of obtaining excellent electric conductivity with a smaller amount, an average particle diameter is preferably 500 nm or less, more preferably 5 nm or more and 100 nm or less, further preferably 10 nm or more and 70 nm or less, a surface area (BET method) is preferably 10 $m^2/g$ or more, more preferably 30 $m^2/g$ or more, further preferably 50 $m^2/g$ or more, further, DBP (dibutyl phthalate) oil absorption is preferably 50 ml/100 g or more, more preferably 100 ml/100 g, and further preferably 150 ml/100 g or more. Also, the ash content is preferably 0.5% by mass or less, and more preferably 0.3% by mass or less. The DBP oil absorption herein mentioned is a value measured by the method determined in ASTM D-2414. Also, a content of volatile matter of the carbon black is preferably less than 1% by mass.

These conductive fillers may be subjected to surface treatment with a surface treatment agent such as a titanate-based, aluminum-based, silane-based, etc. Further, it is also possible to use those granulated for improving workability of melt-kneading.

A content of the conductive filler varies depending on the kind of the conductive filler to be used, so that it cannot be unconditionally specified, but from the viewpoint of a balance with conductivity, fluidity, mechanical strength, etc., it is generally preferably 3 parts by mass or more and 30 parts by mass or less based on 100 parts by mass of the semi-aromatic polyamide composition (B).

Also, such a conductive filler preferably has a surface specific resistance value of the melt extrudate of $10^8$ Ω/square or less from the viewpoint of obtaining sufficient antistatic performance, and more preferably $10^6$ Ω/square or less. However, addition of the conductive filler tends to cause deterioration of strength and fluidity. Therefore, it is desirable that the content of the conductive filler be as small as possible if a target conductivity level is obtained.

In the multilayer tube of the first embodiment, a thickness of each layer is not particularly limited, and can be adjusted according to the kind of the polymer constituting each layer, the total number of whole layers in the multilayer tube, use, etc., and the thicknesses of the respective layers are determined in consideration of characteristics such as chemical liquid-barrier property, low temperature impact resistance, flexibility, etc., of the multilayer tube. In general, thicknesses of Layer (a) and Layer (b) are each preferably 3% or more and 90% or less based on the thickness of the whole multilayer tube. In consideration of the balance between low temperature impact resistance and chemical liquid-barrier property, the thickness of Layer (b) is more preferably 5% or more and 35% or less based on the thickness of the whole multilayer tube, and further preferably 7% or more and 30% or less.

Also, the total number of layers in the multilayer tube of the first embodiment is not particularly limited as long as it is at least two layers having Layer (a) and Layer (b). Further, the multilayer tube of the first embodiment may further comprise one layer or two or more layers of a layer(s) containing other thermoplastic resin(s) other than the two layers of Layer (a) and Layer (b) in order to obtain a multilayer tube to which a further function(s) is/are provided or which is economically advantageous. The number of the layers of the multilayer tube of the first embodiment is two or more layers, and is preferably eight layers or less judging from the mechanism of the tube producing apparatus, and more preferably two layers or more and seven layers or less.

The second embodiment of the multilayer tube contains at least three layers in which Layer (c) is further contained in the first embodiment, and at least one pair of Layer (b) and Layer (c) are disposed adjacent to each other.

In the multilayer tube of the second embodiment, it is essential to contain Layer (b), whereby chemical liquid-barrier property, in particular, hydrocarbon barrier property of the multilayer tube become good. In addition, it is also essential to contain Layer (c), whereby mechanical properties become good. Further, by being disposed Layer (a) and Layer (b), and Layer (b) and Layer (c) adjacent to each other, it is possible to obtain a multilayer tube excellent in interlayer adhesiveness and durability thereof.

As the preferred embodiment, Layer (c) is disposed inside Layer (b). Also, Layer (b) is disposed between Layer (a) and Layer (c). In this case, other layer(s) may be disposed between Layer (a) and Layer (b), and Layer (b) and Layer (c) as long as at least one pair of Layer (a) and Layer (b) are adjacent to each other, and Layer (b) and Layer (c) are adjacent to each other.

As the more preferred embodiment, Layer (a) is disposed at the outermost layer of the multilayer tube. By disposing Layer (a) at the outermost layer, it is possible to obtain a multilayer tube having excellent chemical resistance and flexibility.

As the further preferred embodiment, Layer (c) is disposed at the innermost layer of the multilayer tube. By disposing Layer (c) at the innermost layer, it is possible to suppress elution of a low molecular weight component(s) such as the monomer and the oligomer, etc., due to contact with alcohol-containing gasoline. That is, a multilayer tube in which Layer (a) is disposed at the outermost layer, Layer (b) is disposed at the intermediate layer, and Layer (c) is disposed at the innermost layer is further preferable.

Also, in the multilayer tube of the second embodiment, when a conductive layer containing the polyamide composition (C) to which a conductive filler is contained is disposed at the innermost layer of the multilayer tube, it is excellent in elution resistance of the monomer and the oligomer, and when it is used as a fuel piping tube, it is possible to prevent sparks generated by internal friction of the fuel circulating in the pipe or friction with the pipe wall of the same from igniting the fuel. In such a case, the layer containing the polyamide composition (C) having no conductivity is disposed outside the conductive layer, whereby it is possible to achieve both low temperature impact resistance and conductivity, and it is also economically advantageous.

Details of conductivity and the conductive filler are the same as those of the multilayer tube of the first embodiment.

A content of the conductive filler varies depending on the kind of the conductive filler to be used, so that it cannot be unconditionally specified, but from the viewpoints of a balance with conductivity, fluidity, mechanical strength, etc., it is generally preferably 3 parts by mass or more and 30 parts by mass or less based on 100 parts by mass of the aliphatic polyamide composition (C).

Also, such a conductive filler preferably has a surface specific resistance value of the melt extrudate of $10^8$ Ω/square or less from the viewpoint of obtaining sufficient antistatic performance, and more preferably $10^6$ Ω/square or less. However, addition of the conductive filler tends to cause deterioration of strength and fluidity. Therefore, it is desirable that the content of the conductive filler be as small as possible if a target conductivity level is obtained.

In the multilayer tube of the second embodiment, a thickness of each layer is not particularly limited, and can be adjusted according to the kind of the polymer constituting each layer, the total number of whole layers in the multilayer tube, use, etc., and the thicknesses of the respective layers are determined in consideration of characteristics such as chemical liquid-barrier property, low temperature impact resistance, flexibility, etc., of the multilayer tube. In general, the thicknesses of Layer (a), Layer (b) and Layer (c) are each preferably 3% or more and 90% or less based on the whole thickness of the multilayer tube. In consideration of the balance between low temperature impact resistance and chemical liquid-barrier property, the thickness of Layer (b) is each more preferably 5% or more and 35% or less based on the whole thickness of the multilayer tube, and further preferably 7% or more and 30% or less.

Also, the total number of layers in the multilayer tube of the second embodiment is not particularly limited as long as it is at least three layers having Layer (a), Layer (b) and Layer (c). Further, the multilayer tube of the second embodiment may further comprise one layer or two or more layers of a layer(s) containing other thermoplastic resin(s) other than the three layers of Layer (a), Layer (b) and Layer (c) in order to obtain a multilayer tube to which a further function(s) is/are provided or which is economically advantageous. The number of the layers of the multilayer tube of the second embodiment is three or more layers, and is preferably eight layers or less judging from the mechanism of the tube producing apparatus, and more preferably three layers or more and seven layers or less.

The third embodiment of the multilayer tube contains at least three layers (when Layer (c) is provided, then at least four layers) in which Layer (d) is further contained in the first embodiment or the second embodiment.

In the multilayer tube of the third embodiment, it is essential to contain Layer (b), whereby chemical liquid-barrier property, in particular, hydrocarbon barrier property of the multilayer tube become good. In addition, it is also essential to contain Layer (d), whereby chemical liquid-barrier property, in particular, alcohol barrier property and barrier property to gasoline containing an alcohol with high concentration of the multilayer tube become good. Further, by disposing Layer (a) and Layer (b) adjacent to each other, it is possible to obtain a multilayer tube excellent in interlayer adhesiveness and durability thereof.

As the preferred embodiment, Layer (d) is disposed inside the above-mentioned Layer (a). Also, Layer (b) is disposed between Layer (a) and Layer (d). In this case, Layer (b) may be disposed so as to adjacent to Layer (d), and other layer(s) may be disposed between Layer (a) and Layer (b) and between Layer (b) and Layer (d) as long as at least one pair of Layer (a) and Layer (b) are adjacent to each other.

As the more preferred embodiment, Layer (a) and/or Layer (c) is/are disposed between Layer (b) and Layer (d). In this case, Layer (a) and/or Layer (c) may be disposed so as to adjacent to Layer (b) and/or Layer (d), and other layer(s) than Layer (a) and/or Layer (c) may be disposed between Layer (b) and Layer (d) as long as at least one pair of Layer (a) and Layer (b) are adjacent to each other, and Layer (b) and Layer (c) are adjacent to each other.

As the further preferred embodiment, Layer (a) is disposed at the outermost layer of the multilayer tube. By disposing Layer (a) at the outermost layer, it is possible to obtain a multilayer tube having excellent chemical resistance and flexibility. Also, Layer (d) is disposed at the innermost layer of the multilayer tube. By disposing Layer (d) at the innermost layer, a multilayer tube excellent in deteriorated fuel resistant property can be obtained, and it is also possible to suppress elution of a low molecular weight component(s) such as the monomer and the oligomer, etc., due to contact with alcohol-containing gasoline. That is, a multilayer tube in which Layer (a) is disposed at the outermost layer, Layer (b) is disposed at the intermediate layer and Layer (d) is disposed at the innermost layer, a multilayer tube in which Layer (a) is disposed at the outermost layer, Layer (b) is disposed at the intermediate layer, Layer (a) is disposed at the inner layer and Layer (d) is disposed at the innermost layer, or a multilayer tube in which Layer (a) is disposed at the outermost layer, Layer (b) is disposed at the intermediate layer, Layer (c) is disposed at the inner layer and Layer (d) is disposed at the innermost layer is further preferable.

Also, in the multilayer tube of the third embodiment, when the conductive layer containing the fluorine-containing polymer composition to which a conductive filler is contained is disposed at the innermost layer of the multilayer tube, it is excellent in chemical liquid-barrier property, deteriorated fuel resistant property and elution resistance to the monomer and the oligomer, and when it is used as a fuel piping tube, it is possible to prevent sparks generated by internal friction of the fuel circulating in the pipe or friction with the pipe wall of the same from igniting the fuel. In such a case, the layer containing the fluorine-containing polymer having no conductivity is disposed outside the conductive layer, whereby it is possible to achieve both low temperature impact resistance and conductivity, and it is also economically advantageous. Further, the fluorine-containing polymer herein mentioned includes a fluorine-containing polymer (D) into which a functional group having reactivity to an amino group is introduced in its molecular chain, and also includes a fluorine-containing polymer which does not contain a functional group having reactivity to an amino group mentioned later.

Details of conductivity and the conductive filler are the same as those of the multilayer tube of the first embodiment.

A content of the conductive filler varies depending on the kind of the conductive filler to be used, so that it cannot be unconditionally specified, but from the viewpoints of a balance with conductivity, fluidity, mechanical strength, etc., it is generally preferably 3 parts by mass or more and 30 parts by mass or less based on 100 parts by mass of the fluorine-containing polymer.

Also, such a conductive filler preferably has a surface specific resistance value of the melt extrudate of $10^8$ Ω/square or less from the viewpoint of obtaining sufficient antistatic performance, and more preferably $10^6$ Ω/square or less. However, addition of the conductive filler tends to cause deterioration of strength and fluidity. Therefore, it is desirable that the content of the conductive filler be as small as possible if a target conductivity level is obtained.

In the multilayer tube of the third embodiment, a thickness of each layer is not particularly limited, and can be adjusted according to the kind of the polymer constituting each layer, the total number of whole layers in the multilayer tube, use, etc., and the thicknesses of the respective layers are determined in consideration of characteristics such as chemical liquid-barrier property, low temperature impact resistance, flexibility, etc., of the multilayer tube. In general, the thicknesses of Layer (a), Layer (b) and Layer (d) or Layer (a), Layer (b), Layer (c) and Layer (d) are each preferably 3% or more and 90% or less based on the whole thickness of the multilayer tube. In consideration of the balance between low temperature impact resistance and chemical liquid-barrier property, the thicknesses of Layer (b) and Layer (d) are each more preferably 5% or more and 50% or less based on the whole thickness of the multilayer tube, and further preferably 7% or more and 30% or less.

Also, the total number of layers in the multilayer tube of the third embodiment is not particularly limited as long as it is at least three layers (when Layer (c) is provided, then at least four layers) having Layer (a), Layer (b) and Layer (d) or Layer (a), Layer (b), Layer (c) and Layer (d). Further, the multilayer tube of the third embodiment may further comprise one layer or two or more layers of a layer(s) containing other thermoplastic resin(s) other than the three layers of Layer (a), Layer (b) and Layer (d), or other than the four layers of Layer (a), Layer (b), Layer (c) and Layer (d) in order to obtain a multilayer tube to which a further function(s) is/are provided or which is economically advantageous. The number of the layers of the multilayer tube of the third embodiment is three or more layers (when Layer (c) is provided, four or more layers), and is preferably eight layers or less judging from the mechanism of the tube producing apparatus, and more preferably four layers or more and seven layers or less.

As the other thermoplastic resin(s) in the multilayer tube of the first embodiment, the second embodiment and the third embodiment, there may be mentioned, other than the polyamide (A1), the polyamide (A2), the semi-aromatic polyamide (B11), the semi-aromatic polyamide (B12), the semi-aromatic polyamide (B21) and the semi-aromatic polyamide (B22), polyamide-based resins such as polymetaxylylene terephthalamide (polyamide MXDT), polymetaxylylene isophthalamide (polyamide MXDI), polymetaxylylene hexahydroterephthalamide (polyamide MXDT(H)), polymetaxylylene naphthalamide (polyamide MXDN), polyparaxylylene terephthalamide (polyamide PXDT), polyparaxylylene isophthalamide (polyamide PXDI), polyparaxylylene hexahydroterephthalamide (polyamide PXDT(H)), polyparaxylylene naphthalamide (polyamide PXDN), polyparaphenylene terephthalamide (PPTA), polyparaphenylene isophthalamide (PPIA), polymetaphenylene terephthalamide (PMTA), polymetaphenylene isophthalamide (PMIA), poly(2,6-naphthalenedimethylene terephthalamide) (polyamide 2,6-BANT), poly(2,6-naphthalenedimethylene isophthalamide) (polyamide 2,6-BANI), poly(2,6-naphthalenedimethylene hexahydroterephthalamide) (polyamide 2,6-BANT(H)), poly(2,6-naphthalenedimethylene naphthalamide) (polyamide 2,6-BANN), poly(1,3-cyclohexanedimethylene adipamide) (polyamide 1,3-BAC6), poly(1,3-cyclohexanedimethylene suberamide (polyamide 1,3-BAC8), poly(1,3-cyclohexanedimethylene azelamide) (polyamide 1,3-BAC9), poly(1,3-cyclohexanedimethylene sebacamide) (polyamide 1,3-BAC10), poly(1,3-cyclohexanedimethylene dodecamide) (polyamide 1,3-BAC12), poly(1,3-cyclohexanedimethylene terephthalamide) (polyamide 1,3-BACT), poly(1,3-cyclohexanedimethylene isophthalamide) (polyamide 1,3-BACI), poly(1,3-cyclohexanedimethylene hexahydroterephthalamide) (polyamide 1,3-BACT(H)), poly(1,3-cyclohexanedimethylene naphthalamide) (polyamide 1,3-BACN), poly(1,4-cyclohexanedimethylene adipamide) (polyamide 1,4-BAC6), poly(1,4-cyclohexanedimethylene suberamide) (polyamide 1,4-BAC8), poly(1,4-cyclohexanedimethylene azelamide) (polyamide 1,4-BAC9), poly(1,4-cyclohexanedimethylene sebacamide) (polyamide 1,4-BAC10), poly(1,4-cyclohexanedimethylene dodecamide) (polyamide 1,4-BAC12), poly(1,4-cyclohexanedimethylene terephthalamide) (polyamide 1,4-BACT), poly(1,4-cyclohexanedimethylene isophthalamide) (polyamide 1,4-BACI), poly(1,4-cyclohexanedimethylene hexahydroterephthalamide) (polyamide 1,4-BACT(H)), poly(1,4-cyclohexanedimethylene naphthalamide) (polyamide 1,4-BACN), poly(4,4'-methylenebiscyclohexylene adipamide) (polyamide PACM6), poly(4,4'-methylenebiscyclohexylene suberamide) (polyamide PACM8), poly(4,4'-methylenebiscyclohexylene azelamide) (polyamide PACM9), poly(4,4'-methylenebiscyclohexylene sebacamide) (polyamide PACM10), poly(4,4'-methylenebiscyclohexylene dodecamide) (polyamide PACM12), poly(4,4'-methylenebiscyclohexylene tetradecamide) (polyamide PACM14), poly(4,4'-methylenebiscyclohexylene hexadecamide) (polyamide PACM16), poly(4,4'-methylenebiscyclohexylene octadecamide) (polyamide PACM18), poly(4,4'-methylenebiscyclohexylene terephthalamide) (polyamide PACMT), poly(4,4'-methylenebiscyclohexylene isophthalamide) (polyamide PACMI), poly(4,4'-methylenebiscyclohexylene hexahydroterephthalamide) (polyamide PACMT(H)), poly(4,4'-methylenebiscyclohexylene naphthalamide) (polyamide PACMN), poly(4,4'-methylenebis(2-methyl-cyclohexylene)adipamide) (polyamide MACM6), poly(4,4'-methylenebis(2-methyl-cyclohexylene)suberamide) (polyamide MACM8), poly(4,4'-methylenebis(2-methyl-cyclohexylene)azelamide) (polyamide MACM9), poly(4,4'-methylenebis(2-methyl-cyclohexylene)sebacamide) (polyamide MACM10), poly(4,4'-methylenebis(2-methyl-cyclohexylene)dodecamide) (polyamide MACM12), poly(4,4'-methylenebis(2-methyl-cyclohexylene)tetradecamide) (polyamide MACM14), poly(4,4'-methylenebis(2-methyl-cyclohexylene)hexadecamide) (polyamide MACM16), poly(4,4'-methylenebis(2-methyl-cyclohexylene)octadecamide) (polyamide MACM18), poly(4,4'-methylenebis(2-methyl-cyclohexylene)terephthalamide) (polyamide MACMT), poly(4,4'-methylenebis(2-methyl-cyclohexylene)isophthalamide) (polyamide MACMI), poly(4,4'-methylenebis(2-methyl-cyclohexylene)hexahydroterephthalamide) (polyamide MACMT(H)), poly(4,4'-methylenebis(2-methyl-cyclohexylene)naphthalamide) (polyamide MACMN), poly(4,4'-propylene biscyclohexylene adipamide) (polyamide PACP6), poly(4,4'-propylene biscyclohexylene suberamide) (polyamide PACP8), poly(4,4'-propylene biscyclohexylene azelamide) (polyamide PACP9), poly(4,4'-propylene biscyclohexylene sebacamide) (polyamide PACP10), poly(4,4'-propylene biscyclohexylene dodecamide) (polyamide PACP12), poly(4,4'-propylene biscyclohexylene tetradecamide) (polyamide PACP14), poly(4,4'-propylene biscyclohexylene hexadecamide) (polyamide PACP16), poly(4,4'-propylene biscyclohexylene octadecamide) (polyamide PACP18), poly(4,4'-propylene biscyclohexylene terephthalamide) (polyamide PACPT), poly(4,4'-propylene biscyclohexylene isophthalamide) (polyamide PACPI), poly(4,4'-propylene biscyclohexylene hexahydroterephthalamide) (polyamide PACPT(H)), poly(4,4'-propylene biscyclohexylene naphthalamide) (polyamide PACPN), polyisophorone adipamide (polyamide IPD6), polyisophorone suberamide (polyamide IPD8), polyisophorone azelamide (polyamide IPD9), polyisophorone sebacamide (polyamide IPD10), polyisophorone dodecamide (polyamide IPD12), polyisophorone terephthalamide (polyamide IPDT), polyisophorone isophthalamide (polyamide IPDI), polyisophorone hexahydroterephthalamide (polyamide IPDT(H)), polyisophorone naphthalamide (polyamide IPDN), polytetramethylene hexahydroterephthalamide (polyamide 4T(H)), polypentamethylene hexahydroterephthalamide (polyamide 5T(H)), polyhexamethylene hexahydroterephthalamide (polyamide 6T(H)), poly(2-methylpentamethylene hexahydroterephthalamide) (polyamide M5T(H)), polynonamethylene hexahydroterephthalamide (polyamide 9T(H)), poly (2-methyloctamethylene hexahydroterephthalamide) (polyamide M8T(H)), polytrimethylhexamethylene hexahydroterephthalamide (polyamide TMHT(H)), polydecamethylene hexahydroterephthalamide (polyamide 10T(H)), polyundecamethylene hexahydroterephthalamide (polyamide 11T(H)), polydodecamethylene hexahydroterephthalamide (polyamide 12T(H)), and a copolymer using several kinds of raw material monomers of these polyamides, and/or raw material monomers of the polyamide (A1) and polyamide (A2), etc. These may be used singly, or two or more may be used in combination.

Examples further include fluorine-containing polymers which contain no functional groups reactive to amino groups, such as polyvinylidene fluoride (PVDF), polyvinyl fluoride (PVF), polytetrafluoroethylene (PTFE), polychlorotrifluoroethylene (PCTFE), tetrafluoroethylene/perfluoro (alkyl vinyl ether) copolymer (PFA), tetrafluoroethylene/hexafluoropropylene copolymer (FEP), tetrafluoroethylene/perfluoro(alkyl vinyl ether)/hexafluoropropylene copolymer, ethylene/tetrafluoroethylene copolymer (ETFE), ethylene/tetrafluoroethylene/hexafluoropropylene copolymer (EFEP), vinylidene fluoride/tetrafluoroethylene copolymer, vinylidene fluoride/hexafluoropropylene copolymer, vinylidene fluoride/perfluoro(alkyl vinyl ether) copolymer, tetrafluoroethylene/hexafluoropropylene/vinylidene fluoride copolymer (THV), vinylidene fluoride/perfluoro(alkyl vinyl ether)/tetrafluoroethylene copolymer, tetrafluoroethylene/hexafluoropropylene/vinylidene fluoride/perfluoro(alkyl vinyl ether) copolymer, ethylene/chlorotrifluoroethylene copolymer (ECTFE), chlorotrifluoroethylene/tetrafluoroethylene copolymer, vinylidene fluoride/chlorotrifluoroethylene copolymer, chlorotrifluoroethylene/perfluoro(alkyl vinyl ether) copolymer, chlorotrifluoroethylene/hexafluoropropylene copolymer, chlorotrifluoroethylene/tetrafluoroethylene/hexafluoropropylene copolymer, chlorotrifluoroethylene/tetrafluoroethylene/vinylidene fluoride copolymer, chlorotrifluoroethylene/perfluoro(alkyl vinyl ether)/tetrafluoroethylene copolymer (CPT), chlorotrifluoroethylene/perfluoro(alkyl vinyl ether)/hexafluoropropylene copolymer, chlorotrifluoroethylene/tetrafluoroethylene/hexafluoropropylene/perfluoro(alkyl vinyl ether) copolymer, chlorotrifluoroethylene/tetrafluoroethylene/vinylidene fluoride/perfluoro(alkyl vinyl ether) copolymer, chlorotrifluoroethylene/tetrafluoroethylene/vinylidene fluoride/hexafluoropropylene copolymer, and chlorotrifluoroethylene/tetrafluoroethylene/vinylidene fluoride/perfluoro (alkyl vinyl ether)/hexafluoropropylene copolymer. These may be used singly, or two or more may be used in combination.

When the multilayer tube has the layer (d), low-temperature impact resistance, barrier properties to chemical medias and environmental stress crack resistance can be satisfied at the same time by arranging a layer which includes a fluoropolymer having no functional groups reactive to an amino group, inside the layer (d). This approach is also advantageous in economic efficiency.

Further, there may be mentioned polyolefin-based resins such as high density polyethylene (HDPE), medium density polyethylene (MDPE), low density polyethylene (LDPE), linear low density polyethylene (LLDPE), ultra high molecular weight polyethylene (UHMWPE), polypropylene (PP), polybutene (PB), polymethylpentene (TPX), an ethylene/propylene copolymer (EPR), an ethylene/butene copolymer (EBR), an ethylene/vinyl acetate copolymer (EVA), an ethylene/acrylic acid copolymer (EAA), an ethylene/methacrylic acid copolymer (EMAA), an ethylene/methyl acrylate copolymer (EMA), an ethylene/methyl methacrylate copolymer (EMMA), an ethylene/ethyl acrylate copolymer (EEA), an ethylene/vinyl acetate copolymer saponified product (EVOH), etc.; polystyrene-based resins such as polystyrene (PS), syndiotactic polystyrene (SPS), a methyl methacrylate/styrene copolymer (MS), a methyl methacrylate/styrene/butadiene copolymer (MBS), a styrene/butadiene copolymer (SBR), a styrene/isoprene copolymer (SIR), a styrene/isoprene/butadiene copolymer (SIBR), a styrene/butadiene/styrene copolymer (SBS), a styrene/isoprene/styrene copolymer (SIS), a styrene/ethylene/butylene/styrene copolymer (SEBS), a styrene/ethylene/propylene/styrene copolymer (SEPS), etc.; the above-mentioned polyolefin-based resins and polystyrene-based resins in which a functional group(s) is/are contained, including a carboxyl group such as acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endo-bicyclo-[2.2.1]-5-heptene-2,3-dicarboxylic acid, etc., and a metal salt thereof (Na, Zn, K, Ca, Mg), an acid anhydride group such as maleic anhydride, itaconic anhydride, citraconic anhydride, endo-bicyclo-[2.2.1]-5-heptene-2,3-dicarboxylic anhydride, etc.; an epoxy group such as glycidyl acrylate, glycidyl methacrylate, glycidyl ethacrylate, glycidyl itaconate, glycidyl citraconate, etc.; polyester-based resins such as polybutylene terephthalate (PBT), polyethylene terephthalate (PET), polyethylene isophthalate (PEI), poly(ethylene terephthalate/ethylene isophthalate) copolymer (PET/PEI), polytrimethylene terephthalate (PTT), polycyclohexanedimethylene terephthalate (PCT), polyethylene naphthalate (PEN), polybutylene naphthalate (PBN), polyacrylate (PAR), liquid crystal polyester (LCP), polylactic acid (PLA), polyglycolic acid (PGA), etc.; polyether-based resins such as polyacetal (POM), polyphenylene ether (PPO), etc.; polysulfone-based resins such as polysulfone (PSU), polyethersulfone (PESU), polyphenylsulfone (PPSU), etc.; polythioether-based resins such as polyphenylene sulfide (PPS), polythioether sulfone (PTES), etc.; polyketone-based resins such as polyketone (PK), polyetherketone (PEK), polyetheretherketone (PEEK), polyetherketoneketone (PEKK), polyetheretheretherketone (PEEEK), polyetheretherketoneketone (PEEKK), polyetherketoneketoneketone (PEKKK), polyetherketoneetherketoneketone (PEKEKK), etc.; polynitrile-based resins such as polyacrylonitrile (PAN), polymethacrylonitrile, an acrylonitrile/styrene copolymer (AS), a methacrylonitrile/styrene copolymer, an acrylonitrile/butadiene/styrene copolymer (ABS), an acrylonitrile/butadiene copolymer (NBR), etc.; polymethacrylate-based resins such as polymethyl methacrylate (PMMA), polyethyl methacrylate (PEMA), etc.; polyvinyl ester-based resins such as polyvinyl acetate (PVAc), etc.; polyvinyl chloride-based resins such as polyvinylidene chloride (PVDC), polyvinyl chloride (PVC), a vinyl chloride/vinylidene chloride copolymer, a vinylidene chloride/methyl acrylate copolymer, etc.; cellulose-based resins such as cellulose acetate, cellulose butyrate, etc.; polycarbonate-based resins such as polycarbonate (PC), etc.; polyimide-based resins such as thermoplastic polyimide (TPI), polyether imide, polyester imide, polyamideimide (PAI), polyester amideimide, etc.; thermoplastic polyurethane-based resins; polyamide elastomer, polyurethane elastomer, polyester elastomer, etc. These may be used singly, or two or more may be used in combination.

Incidentally, in the multilayer tubes of the first embodiment, the second embodiment and the third embodiment, from the viewpoints of melt stability and molding stability, among the above-mentioned exemplified thermoplastic resins, it is preferable to use the polyester-based resins, the polyamide-based resins, the polythioether-based resins, the polyolefin-based resins and/or the fluorine-containing polymers having no functional group, each having a melting point of 290° C. or lower.

Substrates other than thermoplastic resins may be coated, with examples including paper, metallic materials, non-stretched, uniaxially stretched or biaxially stretched plastic films or sheets, woven fabrics, nonwoven fabrics, metallic fibers and wood. Examples of the metallic materials include metals such as aluminum, iron, copper, nickel, gold, silver, titanium, molybdenum, magnesium, manganese, lead, tin, chromium, beryllium, tungsten and cobalt, metal compounds, and alloys composed of two or more kinds of these metals, for example, alloyed steels such as stainless steel, aluminum alloys, copper alloys such as brass and bronze, and nickel alloys. These may be used singly, or two or more may be used in combination.

Some example methods for the production of the multilayer tubes are a method in which the materials are melt-extruded using as many extruders as the number of layers or the number of materials and are stacked simultaneously inside or outside the die (co-extrusion method), and a method in which a single-layer tube is produced beforehand or a multilayer tube is produced beforehand by the aforementioned method, and then resins are sequentially integrated or coated therewith, optionally via an adhesive, onto the outer surface (coating method). The multilayer tube is preferably produced by the co-extrusion method in which the materials are coextruded in a molten state and are thermally fused together (melt bonded) to form a stacked tube in a single step. That is, the method for the production of the multilayer tube preferably includes performing co-extrusion.

In the case where the multilayer tube to be obtained is of a complicated shape or, after its formation, is heated and bent into a final product, the target product may be obtained in such a manner that the multilayer tube that has been formed is heat treated at a temperature lower than the lowest melting point of the melting points of the resins that constitute the tube for 0.01 hour to 10 hours, thereby removing residual strain from the product.

The multilayer tube may have a wavy region. The wavy region is a region having a wave shape, a bellows shape, an accordion shape, a corrugated shape or the like. The wavy region may extend over the entire length of the multilayer tube or may be provided locally anywhere in an appropriate region. The wavy region may be easily formed by first forming a straight tube and then molding the tube to give it a predetermined wave shape or the like. The wavy region offers impact absorption and facilitates attachment. Further, the tube may be made into an L-shape, a U-shape or the like by, for example, fitting the tubes with necessary components such as connectors or by a bending process.

In consideration of flying stone damage, wear with other components and flame resistance, the outer periphery of the multilayer tube produced as described above may be entirely or partly provided with a solid or sponge-like protective member (protector) composed of, for example, natural rubber (NR), butadiene rubber (BR), isoprene rubber (IR), butyl rubber (IIR), chloroprene rubber (CR), carboxylated butadiene rubber (XBR), carboxylated chloroprene rubber (XCR), epichlorohydrin rubber (ECO), acrylonitrile butadiene rubber (NBR), hydrogenated acrylonitrile butadiene rubber (HNBR), carboxylated acrylonitrile butadiene rubber (XNBR), mixture of NBR and polyvinyl chloride, acrylonitrile isoprene rubber (NIR), chlorinated polyethylene rubber (CM), chlorosulfonated polyethylene rubber (CSM), ethylene propylene rubber (EPR), ethylene propylene diene rubber (EPDM), ethylene vinyl acetate rubber (EVM), NBR-EPDM mixed rubber, acrylic rubber (ACM), ethylene acrylic rubber (AEM), acrylate butadiene rubber (ABR), styrene butadiene rubber (SBR), carboxylated styrene butadiene rubber (XSBR), styrene isoprene rubber (SIR), styrene isoprene butadiene rubber (SIBR), urethane rubber, silicone rubber (MQ, VMQ), fluororubber (FKM, FFKM), fluorosilicone rubber (FVMQ) or a thermoplastic elastomer such as of vinyl chloride type, olefin type, ester type, urethane type or amide type. The protective member may be rendered porous like a sponge by a known technique. By being made porous, the protective member attains lightness in weight and superior thermal insulating properties, and further allows the material cost to be reduced. Glass fibers or the like may be added to improve the strength of the protective member. While the shape of the protective member is not particularly limited, the protective member is usually a tubular member or a block-like member having a recess for accommodating the multilayer tube. In the case of a tubular member, the multilayer tube may be inserted into a separately fabricated tubular member, or a tubular member may be extruded onto the multilayer tube so as to coat the multilayer tube intimately. The multilayer tube and the protective member may be formed into a single-piece structure by applying as required an adhesive onto the inner face or the recess of the protective member, inserting or fitting the multilayer tube thereinto, and bringing the two into tight contact. Reinforcement with metals or the like may be added.

The outer diameter of the multilayer tube is not limited and is designed in light of the flow rates of chemicals (for example, fuel such as alcohol-containing gasoline) or the like so that the tube is thick enough to avoid an increase in chemical permeation and to attain a burst pressure of usual tubes, and also enough to allow for such an extent of flexibility that the tube can be attached easily and exhibits good vibration resistance during use. Preferably, the outer diameter is 4 mm or more and 300 mm or less, the inner diameter is 3 mm or more and 250 mm or less, and the wall thickness is 0.5 mm or more and 25 mm or less.

The multilayer tubes of the present embodiments may be used in various applications, including mechanical components such as automobile parts, internal combustion engine applications and power tool housings, and further industrial materials, manufacturing industry materials, electric and electronic components, medical applications, food applications, home and office supplies, construction material-related components and furniture parts.

Also, the multilayer tube is excellent in chemical liquid-barrier property, so that it is suitable as a chemical liquid conveying tube. As the chemical liquid, there may be mentioned, for example, aromatic hydrocarbon solvents such as benzene, toluene, xylene, alkylbenzene, etc.; alcohols such as methanol, ethanol, propanol, butanol, pentanol, ethylene glycol, propylene glycol, diethylene glycol, phenol, cresol, polyethylene glycol, polypropylene glycol, polyalkylene glycol, etc.; phenol solvents; ether solvents such as dimethyl ether, dipropyl ether, methyl-t-butyl ether, ethyl-t-butyl ether, dioxane, tetrahydrofuran, polyol esters, polyvinyl ethers, etc.; halo-olefins such as HFC-23 (trifluoromethane), HFC-32 (difluoromethane), HFC-41 (fluoromethane), HFC-123 (2,2-dichloro-1,1,1-tifluoroethane), HFC-125 (1,1,1,2,2-pentafluoroethane), HFC-134 (1,1,2,2-tetrafluoroethane), HFC-134a (1,1,1,2-tetrafluoroethane), HFC-143 (1,1,2-trifluoroethane), HFC-143a (1,1,1-trifluoroethane), HFC-152 (1,2-difluoroethane), HFC-152a (1,1-difluoroethane), HFC-161 (fluoroethane), HFC-227ea (1,1,1,2,3,3,3-heptafluoropropane), HFC-227ca (1,1,2,2,3,3,3-heptafluoropropane), HFC-236fa (1,1,1,3,3,3-hexafluoropropane), HFC-236ea (1,1,1,2,3,3-hexafluoropropane), HFC-236cb (1,1,1,2,2,3-hexafluoropropane), HFC-236ca (1,1,2,2,3,3-hexafluoropropane), HFC-245ca (1,1,2,2,3-pentafluoropropane), HFC-245ea (1,1,2,3,3-pentafluoropropane), HFC-245eb (1,1,1,2,3-pentafluoropropane), HFC-245fa (1,1,1,3,3-pentafluoropropane), HFC-245cb (1,1,1,2,2-pentafluoropropane), HFC-254eb (1,1,1,2-tetrafluoropropane), HFC-254cb (1,1,2,2-tetrafluoropropane), HFC-254ca (1,2,2,3-tetrafluoropropane), HFC-263fb (1,1,1-trifluoropropane), HFC-263ca (1,2,2-trifluoropropane), HFC-272fb (1,1-difluoropropane), HFC-272ea (1,2-difluoropropane), HFC-272fa (1,3-difluoropropane), HFC-272ca (2,2-difluoropropane), HFC-281fa (1-fluoropropane), HFC-281ea (2-fluoropropane), HFC-329p (1,1,1,2,2,3,3,4,4-nonafluorobutane), HFC-329mmz (1,1,1,3,3,3-hexafluoro-2-(trifluoro)propane), HFC-338mf (1,1,1,3,3,4,4,4-octafluorobutane), HFC-338mcc (1,1,1,2,2,3,4,4-octafluorobutane), HFC-338pcc (1,1,2,2,3,3,4,4-octafluorobutane), HFC-347s (1,1,1,2,2,3,3-heptafluorobutane), HFC-365mfc (1,1,1,3,3-pentafluorobutane), HFC-4310mee (1,1,1,2,3,4,4,5,5,5-decafluoropentane), HFC-1123 (trifluoroethylene), HFC-1132a (1,2-difluoroethylene), FC-1216 (hexafluoro-1-propene), HFC-1223 (3,3,3-trifluoro-1-propene), HFC-1225zc (1,1,3,3,3-pentafluoro-1-propene), HFC-1225ye (1,2,3,3,3-pentafluoro-1-propene), HFC-1225yc (1,1,2,3,3-pentafluoro-1-propene), HFC-1232xf (3,3-difluoro-1-propene), HFC-1234ye (1,2,3,3-tetrafluoro-1-propene), HFC-1234ze (1,3,3,3-tetrafluoro-1-propene), HFC-1234yf (2,3,3,3-tetrafluoro-1-propene), HFC-1234yc (1,1,2,3-tetrafluoro-1-propene), HFC-1234zc (1,1,3,3-tetrafluoro-1-propene), HFC-1243yf (2,3,3-trifluoro-1-propene), HFC-1243zc (1,1,3-trifluoro-1-propene), HFC-1243ye (1,2,3-trifluoro-1-propene), HFC-1243ze (1,3,3-trifluoro-1-propene), HFC-1243zf (3,3,3-trifluoro-1-propene), HFC-1243yc (1,1,2-trifluoro-1-propene), HFC-1261yf (2-fluoropropene), FC-1318my (1,1,1,2,3,4,4,4-octafluoro-2-butene), FC-1318cy (1,1,2,3,3,4,4,4-octafluoro-1-butene), HFC-1327my (1,1,1,2,4,4,4-heptafluoro-2-butene), HFC-1327ye (1,2,3,3,4,4,4-heptafluoro-1-butene), HFC-1327py (1,1,1,2,3,4,4-heptafluoro-2-butene), HFC-1327et (1,3,3,3-tetrafluoro-2-(trifluoromethyl)-1-propene), HFC-1327cz (1,1,3,3,4,4,4-heptafluoro-1-butene), HFC-1327cye (1,1,2,3,4,4,4-heptafluoro-1-butene), HFC-1327cyc (1,1,2,3,3,4,4-heptafluoro-1-butene), HFC-1336yf (2,3,3,4,4,4-hexafluoro-1-butene), HFC-1336ze (1,3,3,4,4,4-hexafluoro-1-butene), HFC-1336eye (1,2,3,4,4,4-hexafluoro-1-butene), HFC-1336eyc (1,2,3,3,4,4-hexafluoro-1-butene), HFC-1336pyy (1,1,2,3,4,4-hexafluoro-2-butene), HFC-1336pz (1,1,1,2,4,4-hexafluoro-2-butene), HFC-1336mzy (1,1,1,3,4,4-hexafluoro-2-butene), HFC-1336mzz (1,1,1,4,4,4-hexafluoro-2-butene), HFC-1336qc (1,1,2,3,3,4-hexafluoro-1-butene), HFC-1336pe (1,1,2,3,4,4-hexafluoro-1-butene), HFC-1336 ft (3,3,3-trifluoro-2-(trifluoromethyl)-1-propene), HFC-1345qz (1,1,1,2,4-pentafluoro-2-butene), HFC-1345mzy (1,1,1,3,4-pentafluoro-2-butene), HFC-1345fz (3,3,4,4,4-pentafluoro-1-butene), HFC-1345mzz (1,1,1,4,4-pentafluoro-2-butene), HFC-1345sy (1,1,1,2,3-pentafluoro-2-butene), HFC-1345fyc (2,3,3,4,4-pentafluoro-1-butene), HFC-1345pyz (1,1,2,4,4-pentafluoro-2-butene), HFC-1345cyc (1,1,2,3,3-pentafluoro-1-butene), HFC-1345pyy (1,1,2,3,4-pentafluoro-2-butene), HFC-1345eyc (1,2,3,3,4-pentafluoro-1-butene), HFC-1345ctm (1,1,3,3,3-pentafluoro-2-methyl-1-propene), HFC-1345ftp (2-(difluoromethyl)-3,3,3-trifluoro-1-propene), HFC1345fye (2,3,4,4,4-pentafluoro-1-butene), HFC-1345eyf (1,2,4,4,4-pentafluoro-1-butene), HFC-1345eze (1,3,4,4,4-pentafluoro-1-butene), HFC-1345 ezc (1,3,3,4,4-pentafluoro-1-butene), HFC-1345eye (1,2,3,4,4-pentafluoro-1-butene), HFC-1354fzc (3,3,4,4-tetrafluoro-1-butene), HFC-1354ctp (1,1,3,3-tetrafluoro-2-methyl-1-propene), HFC-1354etm (1,3,3,3-tetrafluoro-2-methyl-1-propene), HFC-1354tfp (2-(difluoromethyl)-3,3-difluoro-1-propene), HFC-1354my (1,1,1,2-tetrafluoro-2-butene), HFC-1354mzy (1,1,1,3-tetrafluoro-2-butene), FC-141-10myy (1,1,1,2,3,4,4,5,5,5-decafluoro-2-pentene), FC-141-10cy (1,1,2,3,3,4,4,5,5,5-decafluoro-1-pentene) HFC-1429mzt (1,1,1,4,4,4-hexafluoro-2-(trifluoromethyl)-2-butene), HFC-1429myz (1,1,1,2,4,4,5,5,5-nonafluoro-2-pentene), HFC-1429mzy (1,1,1,3,4,4,5,5,5-nonafluoro-2-pentene), HFC-1429eyc (1,2,3,3,4,4,5,5,5-nonafluoro-1-pentene), HFC-1429czc (1,1,3,3,4,4,5,5,5-nonafluoro-1-pentene), HFC-1429cycc (1,1,2,3,3,4,4,5,5-nonafluoro-1-pentene), HFC-1429pyy (1,1,2,3,4,4,5,5,5-nonafluoro-2-pentene), HFC-1429myyc (1,1,1,2,3,4,4,5,5-nonafluoro-2-pentene), HFC-1429myye (1,1,1,2,3,4,5,5,5-nonafluoro-2-pentene), HFC-1429eyym (1,2,3,4,4,4-hexafluoro-3-(trifluoromethyl)-1-butene), HFC-1429cyzm (1,1,2,4,4,4-hexafluoro-3-(trifluoromethyl)-1-butene), HFC-1429mzt (1,1,1,4,4,4-hexafluoro-2-(trifluoromethyl)-2-butene), HFC-1429czym (1,1,3,4,4,4-hexafluoro-3-(trifluoromethyl)-1-butene), HFC-1438fy (2,3,3,4,4,5,5,5-octafluoro-1-pentene), HFC-1438eycc (1,2,3,3,4,4,5,5-octafluoro-1-pentene), HFC-1438ftmc (3,3,4,4,4-pentafluoro-2-(trifluoromethyl)-1-butene), HFC-1438czzm (1,1,4,4,4-pentafluoro-3-(trifluoromethyl)-1-butene), HFC-1438ezym (1,3,4,4,4-pentafluoro-3-(trifluoromethyl)-1-butene), HFC-1438ctmf (1,1,4,4,4-pentafluoro-2-(trifluoromethyl)-1-butene), HFC-1447fzy (3,4,4,4-tetrafluoro-3-(trifluoromethyl)-1-butene), HFC-1447fz (3,3,4,4,5,5,5-heptafluoro-1-pentene), HFC-1447fycc (2,3,3,4,4,5,5-heptafluoro-1-pentene), HFC-1447cz (1,1,3,3,5,5,5-heptafluoro-1-pentene), HFC-1447mytm (1,1,1,2,4,4,4 heptafluoro-3-methyl-2-butene), HFC-1447fyz (2,4,4,4-tetrafluoro-3-(trifluoromethyl)-1-butene), HFC-1447ezz (1,4,4,4-tetrafluoro-3-(trifluoromethyl)-1-butene), HFC-1447qzt (1,4,4,4-tetrafluoro-2-(trifluoromethyl)-2-butene), HFC-1447syt (2,4,4,4-tetrafluoro-2-(trifluoromethyl)-2-butene), HFC-1456szt (3-(trifluoromethyl)-4,4,4-trifluoro-2-butene), HFC-1456szy (3,4,4,5,5,5 hexafluoro-2-pentene), HFC-1456mstz (1,1,1,4,4,4-hexafluoro-2-methyl-2-butene), HFC-1456fzce (3,3,4,5,5,5-hexafluoro-1-pentene), HFC-1456ftmf (4,4,4-trifluoro-2-(trifluoromethyl)-1-butene), FC-151-12c (1,1,2,3,3,4,4,5,5,6,6,6-dodeca-1-hexene, perfluoro-1-hexene), FC-151-12mcy (1,1,1,2,2,3,4,5,5,6,6,6-dodeca-3-hexene, perfluoro-3-hexene), FC-151-12mmtt (1,1,1,4,4,4-hexafluoro-2,3-bis(trifluoromethyl)-2-butene), FC-151-12mmzz (1,1,1,2,3,4,5,5,5-nonafluoro-4-(trifluoromethyl)-2-pentene), HFC-152-11mmtz (1,1,1,4,4,5,5,5-octafluoro-2-(trifluoromethyl)-2-pentene), HFC-152-11mmyyz (1,1,1,3,4,5,5,5-octafluoro-4-(trifluoromethyl)-2-pentene), HFC-152-11mmyyz (1,1,1,3,4,5,5,5-octafluoro-4-(trifluoromethyl)-2-pentene), HFC-1549fz (PFBE) (3,3,4,4,5,5,6,6,6-nonafluoro-1-hexene, perfluorobutyl), HFC-1549fztmm (4,4,4-trifluoro-3,3-bis(trifluoromethyl)-1-butene), HFC-1549mmtts (1,1,1,4,4,4-hexafluoro-3-methyl- 2-(trifluoromethyl)-2-butene), HFC-1549fycz (2,3,3,5,5,5-hexafluoro-4-(trifluoromethyl)-1-pentene), HFC-1549myts (1,1,1,2,4,4,5,5,5-nonafluoro-3-methyl-2-pentene), HFC-1549mzzz (1,1,1,5,5,5-hexafluoro-4-(trifluoromethyl)-2-pentene), HFC-1558szy (3,4,4,5,5,6,6,6-octafluoro-2-hexene), HFC-1558fzccc (3,3,4,4,5,5,6,6-octafluoro-2-hexene), HFC-1558mmtzc (1,1,1,4,4-pentafluoro-2-(trifluoromethyl)-2-pentene), HFC-1558ftmf (4,4,5,5,5-pentafluoro-2-(trifluoromethyl)-1-pentene), HFC-1567fts (3,3,4,4,5,5,5-heptafluoro-2-methyl-1-pentene), HFC-1567szz (4,4,5,5,6,6,6-heptafluoro-2-hexene), HFC-1567fzfc (4,4,5,5,6,6,6-heptafluoro-1-hexene), HFC-1567sfyy (1,1,1,2,2,3,4-heptafluoro-3-hexene), HFC-1567fzfy (4,5,5,5-tetrafluoro-4-(trifluoromethyl)-1-pentene), HFC-1567myzzm (1,1,1,2,5,5,5-heptafluoro-4-methyl-2-pentene), HFC-1567mmtyf (1,1,1,3-tetrafluoro-2-(trifluoromethyl)-2-pentene), FC-161-14myy (1,1,1,2,3,4,4,5,5,6,6,7,7,7-tetradecafluoro-2-heptene), FC-161-14mcyy (1,1,1,2,2,3,4,5,5,6,6,7,7,7-tetradecafluoro-2-heptene), HFC-162-13mzy (1,1,1,3,4,4,5,5,6,6,7,7,7-tridecafluoro-2-heptene), HFC162-13myz (1,1,1,2,4,4,5,5,6,6,7,7,7-tridecafluoro-2-heptene), HFC-162-13mczy (1,1,1,2,2,4,5,5,6,6,7,7,7-tridecafluoro-3-heptene), HFC-162-13mcyz (1,1,1,2,2,3,5,5,6,6,7,7,7-tridecafluoro-3-heptene), CFC-11 (fluorotrichloromethane), CFC-12 (dichlorodifluoromethane), CFC-114 (1,1,2,2-tetrafluoro-1,2-dichloroethane), CFC-114a (1,1,1,2-tetrafluoro-2,2-dichloroethane), CFC-115 (1,1,1,2,2-pentafluoro-2-dichloroethane), HCFC-21 (dichlorofluoromethane), HCFC-22 (chlorodifluoromethane), HCFC-122 (1,1,2-trichloro-2,2-difluoroethane), HCFC-123 (1,1,1-trifluoro-2,2-dichloroethane), HCFC-124 (1,1,1,2-tetrafluoro-2-chloroethane), HCFC-124a (1,1,2,2-tetrafluoro-2-chloroethane), HCFC-132 (dichlorodifluoroethane), HCFC-133a (1,1,1-trifluoro-2-chloroethane), HCFC-141b (1,1-dichloro-1-fluoroethane), HCFC-142 (1,1-difluoro-2-chloroethane), HCFC-142b (1,1-difluoro-1-chloroethane), HCFC-225 ca (3,3-dichloro-1,1,1,2,2-pentafluoropropane), HCFC-225cb (1,3-dichloro-1,1,2,2,3-pentafluoropropane), HCFC-240db (1,1,1,2,3-pentachloropropane), HCFC-243db (1,1,1-trifluoro-2,3-dichloropropane), HCFC-243ab (1,1,1-trifluoro-2,2-dichloropropane), HCFC-244eb (1,1,1,2-tetrafluoro-3-chloropropane), HCFC-244bb (1,1,1,2-tetrafluoro-2-chloropropane), HCFC-244db (1,1,1,3-tetrafluoro-2-chloropropane), HCFC-1111 (1,1,2-trichloro-2-fluoroethylene), HCFC-1113 (1,1,2-trifluoro-2-chloroethylene), HCFC-1223xd (3,3,3-trifluoro-1,2-dichloropropene), HCFC-1224xe (1,3,3,3-tetrafluoro-2-chloropropene), HCFC-1232xf (3,3-difluoro-1,3-dichloropropene), HCFC-1233xf (3,3,3-trifluoro-2-chloropropene), HCFC-1233zd (3,3,3-trifluoro-1-chloropropene), and a mixture of these, etc.; ketone solvents such as acetone, methyl ethyl ketone, diethyl ketone, acetophenone, etc.; mineral oils, silicone oils, natural paraffins, naphthenes, synthetic paraffins, polyalfaolefins, etc., gasoline, kerosene, diesel gasoline, rapeseed oil methyl ester, soybean oil methyl ester, palm oil methyl ester, coconuts oil methyl ester, gas liquefied oil (Gas To Liquid: GTL), coal liquefied oil (Coal To Liquid: CTL), biomass liquefied oil (Biomass To Liquid: BTL), alcohol-containing gasoline, ethyl-t-butyl ether blend oxygen-containing gasoline, amine-containing gasoline, sour gasoline, compressed natural gas (CNG), liquefied petroleum gas (LPG), liquefied hydrocarbon gas (LHG), liquefied natural gas (LNG), dimethyl ether for fuel (DME), castor oil-based brake fluid, glycol ether-based brake fluid, boric acid ester-based brake fluid, brake fluid for an extremely cold region, silicone oil-based brake fluid, mineral oil-based brake fluid, power steering oil, hydrogen sulfide-containing oil, windshield washer liquid, engine coolant, urea solution, medicines, inks, paints, etc. The multilayer tube is suitable as a tube for conveying the chemical liquid, and specifically mentioned fuel tubes such as feed tubes, return tubes, evaporator tubes, fuel filler tubes, ORVR tubes, reserve tubes, bent tubes, etc., hydrogen conveying tubes for fuel cells, oil tubes, oil drilling tubes, pneumatic, hydraulic tubes, clutch tubes, brake tubes, brake negative pressure tubes, suspension tubes, air tubes, turbo air tubes, air duct tubes, blow-by tubes, EGR valve control tubes, tubes for windshield washer liquid, engine coolant (LLC) tubes, reservoir tank tubes, urea solution conveying tubes, cooler tubes for cooling water, refrigerant, etc., tubes for air conditioner refrigerant, heater tubes, radiator tubes, road heating tubes, floor heating tubes, tubes for infrastructure supply, tubes for fire extinguishers and fire extinguishing equipments, tubes for cooling equipments for medical use, tubes for spreading inks and paints, and other chemical liquid tubes. In particular, it is suitable for fuel tubes. That is, the present invention includes use of the multilayer tube as a fuel tube.

EXAMPLES

In the following, the present invention is specifically explained by showing Examples and Comparative Examples, but the present invention is not limited by these.

Incidentally, analyses and measurement methods of properties in Examples and Comparative Examples, and materials used in Examples and Comparative Examples are shown.

Properties of the polyamide were measured by the following methods.

[Relative Viscosity]

It was measured in accordance with JIS K-6920 in 96% sulfuric acid with a polyamide concentration of 1% under the condition of a temperature of 25° C.

[Concentration of Terminal Amino Groups of Polyamide (A1) and Polyamide (A2)]

In an Erlenmeyer flask equipped with a stop cock was charged a predetermined amount of a polyamide sample, 40 mL of a previously prepared solvent phenol/methanol (volume ratio: 9/1) was added thereto, and then, the mixture was stirred and dissolved with a magnetic stirrer, then, titration was carried out with 0.05N hydrochloric acid using thymol blue as an indicator to obtain the terminal amino group concentration.

[Concentration of Terminal Carboxyl Groups of Polyamide (A1) and Polyamide (A2)]

In a three-necked pear-shaped flask is charged a predetermined amount of a polyamide sample, 40 mL of benzyl alcohol is added thereto, and then, the flask is immersed in an oil bath set at 180° C. under a nitrogen stream. The mixture was stirred and dissolved by a stirring motor attached to the upper portion, titration was carried out with a 0.05N sodium hydroxide solution using phenolphthalein as an indicator to obtain the terminal carboxyl group concentration.

[Total Concentration of Carboxyl Group and Acid Anhydride Group of Elastomer Polymer (A3)]

In a three-necked pear-shaped flask was charged a predetermined amount of an elastomer polymer sample, dissolved in 170 mL of toluene, and further 30 mL of ethanol was added thereto, and using the prepared sample solution, titration was carried out with a 0.1N KOH ethanol solution using phenolphthalein as an indicator to obtain the total concentration of the carboxyl group and the acid anhydride group.

Also, the characteristics of the fluorine-containing polymer were measured by the following methods.

[Content of Each Constitutional Unit of Fluorine-Containing Polymer]

A ratio (mol %) of each constitutional unit was obtained by melt NMR (nuclear magnetic resonance) analysis and fluorine content analysis.

[Content of Constitutional Unit Based on Itaconic Anhydride (IAH)]

The fluorine-containing polymer was subjected to press-molding to obtain a film having 200 μm. In the infrared absorption spectrum, an absorption peak derived from a constitutional unit based on IAH in the fluorine-containing polymer appears at 1870 $cm^{-1}$. The absorbance of the absorption peak was measured, and the ratio (mol %) of the constitutional unit based on IAH was determined using the molar absorption coefficient of IAH of 237 L/(mol·cm) obtained from the model compound.

[Content of Constitutional Unit Based on 5-Norbornene-2,3-Dicarboxylic Acid Anhydride (NAH)]

The fluorine-containing polymer was subjected to press-molding to obtain a film having 200 μm. In the infrared absorption spectrum, an absorption peak derived from a constitutional unit based on NAH in the fluorine-containing polymer appears at 1778 $cm^{-1}$. The absorbance of the absorption peak was measured, and the ratio (mol %) of the constitutional unit based on NAH was determined using the molar absorption coefficient of NAH of 20,810 L/(mol·cm) obtained from the model compound.

[Number of Terminal Carbonate Groups in Fluorine-Containing Polymer]

With regard to the number of the terminal carbonate groups in the fluorine-containing polymer, by infrared absorption spectrum analysis, the peak to which the carbonyl group of the carbonate group (—OC(═O)O—) belongs appears at an absorption wavelength of 1810 to 1815 $cm^{-1}$, the absorbance of the absorption peak was measured, and the number of the carbonate groups per $10^6$ main chain carbon atoms in the fluorine-containing polymer was calculated by the following equation.

[Number of carbonate groups per $10^6$ main chain carbon atoms in fluorine-containing polymer]=500 AW/εdf A: Absorbance of peak of carbonate group (—OC(═O)O—)

ε: Mole absorbance coefficient [$cm^{-1}\cdot mol^{-1}$] of carbonate group (—OC(═O)O—). From the model compound, ε was made 170.

W: Composition average molecular weight calculated from monomer composition d: Density of film [$g/cm^3$]

f: Thickness of film [mm]

In addition, the melting points of the polyamide and the fluorine-containing polymer were measured by the following method.

[Melting point]

In accordance with ISO 11357-3, using a differential scanning calorimeter, the sample is heated to a temperature equal to or higher than the expected melting point and then, the sample is cooled at a rate of 20° C. per a minute, and after cooling to 30° C., it is allowing to stand as such for about 1 minutes and raising the temperature at a rate of 20° C. per a minute whereby the temperature at the peak value of the measured melting curve is defined to be the melting point.

The respective properties of the multilayer tube were measured by the following methods.

[Chemical Liquid-Barrier Property (Alcohol-Containing Gasoline-Barrier Property)]

One end of the tube cut to 200 mm was sealed, an alcohol-containing gasoline (CE10) mixed with isooctane/toluene/ethanol=45/45/10% by volume was charged therein, and the other end was also sealed. Thereafter, the entire mass was measured, and then, the test tube was placed in an oven at 60° C., and change of the mass was measured every day. The change in mass per day was divided by the surface area of the inner layer per meter of the tube to calculate the permeation amount of alcohol-containing gasoline ($g/m^2$·day). When the permeation amount of the alcohol-containing gasoline (CE10) was 10 $g/m^2$·day or less, it was judged to be excellent in chemical liquid-barrier property.

[Chemical Resistance (Zinc Chloride Resistance)]

A joint made of a metal was press-fitted into the end of the tube, and immersed in zinc chloride by the method described in SAE J-2260 7.12. Thereafter, the sample was taken out and the presence or absence of cracks was confirmed. Using the sample subjected to immersion treatment, an impact test was carried out at −40° C. by the method described in SAE J-2260 7.5.

[Interlayer Adhesiveness (Initial Peel Strength)]

The tube cut to 200 mm was further cut in half in the longitudinal direction to prepare a test piece. Using a universal material testing machine (manufactured by Orientec Co., Ltd., Tensilon UTMIII-200), a 90° peeling test was carried out at a tensile speed of 50 mm/min. The peeling strength was red from the maximum point of the S-S curve, interlayer adhesiveness was evaluated.

[Durability of Interlayer Adhesiveness (Peeling Strength after Heat Treatment)]

The tube cut to 200 mm was placed in an oven at 160° C., and treated for 30 minutes. Interlayer adhesiveness of the taken out tube was evaluated according to the above-mentioned method. When the peeling strength after heat treatment was 3.0 N/mm or more, it was judged to be excellent in durability of interlayer adhesiveness.

[Materials Used in Examples and Comparative Examples]

Polyamide (A1)

Production of Polyamide 12 (A1-1)

In a pressure-resistant reaction vessel equipped with a stirrer and having an inner volume of 70 liters were charged 19.73 kg (100.0 mol) of dodecane lactam, 45.0 g (0.264 mol) of 5-amino-1,3,3-trimethylcyclohexanemethylamine and 0.5 L of distilled water, and after replacing inside of the polymerization tank with nitrogen, the mixture was heated to 180° C. and stirred so that the inside of the reaction system became a uniform state at this temperature. Then, the temperature in the polymerization tank was raised to 270° C., and polymerization was carried out for 2 hours under stirring while adjusting the pressure in the tank to 3.5 MPa. Thereafter, the pressure was released to normal pressure over about 2 hours, then, the pressure was reduced to 53 kPa and polymerization was carried out under reduced pressure for 5 hours. Then, nitrogen was introduced into the autoclave, and after the pressure was restored to normal pressure, the product was drawn out from the nozzle at the lower portion of the reaction vessel and cut to obtain pellets. The pellets were dried under reduced pressure to obtain a polyamide 12 having a relative viscosity of 2.10, a terminal amino group concentration of 48 μeq/g, and a terminal carboxyl group concentration of 24 μeq/g (hereinafter the polyamide 12 is referred to as (A1-1).). The ratio of the number of the methylene groups to the number of the amide groups $[CH_2]/[NHCO]$ of the polyamide 12 (A1-1) is 11.0, which satisfies 8.0 or more. The melting point of the polyamide 12 (A1-1) measured in accordance with ISO 11357-3 is 178° C., which satisfies 210° C. or lower. The solubility parameter SP value of the polyamide 12 (A1-1) is 22.5 $(MPa)^{1/2}$.

Production of Polyamide 1010 (A1-2)

In a pressure-resistant reaction vessel equipped with a stirrer and having an inner volume of 70 liters were charged 17.82 kg (50.0 mol) of equimolar salt of 1,10-decanediamine and sebacic acid, 29.3 g (0.17 mol) of 1,10-decanediamine and 5.0 L of distilled water, and after replacing inside of the polymerization tank with nitrogen, the mixture was heated to 220° C. and stirred so that the inside of the reaction system became a uniform state at this temperature. Then, the temperature in the polymerization tank was raised to 270° C., and polymerization was carried out for 2 hours under stirring while adjusting the pressure in the tank to 1.7 MPa. Thereafter, the pressure was released to normal pressure over about 2 hours, then, the pressure was reduced to 53 kPa and polymerization was carried out under reduced pressure for 4 hours. Then, nitrogen was introduced into the autoclave, and after the pressure was restored to normal pressure, the product was drawn out from the nozzle at the lower portion of the reaction vessel and cut to obtain pellets. The pellets were dried under reduced pressure to obtain a polyamide 1010 having a relative viscosity of 2.22, a terminal amino group concentration of 45 μeq/g and a terminal carboxyl group concentration of 28 μeq/g (hereinafter the polyamide 1010 is referred to as (A1-2).). The ratio of the number of the methylene groups to the number of the amide groups $[CH_2]/[NHCO]$ of the polyamide 1010 (A1-2) is 9.0, which satisfies 8.0 or more. The melting point of the polyamide 1010 (A1-2) measured in accordance with ISO 11357-3 is 203° C., which satisfies 210° C. or lower. The solubility parameter SP value of the polyamide 1010 (A1-2) is 23.5 $(MPa)^{1/2}$.

Polyamide (A2)

Production of Polyamide 6/12 (A2-1)

In a pressure-resistant reaction vessel equipped with a stirrer and having an inner volume of 70 liters were charged 9.90 kg (87.5 mol) of caprolactam, 2.69 kg (12.5 mol) of 12-aminododecanoic acid, 20.0 g (0.12 mol) of 5-amino-1,3,3-trimethylcyclohexanemethylamine and 2.0 L of distilled water, and the mixture was heated to 100° C. and stirred so that the inside of the reaction system became a uniform state at this temperature. Subsequently, the temperature was further raised to 260° C., and the mixture was stirred under a pressure of 2.5 MPa for 1 hour. Thereafter, polymerization reaction was carried out at 260° C. for 2 hours under normal pressure while releasing the pressure to evaporate the water from the reaction vessel, and polymerization reaction was further carried out at 260° C. under a reduced pressure of 53 kPa for 4 hours. After completion of the reaction, the reaction product drawn out from the nozzle at the lower portion of the reaction vessel in a strand-state was introduced into a water tank and cooled, and subjected to cutting to obtain pellets. The pellets were dipped in hot water, and after removing the unreacted monomer by extraction, dried under reduced pressure to obtain a polyamide 6/12 (caproamide unit/dodecaneamide unit=87.5/12.5 mol %) having a relative viscosity of 2.63, a terminal amino group concentration of 54 μeq/g and a terminal carboxyl group concentration of 40 μeq/g (hereinafter this polyamide 6/12 is referred to as (A2-1).). The ratio of the number of the methylene groups to the number of the amide groups $[CH_2]/[NHCO]$ of the polyamide 6/12 (A2-1) is 5.75, which is less than 8.0. In addition, the melting point of the polyamide 6/12 (A2-1) measured in accordance with ISO 11357-3 is 200° C. The solubility parameter SP value of the polyamide 6/12 (A2-1) is 26.4 $(MPa)^{1/2}$.

Production of Polyamide 6 (A2-2)

In the production of the polyamide 6/12 (A2-1), the same method as in the production of the polyamide 6/12 (A2-1) was carried out except for changing 9.90 kg (87.5 mol) of caprolactam and 2.69 kg (12.5 mol) of 12-aminododecanoic acid to 11.32 kg (100.0 mol) of caprolactam, and changing 20.0 g (0.12 mol) of 5-amino-1,3,3-trimethylcyclohexanemethylamine to 80.0 g (0.47 mol) to obtain a polyamide 6 having a relative viscosity of 2.50, a terminal amino group concentration of 112 μeq/g and a terminal carboxyl group concentration of 33 μeq/g (hereinafter the polyamide 6 is referred to as (A2-2).). The ratio of the number of the methylene groups to the number of the amide groups $[CH_2]/[NHCO]$ of the polyamide 6 (A2-2) is 5.0, which is less than 8.0. In addition, the melting point of the polyamide 6 (A2-2) measured in accordance with ISO 11357-3 is 220° C. The solubility parameter SP value of the polyamide 6 (A2-2) is 26.9 $(MPa)^{1/2}$.

Production of Polyamide 6 (A2-3)

In the production of the polyamide 6 (A2-2), the same method as in the production of the polyamide 6 (A2-2) was carried out except for not using 80.0 g (0.47 mol) of 5-amino-1,3,3-trimethylcyclohexanemethylamine to obtain a polyamide 6 having a relative viscosity of 3.50, a terminal amino group concentration of 38 μeq/g and a terminal carboxyl group concentration of 40 μeq/g (hereinafter the polyamide 6 is referred to as (A2-3).). The ratio of the number of the methylene groups to the number of the amide groups $[CH_2]/[NHCO]$ of the polyamide 6 (A2-3) is 5.0, which is less than 8.0. In addition, the melting point of the polyamide 6 (A2-3) measured in accordance with ISO 11357-3 is 220° C. The solubility parameter SP value of the polyamide 6 (A2-3) is 26.9 $(MPa)^{1/2}$.

Production of Polyamide 610 (A2-4)

In the production of the polyamide 1010 (A1-2), the same method as in the production of the polyamide 1010 (A1-2) was carried out except for changing 17.82 kg (50.0 mol) of the equimolar salt of 1,10-decanediamine and sebacic acid to 15.02 kg (50.0 mol) of the equimolar salt of 1,6-hexanediamine and sebacic acid, and 29.3 g (0.17 mol) of 1,10-decanediamine to 15.1 g (0.13 mol) of 1,6-hexanediamine to obtain a polyamide 610 having a relative viscosity of 2.58, a terminal amino group concentration of 53 μeq/g and a terminal carboxyl group concentration of 33 μeq/g (hereinafter the polyamide 610 is referred to as (A2-4).). The ratio of the number of the methylene groups to the number of the amide groups $[CH_2]/[NHCO]$ of the polyamide 610 (A2-4) is 7.0, which is less than 8.0. In addition, the melting point of the polyamide 610 (A2-4) measured in accordance with ISO 11357-3 is 220° C. The solubility parameter SP value of the polyamide 610 (A2-4) is 24.9 $(MPa)^{1/2}$.

Production of Polyamide 612 (A2-5)

In the production of the polyamide 1010 (A1-2), the same method as in the production of the polyamide 1010 (A1-2) was carried out except for changing 17.82 kg (50.0 mol) of the equimolar salt of 1,10-decanediamine and sebacic acid to 16.42 kg (50.0 mol) of the equimolar salt of 1,6-hexanediamine and dodecanedioic acid, and 29.3 g (0.17 mol) of 1,10-decanediamine to 16.3 g (0.14 mol) of 1,6-hexanediamine to obtain a polyamide 612 having a relative viscosity of 2.48, a terminal amino group concentration of 50 μeq/g and a terminal carboxyl group concentration of 35 μeq/g (hereinafter this polyamide 612 is referred to as (A2-5).).

The ratio of the number of the methylene groups to the number of the amide groups $[CH_2]/[NHCO]$ of the polyamide 612 (A2-5) is 8.0, which satisfies 8.0 or more. However, the melting point of the polyamide 612 (A2-5) measured in accordance with ISO 11357-3 is 218° C., which does not satisfy 210° C. or lower. The solubility parameter SP value of the polyamide 612 (A2-5) is 24.1 $(MPa)^{1/2}$.

Elastomer Polymer (A3)

Maleic anhydride-modified ethylene/l-butene copolymer (A3-1) (available from Mitsui Chemicals, Inc., TAFMER MH5010, acid anhydride group concentration: 50 μeq/g)

Maleic anhydride-modified ethylene/l-butene copolymer (A3-2) (available from Mitsui Chemicals, Inc., TAFMER M115020, acid anhydride group concentration: 100 μeq/g)

Aliphatic Polyamide Composition (A)

Production of Polyamide 12 Composition (A-1)

With the polyamide 12 (A1-1) were previously mixed the polyamide 6/12 (A2-1), the maleic anhydride-modified ethylene/1-butene copolymer (A3-1), triethylene glycol-bis[3-(3-t-butyl-5-methyl-4-hydroxyphenyl)propionate] (available from BASF Japan, IRGANOX245) as an antioxidant and tris(2,4-di-t-butylphenyl)phosphite (available from BASF Japan, IRGAFOS168) as a phosphorus-based processing stabilizer, and the mixture was supplied to a twin-screw melt/kneader (manufactured by The Japan Steel Works, Ltd., Model type: TEX44), melt-kneaded at a cylinder temperature of from 180° C. to 270° C., after a molten resin was extruded into a strand-state, the material was introduced into a water tank, cooled, cut and vacuum-dried to obtain pellets of a polyamide 12 composition (hereinafter this polyamide 12 composition is referred to as (A-1).) comprising 0.8 part by mass of the antioxidant and 0.2 part by mass of the phosphorus-based processing stabilizer based on the total of the polyamide 12 (A1-1)/polyamide 6/12 (A2-1)/elastomer polymer (A3-1)=60.0/20.0/20.0 (% by mass) as 100 parts by mass. The absolute value [|(SP value of polyamide 12 (A1-1))−(SP value of polyamide 6/12 (A2-1))|] of the difference in the solubility parameter SP values of the polyamide (A1) and the polyamide (A2) is |22.5−26.4|=3.9 $(MPa)^{1/2}$, which satisfies 1.8 $(MPa)^{1/2}$ or more and 5.5 $(MPa)^{1/2}$ or less. In addition, the terminal amino group concentration [A] (μeq/g) and the terminal carboxyl group concentration [B] (μeq/g) of the polyamide 12 composition (A-1) satisfies [A]>[B]+10.

Production of Polyamide 12 Composition (A-2)

In the production of the polyamide 12 composition (A-1), the same method as in the production of the polyamide 12 composition (A-1) was carried out except for changing the addition amounts of the polyamide 12 (A1-1) and the polyamide 6/12 (A2-1) to obtain pellets of a polyamide 12 composition (hereinafter the polyamide 12 composition is referred to as (A-2).) comprising 0.8 part by mass of the antioxidant and 0.2 part by mass of the phosphorus-based processing stabilizer based on the total of the polyamide 12 (A1-1)/polyamide 6/12 (A2-1)/elastomer polymer (A3-1) 65.0/15.0/20.0 (% by mass) as 100 parts by mass. The absolute value [|(SP value of polyamide 12 (A1-1))−(SP value of polyamide 6/12 (A2-1))|] of the difference in the solubility parameter SP values of the polyamide (A1) and the polyamide (A2) is |22.5−26.4|=3.9 $(MPa)^{1/2}$, which satisfies 1.8 $(MPa)^{1/2}$ or more and 5.5 $(MPa)^{1/2}$ or less. Also, the terminal amino group concentration of [A] (μeq/g) and the terminal carboxyl group concentration of [B] (μeq/g) of the polyamide 12 composition (A-2) satisfies [A]>[B]+10.

Production of Polyamide 12 Composition (A-3)

In the production of the polyamide 12 composition (A-1), the same method as in the production of the polyamide 12 composition (A-1) was carried out except for changing the addition amounts of the polyamide 12 (A1-1) and the polyamide 6/12 (A2-1) to obtain pellets of a polyamide 12 composition (hereinafter the polyamide 12 composition is referred to as (A-3).) comprising 0.8 part by mass of the antioxidant and 0.2 part by mass of the phosphorus-based processing stabilizer based on the total of the polyamide 12 (A1-1)/polyamide 6/12 (A2-1)/elastomer polymer (A3-1) =55.0/25.0/20.0 (% by mass) as 100 parts by mass. The absolute value [|(SP value of polyamide 12 (A1-1))−(SP value of polyamide 6/12 (A2-1))|] of the difference in the solubility parameter SP values of the polyamide (A1) and the polyamide (A2) is |22.5−26.4|=3.9 $(MPa)^{1/2}$, which satisfies 1.8 $(MPa)^{1/2}$ or more and 5.5 $(MPa)^{1/2}$ or less. In addition, the terminal amino group concentration of [A] (μeq/g) and the terminal carboxyl group concentration of [B] (μeq/g) of the polyamide 12 composition (A-3) satisfies [A]>[B]+10.

Production of Polyamide 12 Composition (A-4)

In the production of the polyamide 12 composition (A-1), the same method as in the production of the polyamide 12 composition (A-1) was carried out except for changing polyamide 6/12 (A2-1) to polyamide 6 (A2-2) to obtain pellets of a polyamide 12 composition (hereinafter the polyamide 12 composition is referred to as (A-4).) comprising 0.8 part by mass of the antioxidant and 0.2 part by mass of the phosphorus-based processing stabilizer based on the total of the polyamide 12 (A1-1)/polyamide 6 (A2-2)/elastomer polymer (A3-1)=60.0/20.0/20.0 (% by mass) as 100 parts by mass. The absolute value [|(SP value of polyamide 12 (A1-1))−(SP value of polyamide 6 (A2-2))|] of the difference in the solubility parameter SP values of the polyamide (A1) and the polyamide (A2) is |22.5−26.9|=4.4 $(MPa)^{1/2}$, which satisfies 1.8 $(MPa)^{1/2}$ or more and 5.5 $(MPa)^{1/2}$ or less. In addition, the terminal amino group concentration of [A] (μeq/g) and the terminal carboxyl group concentration of [B] (μeq/g) of the polyamide 12 composition (A-4) satisfies [A]>[B]+10.

Production of Polyamide 12 Composition (A-5)

In the production of the polyamide 12 composition (A-1), the same method as in the production of the polyamide 12 composition (A-1) was carried out except for changing the polyamide 6/12 (A2-1) to the polyamide 610 (A2-4) to obtain pellets of a polyamide 12 composition (hereinafter the polyamide 12 composition is referred to as (A-5).) comprising 0.8 part by mass of the antioxidant and 0.2 part by mass of the phosphorus-based processing stabilizer based on the total of the polyamide 12 (A1-1)/polyamide 610 (A2-4)/elastomer polymer (A3-1)=55.0/25.0/20.0 (% by mass) as 100 parts by mass. The absolute value [|(SP value of polyamide 12 (A1-1))−(SP value of polyamide 610 (A2-4))|] of the difference in the solubility parameter SP values of the polyamide (A1) and the polyamide (A2) is |22.5−24.9|=2.4 $(MPa)^{1/2}$, which satisfies 1.8 $(MPa)^{1/2}$ or more and 5.5 $(MPa)^{1/2}$ or less. Also, the terminal amino group concentration of [A] (μeq/g) and the terminal carboxyl group concentration of [B] (μeq/g) of the polyamide 12 composition (A-5) satisfies [A]>[B]+10.

Production of Polyamide 12 Composition (A-6)

In the production of the polyamide 12 composition (A-1), the same method as in the production of the polyamide 12 composition (A-1) was carried out except for changing the maleic anhydride-modified ethylene/1-butene copolymer (A3-1) to (A3-2) to obtain pellets of a polyamide 12 composition (hereinafter the polyamide 12 composition is referred to as (A-6).) comprising 0.8 part by mass of the antioxidant and 0.2 part by mass of the phosphorus-based processing stabilizer based on the total of the polyamide 12 (A1-1)/polyamide 6/12 (A2-1)/elastomer polymer (A3-2) =60.0/20.0/20.0 (% by mass) as 100 parts by mass. The absolute value [|(SP value of polyamide 12 (A14))−(SP value of polyamide 6/12 (A2-1))|] of the difference in the solubility parameter SP values of the polyamide (A1) and the polyamide (A2) is |22.5−26.4|=3.9 $(MPa)^{1/2}$, which satisfies 1.8 $(MPa)^{1/2}$ or more and 5.5 $(MPa)^{1/2}$ or less. Also, the terminal amino group concentration of [A] (μeq/g) and the terminal carboxyl group concentration of [B] (μeq/g) of the polyamide 12 composition (A-6) satisfies [A]>[B]+10.

Production of Polyamide 1010 Composition (A-7)

In the production of the polyamide 12 composition (A-1), the same method as in the production of the polyamide 12 composition (A-1) was carried out except for changing the polyamide 12 (A1-1) to the polyamide 1010 (A1-2) to obtain pellets of a polyamide 1010 composition (hereinafter the polyamide 1010 composition is referred to as (A-7).) comprising 0.8 part by mass of the antioxidant and 0.2 part by mass of the phosphorus-based processing stabilizer based on the total of the polyamide 1010 (A1-2)/polyamide 6/12 (A2-1)/elastomer polymer (A3-1)=65.0/15.0/20.0 (% by mass) as 100 parts by mass. The absolute value [|(SP value of polyamide 1010 (A1-2))−(SP value of polyamide 6/12 (A2-1))|] of the difference in the solubility parameter SP values of the polyamide (A1) and the polyamide (A2) is |23.5−26.4|=2.9 $(MPa)^{1/2}$, which satisfies 1.8 $(MPa)^{1/2}$ or more and 5.5 $(MPa)^{1/2}$ or less. Also, the terminal amino group concentration of [A] (μeq/g) and the terminal carboxyl group concentration of [B] (μeq/g) of the polyamide 12 composition (A-7) satisfies [A]>[B]+10.

Production of Conductive Polyamide 12 Composition (A-8)

In the production of the polyamide 12 composition (A-1), the same method as in the production of the polyamide 12 composition (A-1) was carried out except for using carbon black (available from CABOT Corporation, VULCAN XC-72) as a conductive filler, and changing the cylinder temperature from 270° C. to 290° C. to obtain pellets of a conductive polyamide 12 composition (hereinafter the conductive polyamide 12 composition is referred to as (A-8).) which comprises 25 parts by mass of the conductive filler, 0.8 part by mass of the antioxidant and 0.2 part by mass of the phosphorus-based processing stabilizer based on the total of the polyamide 12 (A1-1)/polyamide 6/12 (A2-1)/elastomer polymer (A3-1)=50.0/25.0/25.0 (% by mass) as 100 parts by mass. The absolute value [|(SP value of polyamide 12 (A1-1))−(SP value of polyamide 6/12 (A2-1))|] of the difference in the solubility parameter SP values of the polyamide (A1) and the polyamide (A2) is |22.5−26.4|=3.9 $(MPa)^{1/2}$, which satisfies 1.8 $(MPa)^{1/2}$ or more and 5.5 $(MPa)^{1/2}$ or less. Also, the terminal amino group concentration of [A] (μeq/g) and the terminal carboxyl group concentration of [B] (μeq/g) of the conductive polyamide 12 composition (A-8) satisfies [A]>[B]+10.

Production of Polyamide 12 Composition (A-9)

In the production of the polyamide 12 composition (A-1), the same method as in the production of the polyamide 12 composition (A-1) was carried out except for not using the polyamide 6/12 (A2-1), and injecting benzenesulfonic acid butyramide as a plasticizer from the middle of the cylinder of the twin-screw melt/kneader by a quantitative pump to obtain pellets of a polyamide 12 composition (hereinafter the polyamide 12 composition is referred to as (A-9).) comprising 0.8 part by mass of the antioxidant and 0.2 part by mass of the phosphorus-based processing stabilizer based on the total of the polyamide 12 (A1-1)/elastomer polymer (A3-1)/plasticizer=87.5/10.0/2.5 (% by mass) as 0.100 parts by mass. Since this is not using the polyamide 6/12 (A2-1), so that the absolute value of the difference in the solubility parameter SP values of the polyamide (A1) and the polyamide (A2) is conveniently [|(SP value of polyamide 12 (A1-1))−0|]=|22.5−0|=22.5 $(MPa)^{1/2}$, which does not satisfy 1.8 $(MPa)^{1/2}$ or more and 5.5 $(MPa)^{1/2}$ or less. In addition, the terminal amino group concentration of [A] (μeq/g) and the terminal carboxyl group concentration of [B] (μeq/g) of the polyamide 12 composition (A-9) satisfies [A]>[B]+10.

Production of Polyamide 12 Composition (A-10)

In the production of the polyamide 12 composition (A-1), the same method as in the production of the polyamide 12 composition (A-1) was carried out except for not using the polyamide 6/12 (A2-1) to obtain pellets of a polyamide 12 composition (hereinafter the polyamide 12 composition is referred to as (A-10).) comprising 0.8 part by mass of the antioxidant and 0.2 part by mass of the phosphorus-based processing stabilizer based on the total of the polyamide 12 (A1-1)/elastomer polymer (A3-1)=80.0/20.0 (% by mass) as 100 parts by mass. Since this is not using the polyamide 6/12 (A2-1), so that the absolute value of the difference in the solubility parameter SP values of the polyamide (A1) and the polyamide (A2) is conveniently [|(SP value of polyamide 12 (A1-1))−0|]=|22.5−0|=22.5 $(MPa)^{1/2}$, which does not satisfy 1.8 $(MPa)^{1/2}$ or more and 5.5 $(MPa)^{1/2}$ or less. In addition, the terminal amino group concentration of [A] (μeq/g) and the terminal carboxyl group concentration of [B] (μeq/g) of the polyamide 12 composition (A-10) satisfies [A]>[B]+10.

Production of Polyamide 12 Composition (A-11)

In the production of the polyamide 12 composition (A-1), the same method as in the production of the polyamide 12 composition (A-1) was carried out except for changing the polyamide 6/12 (A2-1) to the polyamide 1010 (A1-2) to obtain pellets of a polyamide 12 composition (hereinafter the polyamide 12 composition is referred to as (A-11).) comprising 0.8 part by mass of the antioxidant and 0.2 part by mass of the phosphorus-based processing stabilizer based on the total of the polyamide 12 (A1-1)/polyamide 1010 (A1-2)/elastomer polymer (A3-1)=60.0/20.0/20.0 (% by mass) as 100 parts by mass. The absolute value [|(SP value of polyamide 12 (A1-1))−(SP value of polyamide 1010 (A1-2))|] of the difference in the solubility parameter SP values of the polyamide (A1) and the polyamide (A2) is |22.5−23.5|=1.0 $(MPa)^{1/2}$, which does not satisfy 1.8 $(MPa)^{1/2}$ or more and 5.5 $(MPa)^{1/2}$ or less. In addition, the terminal amino group concentration of [A] (μeq/g) and the terminal carboxyl group concentration of [B] (μeq/g) of the polyamide 12 composition (A-11) satisfies [A]>[B]+10.

Production of Polyamide 12 Composition (A-12)

In the production of the polyamide 12 composition (A-1), the same method as in the production of the polyamide 12 composition (A-1) was carried out except for changing the polyamide 6/12 (A2-1) to the polyamide 6 (A2-2), and changing the added amounts of the polyamide 12 (A1-1) and the polyamide 6 (A2-2) to obtain pellets of a polyamide 12 composition (hereinafter the polyamide 12 composition is referred to as (A-12).) comprising 0.8 part by mass of the antioxidant and 0.2 part by mass of the phosphorus-based processing stabilizer based on the total of the polyamide 12 (A1-1)/polyamide 6 (A2-2)/elastomer polymer (A3-1)= 40.0/40.0/20.0 (% by mass) as 100 parts by mass. The absolute value [|(SP value of polyamide 12 (A1-1))−(SP value of polyamide 6 (A2-2))|] of the difference in the solubility parameter SP values of the polyamide (A1) and the polyamide (A2) is |22.5−26.9|=4.4 $(MPa)^{1/2}$, which satisfies 1.8 $(MPa)^{1/2}$ or more and 5.5 $(MPa)^{1/2}$ or less. Also, the terminal amino group concentration of [A] (μeq/g) and the terminal carboxyl group concentration of [B] (μeq/g) of the polyamide 12 composition (A-12) satisfies [A]>[B]+10.

Semi-Aromatic Polyamide (131)

Production of Semi-Aromatic Polyamide (B11-1)

In an autoclave were charged 3.602 kg (31.0 mol) of 1,6-hexanediamine, 2.483 kg (15.0 mol) of terephthalic acid, 1.738 kg (10.5 mol) of isophthalic acid, 0.655 kg (4.5 mol) of adipic acid, 65.9 g (0.54 mol) of benzoic acid, 8.5 g (0.1% by mass based on the starting materials) of sodium hypophosphite monohydrate and 3.0 L of distilled water, and inside thereof was purged with nitrogen. The mixture was stirred at 100° C. for 30 minutes, and the internal temperature was raised to 200° C. over 2 hours. At this time, the pressure in the autoclave was increased to 3.1 MPa. After continuing the reaction for 1 hour as such, the temperature was raised to 250° C., and thereafter, the temperature was maintained at 230° C. for 2 hours and polymerization was carried out while gradually removing water vapor and maintaining the pressure at 3.1 MPa. Next, the pressure was reduced to 1.0 MPa over 30 minutes, and further reacted for 1 hour to obtain a prepolymer. This was dried at 100° C. under reduced pressure for 12 hours, pulverized to a size of 2 mm or less, and subjected to solid-phase polymerization at 210° C. under 0.013 kPa for 8 hours to obtain a semi-aromatic polyamide (polyamide 6T/6I/66=50.0/35.0/15.0 mol %) (hereinafter this semi-aromatic polyamide is referred to as (B11-1).) having a melting point of 266° C. and a relative viscosity of 2.28.

Production of Semi-Aromatic Polyamide (1311-2)

In the production of the semi-aromatic polyamide (B11-1), the same method as in the production of the semi-aromatic polyamide (B11-1) was carried out except for changing 3.602 kg (31.0 mol) of 1,6-hexanediamine, 2.483 kg (15.0 mol) of terephthalic acid, 1.738 kg (10.5 mol) of isophthalic acid and 0.655 kg (4.5 mol) of adipic acid to 1.801 kg (15.5 mol) of 1,6-hexanediamine, 1.801 kg (15.5 mol) of 2-methyl-1,5-pentanediamine and 4.983 kg (30.0 mol) of terephthalic acid, and changing the polymerization temperature from 230° C. to 260° C. and the solid phase polymerization temperature from 210° C. to 240° C. to obtain a semi-aromatic polyamide (polyamide 6T/M5T=50.0/50.0 mol %) (hereinafter this semi-aromatic polyamide is referred to as (B11-2).) having a melting point of 301° C. and a relative viscosity of 2.35.

Production of Semi-Aromatic Polyamide (B11-3)

In the production of the semi-aromatic polyamide (B11-1), the same method as in the production of the semi-aromatic polyamide (B11-1) was carried out except for changing 3.602 kg (31.0 mol) of 1,6-hexanediamine, 2.483 kg (15.0 mol) of terephthalic acid, 1.738 kg (10.5 mol) of isophthalic acid and 0.655 kg (4.5 mol) of adipic acid to 2.522 kg (21.7 mol) of 1,6-hexanediamine, 3.489 kg (21.0 mol) of terephthalic acid and 1.018 kg (9.0 mol) of caprolactam, and changing the polymerization temperature from 230° C. to 260° C. and the solid phase polymerization temperature from 210° C. to 240° C. to obtain a semi-aromatic polyamide (polyamide 6T/6=70.0/30.0 mol %) (hereinafter this semi-aromatic polyamide is referred to as (B11-3).) having a melting point of 295° C. and a relative viscosity of 2.34.

Production of Semi-Aromatic Polyamide (B11-4)

In the production of the semi-aromatic polyamide (B11-1), the same method as in the production of the semi-aromatic polyamide (B11-1) was carried out except for changing 3.602 kg (31.0 mol) of 1,6-hexanediamine, 2.483 kg (15.0 mol) of terephthalic acid, 1.738 kg (10.5 mol) of isophthalic acid and 0.655 kg (4.5 mol) of adipic acid to 2.522 kg (21.7 mol) of 1,6-hexanediamine, 1.602 kg (9.3 mol) of 1,10-decanediamine, 4.135 kg (24.0 mol) of terephthalic acid and 1.034 kg (6.0 mol) of isophthalic acid, and changing the polymerization temperature from 230° C. to 260° C. and the solid phase polymerization temperature from 210° C. to 240° C. to obtain a semi-aromatic polyamide polymer (polyamide 6T/6I/10T/10I=56.0/24.0/14.0/6.0 mol %) (hereinafter this semi-aromatic polyamide polymer is referred to as (B11-4).) having a melting point of 302° C. and a relative viscosity of 2.32.

Production of Semi-Aromatic Polyamide (B11-5)

In the production of the semi-aromatic polyamide (B11-1), the same method as in the production of the semi-aromatic polyamide (B11-1) was carried out except for changing 2.483 kg (15.0 mol) of terephthalic acid, 1.738 kg (10.5 mol) of isophthalic acid and 0.655 kg (4.5 mol) of adipic acid to 2.392 kg (14.4 mol) of terephthalic acid, 1.595 kg (9.6 mol) of isophthalic acid and 1.213 kg (6.0 mol) of sebacic acid, and changing the polymerization temperature from 230° C. to 260° C. and the solid phase polymerization temperature from 210° C. to 240° C. to obtain a semi-aromatic polyamide (polyamide 6T/6I/610=48.0/32.0/20.0 mol %) (hereinafter this semi-aromatic polyamide is referred to as (B11-5).) having a melting point of 289° C. and a relative viscosity of 2.20.

Production of Semi-Aromatic Polyamide (B11-6)

In the production of the semi-aromatic polyamide (B11-1), the same method as in the production of the semi-aromatic polyamide (B11-1) was carried out except for changing the solid phase polymerization time from 8 hours to 4 hours to obtain a semi-aromatic polyamide (polyamide 6T/6I/66=50.0/35.0/15.0 mol %) (hereinafter this semi-aromatic polyamide is referred to as (B11-6).) having a melting point of 266° C. and a relative viscosity of 2.05.

Production of Semi-Aromatic Polyamide (B12-1)

In the production of the semi-aromatic polyamide (B11-1), the same method as in the production of the semi-aromatic polyamide (B11-1) was carried out except for changing 3.602 kg (31.0 mol) of 1,6-hexanediamine, 2.483 kg (15.0 mol) of terephthalic acid, 1.738 kg (10.5 mol) of isophthalic acid and 0.655 kg (4.5 mol) of adipic acid to 2.374 kg (15.0 mol) of 1,9-nonanediamine, 2.374 kg (15.0 mol) of 2-methyl-1,8-octanediamine and 4.939 kg (29.7 mol) of terephthalic acid to obtain a semi-aromatic polyamide (polyamide 9T/M8T=50.0/50.0 mol %) (hereinafter this semi-aromatic polyamide is referred to as (B12-1).) having a melting point of 265° C. and a relative viscosity of 2.38.

Production of Semi-Aromatic Polyamide (B12-2)

In the production of the semi-aromatic polyamide (B12-1), the same method as in the production of the semi-aromatic polyamide (B12-1) was carried out except for changing 2.374 kg (15.0 mol) of 1,9-nonanediamine and 2.374 kg (15.0 mol) of 2-methyl-1,8-octanediamine to 4.036 kg (25.5 mol) of 1,9-nonanediamine and 0.712 kg (4.5 mol) of 2-methyl-1,8-octanediamine, and changing the polymerization temperature from 230° C. to 250° C. and the solid phase polymerization temperature from 210° C. to 240° C. to obtain a semi-aromatic polyamide (polyamide 9T/M8T=85.0/15.0 mol %) (hereinafter this semi-aromatic polyamide is referred to as (B12-2).) having a melting point of 305° C. and a relative viscosity of 2.34.

Production of Semi-Aromatic Polyamide (B12-3)

In the production of the semi-aromatic polyamide (B12-1), the same method as in the production of the semi-aromatic polyamide (B12-1) was carried out except for changing 2.374 kg (15.0 mol) of 1,9-nonanediamine, 2.374 kg (15.0 mol) of 2-methyl-1,8-octanediamine and 4.939 kg (29.7 mol) of terephthalic acid to 3.101 kg (18.0 mol) of 1,10-decanediamine, 2.990 kg (18.0 mol) of terephthalic acid and 2.416 kg (12.0 mol) of 11-aminoundecanoic acid, and changing the polymerization temperature from 230° C. to 220° C. and the solid phase polymerization temperature from 210° C. to 200° C. to obtain a semi-aromatic polyamide (polyamide 10T/11=60.0/40.0 mol %) (hereinafter this semi-aromatic polyamide is referred to as (B12-3).) having a melting point of 255° C. and a relative viscosity of 2.34.

Production of Semi-Aromatic Polyamide (B12-4)

In the production of the semi-aromatic polyamide (B12-1), the same method as in the production of the semi-aromatic polyamide (B12-1) was carried out except for changing 2.374 kg (15.0 mol) of 1,9-nonanediamine, 2.374 kg (15.0 mol) of 2-methyl-1,8-octanediamine and 4.939 kg (29.7 mol) of terephthalic acid to 3.101 kg (18.0 mol) of 1,10-decanediamine, 3.324 kg (20.0 mol) of terephthalic acid and 2.020 kg (9.99 mol) of sebacic acid, and changing the polymerization temperature from 230° C. to 240° C. and the solid phase polymerization temperature from 210° C. to obtain a semi-aromatic polyamide (polyamide 10T/1010=67.0/33.0 mol %) (hereinafter this semi-aromatic polyamide is referred to as (B12-4).) having a melting point of 279° C. and a relative viscosity of 2.37.

Production of Semi-Aromatic Polyamide (B12-5)

In the production of the semi-aromatic polyamide (B12-1), the same method as in the production of the semi-aromatic polyamide (B12-1) was carried out except for changing the solid phase polymerization time from 8 hours to 4 hours to obtain a semi-aromatic polyamide (polyamide 9T/M8T=50.0/50.0 mol %) (hereinafter this semi-aromatic polyamide is referred to as (B12-5).) having a melting point of 265° C. and a relative viscosity of 2.08.

Semi-Aromatic Polyamide (B2)

Semi-Aromatic Polyamide (B21)

Production of Semi-Aromatic Polyamide (B21-1)

To a pressure vessel having an inner volume of 70 liters equipped with a stirrer, a thermometer, a torque meter, a pressure gauge, a raw material inlet to which a diaphragm pump was directly connected, a nitrogen gas inlet, a pressure outlet, a pressure regulating device and a polymer outlet were charged 4.384 kg (30.0 mol) of adipic acid, 8.50 g (0.049 mol) of calcium hypophosphite and 2.19 g (0.025 mol) of sodium acetate, and after an operation of pressurizing inside the pressure vessel with a nitrogen gas having a purity of 99.9999% to 0.3 MPa, and then, releasing the nitrogen gas to normal pressure was repeated five times to carry out nitrogen substitution, the temperature inside the system was increased while stirring under a sealing pressure. Further, after the temperature was raised to 190° C. under a small amount of nitrogen stream, 4.086 kg (30.0 mol) of m-xylylenediamine was added dropwise to the mixture under stirring over 160 minutes. During this time, the internal pressure of the reaction system was controlled at 0.5 MPa, and the internal temperature was continuously raised to 295° C. In addition, water distilled off along with dropwise addition of m-xylylenediamine was removed from the system through a partial condenser and a cooler. After completion of the dropwise addition of m-xylylenediamine, the pressure was reduced to normal pressure over 60 minutes, and during this time, the temperature in the vessel was maintained at 275° C. and the reaction was continued for 10 minutes. Next, the internal pressure of the reaction system was reduced to 79 kPa, and melt polymerization reaction was continued for 40 minutes. Thereafter, stirring was stopped and the inside of the system was pressurized to 0.2 MPa with nitrogen to draw out the polycondensate in a string-state from the lower outlet of the pressure vessel. The string-state polycondensate was immediately cooled, the water-cooled string-state resin was pelletized by a pelletizer, and thereafter, dried under reduced pressure to obtain a semi-aromatic polyamide (polyamide MXD6=100.0 mol %) (hereinafter this semi-aromatic polyamide is referred to as (B21-1).) having a melting point of 243° C. and a relative viscosity of 2.35.

Production of semi-aromatic polyamide (B21-2)

In the production of the semi-aromatic polyamide (B21-1), the same method as in the production of the semi-aromatic polyamide (B21-1) was carried out except for changing 4.086 kg (30.0 mol) of m-xylylene diamine to 4.086 kg (30.0 mol) of a mixed diamine of m-xylylene diamine and p-xylylene diamine with 7:3 (molar ratio), and changing the polymerization temperature from 275° C. to 290° C. to obtain a semi-aromatic polyamide (polyamide MXD6/PXD6=70.0/30.0 mol %) (hereinafter this semi-aromatic polyamide is referred to as (B21-2).) having a melting point of 264° C. and a relative viscosity of 2.32.

Production of Semi-Aromatic Polyamide (B21-3)

In the production of the semi-aromatic polyamide (B21-1), the same method as in the production of the semi-aromatic polyamide (B21-1) was carried out except for changing the melt polymerization time from 40 minutes to 20 minutes to obtain a semi-aromatic polyamide (polyamide MXD6=100.0 mol %) (hereinafter this semi-aromatic polyamide is referred to as (B21-3).) having a melting point of 243° C. and a relative viscosity of 2.10.

Production of Semi-Aromatic Polyamide (B22-1)

In the production of the semi-aromatic polyamide (B21-1), the same method as in the production of the semi-aromatic polyamide (B21-1) was carried out except for changing 4.384 kg (30.0 mol) of adipic acid to 6.068 kg (30.0 mol) of sebacic acid, and changing the polymerization temperature from 275° C. to 250° C. to obtain a semi-aromatic polyamide (polyamide MXD10=100.0 mol %) (hereinafter this semi-aromatic polyamide is referred to as (B22-1).) having a melting point of 191° C. and a relative viscosity of 2.46.

Production of Semi-Aromatic Polyamide (322-2)

In the production of the semi-aromatic polyamide (B22-1), the same method as in the production of the semi-aromatic polyamide (B22-1) was carried out except for changing 4.086 kg (30.0 mol) of m-xylylene diamine to 4.086 kg (30.0 mol) of a mixed diamine of m-xylylene diamine and p-xylylene diamine with 7:3 (molar ratio), and changing the polymerization temperature from 250° C. to 260° C. to obtain a semi-aromatic polyamide (polyamide MXD10/PXD10=70.0/30.0 mol %) (hereinafter this semi-aromatic polyamide is referred to as (B22-2).) having a melting point of 213° C. and a relative viscosity of 2.40.

Production of Semi-Aromatic Polyamide (B22-3)

In the production of the semi-aromatic polyamide (B22-1), the same method as in the production of the semi-aromatic polyamide (B22-1) was carried out except for changing 4.086 kg (30.0 mol) of m-xylylene diamine to 4.086 kg (30.0 mol) of p-xylylene diamine, and changing the polymerization temperature from 250° C. to 300° C. to obtain a semi-aromatic polyamide (polyamide PXD10=100.0 mol %) (hereinafter this semi-aromatic polyamide is referred to as (B22-3).) having melting points of 281 and 291° C. (having two melting points) and a relative viscosity of 2.42.

Production of Semi-Aromatic Polyamide (B22-4)

In the production of the semi-aromatic polyamide (B22-1), the same method as in the production of the semi-aromatic polyamide (B22-1) was carried out except for changing the melt polymerization time from 40 minutes to 20 minutes to obtain a semi-aromatic polyamide (polyamide MXD10=100.0 mol %) (hereinafter this semi-aromatic polyamide is referred to as (B22-4).) having a melting point of 191° C. and a relative viscosity of 2.15.

Semi-Aromatic Polyamide Composition (B)

Production of Semi-Aromatic Polyamide Composition (B-1)

With the semi-aromatic polyamide (B11-1) were previously mixed the maleic anhydride-modified ethylene/1-butene copolymer (A3-1) as a shock improving material, triethylene glycol-bis[3-(3-t-butyl-5-methyl-4-hydroxyphenyl)propionate] (available from BASF Japan, IRGANOX245) as an antioxidant, and tris(2,4-di-t-butylphenyl)phosphite (available from BASF Japan, IRGAFOS168) as a phosphorus-based processing stabilizer, and the mixture was supplied to a twin-screw melt/kneader (manufactured by The Japan Steel Works, Ltd., Model type: TEX44), melt-kneaded at a cylinder temperature of from 220° C. to 300° C., after a molten resin was extruded into a strand-state, the material was introduced into a water tank, cooled, cut and vacuum-dried to obtain pellets of a semi-aromatic polyamide composition (hereinafter this semi-aromatic polyamide composition is referred to as (B-1).) comprising 0.8 part by mass of the antioxidant and 0.2 part by mass of the phosphorus-based processing stabilizer based on the total of the semi-aromatic polyamide (B11-1)/elastomer polymer (A3-1)=85.0/15.0 (% by mass) as 100 parts by mass.

Production of Semi-Aromatic Polyamide Composition (B-2)

In the production of the semi-aromatic polyamide composition (B-1), the same method as in the production of the semi-aromatic polyamide composition (B-1) was carried out except for changing the semi-aromatic polyamide (B11-1) to (B11-2), and changing the cylinder temperature from 300° C. to 340° C. to obtain pellets of a semi-aromatic polyamide composition (hereinafter the semi-aromatic polyamide composition is referred to as (B-2).) comprising 0.8 part by mass of the antioxidant and 0.2 part by mass of the phosphorus-based processing stabilizer based on the total of the semi-aromatic polyamide (B11-2)/elastomer polymer (A3-1)=85.0/15.0 (% by mass) as 100 parts by mass.

Production of Semi-Aromatic Polyamide Composition (B-3)

In the production of the semi-aromatic polyamide composition (B-1), the same method as in the production of the semi-aromatic polyamide composition (B-1) was carried out except for changing the semi-aromatic polyamide (B11-1) to (B11-3), and changing the cylinder temperature from 300° C. to 330° C. to obtain pellets of a semi-aromatic polyamide composition (hereinafter the semi-aromatic polyamide composition is referred to as (B-3).) comprising 0.8 part by mass of the antioxidant and 0.2 part by mass of the phosphorus-based processing stabilizer based on the total of the semi-aromatic polyamide (B11-3)/elastomer polymer (A3-1)=85.0/15.0 (% by mass) as 100 parts by mass.

Production of Semi-Aromatic Polyamide Composition (B-4)

In the production of the semi-aromatic polyamide composition (B-1), the same method as in the production of the semi-aromatic polyamide composition (B-1) was carried out except for changing the semi-aromatic polyamide (B11-1) to (B11-4), and changing the cylinder temperature from 300° C. to 340° C. to obtain pellets of a semi-aromatic polyamide composition (hereinafter this semi-aromatic polyamide composition is referred to as (B-4).) comprising 0.8 part by mass of the antioxidant and 0.2 part by mass of the phosphorus-based processing stabilizer based on the total of the semi-aromatic polyamide (B11-4)/elastomer polymer (A3-1)=85.0/15.0 (% by mass) as 100 parts by mass.

Production of Semi-Aromatic Polyamide Composition (B-5)

In the production of the semi-aromatic polyamide composition (B-1), the same method as in the production of the semi-aromatic polyamide composition (B-1) was carried out except for changing the semi-aromatic polyamide (B11-1) to (B11-5), and changing the cylinder temperature from 300° C. to 330° C. to obtain pellets of a semi-aromatic polyamide composition (hereinafter this semi-aromatic polyamide composition is referred to as (B-5).) comprising 0.8 part by mass of the antioxidant and 0.2 part by mass of the phosphorus-based processing stabilizer based on the total of the semi-aromatic polyamide (B11-5)/elastomer polymer (A3-1)=85.0/15.0 (% by mass) as 100 parts by mass.

Production of Semi-Aromatic Polyamide Composition (B-6)

In the production of the semi-aromatic polyamide composition (B-1), the same method as in the production of the semi-aromatic polyamide composition (B-1) was carried out except for using the semi-aromatic polyamides (B11-1) and (B12-1) in combination to obtain pellets of a semi-aromatic polyamide composition (hereinafter this semi-aromatic polyamide composition is referred to as (B-6).) comprising 0.8 part by mass of the antioxidant and 0.2 part by mass of the phosphorus-based processing stabilizer based on the total of the semi-aromatic polyamide (B11-1)/semi-aromatic polyamide (B12-1)/elastomer polymer (A3-1)=59.5/25.5/15.0 (% by mass) as 100 parts by mass.

Production of Semi-Aromatic Polyamide Composition (B-7)

In the production of the semi-aromatic polyamide composition (B-6), the same method as in the production of the semi-aromatic polyamide composition (B-6) was carried out except for changing the semi-aromatic polyamide (B12-1) to (B12-2), and changing the cylinder temperature from 300° C. to 340° C. to obtain pellets of a semi-aromatic polyamide composition (hereinafter this semi-aromatic polyamide composition is referred to as (B-7).) comprising 0.8 part by mass of the antioxidant and 0.2 part by mass of the phosphorus-based processing stabilizer based on the total of the semi-aromatic polyamide (B11-1)/semi-aromatic polyamide (B12-2)/elastomer polymer (A3-1)=59.5/25.5/15.0 (% by mass) as 100 parts by mass.

Production of Semi-Aromatic Polyamide Composition (B-8)

In the production of the semi-aromatic polyamide composition (B-6), the same method as in the production of the semi-aromatic polyamide composition (B-6) was carried out except for changing the semi-aromatic polyamide (B12-1) to (B12-3) to obtain pellets of a semi-aromatic polyamide composition (hereinafter this semi-aromatic polyamide composition is referred to as (B-8).) comprising 0.8 part by mass of the antioxidant and 0.2 part by mass of the phosphorus-based processing stabilizer based on the total of the semi-aromatic polyamide (B11-1)/semi-aromatic polyamide (B12-3)/elastomer polymer (A3-1)=59.5/25.5/15.0 (% by mass) as 100 parts by mass.

Production of Semi-Aromatic Polyamide Composition (B-9)

In the production of the semi-aromatic polyamide composition (B-6), the same method as in the production of the semi-aromatic polyamide composition (B-6) was carried out except for changing the semi-aromatic polyamide (B12-1) to (B12-4), and changing the cylinder temperature from 300° C. to 310° C. to obtain pellets of a semi-aromatic polyamide composition (hereinafter this semi-aromatic polyamide composition is referred to as (B-9).) comprising 0.8 part by mass of the antioxidant and 0.2 part by mass of the phosphorus-based processing stabilizer based on the total of the semi-aromatic polyamide (B11-1)/semi-aromatic polyamide (B12-4)/elastomer polymer (A3-1)=59.5/25.5/15.0 (% by mass) as 100 parts by mass.

Production of Semi-Aromatic Polyamide Composition (B-10)

In the production of the semi-aromatic polyamide composition (B-1), the same method as in the production of the semi-aromatic polyamide composition (B-1) was carried out except for changing the semi-aromatic polyamide (B11-1) to (B21-1), and changing the cylinder temperature from 300° C. to 280° C. to obtain pellets of a semi-aromatic polyamide composition (hereinafter this semi-aromatic polyamide composition is referred to as (B-10).) comprising 0.8 part by mass of the antioxidant and 0.2 part by mass of the phosphorus-based processing stabilizer based on the total of the semi-aromatic polyamide (B21-1)/elastomer polymer (A3-1)=85.0/15.0 (% by mass) as 100 parts by mass.

Production of Semi-Aromatic Polyamide Composition (B-11)

In the production of the semi-aromatic polyamide composition (B-10), the same method as in the production of the semi-aromatic polyamide composition (B-10) was carried out except for changing the semi-aromatic polyamide (B21-1) to (B21-2), and changing the cylinder temperature from 280° C. to 300° C. to obtain pellets of a semi-aromatic polyamide composition (hereinafter this semi-aromatic polyamide composition is referred to as (B-11).) comprising 0.8 part by mass of the antioxidant and 0.2 part by mass of the phosphorus-based processing stabilizer based on the total of the semi-aromatic polyamide (B21-2)/elastomer polymer (A3-1)=85.0/15.0 (% by mass) as 100 parts by mass.

Production of Semi-Aromatic Polyamide Composition (B-12)

In the production of the semi-aromatic polyamide composition (B-10), the same method as in the production of the semi-aromatic polyamide composition (B-10) was carried out except for using the semi-aromatic polyamides (B21-1) and (B22-1) in combination to obtain pellets of a semi-aromatic polyamide composition (hereinafter this semi-aromatic polyamide composition is referred to as (B-12).) comprising 0.8 part by mass of the antioxidant and 0.2 part by mass of the phosphorus-based processing stabilizer based on the total of the semi-aromatic polyamide (821-1)/semi-aromatic polyamide (B22-1)/elastomer polymer (A3-1) =59.5/25.5/15.0 (% by mass) as 100 parts by mass.

Production of Semi-Aromatic Polyamide Composition (B-13)

In the production of the semi-aromatic polyamide composition (B-12), the same method as in the production of the semi-aromatic polyamide composition (B-12) was carried out except for changing the semi-aromatic polyamide (B22-1) to (B22-2) to obtain pellets of a semi-aromatic polyamide composition (hereinafter this semi-aromatic polyamide composition is referred to as (B-13).) comprising 0.8 part by mass of the antioxidant and 0.2 part by mass of the phosphorus-based processing stabilizer based on the total of the semi-aromatic polyamide (B21-1)/semi-aromatic polyamide (B22-2)/elastomer polymer (A3-1)=59.5/25.5/15.0 (% by mass) as 100 parts by mass.

Production of Semi-Aromatic Polyamide Composition (B-14)

In the production of the semi-aromatic polyamide composition (B-12), the same method as in the production of the semi-aromatic polyamide composition (B-12) was carried out except for changing the semi-aromatic polyamide (B22-1) to (B22-3), and changing the cylinder temperature from 280° C. to 320° C. to obtain pellets of a semi-aromatic polyamide composition (hereinafter this semi-aromatic polyamide composition is referred to as (B-14).) comprising 0.8 part by mass of the antioxidant and 0.2 part by mass of the phosphorus-based processing stabilizer based on the total of the semi-aromatic polyamide (B21-1)/semi-aromatic polyamide (B22-3)/elastomer polymer (A3-1) 59.5/25.5/15.0 (% by mass) as 100 parts by mass.

Production of Conductive Semi-Aromatic Polyamide Composition (B-15)

With the semi-aromatic polyamide (B11-6) were previously mixed a maleic anhydride-modified ethylene/1-butene copolymer (A3-1) and an ethylene/1-butene copolymer (available from Mitsui Chemicals, Inc., TAFMER A-0550) as impact improvers, carbon nanotube (available from Nanocyl S.A, NC7000) as a conductive filler, triethylene glycol-bis[3-(3-t-butyl-5-methyl-4-hydroxyphenyl)propionate] (available from BASF Japan, IRGANOX245) as an antioxidant and tris(2,4-di-t-butylphenyl)phosphite (available from BASF Japan, IRGAFOS168) as a phosphorus-based processing stabilizer, and the mixture was supplied to a twin-screw melt/kneader (manufactured by The Japan Steel Works, Ltd., Model type: TEX44), melt-kneaded at a cylinder temperature of from 230° C. to 320° C., after a molten resin was extruded into a strand-state, the material was introduced into a water tank, cooled, cut and vacuum-dried to obtain pellets of a conductive semi-aromatic polyamide composition (hereinafter the conductive semi-aromatic polyamide composition is referred to as (B-15).) comprising 0.8 part by mass of the antioxidant and 0.2 part by mass of the phosphorus-based processing stabilizer based on the total of the semi-aromatic polyamide (B11-6)/elastomer polymer (A3-1)/the conductive filler=75.0/20.0/5.0 (% by mass) as 100 parts by mass.

Production of Conductive Semi-Aromatic Polyamide Composition (B-16)

In the production of the conductive semi-aromatic polyamide composition (B-15), the same method as in the production of the conductive semi-aromatic polyamide composition (B-15) was carried out except for using the semi-aromatic polyamides (B11-6) and (B12-5) in combination to obtain pellets of a conductive semi-aromatic polyamide composition (hereinafter this conductive semi-aromatic polyamide composition is referred to as (B-16).) comprising 0.8 part by mass of the antioxidant and 0.2 part by mass of the phosphorus-based processing stabilizer based on the total of the semi-aromatic polyamide (B11-6)/semi-aromatic polyamide (B12-5)/elastomer polymer (A3-1)/the conductive filler=52.5/22.5/20.0/5.0 (% by mass) as 100 parts by mass.

Production of conductive semi-aromatic polyamide composition (B-17)

In the production of the conductive semi-aromatic polyamide composition (B-15), the same method as in the production of the conductive semi-aromatic polyamide composition (B-15) was carried out except for changing the semi-aromatic polyamide (B11-6) to (B21-3) and the polyamide 6/12 (A2-1), and changing the cylinder temperature from 320° C. to 300° C. to obtain pellets of a conductive semi-aromatic polyamide composition (hereinafter this conductive semi-aromatic polyamide composition is refereed to as (B-17).) comprising 0.8 part by mass of the antioxidant and 0.2 part by mass of the phosphorus-based processing stabilizer based on the total of the semi-aromatic polyamide (B21-3)/polyamide 6/12 (A2-1)/elastomer polymer (A3-1)/the conductive filler=70.0/10.0/15.0/5.0 (% by mass) as 100 parts by mass.

Production of Conductive Semi-Aromatic Polyamide Composition (B-18)

In the production of the conductive semi-aromatic polyamide composition (B-17), the same method as in the production of the conductive semi-aromatic polyamide composition (B-17) was carried out except for using the semi-aromatic polyamides (B21-3) and (B22-4) in combination to obtain pellets of a conductive semi-aromatic polyamide composition (hereinafter this conductive semi-aromatic polyamide composition is referred to as (B-18).) comprising 0.8 part by mass of the antioxidant and 0.2 part by mass of the phosphorus-based processing stabilizer based on the total of the semi-aromatic polyamide (B21-3)/semi-aromatic polyamide (B22-4)/polyamide 6/12 (A2-1)/elastomer polymer (A3-1)/the conductive filler=49.0/21.0/10.0/15.0/5.0 (% by mass) as 100 parts by mass.

Production of Semi-Aromatic Polyamide Composition (B-19)

In the production of the semi-aromatic polyamide composition (B-1), the same method as in the production of the semi-aromatic polyamide composition (B-1) was carried out except for changing the semi-aromatic polyamide (B11-1) to (B12-3), and changing the cylinder temperature from 300° C. to 290° C. to obtain pellets of a semi-aromatic polyamide composition (hereinafter this semi-aromatic polyamide composition is referred to as (B-19).) comprising 0.8 part by mass of the antioxidant and 0.2 part by mass of the phosphorus-based processing stabilizer based on the total of the semi-aromatic polyamide (B12-3)/elastomer polymer (A3-1)=90.0/10.0 (% by mass) as 100 parts by mass.

Production of Semi-Aromatic Polyamide Composition (B-20)

In the production of the semi-aromatic polyamide composition (B-10), the same method as in the production of the semi-aromatic polyamide composition (B-10) was carried out except for changing the semi-aromatic polyamide (B21-1) to (B22-1), and changing the cylinder temperature from 280° C. to 240° C. to obtain pellets of a semi-aromatic polyamide composition (hereinafter this semi-aromatic polyamide composition is referred to as (B-20).) comprising 0.8 part by mass of the antioxidant and 0.2 part by mass of the phosphorus-based processing stabilizer based on the total of the semi-aromatic polyamide (B22-1)/elastomer polymer (A3-1)=90.0/10.0 (% by mass) as 100 parts by mass.

Polyamide Composition (C)

Production of Polyamide 610 Composition (C-1)

In the production of the polyamide 12 composition (A-1), the same method as in the production of the polyamide 12 composition (A-1) was carried out except for changing polyamide 12 (A1-1) to polyamide 610 (A2-4), and not using the polyamide 6/12 (A2-1) to obtain pellets of a polyamide 610 composition (hereinafter this polyamide 610 composition is referred to as (C-1).) comprising 0.8 part by mass of the antioxidant and 0.2 part by mass of the phosphorus-based processing stabilizer based on the total of the polyamide 610 (A2-4)/elastomer polymer (A3-1)=80.0/20.0 (% by mass) as 100 parts by mass.

Production of Conductive Polyamide 610 Composition (C-2)

In the production of the conductive polyamide 12 composition (A-8), the same method as in the production of the conductive polyamide 12 composition (A-8) was carried out except for changing polyamide 12 (A1-1) to the polyamide 610 (A2-4), without using the polyamide 6/12 (A2-1), and changing the cylinder temperature from 290° C. to 300° C. to obtain pellets of a conductive polyamide 610 composition (hereinafter this conductive polyamide 610 composition is referred to as (C-2).) comprising 25 parts by mass of the conductive filler, 0.8 part by mass of the antioxidant and 0.2 part by mass of the phosphorus-based processing stabilizer based on the total of the polyamide 610 (A2-4)/elastomer polymer (A3-1)=75.0/25.0 (% by mass) as 100 parts by mass.

Production of Polyamide 6/12 Composition (C-3)

In the production of the polyamide 610 composition (C-1), the same method as in the production of the polyamide 610 composition (C-1) was carried out except for changing the polyamide 610 (A2-4) to the polyamide 6/12 (A2-1) to obtain pellets of a polyamide 6/12 composition (hereinafter this polyamide 6/12 composition is referred to as (C-3).) comprising 0.8 part by mass of the antioxidant and 0.2 part by mass of the phosphorus-based processing stabilizer based on the total of the polyamide 6/12 (A2-1)/elastomer polymer (A3-1)=80.0/20.0 (% by mass) as 100 parts by mass.

Production of Polyamide 6 Composition (C-4)

In the production of the polyamide 610 composition (C-1), the same method as in the production of the polyamide 610 composition (C-1) was carried out except for changing the polyamide 610 (A2-4) to the polyamide 6 (A2-3) to obtain pellets of a polyamide 6 composition (hereinafter this polyamide 6 composition is referred to as (C-4).) comprising 0.8 part by mass of the antioxidant and 0.2 part by mass of the phosphorus-based processing stabilizer based on the total of the polyamide 6 (A2-3)/elastomer polymer (A3-1)=80.0/20.0 (% by mass) as 100 parts by mass.

Production of Polyamide 612 Composition (C-5)

In the production of the polyamide 12 composition (A-1), the same method as in the production of the polyamide 12 composition (A-1) was carried out except for changing the polyamide 12 (A1-1) to a polyamide 612 (A2-5) to obtain pellets of a polyamide 612 composition (hereinafter this polyamide 612 composition is referred to as (C-5).) comprising 0.8 part by mass of the antioxidant and 0.2 part by mass of the phosphorus-based processing stabilizer based on the total of the polyamide 612 (A2-5)/polyamide 6/12 (A2-1)/elastomer polymer (A3-1)=65.0/15.0/20.0 (% by mass) as 100 parts by mass.

Production of Conductive Polyamide 612 Composition (C-6)

In the production of the conductive polyamide 12 composition (A-8), the same method as in the production of the conductive polyamide 12 composition (A-8) was carried out except for changing the polyamide 12 (A1-1) to the polyamide 612 (A2-5), and changing the cylinder temperature from 290° C. to 300° C. to obtain pellets of a conductive polyamide 612 composition (hereinafter this conductive polyamide 612 composition is referred to as (C-6).) comprising 25 parts by mass of the conductive filler, 0.8 part by mass of the antioxidant and 0.2 part by mass of the phosphorus-based processing stabilizer based on the total of the polyamide 612 (A2-5)/polyamide 6/12 (A2-1)/elastomer polymer (A3-1)=56.25/18.75/25.0 (% by mass) as 100 parts by mass.

Fluorine-Containing Polymer (D)

Production of Fluorine-Containing Polymer (D-1)

A polymerization tank having an inner volume of 100 L equipped with a stirrer was degassed, 92.1 kg of 1-hydrotridecafluorohexane, 16.3 kg of 1,3-dichloro-1,1,2,2,3-pentafluoropropane, 73 g of (perfluoroethyl)ethylene $CH_2{=}CH(CF_2)_2F$ and 10.1 g of itaconic anhydride (IAH) were charged therein, and 9.6 kg of tetrafluoroethylene (TFE) and 0.7 kg of ethylene (E) were charged by pressure, the temperature of the mixture in the polymerization tank was elevated to 66° C., and 433 $cm^3$ of a 1,3-dichloro-1,1,2,2,3-pentafluoropropane solution containing 1% by mass of t-butylperoxypivalate was charged as a polymerization initiator to start polymerization. A monomer mixed gas of TFE/E: 60/40 (molar ratio) was continuously charged so that the pressure became constant during the polymerization. Further, (perfluoroethyl)ethylene in an amount corresponding to 2.0 mol % and IAH in an amount corresponding to 0.5 mol % based on the total molar number of TFE and E to be charged during the polymerization were continuously charged. After 5.5 hours from starting the polymerization, at the time of charging 8.0 kg of the monomer mixed gas and 63 g of IAH, the temperature in the polymerization tank was lowered to room temperature, and the pressure was reduced to normal pressure by purging. The obtained slurry-state fluorine-containing polymer was thrown into 200 L of a granulation tank into which 75.0 kg of water had been charged, and then, heated to 105° C. while stirring and granulated while distilling off and removing the solvent. The obtained granules were dried at 150° C. for 5 hours to obtain 8.3 kg of a fluorine-containing polymer.

The composition of the fluorine-containing polymer was polymerization units based on TFE/polymerization units based on E/polymerization units based on $CH_2{=}CH(CF_2)_2F$/polymerization units based on IAH=58.5/39.0/2.0/0.5 (mol %), and the melting point was 240° C. The granulated product was melted using an extruder at 280° C. and a residence time of 2 minutes to obtain pellets of a fluorine-containing polymer (hereinafter the fluorine-containing polymer is referred to as (D-1).).

Production of Conductive Fluorine-Containing Polymer Composition (D-2)

100 parts by mass of the fluorine-containing polymer (D-1) and 13 parts by mass of carbon black (available from Denka Company Limited) were previously mixed, and the mixture was supplied to a twin-screw melt/kneader (manufactured by Toshiba Machine Co., Ltd., Model type: TEM-48S), melt-kneaded at a cylinder temperature of from 240° C. to 300° C., after a molten resin was extruded into a strand-state, the material was introduced into a water tank, discharged strand was cooled by water, and the strand was cut by a pelletizer and dried for the purpose of removing water content in a drier at 120° C. for 10 hours to obtain pellets of a conductive fluorine-containing polymer composition (hereinafter the conductive fluorine-containing polymer composition is referred to as (D-2).).

Production of Fluorine-Containing Polymer (D-3)

In the production of the fluorine-containing polymer (D-1), the same method as in the production of the fluorine-containing polymer (D-1) was carried out except for not charging the itaconic anhydride (IAH) to obtain 7.6 kg of a fluorine-containing polymer.

The composition of the fluorine-containing polymer was polymerization units based on TFE/polymerization units based on E/polymerization units based on $CH_2{=}CH(CF_2)_2F$=58.8/39.2/2.0 (mol %), and the melting point was 242° C. The granulated product was melted using an extruder at 280° C. and a residence time of 2 minutes to obtain pellets of a fluorine-containing polymer (hereinafter the fluorine-containing polymer is referred to as (E-3).).

Production of Conductive Fluorine-Containing Polymer Composition (D-4)

In the production of the conductive fluorine-containing polymer composition (D-2), the same method as in the production of the conductive fluorine-containing polymer composition (D-2) was carried out except for changing the fluorine-containing polymer (D-1) to (D-3) to obtain pellets of a conductive fluorine-containing polymer composition (hereinafter the conductive fluorine-containing polymer composition is referred to as (D-4).).

Production of Fluorine-Containing Polymer (D-5)

A polymerization tank having an inner volume of 100 L equipped with a stirrer was degassed, 42.5 kg of 1,3-dichloro-1,1,2,2,3-pentafluoropropane, 2.13 kg of $CF_2{=}CFOCF_2CF_2CF_3$ (perfluoro(propyl vinyl ether): PPVE), 1,1,2,4,4,5,5,6,6,6-decafluoro-3-oxahex-1-ene) and 51.0 kg of hexafluoropropylene(HFP) were charged therein. Then, the temperature of the mixture in the polymerization tank was elevated to 50° C., 4.25 kg of tetrafluoroethylene (TFE) was charged and the pressure was raised to 1.0 MPa/G. As the polymerization initiator solution, 340 $cm^3$ of a 1,3-dichloro-1,1,2,2,3-pentafluoropropane solution containing 0.3% by mass of (perfluorobutyryl)peroxide was charged therein to start polymerization, and thereafter, 340 $cm^3$ of the polymerization initiator solution was charged with each 10 minutes. TFE was continuously charged so that the pressure retained 1.0 MPa/G during the polymerization. Further, a 1,3-dichloro-1,1,2,2,3-pentafluoropropane solution containing 0.3% by mass of 5-norbornene-2,3-dicarboxylic acid anhydride (NAH) corresponding to an amount of 0.1 mol % based on the molar number of TFE to be charged during the polymerization was continuously charged. After 5 hours from starting the polymerization, at the time of charging 8.5 kg of TFE, the temperature in the polymerization tank was lowered to room temperature, and the pressure was reduced to normal pressure by purging. The obtained slurry-state fluorine-containing polymer was thrown into 200 L of a granulation tank into which 75.0 kg of water had been charged, and then, heated to 105° C. while stirring and granulated while distilling off and removing the solvent. The obtained granules were dried at 150° C. for 5 hours to obtain 7.5 kg of a granulated product of a fluorine-containing polymer.

The composition of the fluorine-containing polymer was polymerization units based on TFE/polymerization units based on PPVE/polymerization units based on HFP/polymerization units based on NAH=91.2/1.5/7.2/0.1 (mol %), and the melting point was 262° C. The granulated product was melted using an extruder at 300° C. and a residence time of 2 minutes to obtain pellets of a fluorine-containing polymer (hereinafter the fluorine-containing polymer is referred to as (D-5).).

Production of Fluorine-Containing Polymer (D-6)

In the production of the fluorine-containing polymer (D-5), the same method as in the production of the fluorine-containing polymer (D-5) was carried out except for changing not charging the 1,3-dichloro-1,1,2,2,3-pentafluoropropane solution containing 0.3% by mass of 5-norbornene-2,3-dicarboxylic acid anhydride (NAH) to obtain 7.6 kg of a fluorine-containing polymer.

The composition of the fluorine-containing polymer was polymerization units based on TFE/polymerization units based on PPVE/polymerization units based on HFP=91.5/1.5/7.0 (mol %), and the melting point was 257° C. The granulated product was melted using an extruder at 300° C. and a residence time of 2 minutes to obtain pellets of a fluorine-containing polymer (hereinafter the fluorine-containing polymer is referred to as (D-6).).

Production of Conductive Fluorine-Containing Polymer Composition (D-7)

In the production of the conductive fluorine-containing polymer composition (D-2), the same method as in the production of the conductive fluorine-containing polymer composition (D-2) was carried out except for changing the fluorine-containing polymer (D-1) to (D-6), changing 13 parts by mass of carbon black to 11 parts by mass, and changing the cylinder temperature from 300° C. to 320° C. to obtain pellets of a conductive fluorine-containing polymer composition (hereinafter the conductive fluorine-containing polymer composition is referred to as (D-7).).

Production of Fluorine-Containing Polymer (D-8)

In a stirring type polymerization tank attached with a jacket capable of containing 174 kg of water was charged 51.5 kg of pure water subjected to demineralization, and after sufficiently purging the internal space with a pure nitrogen gas, the nitrogen gas was removed by vacuum. Then, 40.6 kg of octafluorocyclobutane, 1.6 kg of chlorotrifluoroethylene (CTFE), 4.5 kg of tetrafluoroethylene (TFE) and 2.8 kg of perfluoro(propyl vinyl ether) (PPVE) were charged therein by pressure. 0.090 kg of n-propyl alcohol was added thereto as a chain transfer agent, and the temperature was adjusted to 35° C. and stirring was started. To the mixture was added 0.44 kg of a methanol solution containing 50% by mass of di-n-propylperoxy dicarbonate as a polymerization initiator to start polymerization. During the polymerization, a mixed monomer prepared to have the same composition as the desired copolymer composition was additionally charged so as to maintain the pressure in the tank to 0.66 MPa and polymerized, then, the remaining gas in the tank was evacuated and the formed polymer was taken out and washed with pure water subjected to demineralization, and dried to obtain 30.5 kg of a granular powdery fluorine-containing polymer.

The composition of the fluorine-containing polymer was polymerization units based on CTFE/polymerization units based on TFE/polymerization units based on PPVE in a molar ratio of 24.4/73.1/2.5, and the number of the carbonate terminal group based on $1\times10^6$ of main chain carbon atoms in the fluorine-containing polymer was 170. In addition, the melting point was 241° C. The granulated product was melted using an extruder at 290° C. and a residence time of 2 minutes to obtain pellets of a fluorine-containing polymer (hereinafter the fluorine-containing polymer is referred to as (D-8).).

Production of Fluorine-Containing Polymer (D-9)

In the production of the fluorine-containing polymer (D-8), the same method as in the production of the fluorine-containing polymer (D-8) was carried out except for changing not charging the methanol solution containing 50% by mass of di-n-propylperoxy dicarbonate to obtain 29.8 kg of a fluorine-containing polymer.

The composition of the fluorine-containing polymer was polymerization units based on CTFE/polymerization units based on TFE/polymerization units based on PPVE in a molar ratio of 24.4/73.1/2.5, and the melting point was 241° C. The granulated product was melted using an extruder at 290° C. and a residence time of 2 minutes to obtain pellets of a fluorine-containing polymer (hereinafter the fluorine-containing polymer is referred to as (D-9).).

Production of Conductive Fluorine-Containing Polymer Composition (D-10)

In the production of the conductive fluorine-containing polymer composition (D-7), the same method as in the production of the conductive fluorine-containing polymer composition (D-7) was carried out except for changing the fluorine-containing polymer (D-6) to (D-9), and changing the cylinder temperature from 320° C. to 300° C. to obtain pellets of a conductive fluorine-containing polymer composition (hereinafter the conductive fluorine-containing polymer composition is referred to as (D-10).).

Example 1

By using the polyamide 12 composition (A-1) and the semi-aromatic polyamide composition (B-1) as mentioned above, (A-1) was melted at the extrusion temperature of 270° C. and (B-1) was melted at the extrusion temperature of 300'C separately in a two-layer tube molding machine Plabor (manufactured by Plastics Technology Co., Ltd.), and the discharged molten resins were combined by an adaptor to mold a multilayered tubular body. Subsequently, it was cooled by a sizing die for controlling the dimensions, and subjecting to take off to obtain a multilayer tube having the layer constitution of (a)/(b)=0.75/0.25 mm when it was made Layer (a) (outermost layer) comprising (A-1) and Layer (b) (outermost layer) comprising (B-1), and having an inner diameter of 6.0 mm and an outer diameter of 8.0 mm. The measurement results of the properties of the multilayer tube are shown in Table 1.

Example 2

In Example 1, the same method was carried out as in Example 1 except for changing the polyamide 12 composition (A-1) to (A-2) to obtain a multilayer tube having the layer constitution shown in Table 1. The measurement results of the properties of the multilayer tube are shown in Table 1.

Example 3

In Example 1, the same method was carried out as in Example 1 except for changing the polyamide 12 composition (A-1) to (A-3) to obtain a multilayer tube having the layer constitution shown in Table 1. The measurement results of the properties of the multilayer tube are shown in Table 1.

Example 4

In Example 1, the same method was carried out as in Example 1 except for changing the polyamide 12 composition (A-1) to (A-4) to obtain a multilayer tube having the layer constitution shown in Table 1. The measurement results of the properties of the multilayer tube are shown in Table 1.

Example 5

In Example 1, the same method was carried out as in Example 1 except for changing the polyamide 12 composition (A-1) to (A-5) to obtain a multilayer tube having the layer constitution shown in Table 1. The measurement results of the properties of the multilayer tube are shown in Table 1.

Example 6

In Example 1, the same method was carried out as in Example 1 except for changing the polyamide 12 composition (A-1) to (A-6) to obtain a multilayer tube having the layer constitution shown in Table 1. The measurement results of the properties of the multilayer tube are shown in Table 1.

Example 7

In Example 1, the same method was carried out as in Example 1 except for changing the polyamide 12 composition (A-1) to the polyamide 1010 composition (A-7) to obtain a multilayer tube having the layer constitution shown in Table 1. The measurement results of the properties of the multilayer tube are shown in Table 1.

Example 8

In Example 1, the same method was carried out as in Example 1 except for changing the semi-aromatic polyamide composition (B-1) to (B-2), and changing the extrusion temperature of (B-2) to 340° C. to obtain a multilayer tube having the layer constitution shown in Table 1. The measurement results of the properties of the multilayer tube are shown in Table 1.

Example 9

In Example 1, the same method was carried out as in Example 1 except for changing the semi-aromatic polyamide composition (B-1) to (B-3), and changing the extrusion temperature of (B-3) to 330° C. to obtain a multilayer tube having the layer constitution shown in Table 1. The measurement results of the properties of the multilayer tube are shown in Table 1.

Example 10

In Example 1, the same method was carried out as in Example 1 except for changing the semi-aromatic polyamide composition (B-1) to (B-4), and changing the extrusion temperature of (B-4) to 340° C. to obtain a multilayer tube having the layer constitution shown in Table 1. The measurement results of the properties of the multilayer tube are shown in Table 1.

Example 11

In Example 1, the same method was carried out as in Example 1 except for changing the semi-aromatic polyamide composition (B-1) to (B-5), and changing the extrusion temperature of (B-5) to 330° C. to obtain a multilayer tube having the layer constitution shown in Table 1. The measurement results of the properties of the multilayer tube are shown in Table 1.

Example 12

In Example 1, the same method was carried out as in Example 1 except for changing the semi-aromatic polyamide composition (B-1) to (B-6) to obtain a multilayer tube having the layer constitution shown in Table 1. The measurement results of the properties of the multilayer tube are shown in Table 1.

Example 13

In Example 1, the same method was carried out as in Example 1 except for changing the semi-aromatic polyamide composition (B-1) to (B-7), and changing the extrusion temperature of (B-7) to 340° C. to obtain a multilayer tube having the layer constitution shown in Table 1. The measurement results of the properties of the multilayer tube are shown in Table 1.

Example 14

In Example 1, the same method was carried out as in Example 1 except for changing the semi-aromatic polyamide composition (B-1) to (B-8) to obtain a multilayer tube having the layer constitution shown in Table 1. The measurement results of the properties of the multilayer tube are shown in Table 1.

Example 15

In Example 1, the same method was carried out as in Example 1 except for changing the semi-aromatic polyamide composition (B-1) to (B-9), and changing the extrusion temperature of (B-9) to 310° C. to obtain a multilayer tube having the layer constitution shown in Table 1. The measurement results of the properties of the multilayer tube are shown in Table 1.

Example 16

In Example 1, the same method was carried out as in Example 1 except for changing the semi-aromatic polyamide composition (B-1) to (B-10), and changing the extrusion temperature of (B-10) to 280° C. to obtain a multilayer tube having the layer constitution shown in Table 1. The measurement results of the properties of the multilayer tube are shown in Table 1.

Example 17

In Example 1, the same method was carried out as in Example 1 except for changing the semi-aromatic polyamide composition (B-1) to (B-11) to obtain a multilayer tube having the layer constitution shown in Table 1. The measurement results of the properties of the multilayer tube are shown in Table 1.

Example 18

In Example 1, the same method was carried out as in Example 1 except for changing the semi-aromatic polyamide composition (B-1) to (B-12), and changing the extrusion temperature of (B-12) to 280° C. to obtain a multilayer tube having the layer constitution shown in Table 1. The measurement results of the properties of the multilayer tube are shown in Table 1.

Example 19

In Example 1, the same method was carried out as in Example 1 except for changing the semi-aromatic polyamide composition (B-1) to (B-13) to obtain a multilayer tube having the layer constitution shown in Table 1. The measurement results of the properties of the multilayer tube are shown in Table 1.

Example 20

In Example 1, the same method was carried out as in Example 1 except for changing the semi-aromatic polyamide composition (B-1) to (B-14), and changing the extrusion temperature of (B-14) to 320° C. to obtain a multilayer tube having the layer constitution shown in Table 1. The measurement results of the properties of the multilayer tube are shown in Table 1.

Example 21

By using the polyamide 12 composition (A-1), the semi-aromatic polyamide composition (B-1) and the conductive semi-aromatic polyamide composition (B-15) mentioned above, (A-1) was melted at the extrusion temperature of 270° C., (B-1) was melted at the extrusion temperature of 300° C. and (B-15) was melted at the extrusion temperature of 320° C. separately in a three-layer tube molding machine Plabor (manufactured by Plastics Technology Co., Ltd.), and the discharged molten resins were combined by an adaptor to mold a multilayered tubular body. Subsequently, it was cooled by a sizing die for controlling the dimensions, and subjecting to take off, to obtain a multilayer tube having the layer constitution of (a)/(b)/(b')=0.75/0.15/0.10 mm when it was made Layer (a) (outermost layer) comprising (A-1), Layer (b) (intermediate layer) comprising (B-1) and Layer (b') (innermost layer) comprising (B-15), and having an inner diameter of 6.0 mm and an outer diameter of 8.0 mm. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 22

In Example 21, the same method was carried out as in Example 21 except for changing the conductive semi-aromatic polyamide composition (B-15) to (B-16) to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 23

In Example 21, the same method was carried out as in Example 21 except for changing the semi-aromatic polyamide composition (B-1) to (B-10), changing the conductive semi-aromatic polyamide composition (B-15) to (B-17), and changing the extrusion temperature of (B-10) to 280° C. and the extrusion temperature of (B-17) to 300° C. to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 24

In Example 21, the same method was carried out as in Example 21 except for changing semi-aromatic polyamide composition (B-1)を(B-10), the conductive semi-aromatic polyamide composition (B-15) to (B-18), and changing the extrusion temperature of (B-10) to 280° C. and the extrusion temperature of (B-18) to 300° C. to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 25

In Example 21, the same method was carried out as in Example 21 except for changing the conductive semi-aromatic polyamide composition (B-15) to the conductive polyamide 12 composition (A-8), changing the extrusion temperature of (A-8) to 290° C., and changing the layer constitution to (a)/(b)/(a')=0.60/0.20/0.20 mm when it was made Layer (a) (outermost layer) comprising (A-1), Layer (b) (intermediate layer) comprising (B-1) and Layer (a') (innermost layer) comprising (A-8), to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 26

In Example 23, the same method was carried out as in Example 23 except for changing the conductive semi-aromatic polyamide composition (B-17) to the conductive polyamide 12 composition (A-8), changing the extrusion temperature of (A-8) to 290° C., and changing the layer constitution to (a)/(b)/(a')=0.60/0.20/0.20 mm when it was made Layer (a) (outermost layer) comprising (A-1), Layer (b) (intermediate layer) comprising (B-10) and Layer (a') (innermost layer) comprising (A-8), to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 27

In Example 21, the same method was carried out as in Example 21 except for changing the conductive semi-aromatic polyamide composition (B-15) to the polyamide 610 composition (C-1), changing the extrusion temperature of (C-1) to 270° C., and changing the layer constitution to (a)/(b)/(c)=0.40/0.20/0.40 mm when it was made Layer (a) (outermost layer) comprising (A-1), Layer (b) (intermediate layer) comprising (B-1) and Layer (c) (innermost layer) comprising (C-1), to obtain a multilayer tube having the layer constitution shown in Table 2. The measurement results of the properties of the multilayer tube are shown in Table 2.

Example 28

In Example 23, the same method was carried out as in Example 23 except for changing the conductive semi-aromatic polyamide composition (B-17) to the polyamide 610 composition (C-1), changing the extrusion temperature of (C-1) to 270° C., and changing the layer constitution to (a)/(b)/(c)=0.40/0.20/0.40 mm when it was made Layer (a) (outermost layer) comprising (A-1), Layer (b) (intermediate layer) comprising (B-10) and Layer (c) (innermost layer) comprising (C-1), to obtain a multilayer tube having the layer constitution shown in Table 2. The measurement results of the properties of the multilayer tube are shown in Table 2.

Example 29

In Example 21, the same method was carried out as in Example 21 except for changing the conductive semi-aromatic polyamide composition (B-15) to the conductive polyamide 610 composition (C-2), changing the extrusion temperature of (C-2) to 300° C., and changing the layer constitution to (a)/(b)/(c)=0.60/0.20/0.20 mm when it was made Layer (a) (outermost layer) comprising (A-1), Layer (b) (intermediate layer) comprising (B-1) and Layer (c) (innermost layer) comprising (C-2), to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 30

In Example 23, the same method was carried out as in Example 23 except for changing the conductive semi-aromatic polyamide composition (B-17) to the conductive polyamide 610 composition (C-2), changing the extrusion temperature of (C-2) to 300° C., and changing the layer constitution to (a)/(b)/(c)=0.60/0.20/0.20 mm when it was made Layer (a) (outermost layer) comprising (A-1), Layer (b) (intermediate layer) comprising (B-1) and Layer (c) (innermost layer) comprising (C-2), to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 31

In Example 21, the same method was carried out as in Example 21 except for changing the conductive semi-aromatic polyamide composition (B-15) to the polyamide 612 composition (C-5), changing the extrusion temperature of (C-5) to 270° C., and changing the layer constitution to (a)/(b)/(c)=0.40/0.20/0.40 mm when it was made Layer (a) (outermost layer) comprising (A-1), Layer (b) (intermediate layer) comprising (B-1) and Layer (c) (innermost layer) comprising (C-5), to obtain a multilayer tube having the layer constitution shown in Table 2. The measurement results of the properties of the multilayer tube are shown in Table 2.

Example 32

In Example 23, the same method was carried out as in Example 23 except for changing the conductive semi-aromatic polyamide composition (B-17) to the polyamide 612 composition (C-5), changing the extrusion temperature of (C-5) to 270° C., and changing the layer constitution to (a)/(b)/(c)=0.40/0.20/0.40 mm when it was made Layer (a) (outermost layer) comprising (A-1), Layer (b) (intermediate layer) comprising (B-10) and Layer (c) (innermost layer) comprising (C-5), to obtain a multilayer tube having the layer constitution shown in Table 2. The measurement results of the properties of the multilayer tube are shown in Table 2.

Example 33

In Example 21, the same method was carried out as in Example 21 except for changing the conductive semi-aromatic polyamide composition (B-15) to the conductive polyamide 612 composition (C-6), changing the extrusion temperature of (C-6) to 300° C., and changing the layer constitution to (a)/(b)/(c)=0.60/0.20/0.20 mm when it was made Layer (a) (outermost layer) comprising (A-1), Layer (b) (intermediate layer) comprising (B-1) and Layer (c) (innermost layer) comprising (C-6), to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 34

In Example 23, the same method was carried out as in Example 23 except for changing the conductive semi-aromatic polyamide composition (B-17) to the conductive polyamide 612 composition (C-6), changing the extrusion temperature of (C-6) to 300° C., and changing the layer constitution to (a)/(b)/(c)=0.60/0.20/0.20 mm when it was made Layer (a) (outermost layer) comprising (A-1), Layer (b) (intermediate layer) comprising (B-10) and Layer (c) (innermost layer) comprising (C-6), to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 35

In Example 21, the same method was carried out as in Example 21 except for changing the conductive semi-aromatic polyamide composition (B-15) to the fluorine-containing polymer (D-1), and changing the extrusion temperature of (D-1) to 290° C., to obtain a multilayer tube having the layer constitution shown in Table 2. The measurement results of the properties of the multilayer tube are shown in Table 2.

Example 36

In Example 35, the same method was carried out as in Example 35 except for changing the fluorine-containing polymer (D-1) to the conductive fluorine-containing polymer (D-2), and changing the extrusion temperature of (D-2) to 310° C., to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 37

In Example 35, the same method was carried out as in Example 35 except for changing the fluorine-containing polymer (D-1) to (D-5), and changing the extrusion temperature of (D-5) to 310° C., to obtain a multilayer tube having the layer constitution shown in Table 2. The measurement results of the properties of the multilayer tube are shown in Table 2.

Example 38

In Example 35, the same method was carried out as in Example 35 except for changing the fluorine-containing polymer (D-1) to (D-8), and changing the extrusion temperature of (D-8) to 300° C., to obtain a multilayer tube having the layer constitution shown in Table 2. The measurement results of the properties of the multilayer tube are shown in Table 2.

Example 39

In Example 23, the same method was carried out as in Example 23 except for changing the conductive semi-aromatic polyamide composition (B-17) to the fluorine-containing polymer (D-1), and changing the extrusion temperature of (D-1) to 290° C., to obtain a multilayer tube having the layer constitution shown in Table 2. The measurement results of the properties of the multilayer tube are shown in Table 2.

Example 40

In Example 39, the same method was carried out as in Example 39 except for changing the fluorine-containing polymer (D-1) to the conductive fluorine-containing polymer (D-2), and changing the extrusion temperature of (D-2) to 310° C. to obtain a multilayer tube having the layer constitution shown in Table 2. The measurement results of properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Example 41

In Example 39, the same method was carried out as in Example 39 except for changing the fluorine-containing polymer (D-1) to (D-5), and changing the extrusion temperature of (D-5) to 310° C. to obtain a multilayer tube having the layer constitution shown in Table 2. The measurement results of properties of the multilayer tube are shown in Table 2.

Example 42

In Example 39, the same method was carried out as in Example 39 except for changing the fluorine-containing polymer (D-1) to (D-8), and changing the extrusion temperature of (D-8) to 300° C. to obtain a multilayer tube having the layer constitution shown in Table 2. The measurement results of properties of the multilayer tube are shown in Table 2.

Example 43

By using the polyamide 12 composition (A-1), the semi-aromatic polyamide composition (B-1), the fluorine-containing polymer (D-1) and the conductive fluorine-containing polymer (D-2) mentioned above, (A-1) was melted at the extrusion temperature of 270° C., (B-1) was melted at the extrusion temperature of 300° C., (D-1) was melted at the extrusion temperature of 290° C., (D-2) was melted at the extrusion temperature of 310° C. separately in a three-layer tube molding machine Plabor (manufactured by Plastics Technology Co., Ltd.), and the discharged molten resins were combined by an adaptor to mold a multilayered tubular body. Subsequently, it was cooled by a sizing die for controlling the dimensions, and subjecting to take off, to obtain a multilayer tube having the layer constitution of (a)/(b)/(d)/(d')=0.65/0.15/0.10/0.10 mm when it was made Layer (a) (outermost layer) comprising (A-1), Layer (b) (intermediate layer) comprising (B-1), Layer (d) (inner layer) comprising (D-1) and Layer (d') (innermost layer) comprising (D-2), and having an inner diameter of 6.0 mm and an outer diameter of 8.0 mm. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 44

In Example 43, the same method was carried out as in Example 43 except for changing the conductive fluorine-containing polymer (D-2) to the fluorine-containing polymer (D-3), and changing the extrusion temperature of (D-3) to 290° C. to obtain a multilayer tube having the layer constitution shown in Table 3. The measurement results of the properties of the multilayer tube are shown in Table 3.

Example 45

In Example 43, the same method was carried out as in Example 43 except for changing the conductive fluorine-containing polymer (D-2) to (D-4) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 46

In Example 43, the same method was carried out as in Example 43 except for changing the fluorine-containing polymer (D-1) to (D-5), changing the conductive fluorine-containing polymer (D-2) to the fluorine-containing polymer (D-6), and changing the extrusion temperature of (D-5) to 310° C. to obtain a multilayer tube having the layer constitution shown in Table 3. The measurement results of the properties of the multilayer tube are shown in Table 3.

Example 47

In Example 43, the same method was carried out as in Example 43 except for changing the fluorine-containing polymer (D-1) to (D-5), changing the conductive fluorine-containing polymer (D-2) to (D-7), and changing the extrusion temperature of (D-5) to 310° C. and the extrusion temperature of (D-7) to 330° C. to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 48

In Example 43, the same method was carried out as in Example 43 except for changing the fluorine-containing polymer (D-1) to (D-8), and changing the conductive fluorine-containing polymer (D-2) to the fluorine-containing polymer (D-9) to obtain a multilayer tube having the layer constitution shown in Table 3. The measurement results of the properties of the multilayer tube are shown in Table 3.

Example 49

In Example 43, the same method was carried out as in Example 43 except for changing the fluorine-containing polymer (D-1) to (D-8), and changing the conductive fluorine-containing polymer (D-2) to (D-10) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 50

In Example 43, the same method was carried out as in Example 43 except for changing the semi-aromatic polyamide composition (B-1) to (B-10), and changing the extrusion temperature of (B-10) to 280° C. to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 51

In Example 50, the same method was carried out as in Example 50 except for changing the conductive fluorine-containing polymer (D-2) to the fluorine-containing polymer (D-3), and changing the extrusion temperature of (D-3) to 290° C. to obtain a multilayer tube having the layer constitution shown in Table 3. The measurement results of the properties of the multilayer tube are shown in Table 3.

Example 52

In Example 50, the same method was carried out as in Example 50 except for changing the conductive fluorine-containing polymer (D-2) to (D-4) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 53

In Example 50, the same method was carried out as in Example 50 except for changing the fluorine-containing polymer (D-1) to (D-5), changing the conductive fluorine-containing polymer (D-2) to the fluorine-containing polymer (D-6), and changing the extrusion temperature of (D-5) to 310° C. to obtain a multilayer tube having the layer constitution shown in Table 3. The measurement results of the properties of the multilayer tube are shown in Table 3.

Example 54

In Example 50, the same method was carried out as in Example 50 except for changing the fluorine-containing polymer (D-1) to (D-5), changing the conductive fluorine-containing polymer (D-2) to (D-7), and changing the extrusion temperature of (D-5) to 310° C. and the extrusion temperature of (D-7) to 330° C. to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 55

In Example 50, the same method was carried out as in Example 50 except for changing the fluorine-containing polymer (D-1) to (D-8), and changing the conductive fluorine-containing polymer (D-2) to the fluorine-containing polymer (D-9) to obtain a multilayer tube having the layer constitution shown in Table 3. The measurement results of the properties of the multilayer tube are shown in Table 3.

Example 56

In Example 50, the same method was carried out as in Example 50 except for changing the fluorine-containing polymer (D-1) to (D-8), the conductive fluorine-containing polymer (D-2) to (D-10) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 57

In Example 43, the same method was carried out as in Example 43 except for changing the fluorine-containing polymer (D-1) to the polyamide 12 composition (A-1), changing the extrusion temperature of (A-1) to 270° C., and changing the layer constitution to (a)/(b)/(a)/(d)=0.40/0.15/0.35/0.10 mm when it was made Layer (a) (outermost layer, inner layer) comprising (A-1), Layer (b) (intermediate layer) comprising (B-1) and Layer (d) (innermost layer) comprising (D-2), to obtain a multilayer tube having the layer constitution shown in Table 3. The measurement results of the properties of the multilayer tube are shown in Table 3.

Example 58

In Example 50, the same method was carried out as in Example 50 except for changing the fluorine-containing polymer (D-1) to the polyamide 12 composition (A-1), changing the extrusion temperature of (A-1) to 270° C., and changing the layer constitution to (a)/(b)/(a)/(d)=0.40/0.15/0.35/0.10 mm when it was made Layer (a) (outermost layer, inner layer) comprising (A-1), Layer (b) (intermediate layer) comprising (B-1) and Layer (d) (innermost layer) comprising (D-2), to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 59

In Example 43, the same method was carried out as in Example 43 except for changing the fluorine-containing polymer (D-1) to the polyamide 610 composition (C-1), changing the extrusion temperature of (C-1) to 270° C., and changing the layer constitution to (a)/(b)/(c)/(d)=0.40/0.15/0.35/0.10 mm when it was made Layer (a) (outermost layer) comprising (A-1), Layer (b) (intermediate layer) comprising (B-1), Layer (c) (inner layer) comprising (C-1) and Layer (d) (innermost layer) comprising (D-2), to obtain a multilayer tube having the layer constitution shown in Table 2. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 60

In Example 50, the same method was carried out as in Example 50 except for changing the fluorine-containing polymer (D-1) to the polyamide 610 composition (C-1), changing the extrusion temperature of (C-1) to 270° C., and changing the layer constitution to (a)/(b)/(c)/(d)=0.40/0.15/0.35/0.10 mm when it was made Layer (a) (outermost layer) comprising (A-1), Layer (b) (intermediate layer) comprising (B-10), Layer (c) (inner layer) comprising (C-1) and Layer (d) (innermost layer) comprising (D-2), to obtain a multilayer tube having the layer constitution shown in Table 2. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 61

In Example 43, the same method was carried out as in Example 43 except for changing the fluorine-containing polymer (D-1) to the polyamide 6/12 composition (C-3), changing the extrusion temperature of (C-3) to 240° C., and changing the layer constitution to (a)/(b)/(c)/(d)=0.40/0.15/0.35/0.10 mm when it was made Layer (a) (outermost layer) comprising (A-1), Layer (b) (intermediate layer) comprising (B-1), Layer (c) (inner layer) comprising (C-3) and Layer (d) (innermost layer) comprising (D-2), to obtain a multilayer tube having the layer constitution shown in Table 2. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 62

In Example 50, the same method was carried out as in Example 50 except for changing the fluorine-containing polymer (D-1) to the polyamide 6/12 composition (C-3), changing the extrusion temperature of (C-3) to 240° C., and changing the layer constitution to (a)/(b)/(c)/(d)=0.40/0.15/0.35/0.10 mm when it was made Layer (a) (outermost layer) comprising (A-1), Layer (b) (intermediate layer) comprising (B-10), Layer (c) (inner layer) comprising (C-3) and Layer (d) (innermost layer) comprising (D-2), to obtain a multilayer tube having the layer constitution shown in Table 2. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 63

In Example 43, the same method was carried out as in Example 43 except for changing the fluorine-containing polymer (D-1) to the polyamide 6 composition (C-4), changing the extrusion temperature of (C-4) to 270° C., and changing the layer constitution to (a)/(b)/(c)/(d) 0.40/0.15/0.35/0.10 mm when it was made Layer (a) (outermost layer) comprising (A-1), Layer (b) (intermediate layer) comprising (B-1), Layer (c) (inner layer) comprising (C-4) and Layer (d) (innermost layer) comprising (D-2), to obtain a multilayer tube having the layer constitution shown in Table 2. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 64

In Example 50, the same method was carried out as in Example 50 except for changing the fluorine-containing polymer (D-1) to the polyamide 6 composition (C-4), changing the extrusion temperature of (C-4) to 270° C., and changing the layer constitution to (a)/(b)/(c)/(d)=0.40/0.15/0.35/0.10 mm when it was made Layer (a) (outermost layer) comprising (A-1), Layer (b) (intermediate layer) comprising (B-10), Layer (c) (inner layer) comprising (C-4) and Layer (d) (innermost layer) comprising (D-2), to obtain a multilayer tube having the layer constitution shown in Table 2. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 65

In Example 43, the same method was carried out as in Example 43 except for changing the fluorine-containing polymer (D-1) to the polyamide 612 composition (C-5), changing the extrusion temperature of (C-5) to 270° C., and changing the layer constitution to (a)/(b)/(c)/(d)=0.40/0.15/0.35/0.10 mm when it was made Layer (a) (outermost layer) comprising (A-1), Layer (b) (intermediate layer) comprising (B-1), Layer (c) (inner layer) comprising (C-5) and Layer (d) (innermost layer) comprising (D-2), to obtain a multilayer tube having the layer constitution shown in Table 2. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Example 66

In Example 50, the same method was carried out as in Example 50 except for changing the fluorine-containing polymer (D-1) to the polyamide 612 composition (C-5), changing the extrusion temperature of (C-5) to 270° C., and changing the layer constitution to (a)/(b)/(c)/(d)=0.40/0.15/0.35/0.10 mm when it was made Layer (a) (outermost layer) comprising (A-1), Layer (b) (intermediate layer) comprising (B-10), Layer (c) (inner layer) comprising (C-5) and Layer (d) (innermost layer) comprising (D-2), to obtain a multilayer tube having the layer constitution shown in Table 2. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Comparative Example 1

In Example 1, the same method was carried out as in Example 1 except for changing the polyamide 12 composition (A-1) to (A-9) to obtain a multilayer tube having the layer constitution shown in Table 1. The measurement results of the properties of the multilayer tube are shown in Table 1.

Comparative Example 2

In Example 1, the same method was carried out as in Example 1 except for changing the polyamide 12 composition (A-1) to (A-10) to obtain a multilayer tube having the layer constitution shown in Table 1. The measurement results of the properties of the multilayer tube are shown in Table 1.

Comparative Example 3

In Example 1, the same method was carried out as in Example 1 except for changing the polyamide 12 composition (A-1) to (A-11) to obtain a multilayer tube having the layer constitution shown in Table 1. The measurement results of the properties of the multilayer tube are shown in Table 1.

Comparative Example 4

In Example 1, the same method was carried out as in Example 1 except for changing the polyamide 12 composition (A-1) to (A-12) to obtain a multilayer tube having the layer constitution shown in Table 1. The measurement results of the properties of the multilayer tube are shown in Table 1.

Comparative Example 5

In Example 16, the same method was carried out as in Example 16 except for changing the polyamide 12 composition (A-1) to (A-9) to obtain a multilayer tube having the layer constitution shown in Table 1. The measurement results of the properties of the multilayer tube are shown in Table 1.

Comparative Example 6

In Example 16, the same method was carried out as in Example 16 except for changing the polyamide 12 composition (A-1) to (A-10) to obtain a multilayer tube having the layer constitution shown in Table 1. The measurement results of the properties of the multilayer tube are shown in Table 1.

Comparative Example 7

In Example 16, the same method was carried out as in Example 16 except for changing the polyamide 12 composition (A-1) to (A-11) to obtain a multilayer tube having the layer constitution shown in Table 1. The measurement results of the properties of the multilayer tube are shown in Table 1.

Comparative Example 8

In Example 16, the same method was carried out as in Example 16 except for changing the polyamide 12 composition (A-1) to (A-12) to obtain a multilayer tube having the layer constitution shown in Table 1. The measurement results of the properties of the multilayer tube are shown in Table 1.

Comparative Example 9

In Example 21, the same method was carried out as in Example 21 except for changing the polyamide 12 composition (A-1) to (A-9) to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Comparative Example 10

In Example 21, the same method was carried out as in Example 21 except for changing the polyamide 12 composition (A-1) to (A-10) to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Comparative Example 11

In Example 21, the same method was carried out as in Example 21 except for changing the polyamide 12 composition (A-1) to (A-11) to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Comparative Example 12

In Example 21, the same method was carried out as in Example 21 except for changing the polyamide 12 composition (A-1) to (A-12) to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Comparative Example 13

In Example 23, the same method was carried out as in Example 23 except for changing the polyamide 12 composition (A-1) to (A-9) to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Comparative Example 14

In Example 23, the same method was carried out as in Example 23 except for changing the polyamide 12 composition (A-1) to (A-10) to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Comparative Example 15

In Example 23, the same method was carried out as in Example 23 except for changing the polyamide 12 composition (A-1) to (A-11) to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Comparative Example 16

In Example 23, the same method was carried out as in Example 23 except for changing the polyamide 12 composition (A-1) to (A-12) to obtain a multilayer tube having the layer constitution shown in Table 2. The measurement results of the properties of the multilayer tube are shown in Table 2. Also, when the conductivity of the multilayer tube was measured in accordance with SAE J-2260, it was $10^6$ Ω/square or less so that it was confirmed to be excellent in electrostatic removing property.

Comparative Example 17

In Example 27, the same method was carried out as in Example 27 except for changing the polyamide 12 composition (A-1) to (A-9) to obtain a multilayer tube having the layer constitution shown in Table 2. The measurement results of properties of the multilayer tube are shown in Table 2.

Comparative Example 18

In Example 27, the same method was carried out as in Example 27 except for changing the polyamide 12 composition (A-1) to (A-10) to obtain a multilayer tube having the layer constitution shown in Table 2. The measurement results of properties of the multilayer tube are shown in Table 2.

Comparative Example 19

In Example 27, the same method was carried out as in Example 27 except for changing the polyamide 12 composition (A-1) to (A-11) to obtain a multilayer tube having the layer constitution shown in Table 2. The measurement results of properties of the multilayer tube are shown in Table 2.

Comparative Example 20

In Example 27, the same method was carried out as in Example 27 except for changing the polyamide 12 composition (A-1) to (A-12) to obtain a multilayer tube having the layer constitution shown in Table 2. The measurement results of properties of the multilayer tube are shown in Table 2.

Comparative Example 21

In Example 28, the same method was carried out as in Example 28 except for changing the polyamide 12 composition (A-1) to (A-9) to obtain a multilayer tube having the layer constitution shown in Table 2. The measurement results of properties of the multilayer tube are shown in Table 2.

Comparative Example 22

In Example 28, the same method was carried out as in Example 28 except for changing the polyamide 12 composition (A-1) to (A-10) to obtain a multilayer tube having the layer constitution shown in Table 2. The measurement results of properties of the multilayer tube are shown in Table 2.

Comparative Example 23

In Example 28, the same method was carried out as in Example 28 except for changing the polyamide 12 composition (A-1) to (A-11) to obtain a multilayer tube having the layer constitution shown in Table 2. The measurement results of properties of the multilayer tube are shown in Table 2.

Comparative Example 24

In Example 28, the same method was carried out as in Example 28 except for changing the polyamide 12 composition (A-1) to (A-12) to obtain a multilayer tube having the layer constitution shown in Table 2. The measurement results of properties of the multilayer tube are shown in Table 2.

Comparative Example 25

In Example 35, the same method was carried out as in Example 35 except for changing the polyamide 12 composition (A-1) to (A-9) to obtain a multilayer tube having the layer constitution shown in Table 2. The measurement results of properties of the multilayer tube are shown in Table 2.

Comparative Example 26

In Example 35, the same method was carried out as in Example 35 except for changing the polyamide 12 composition (A-1) to (A-10) to obtain a multilayer tube having the layer constitution shown in Table 2. The measurement results of properties of the multilayer tube are shown in Table 2.

Comparative Example 27

In Example 35, the same method was carried out as in Example 35 except for changing the polyamide 12 composition (A-1) to (A-11) to obtain a multilayer tube having the layer constitution shown in Table 2. The measurement results of the properties of the multilayer tube are shown in Table 2.

Comparative Example 28

In Example 35, the same method was carried out as in Example 35 except for changing the polyamide 12 composition (A-1) to (A-12) to obtain a multilayer tube having the layer constitution shown in Table 2. The measurement results of the properties of the multilayer tube are shown in Table 2.

Comparative Example 29

In Example 39, the same method was carried out as in Example 39 except for changing the polyamide 12 composition (A-1) to (A-9) to obtain a multilayer tube having the layer constitution shown in Table 2. The measurement results of the properties of the multilayer tube are shown in Table 2.

Comparative Example 30

In Example 39, the same method was carried out as in Example 39 except for changing the polyamide 12 composition (A-1) to (A-10) to obtain a multilayer tube having the layer constitution shown in Table 2. The measurement results of the properties of the multilayer tube are shown in Table 2.

Comparative Example 31

In Example 39, the same method was carried out as in Example 39 except for changing the polyamide 12 composition (A-1) to (A-11) to obtain a multilayer tube having the layer constitution shown in Table 2. The measurement results of the properties of the multilayer tube are shown in Table 2.

Comparative Example 32

In Example 39, the same method was carried out as in Example 39 except for changing the polyamide 12 composition (A-1) to (A-12) to obtain a multilayer tube having the layer constitution shown in Table 2. The measurement results of the properties of the multilayer tube are shown in Table 2.

Comparative Example 33

In Example 43, the same method was carried out as in Example 43 except for changing the polyamide 12 composition (A-1) to (A-9) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Comparative Example 34

In Example 43, the same method was carried out as in Example 43 except for changing the polyamide 12 composition (A-1) to (A-10) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Comparative Example 35

In Example 43, the same method was carried out as in Example 43 except for changing the polyamide 12 composition (A-1) to (A-11) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Comparative Example 36

In Example 43, the same method was carried out as in Example 43 except for changing the polyamide 12 composition (A-1) to (A-12) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Comparative Example 37

In Example 50, the same method was carried out as in Example 50 except for changing the polyamide 12 composition (A-1) to (A-9) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Comparative Example 38

In Example 50, the same method was carried out as in Example 50 except for changing the polyamide 12 composition (A-1) to (A-10) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Comparative Example 39

In Example 50, the same method was carried out as in Example 50 except for changing the polyamide 12 composition (A-1) to (A-11) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Comparative Example 40

In Example 50, the same method was carried out as in Example 50 except for changing the polyamide 12 composition (A-1) to (A-12) to obtain a multilayer tube having the layer constitution shown in Table 3. The measurement results of the properties of the multilayer tube are shown in Table 3. Also, when the conductivity of the multilayer tube was measured in accordance with SAE J-2260, it was $10^6$ Ω/square or less so that it was confirmed to be excellent in electrostatic removing property.

Comparative Example 41

In Example 1, the same method was carried out as in Example 1 except for changing the semi-aromatic polyamide composition (B-1) to (B-19), and changing the extrusion temperature of (B-19) to 290° C. to obtain a multilayer tube having the layer constitution shown in Table 1. The measurement results of the properties of the multilayer tube are shown in Table 1.

Comparative Example 42

In Example 16, the same method was carried out as in Example 16 except for changing the semi-aromatic polyamide composition (B-10) to (B-20), and changing the extrusion temperature of (B-20) to 240° C. to obtain a multilayer tube having the layer constitution shown in Table 1. The measurement results of the properties of the multilayer tube are shown in Table 1.

TABLE 1

| | Outermost layer | | Innermost layer | | Permeated amount of alcohol-containing gasoline | Chemical resistance | | Peeling strength [N/mm] | |
|---|---|---|---|---|---|---|---|---|---|
| | | | | | | | Low temperature Impact (number of broken/ | | |
| | Klnd | Thickness [mm] | Klnd | Thickness [mm] | (CE10) [g/m$^2$ · day] | Appearance | number of tested) | Initial | After heat treatment |
| Example 1 | A-1 | 0.75 | B-1 | 0.25 | 4.0 | No crack | 0/5 | Peeling Impossible | Peeling Impossible |
| Example 2 | A-2 | 0.75 | B-1 | 0.25 | 4.0 | No crack | 0/5 | Peeling Impossible | Peeling Impossible |
| Example 3 | A-3 | 0.75 | B-1 | 0.25 | 3.9 | No crack | 0/5 | Peeling Impossible | Peeling Impossible |
| Example 4 | A-4 | 0.75 | B-1 | 0.25 | 3.9 | No crack | 0/5 | Peeling Impossible | Peeling Impossible |
| Example 5 | A-5 | 0.75 | B-1 | 0.25 | 4.0 | No crack | 0/5 | Peeling Impossible | Peeling Impossible |
| Example 6 | A-6 | 0.75 | B-1 | 0.25 | 4.0 | No crack | 0/5 | Peeling Impossible | Peeling Impossible |
| Example 7 | A-7 | 0.75 | B-1 | 0.25 | 3.8 | No crack | 0/5 | Peeling Impossible | Peeling Impossible |
| Example 8 | A-1 | 0.75 | B-2 | 0.25 | 3.5 | No crack | 0/5 | Peeling Impossible | Peeling Impossible |
| Example 9 | A-2 | 0.75 | B-3 | 0.25 | 5.7 | No crack | 0/5 | Peeling Impossible | Peeling Impossible |
| Example 10 | A-1 | 0.75 | B-4 | 0.25 | 4.6 | No crack | 0/5 | Peeling Impossible | Peeling Impossible |
| Example 11 | A-1 | 0.75 | B-5 | 0.25 | 5.0 | No crack | 0/5 | Peeling Impossible | Peeling Impossible |
| Exemple 11 | A-1 | 0.75 | B-6 | 0.25 | 4.5 | No crack | 0/5 | Peeling Impossible | Peeling Impossible |
| Example 13 | A-1 | 0.75 | B-7 | 0.25 | 3.3 | No crack | 0/5 | Peeling Impossible | Peeling Impossible |
| Example 14 | A-1 | 0.75 | B-8 | 0.25 | 5.2 | No crack | 0/5 | Peeling Impossible | Peeling Impossible |
| Example 15 | A-1 | 0.75 | B-9 | 0.25 | 5.0 | No crack | 0/5 | Peeling Impossible | Peeling Impossible |
| Example 16 | A-1 | 0.75 | B-10 | 0.25 | 3.8 | No crack | 0/5 | Peeling Impossible | Peeling Impossible |
| Example 17 | A-1 | 0.75 | B-11 | 0.25 | 3.9 | No crack | 0/5 | Peeling Impossible | Peeling Impossible |
| Example 18 | A-1 | 0.75 | B-12 | 0.25 | 4.7 | No crack | 0/5 | Peeling Impossible | Peeling Impossible |
| Example 19 | A-1 | 0.75 | B-13 | 0.25 | 4.8 | No crack | 0/5 | Peeling Impossible | Peeling Impossible |
| Example 20 | A-1 | 0.75 | B-14 | 0.25 | 4.8 | No crack | 0/5 | Peeling Impossible | Peeling Impossible |
| Comparative Example 1 | A-9 | 0.75 | B-1 | 0.25 | 4.4 | No crack | 0/5 | 1.5 | 0.6 |
| Comparative Example 2 | A-10 | 0.75 | B-1 | 0.25 | 4.3 | No crack | 0/5 | 2.0 | 0.8 |
| Comparative Example 3 | A-11 | 0.75 | B-1 | 0.25 | 4.2 | No crack | 0/5 | 2.4 | 0.9 |
| Comparitive Example 4 | A-12 | 0.75 | B-1 | 0.25 | 3.8 | With crack | 5/5 | Peeling Impossible | Peeling Impossible |
| Comparative Example 5 | A-9 | 0.75 | B-10 | 0.25 | 4.3 | No crack | 0/5 | 1.4 | 0.6 |
| Comperative Example 6 | A-10 | 0.75 | B-10 | 0.25 | 4.2 | No crack | 0/5 | 1.8 | 0.7 |
| Comparative Example 7 | A-11 | 0.75 | B-10 | 0.25 | 4.0 | No crack | 0/5 | 2.1 | 0.8 |

TABLE 1-continued

| | Outermost layer | | Innermost layer | | | Chemical resistance | | Peeling strength [N/mm] | |
|---|---|---|---|---|---|---|---|---|---|
| | Klnd | Thickness [mm] | Klnd | Thickness [mm] | Permeated amount of alcohol-containing gasoline (CE10) [g/m$^2$ · day] | Appearance | Low temperature Impact (number of broken/ number of tested) | Initial | After heat treatment |
| Comparative Example 8 | A-12 | 0.75 | B-10 | 0.25 | 3.5 | With Crack | 5/5 | Peeling Impossible | Peeling Impossible |
| Comparative Example 41 | A-1 | 0.75 | B-19 | 0.25 | 20 | No crack | 0/5 | Peeling Impossible | Peeling Impossible |
| Compantive Example 42 | A-1 | 0.75 | B-20 | 0.25 | 14 | No crack | 0/5 | Peeling Impossible | Peeling Impossible |

TABLE 2

| | Outermost layer | | Intermediate layer | | Innermost layer | | Chemical resistance | | Peeling strength [N/mm] | |
|---|---|---|---|---|---|---|---|---|---|---|
| | Klnd | Thickness [mm] | Klnd | Thickness [mm] | Klnd | Thickness [mm] | Appearance | Low temperature Impact (number of broken/ number of tested) | Initial | After heat treatment |
| Example 21 | A-1 | 0.75 | B-1 | 0.15 | B-15 | 0.10 | No crack | 0/5 | Peeling Impossible | Peeling Impossible |
| Example 22 | A-1 | 0.75 | B-1 | 0.15 | B-16 | 0.10 | No crack | 0/5 | Peeling Impossible | Peeling Impossible |
| Example 23 | A-1 | 0.75 | B-10 | 0.15 | B-17 | 0.10 | No crack | 0/5 | Peeling Impossible | Peeling Impossible |
| Example 24 | A-1 | 0.75 | B-10 | 0.15 | B-18 | 0.10 | No crack | 0/5 | Peeling Impossible | Peeling Impossible |
| Example 25 | A-1 | 0.60 | B-1 | 0.20 | A-8 | 0.20 | No crack | 0/5 | Peeling Impossible | Peeling Impossible |
| Example 26 | A-1 | 0.60 | B-10 | 0.20 | A-8 | 0.20 | No crack | 0/5 | Peeling Impossible | Peeling Impossible |
| Example 27 | A-1 | 0.40 | B-1 | 0.20 | C-1 | 0.40 | No crack | 0/5 | Peeling Impossible | Peeling Impossible |
| Example 25 | A-1 | 0.40 | B-10 | 0.20 | C-1 | 0.40 | No crack | 0/5 | Peeling Impossible | Peeling Impossible |
| Example 28 | A-1 | 0.60 | B-1 | 0.20 | C-2 | 0.20 | No crack | 0/5 | Peeling Impossible | Peeling Impossible |
| Example 30 | A-1 | 0.60 | B-10 | 0.20 | C-2 | 0.20 | No crack | 0/5 | Peeling Impossible | Peeling Impossible |
| Example 31 | A-1 | 0.40 | B-1 | 0.20 | C-5 | 0.40 | No crack | 0/5 | Peeling Impossible | Peeling Impossible |
| Example 32 | A-1 | 0.40 | B-10 | 0.20 | C-5 | 0.40 | No crack | 0/5 | Peeling Impossible | Peeling Impossible |
| Example 33 | A-1 | 0.60 | B-1 | 0.20 | C-6 | 0.20 | No crack | 0/5 | Peeling Impossible | Peeling Impossible |
| Example 34 | A-1 | 0.60 | B-10 | 0.20 | C-6 | 0.20 | No crack | 0/5 | Peeling Impossible | Peeling Impossible |
| Example 35 | A-1 | 0.75 | B-1 | 0.15 | D-1 | 0.10 | No crack | 0/5 | Peeling Impossible | Peeling Impossible |
| Example 36 | A-1 | 0.75 | B-1 | 0.15 | D-2 | 0.10 | No crack | 0/5 | Peeling Impossible | Peeling Impossible |
| Example 37 | A-1 | 0.75 | B-1 | 0.15 | D-5 | 0.10 | No crack | 0/5 | Peeling Impossible | Peeling Impossible |
| Example 36 | A-1 | 0.75 | B-1 | 0.15 | D-8 | 0.10 | No crack | 0/5 | Peeling Impossible | Peeling Impossible |
| Example 39 | A-1 | 0.75 | B-10 | 0.15 | D-1 | 0.10 | No crack | 0/5 | Peeling Impossible | Peeling Impossible |
| Example 40 | A-1 | 0.75 | B-10 | 0.15 | D-2 | 0.10 | No crack | 0/5 | Peeling Impossible | Peeling Impossible |
| Example 41 | A-1 | 0.75 | B-10 | 0.15 | D-5 | 0.10 | No crack | 0/5 | Peeling Impossible | Peeling Impossible |
| Example 42 | A-1 | 0.75 | B-10 | 0.15 | D-8 | 0.10 | No crack | 0/5 | Peeling Impossible | Peeling Impossible |
| Comparative Example 9 | A-9 | 0.76 | B-1 | 0.15 | B-15 | 0.10 | No crack | 0/5 | 1.2 | 0.5 |
| Comparative Example 10 | A-10 | 0.75 | B-1 | 0.15 | B-15 | 0.10 | No crack | 0/5 | 2.2 | 0.7 |
| Comparative Example 11 | A-11 | 0.75 | B-1 | 0.15 | B-15 | 0.10 | No crack | 0/5 | 2.5 | 0.8 |
| Comparative Example 12 | A-12 | 0.75 | B-1 | 0.15 | B-15 | 0.10 | With crack | 5/5 | Peeling Impossible | Peeling Impossible |
| Comparative Example 13 | A-9 | 0.75 | B-10 | 0.15 | B-17 | 0.10 | No crack | 0/5 | 13 | 0.5 |
| Comparative Example 14 | A-10 | 0.75 | B-10 | 0.15 | B-17 | 0.10 | No crack | 0/5 | 2.0 | 0.6 |
| Comparative Example 15 | A-11 | 0.75 | B-10 | 0.15 | B-17 | 0.10 | No crack | 0/5 | 2.3 | 0.8 |
| Comparative Example 16 | A-12 | 0.75 | B-10 | 0.15 | B-17 | 0.10 | With crack | 5/5 | Peeling Impossible | Peeling Impossible |
| Comparative Example 17 | A-9 | 0.40 | B-1 | 0.20 | C-1 | 0.40 | No crack | 0/5 | 1.0 | 0.2 |
| Comparative Example 18 | A-10 | 0.40 | B-1 | 0.20 | C-1 | 0.40 | No crack | 0/5 | 2.3 | 0.6 |
| Comparative Example 19 | A-11 | 0.40 | B-1 | 0.20 | C-1 | 0.40 | No crack | 0/5 | 2.4 | 0.9 |

TABLE 2-continued

| | Outermost layer | | Intermediate layer | | Innermost layer | | Chemical resistance | | Peeling strength [N/mm] | |
|---|---|---|---|---|---|---|---|---|---|---|
| | Klnd | Thickness [mm] | Klnd | Thickness [mm] | Klnd | Thickness [mm] | Appearance | Low temperature Impact (number of broken/number of tested) | Initial | After heat treatment |
| Comparative Example 20 | A-12 | 0.40 | B-1 | 0.20 | C-1 | 0.40 | With crack | 5/5 | Peeling Impossible | Peeling Impossible |
| Comparative Example 21 | A-9 | 0.40 | B-10 | 0.20 | C-1 | 0.40 | No crack | 0/5 | 1.4 | 0.3 |
| Comparative Example 22 | A-10 | 0.40 | B-10 | 0.20 | C-1 | 0.40 | No crack | 0/5 | 2.1 | 0.7 |
| Comparative Example 23 | A-11 | 0.40 | B-10 | 0.20 | C-1 | 0.40 | No crack | 0/5 | 2.4 | 0.8 |
| Comparative Example 24 | A-12 | 0.40 | B-10 | 0.20 | C-1 | 0.40 | With crack | 5/5 | Peeling Impossible | Peeling Impossible |
| Comparative Example 25 | A-9 | 0.75 | B-1 | 0.15 | D-1 | 0.10 | No crack | 0/5 | 1.1 | 0.6 |
| Comparative Example 26 | A-10 | 0.70 | B-1 | 0.15 | D-1 | 0.10 | No crack | 0/5 | 2.3 | 0.9 |
| Comparative Example 27 | A-11 | 0.75 | B-1 | 0.15 | D-1 | 0.10 | No crack | 0/5 | 2.5 | 0.9 |
| Comparative Example 28 | A-12 | 0.75 | B-1 | 0.15 | D-1 | 0.10 | With crack | 5/5 | Peeling Impossible | Peeling Impossible |
| Comparative Example 29 | A-9 | 0.75 | B-10 | 0.15 | D-1 | 0.10 | No crack | 0/5 | 1.5 | 0.5 |
| Comparative Example 30 | A-10 | 0.75 | B-10 | 0.15 | D-1 | 0.10 | No crack | 0/5 | 2.4 | 0.8 |
| Comparative Example 31 | A-11 | 0.75 | B-10 | 0.15 | D-1 | 0.10 | No crack | 0/5 | 2.5 | 0.9 |
| Comparative Example 32 | A-12 | 0.75 | B-10 | 0.15 | D-1 | 0.10 | With crack | 5/5 | Peeling Impossible | Peeling Impossible |

TABLE 3

| | Outermost layer | | Intermediate layer | | Inner layer | | Innermost layer | | Chemical resistance | | Peeling strength [N/mm] | |
|---|---|---|---|---|---|---|---|---|---|---|---|---|
| | Klnd | Thickness [mm] | Klnd | Thickness [mm] | Klnd | Thickness [mm] | Klnd | Thickness [mm] | Appearance | Low temperature Impact (number of broken/number of tested) | Initial | After heat treatment |
| Example 43 | A-1 | 0.65 | B-1 | 0.15 | D-1 | 0.10 | D-2 | 0.10 | No crack | 0/5 | Peeling Impossible | Peeling Impossible |
| Example 44 | A-1 | 0.65 | B-1 | 0.15 | D-1 | 0.10 | D-3 | 0.10 | No crack | 0/5 | Peeling Impossible | Peeling Impossible |
| Example 45 | A-1 | 0.55 | B-1 | 0.15 | D-1 | 0.10 | D-4 | 0.10 | No crack | 0/5 | Peeling Impossible | Peeling Impossible |
| Example 46 | A-1 | 0.65 | B-1 | 0.15 | D-5 | 0.10 | D-6 | 0.10 | No crack | 0/5 | Peeling Impossible | Peeling Impossible |
| Example 47 | A-1 | 0.65 | B-1 | 0.15 | D-5 | 0.10 | D-7 | 0.10 | No crack | 0/5 | Peeling Impossible | Peeling Impossible |
| Example 48 | A-1 | 0.65 | B-1 | 0.15 | D-8 | 0.10 | D-9 | 0.10 | No crack | 0/5 | Peeling Impossible | Peeling Impossible |
| Example 49 | A-1 | 0.65 | B-1 | 0.15 | D-8 | 0.10 | D-10 | 0.10 | No crack | 0/5 | Peeling Impossible | Peeling Impossible |
| Example 50 | A-1 | 0.65 | B-10 | 0.15 | D-1 | 0.10 | D-2 | 0.10 | No crack | 0/5 | Peeling Impossible | Peeling Impossible |
| Example 51 | A-1 | 0.65 | B-10 | 0.15 | D-1 | 0.10 | D-3 | 0.10 | No crack | 0/5 | Peeling Impossible | Peeling Impossible |
| Example 52 | A-1 | 0.65 | B-10 | 0.15 | D-1 | 0.10 | D-4 | 0.10 | No crack | 0/5 | Peeling Impossible | Peeling Impossible |
| Example 53 | A-1 | 0.65 | B-10 | 0.15 | D-5 | 0.10 | D-6 | 0.10 | No crack | 0/5 | Peeling Impossible | Peeling Impossible |
| Example 54 | A-1 | 0.65 | B-10 | 0.15 | D-5 | 0.10 | D-7 | 0.10 | No crack | 0/5 | Peeling Impossible | Peeling Impossible |
| Example 55 | A-1 | 0.65 | B-10 | 0.15 | D-8 | 0.10 | D-9 | 0.10 | No crack | 0/5 | Peeling Impossible | Peeling Impossible |
| Example 56 | A-1 | 0.65 | B-10 | 0.15 | D-8 | 0.10 | D-10 | 0.10 | No crack | 0/5 | Peeling Impossible | Peeling Impossible |
| Example 57 | A-1 | 0.40 | B-1 | 0.15 | A-1 | 0.35 | D-2 | 0.10 | No crack | 0/5 | Peeling Impossible | Peeling Impossible |
| Example 58 | A-1 | 0.40 | B-10 | 0.15 | A-1 | 0.35 | D-2 | 0.10 | No crack | 0/5 | Peeling Impossible | Peeling Impossible |
| Example 59 | A-1 | 0.40 | B-1 | 0.15 | C-1 | 0.35 | D-2 | 0.10 | No crack | 0/5 | Peeling Impossible | Peeling Impossible |
| Example 60 | A-1 | 0.40 | B-10 | 0.15 | C-1 | 0.35 | D-2 | 0.10 | No crack | 0/5 | Peeling Impossible | Peeling Impossible |
| Example 61 | A-1 | 0.40 | B-1 | 0.15 | C-3 | 0.35 | D-2 | 0.10 | No crack | 0/5 | Peeling Impossible | Peeling Impossible |
| Example 62 | A-1 | 0.40 | B-10 | 0.15 | C-3 | 0.35 | D-2 | 0.10 | No crack | 0/5 | Peeling Impossible | Peeling Impossible |
| Example 63 | A-1 | 0.40 | B-1 | 0.15 | C-4 | 0.35 | D-2 | 0.10 | No crack | 0/5 | Peeling Impossible | Peeling Impossible |
| Example 64 | A-1 | 0.40 | B-10 | 0.15 | C-4 | 0.35 | D-2 | 0.10 | No crack | 0/5 | Peeling Impossible | Peeling Impossible |
| Example 65 | A-1 | 0.40 | B-1 | 0.15 | C-5 | 0.35 | D-2 | 0.10 | No crack | 0/5 | Peeling Impossible | Peeling Impossible |
| Example 66 | A-1 | 0.40 | B-10 | 0.15 | C-5 | 0.35 | D-2 | 0.10 | No crack | 0/5 | Peeling Impossible | Peeling Impossible |

TABLE 3-continued

| | Outermost layer | | Intermediate layer | | Inner layer | | Innermost layer | | Chemical resistance | | Peeling strength [N/mm] | |
|---|---|---|---|---|---|---|---|---|---|---|---|---|
| | Klnd | Thickness [mm] | Klnd | Thickness [mm] | Klnd | Thickness [mm] | Klnd | Thickness [mm] | Appearance | Low temperature Impact (number of broken/number of tested) | Initial | After heat treatment |
| Comparative Example 33 | A-9 | 0.65 | B-1 | 0.15 | D-1 | 0.10 | D-2 | 0.10 | No crack | 0/5 | 1.2 | 0.5 |
| Comparative Example 34 | A-10 | 0.65 | B-1 | 0.15 | D-1 | 0.10 | D-2 | 0.10 | No crack | 0/5 | 2.1 | 0.7 |
| Comparative Example 35 | A-11 | 0.65 | B-1 | 0.15 | D-1 | 0.10 | D-2 | 0.10 | No crack | 0/5 | 2.2 | 0.9 |
| Comparative Example 36 | A-12 | 0.65 | B-1 | 0.15 | D-1 | 0.10 | D-2 | 0.10 | With crack | 5/5 | Peeling Impossible | Peeling Impossible |
| Comparative Example 37 | A-9 | 0.65 | B-10 | 0.15 | D-1 | 0.10 | D-2 | 0.10 | No crack | 0/5 | 1.2 | 0.7 |
| Comparative Example 38 | A-10 | 0.65 | B-10 | 0.15 | D-1 | 0.10 | D-2 | 0.10 | No crack | 0/5 | 2.3 | 0.9 |
| Comparative Example 39 | A-11 | 0.65 | B-10 | 0.15 | D-1 | 0.10 | D-2 | 0.10 | No crack | 0/5 | 2.4 | 0.9 |
| Comparative Example 40 | A-12 | 0.65 | B-10 | 0.15 | D-1 | 0.10 | D-2 | 0.10 | With crack | 5/5 | Peeling Impossible | Peeling Impossible |

As clearly seen from Tables 1, 2 and 3, the multilayer tubes of Comparative Examples 1 to 2, 5 to 6, 9 to 10, 13 to 14, 17 to 18, 21 to 22, 25 to 26, 29 to 30, 33 to 34 and 37 to 38 having a layer which did not use the polyamide (A2), and contained the aliphatic polyamide composition in which the absolute value of a difference in solubility parameter SP values of the polyamide (A1) and the polyamide (A2) was out of the regulated range of the present invention were inferior in durability of interlayer adhesiveness. The multilayer tubes of Comparative Examples 3, 7, 11, 15, 19, 23, 27, 31, 35 and 39 having a layer which uses the polyamide (A2), and contained the aliphatic polyamide composition in which the absolute value of a difference in solubility parameter SP values of the polyamide (A1) and the polyamide (A2) was out of the regulated range of the present invention were inferior in durability of interlayer adhesiveness. The multilayer tubes of Comparative Examples 4, 8, 12, 16, 20, 24, 28, 32, 36 and 40 having a layer which contains the aliphatic polyamide composition in which the added amount of the polyamide (A2) outside the regulated range of the present invention were poor in chemical resistance. The multilayer tubes of Comparative Examples 41 and 42 having a layer which contains the semi-aromatic polyamide composition out of the regulated range of the present invention were inferior in chemical liquid-barrier property.

On the other hand, it is clear that the multilayer tubes of Examples 1 to 66 regulated in the present invention are good in various characteristics such as chemical liquid-barrier property, chemical resistance, interlayer adhesiveness and durability thereof, etc.

The invention claimed is:

1. A multilayer tube which comprises two or more layers containing Layer (a) and Layer (b), wherein at least one pair of Layer (a) and Layer (b) are disposed adjacent to each other, the Layer (a) contains an aliphatic polyamide composition (A), the Layer (b) contains a semi-aromatic polyamide composition (B), the aliphatic polyamide composition (A) contains a polyamide (A1), a polyamide (A2) and an elastomer polymer (A3), the polyamide (A1) is an aliphatic polyamide having a melting point measured in accordance with ISO 11357-3 of 210° C. or lower, and having a ratio of methylene groups to amide groups of 8.0 or more, and contained in the aliphatic polyamide composition (A) in an amount of 40% by mass or more and 85% by mass or less, the polyamide (A2) is a polyamide other than the polyamide (A1) and contained in the aliphatic polyamide composition (A) in an amount of 10% by mass or more and 30% by mass or less, the elastomer polymer (A3) contains a constitutional unit derived from an unsaturated compound having a carboxyl group and/or an acid anhydride group, and contained in the aliphatic polyamide composition (A) in an amount of 5% by mass or more and 30% by mass or less, an absolute value of a difference in solubility parameter SP values of the polyamide (A1) and the polyamide (A2) [|(SP value of polyamide (A1))−(SP value of polyamide (A2))|] is 1.8 $(MPa)^{1/2}$ or more and 5.5 $(MPa)^{1/2}$ or less, the semi-aromatic polyamide composition (B) contains a semi-aromatic polyamide (B1) and/or a semi-aromatic polyamide (B2), the semi-aromatic polyamide (B1) and/or the semi-aromatic polyamide (B2) is/are contained in an amount(s) of 60% by mass or more, the semi-aromatic polyamide (B1) contains 60% by mass or more and 100% by mass or less of a semi-aromatic polyamide (B11) and 0% by mass or more and 40% by mass or less of a semi-aromatic polyamide (B12), the semi-aromatic polyamide (B11) contains 50 mol % or more of an aliphatic diamine unit having 4 or more and 8 or less carbon atoms based on whole diamine units of the semi-aromatic polyamide (B11), and contains 50 mol % or more of a dicarboxylic acid unit which contains at least one kind selected from the group consisting of a terephthalic acid unit, an isophthalic acid unit and a naphthalene dicarboxylic acid unit based on whole dicarboxylic acid units of the semi-aromatic polyamide (B11), the semi-aromatic polyamide (B12) contains 50 mol % or more of an aliphatic diamine unit having 9 or more and 12 or less carbon atoms based on whole diamine units of the semi-aromatic polyamide (B12), and contains 50 mol % or more of a dicarboxylic acid unit which contains at least one kind selected from the group consisting of a terephthalic acid unit, an isophthalic acid unit and a naphthalene dicarboxylic acid unit based on whole dicarboxylic acid units of the semi-aromatic polyamide (B12), the semi-aromatic polyamide (B2) contains 60% by mass or more and 100% by mass or less of a semi-aromatic polyamide (B21) and 0% by mass or more and 40% by mass or less of a semi-aromatic polyamide (B22), the semi-aromatic polyamide (B21) contains 50 mol % or more of a xylylene diamine unit and/or a bis(aminomethyl)naphthalene unit based on whole diamine units of the semi-aromatic polyamide (B21), and contains 50 mol % or more of an aliphatic dicarboxylic acid unit having 4 or more and 8 or less carbon atoms based on whole dicarboxylic acid units of the semi-aromatic polyamide (B21), and the semi-aromatic polyamide (B22) contains 50 mol % or more of a xylylene diamine unit and/or a bis(aminomethyl)naphthalene unit based on whole diamine units of the semi-aromatic polyamide (B22), and contains 50 mol % or more of an aliphatic dicarboxylic acid unit having 9 or more and 12 or less carbon atoms based on whole dicarboxylic acid units of the semi-aromatic polyamide (B22).

2. The multilayer tube according to claim 1, wherein the polyamide (A1) is at least one kind of a homopolymer selected from the group consisting of polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12), and/or at least one kind of a copolymer using several kinds of raw material monomers forming the homopolymer.

3. The multilayer tube according to claim 1, wherein the polyamide (A2) is at least one kind of a homopolymer selected from the group consisting of polycaproamide (polyamide 6), polyhexamethylene adipamide (polyamide 66), polyhexamethylene azelamide (polyamide 69), polyhexamethylene sebacamide (polyamide 610) and polyhexamethylene dodecamide (polyamide 612), and/or at least one kind of a copolymer using several kinds of raw material monomers forming the homopolymer, or at least one kind of a copolymer comprising a raw material monomer(s) forming at least one kind selected from the group consisting of the polycaproamide (polyamide 6), polyhexamethylene adipamide (polyamide 66), polyhexamethylene azelamide (polyamide 69), polyhexamethylene sebacamide (polyamide 610) and polyhexamethylene dodecamide (polyamide 612) as a main component, and using several kinds of raw material monomers forming at least one kind selected from the group consisting of polynonamethylene dodecamide (polyamide 912), polydecamethylene sebacamide (polyamide 1010), polydecamethylene dodecamide (polyamide 1012), polydodecamethylene dodecamide (polymide 1212), polyundecanamide (polyamide 11) and polydodecanamide (polyamide 12).

4. The multilayer tube according to claim 1, wherein when the terminal amino group concentration which is summed values of the respective terminal amino group concentrations (μeq/g) of the polyamide (A1) and the polyamide (A2) per 1 g of the aliphatic polyamide composition (A) multiplying a mixing mass ratio is made [A] (μeq/g), and when the terminal carboxyl group concentration which is summed values of the respective terminal carboxyl group concentrations (μeq/g) of the polyamide (A1) and the polyamide (A2) per 1 g of the aliphatic polyamide composition (A) multiplying a mixing mass ratio is made [B] (μeq/g), then [A]>[B]+10.

5. The multilayer tube according to claim 1, wherein the semi-aromatic polyamide composition (B) contains an elastomer polymer (B3), and the elastomer polymer (B3) contains a constitutional unit derived from an unsaturated compound having a carboxyl group and/or an acid anhydride group.

6. The multilayer tube according to claim 1, wherein, in at least one pair of the adjacent Layer (a) and Layer (b), the Layer (b) is disposed inside the Layer (a) and adjacent thereto.

7. The multilayer tube according to claim 1, wherein the innermost layer is a conductive layer containing a thermoplastic resin composition in which a conductive tiller is contained.

8. The multilayer tube according to claim 1, wherein it is produced by co-extrusion molding.

9. The multilayer tube according to claim 1, wherein it is used as a fuel tube.

10. The multilayer tube according to claim 1, which further comprises Layer (c), at least one pair of the Layer (b) and the Layer (c) are disposed adjacent to each other, the Layer (c) contains a polyamide composition (C), and the polyamide composition (C) contains a polyamide (C1) and an elastomer polymer (C2), the polyamide (C1) is a polyamide other than the "aliphatic polyamide having a melting point measured in accordance with ISO 11357-3 of 210° C. or lower, and the ratio of the number of the methylene groups to the number of the amide groups of 8.0 or more", and is contained in an amount of 70% by mass or more and 95% by mass or less based on 100% by mass of the polyamide (C1) and the elastomer polymer (C2) in total, and the elastomer polymer (C2) contains a constitutional unit derived from an unsaturated compound having a carboxyl group and/or an acid anhydride group, and is contained in an amount of 5% by mass or more and 30% by mass or less based on 100% by mass of the polyamide (C1) and the elastomer polymer (C2) in total.

11. The multilayer tube according to claim 10, wherein the Layer (c) is disposed inside the Layer (b).

12. The multilayer tube according to claim 1, which further comprises Layer (d), and the Layer (d) contains a fluorine-containing polymer (D) into which a functional group having reactivity to an amino group is introduced in its molecular chain.

13. The multilayer tube according to claim 12, wherein the Layer (d) is disposed inside the Layer (b).

* * * * *